US009642024B2

(12) United States Patent
Reed et al.

(10) Patent No.: US 9,642,024 B2
(45) Date of Patent: *May 2, 2017

(54) MOBILE WIRELESS COMMUNICATIONS SYSTEM AND METHOD WITH CORRECTIVE ACTION RESPONSIVE TO COMMUNICATIONS FAULT DETECTION

(71) Applicant: Traxcell Technologies, LLC, Plano, TX (US)

(72) Inventors: Mark Jefferson Reed, Tucson, AZ (US); Stephen Michael Palik, Redondo Beach, CA (US)

(73) Assignee: TRAXCELL TECHNOLOGIES LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/297,222

(22) Filed: Oct. 19, 2016

(65) Prior Publication Data

US 2017/0041813 A1 Feb. 9, 2017

Related U.S. Application Data

(63) Continuation of application No. 14/642,408, filed on Mar. 9, 2015, now Pat. No. 9,510,320, which is a
(Continued)

(51) Int. Cl.
*H04W 24/00* (2009.01)
*H04W 24/02* (2009.01)
(Continued)

(52) U.S. Cl.
CPC ............. *H04W 24/02* (2013.01); *H04W 4/02* (2013.01); *H04W 8/02* (2013.01)

(58) Field of Classification Search
CPC .......... H04W 24/02; H04W 8/02; H04W 4/02
See application file for complete search history.

(56) References Cited

U.S. PATENT DOCUMENTS 3,419,865 A 12/1968 Chisholm
4,494,119 A 1/1985 Wimbush
(Continued)

FOREIGN PATENT DOCUMENTS

EP 1374481 B1 11/2005

OTHER PUBLICATIONS

Office Action in U.S. Appl. No. 15/099,960 mailed on Jun. 28, 2016, 15 pages (pp. 1-15 in pdf).
(Continued)

*Primary Examiner* — Ajit Patel
(74) *Attorney, Agent, or Firm* — Mitch Harris, Atty at Law, LLC; Andrew M. Harris

(57) ABSTRACT

A mobile device, wireless network and their method of operation provide fault handling in response to detection of a communications fault between a connected mobile device and the communications network. The communications network tracks location of mobile devices and stores performance data of connections between the mobile devices and the network. The performance data is referenced to expected performance data to determine whether a fault exists and a corrective action is suggested when the fault exists.

22 Claims, 90 Drawing Sheets

Related U.S. Application Data continuation of application No. 11/505,578, filed on Aug. 17, 2006, now Pat. No. 8,977,284, which is a continuation-in-part of application No. 10/255,552, filed on Sep. 24, 2002, now abandoned.

(60) Provisional application No. 60/327,327, filed on Oct. 4, 2001, provisional application No. 60/383,528, filed on May 28, 2002, provisional application No. 60/352,761, filed on Jan. 29, 2002, provisional application No. 60/335,203, filed on Oct. 23, 2001, provisional application No. 60/383,529, filed on May 28, 2002, provisional application No. 60/391,469, filed on Jun. 26, 2002, provisional application No. 60/353,379, filed on Jan. 30, 2002, provisional application No. 60/381,249, filed on May 16, 2002.

(51) Int. Cl.
*H04W 8/02* (2009.01)
*H04W 4/02* (2009.01)

(56) References Cited

U.S. PATENT DOCUMENTS

| | | |
|---|---|---|
| 4,818,998 A | 4/1989 | Apsell et al. |
| 4,891,650 A | 1/1990 | Sheffer |
| 4,908,629 A | 3/1990 | Apsell et al. |
| 5,479,482 A | 12/1995 | Grimes |
| 5,504,482 A | 4/1996 | Schreder |
| 5,543,789 A | 8/1996 | Behr et al. |
| 5,561,704 A | 10/1996 | Salimando |
| 5,694,335 A | 12/1997 | Hollenberg |
| 5,712,899 A | 1/1998 | Pace, II |
| 5,835,061 A | 11/1998 | Stewart |
| 5,839,086 A | 11/1998 | Hirano |
| 5,873,040 A | 2/1999 | Dunn et al. |
| 5,911,773 A | 6/1999 | Mutsuga et al. |
| 5,930,515 A | 7/1999 | Ducharme et al. |
| 5,933,100 A | 8/1999 | Golding |
| 5,959,577 A | 9/1999 | Fan et al. |
| 6,014,090 A | 1/2000 | Rosen et al. |
| 6,052,598 A | 4/2000 | Rudrapatna et al. |
| 6,073,075 A | 6/2000 | Kondou |
| 6,084,955 A | 7/2000 | Key et al. |
| 6,088,594 A | 7/2000 | Kingdon et al. |
| 6,091,956 A | 7/2000 | Hollenberg |
| 6,111,539 A | 8/2000 | Mannings et al. |
| 6,150,961 A | 11/2000 | Alewine et al. |
| 6,151,505 A | 11/2000 | Larkins et al. |
| 6,157,838 A | 12/2000 | Di Huo et al. |
| 6,157,841 A | 12/2000 | Bolduc et al. |
| 6,163,751 A | 12/2000 | Van Roekel |
| 6,167,275 A | 12/2000 | Oros et al. |
| 6,233,449 B1 * | 5/2001 | Glitho .............. H04Q 3/0075 455/423 |
| 6,243,030 B1 | 6/2001 | Levine |
| 6,249,252 B1 | 6/2001 | Dupray |
| 6,249,680 B1 | 6/2001 | Wax et al. |
| 6,266,514 B1 | 7/2001 | O'Donnell |
| 6,278,941 B1 | 8/2001 | Yokoyama |
| 6,282,491 B1 | 8/2001 | Bochmann et al. |
| 6,292,743 B1 | 9/2001 | Pu et al. |
| 6,295,502 B1 | 9/2001 | Hancock et al. |
| 6,298,233 B1 | 10/2001 | Souissi et al. |
| 6,298,306 B1 | 10/2001 | Suarez et al. |
| 6,308,073 B1 | 10/2001 | Petty et al. |
| 6,314,365 B1 | 11/2001 | Smith |
| 6,317,605 B1 | 11/2001 | Sakuma |
| 6,317,684 B1 | 11/2001 | Roeseler et al. |
| 6,334,047 B1 | 12/2001 | Andersson et al. |
| 6,336,073 B1 | 1/2002 | Ihara et al. |
| 6,341,255 B1 | 1/2002 | Lapidot |
| 6,362,783 B1 | 3/2002 | Sigiura et al. |
| 6,401,035 B2 | 6/2002 | Jin |
| 6,421,607 B1 | 7/2002 | Gee et al. |
| 6,442,394 B1 | 8/2002 | Valentine et al. |
| 6,456,854 B1 | 9/2002 | Chern et al. |
| 6,484,093 B1 | 11/2002 | Ito et al. |
| 6,490,521 B2 | 12/2002 | Wiener |
| 6,505,114 B2 | 1/2003 | Luciani |
| 6,526,283 B1 | 2/2003 | Jang |
| 6,542,816 B1 | 4/2003 | Ito et al. |
| 6,580,914 B1 | 6/2003 | Smith |
| 6,603,977 B1 | 8/2003 | Walsh et al. |
| 6,614,363 B1 | 9/2003 | Behr et al. |
| 6,633,761 B1 | 10/2003 | Singhal et al. |
| 6,650,902 B1 | 11/2003 | Richton |
| 6,654,683 B2 | 11/2003 | Jin et al. |
| 6,662,105 B1 | 12/2003 | Tada et al. |
| 6,677,894 B2 | 1/2004 | Sheynblat et al. |
| 6,721,542 B1 | 4/2004 | Anttila et al. |
| 6,725,155 B1 | 4/2004 | Takahashi et al. |
| 6,751,443 B2 | 6/2004 | Haymes et al. |
| 6,782,256 B2 | 8/2004 | Engholm et al. |
| 6,795,710 B1 | 9/2004 | Creemer |
| 6,798,358 B2 | 9/2004 | Joyce et al. |
| 6,799,049 B1 | 9/2004 | Zellner et al. |
| 6,816,720 B2 | 11/2004 | Hussain et al. |
| 6,836,667 B1 | 12/2004 | Smith, Jr. |
| 6,839,552 B1 | 1/2005 | Martin |
| 6,845,246 B1 | 1/2005 | Steer |
| 6,847,889 B2 | 1/2005 | Park et al. |
| 6,853,915 B2 | 2/2005 | Hubschneider et al. |
| 6,901,264 B2 | 5/2005 | Myr |
| 6,907,252 B2 | 6/2005 | Papadias et al. |
| 6,925,300 B2 | 8/2005 | Horne |
| 6,931,256 B2 | 8/2005 | Mandyam |
| 6,941,220 B2 | 9/2005 | Le et al. |
| 6,944,447 B2 | 9/2005 | Portman et al. |
| 6,950,745 B2 | 9/2005 | Agnew et al. |
| 6,970,922 B1 | 11/2005 | Spector |
| 6,985,839 B1 | 1/2006 | Motamedi et al. |
| 7,024,187 B2 | 4/2006 | Moles et al. |
| 7,024,205 B1 | 4/2006 | Hose |
| 7,076,244 B2 | 7/2006 | Lazaridis et al. |
| 7,082,365 B2 | 7/2006 | Sheha et al. |
| 7,089,264 B1 | 8/2006 | Guido et al. |
| 7,103,368 B2 | 9/2006 | Teshima |
| 7,116,990 B2 | 10/2006 | Maanoja |
| 7,117,085 B2 | 10/2006 | Buecher et al. |
| 7,120,392 B2 | 10/2006 | Chu et al. |
| 7,149,201 B2 | 12/2006 | Hunzinger |
| 7,151,941 B2 | 12/2006 | Vanttinen et al. |
| 7,162,367 B2 | 1/2007 | Lin et al. |
| 7,164,921 B2 | 1/2007 | Owens et al. |
| 7,203,503 B2 | 4/2007 | Cedervall et al. |
| 7,260,473 B2 | 8/2007 | Abe et al. |
| 7,280,803 B2 | 10/2007 | Nelson |
| 7,333,794 B2 | 2/2008 | Zappala |
| 7,333,820 B2 | 2/2008 | Sheha et al. |
| 7,366,522 B2 | 4/2008 | Thomas |
| 7,574,222 B2 | 8/2009 | Sawada et al. |
| 7,574,230 B1 | 8/2009 | Oh et al. |
| 7,634,266 B2 | 12/2009 | McDougall et al. |
| 7,689,240 B2 * | 3/2010 | Anderson ........... H04W 52/223 340/539.11 |
| 7,813,741 B2 | 10/2010 | Hendrey et al. |
| 7,853,267 B2 | 12/2010 | Jensen |
| 7,996,017 B2 | 8/2011 | Vanttinen |
| 8,218,507 B2 | 7/2012 | Palmer et al. |
| 8,977,284 B2 | 3/2015 | Reed |
| 2002/0002504 A1 | 1/2002 | Engel et al. |
| 2002/0052786 A1 | 5/2002 | Kim et al. |
| 2002/0091568 A1 | 7/2002 | Kraft et al. |
| 2002/0111154 A1 | 8/2002 | Eldering et al. |
| 2002/0161633 A1 | 10/2002 | Jacob et al. |
| 2002/0173905 A1 | 11/2002 | Jin et al. |
| 2003/0004743 A1 | 1/2003 | Callegari |
| 2003/0033571 A1 * | 2/2003 | Bohnke .............. H03M 13/09 714/758 |
| 2003/0134648 A1 | 7/2003 | Reed |
| 2003/0199260 A1 | 10/2003 | Casey et al. |
| 2004/0246147 A1 | 12/2004 | Von Grabe |

(56) References Cited

U.S. PATENT DOCUMENTS

2005/0043036 A1 2/2005 Ioppe et al.
2015/0309295 A1 10/2015 Cocker et al.
2015/0312882 A1 10/2015 Reed et al.
2016/0227510 A1 8/2016 Reed et al.

OTHER PUBLICATIONS

Office Action in U.S. Appl. No. 14/642,408 mailed on Aug. 10, 2016, 21 pages (pp. 1-21 in pdf).
Notice of Allowance in U.S. Appl. No. 14/642,408 mailed on Sep. 28, 2016, 6 pages (pp. 1-6 in pdf).
Office Action in U.S. Appl. No. 11/505,578 mailed on Jul. 7, 2009, 7 pages (pp. 1-7 in pdf).
Office Action in U.S. Appl. No. 11/505,578 mailed on May 12, 2010, 4 pages (pp. 1-4 in pdf).
Final Office Action in U.S. Appl. No. 11/505,578 mailed on Nov. 9, 2010, 6 pages (pp. 1-6 in pdf).
Office Action in U.S. Appl. No. 11/505,578 mailed on Aug. 18, 2011, 7 pages (pp. 1-7 in pdf).
Office Action in U.S. Appl. No. 11/505,578 mailed on Mar. 28, 2012, 7 pages (pp. 1-7 in pdf).
Final Office Action in U.S. Appl. No. 11/505,578 mailed on Dec. 12, 2012, 8 pages (pp. 1-8 in pdf).
Notice of Allowance in U.S. Appl. No. 11/505,578 mailed on May 6, 2014, 13 pages (pp. 1-13 in pdf).
Office Action in U.S. Appl. No. 10/255,552, mailed on Aug. 10, 2005, 12 pages (pp. 1-12 in pdf).
Final Office Action U.S. Appl. No. 10/255,552, mailed on Mar. 7, 2006, 19 pages (pp. 1-19 in pdf).
Lui, et al., "Location Updates and Probabilistic Tracking Algorithms for Mobile Cellular Networks", Fourth International Symposium on Parallel Architectures, Algorithms, and Networks, Jun. 1999, 6 pages (pp. 1-6 in pdf), US.
Krishna, "Performance Issues in Mobile Wireless Networks", Office of Graduate Studies of Texas A&M University, Aug. 1996, 204 pages (pp. 1-204 in pdf), US.

* cited by examiner

TYPICAL THREE SECTOR RADIO TOWER CONFIGURATION
*(PRIOR ART)*

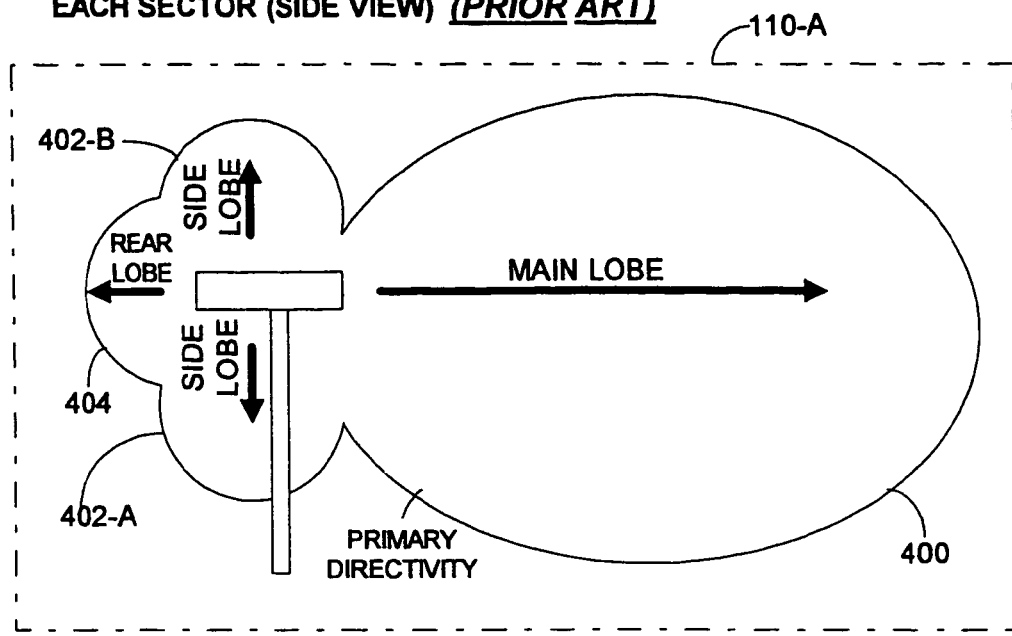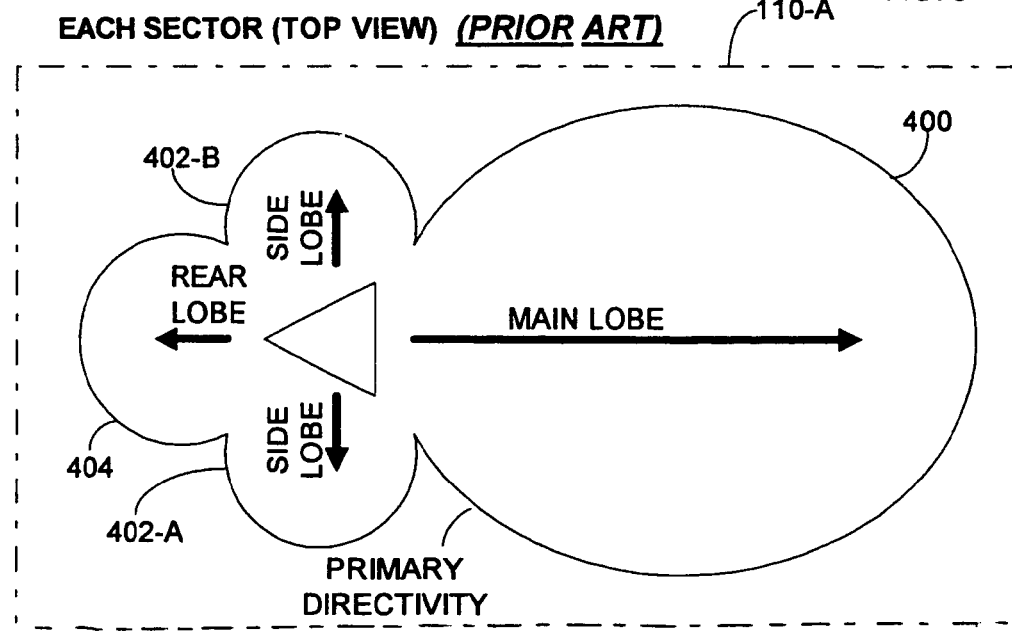

THREE TOWER LOCATION METHOD

USER LOCATION DATABASE COORDINATOR FLOWCHART

FIG. 15 GENERIC USER LOCATION DATABASE COORDINATOR COMPONENTS

FIG. 20 HIERARCHY OF LOCATION METHODS

FIG. 21 VALUATION OF LOCATION METHODS

FIG. 24 RF REMOTE LINK TO REMOTE MOBILE DEVICE

FIG. 27

COMPONENTS UTILIZED BY ULDM WHEN LOCATING WIRELESS DEVICE

|          | MTX | HLR | VLR | ULD | BSC | SBS SHELFS | BTS | WIRELESS DEVICE |
|----------|-----|-----|-----|-----|-----|------------|-----|-----------------|
| METHOD 1 | X   | X   | X   | X   | X   | X          | X   |                 |
| METHOD 2 | X   | X   | X   | X   | X   | X          |     |                 |
| METHOD 3 | X   | X   | X   | X   | X   | X          |     |                 |
| METHOD 4 | X   | X   | X   | X   |     |            |     | X               |

METHOD 1: DIGITAL SIGNITURE

METHOD 2: TRIANGULATION AND SINGNAL STRENGTH

METHOD 3: SIGNAL STRENGTH ONLY

METHOD 4: ALTERNATIVE EMBODIMENT; LOCATION DETERMINED AT WIRELESS DEVICE (GPS, TRIANGULATION, ETC.)

FIG. 28 INTERWORKING SYSTEM DIAGRAM

STANDARDIAZTION/CONVERSION SOFTWARE — FIG. 30

906

- 3000: START (GENERIC COMMAND)
- 3002: CHECK PROTOCOL TYPE AGAINST KNOWN TYPES
- 3004: PROTOCOL DATABASE
- 3006: PROTOCOL RECOGNIZED?
  - NO → 3024: SIGNAL "PROTOCOL ERROR"
  - YES → 3008: CHECK DEVICE ATTACHED
- 3010: CHECK DEVICES PROTOCOL LIST
- 3012: RECEIVE DEVICE PROTOCOL LIST
- 3014: IS CONVERTABLE PROTOCOL LISTED?
  - NO → 3024: SIGNAL "PROTOCOL ERROR"
  - YES → 3016: CONVERT COMMAND PROTOCAL
- 3018: SEND TO CONNECTED DEVICE
- 3020: CONNECTED DISTINATION DEVICE
- 3022: END

THIS STANDARDIZATION/CONVERSTION PROCESS OPERATES THE SAME IN EITHER DIRECTION (FROM SOURCE TO DESTINATION, OR THE DESTINATION TO SOURCE). CONVERSION PROCESS IS THE SAME IN EITHER DIRECTION.

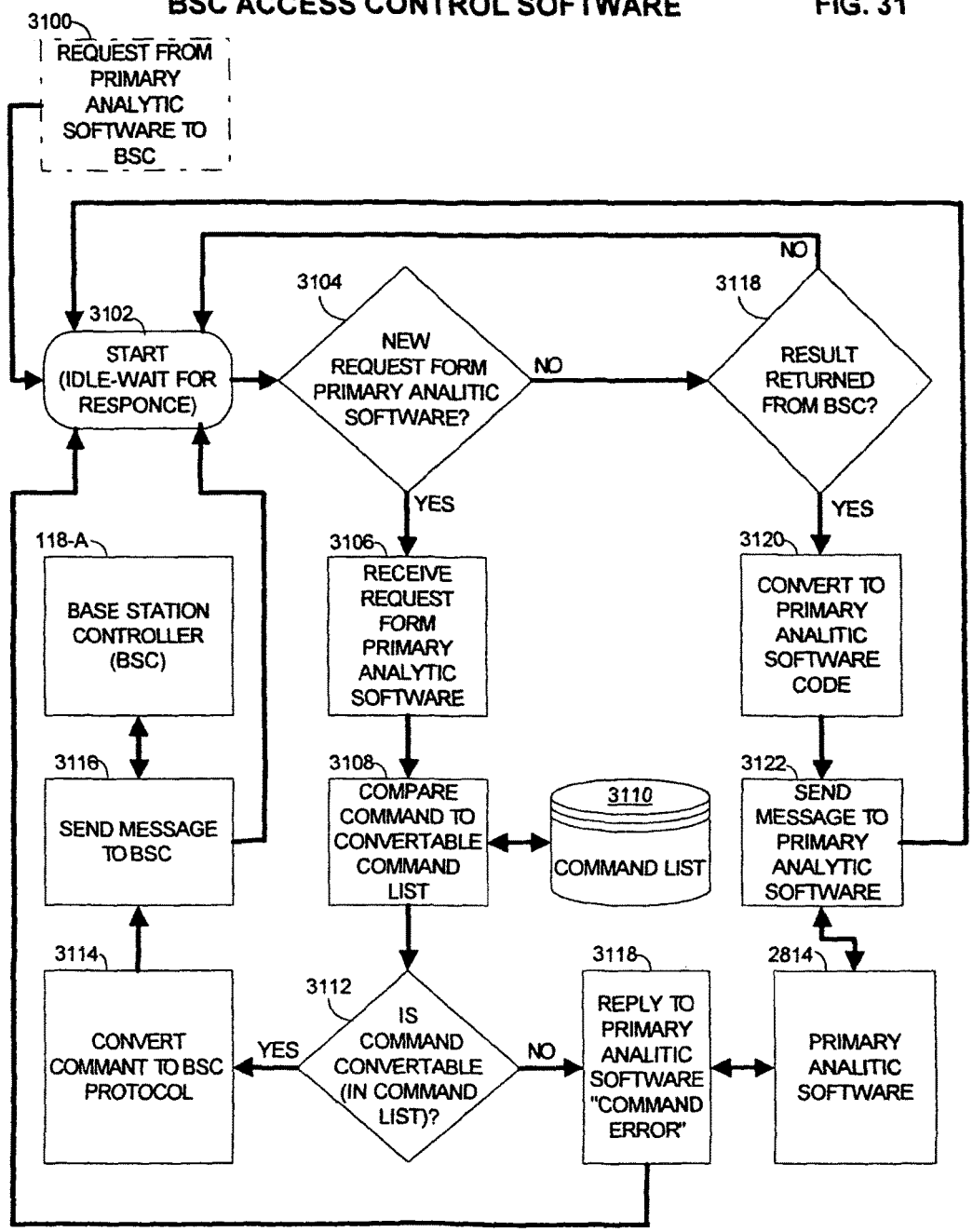

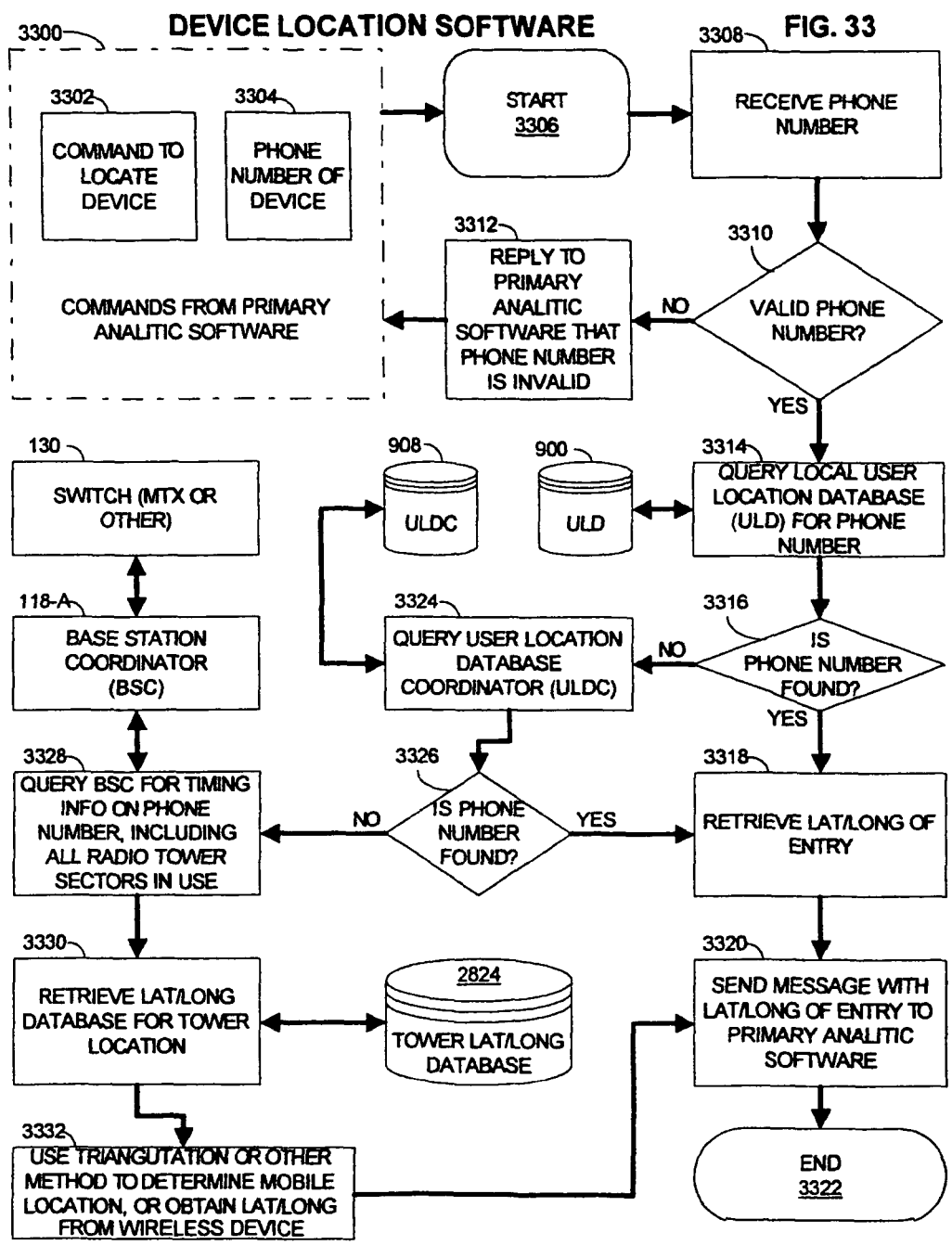

TARGETING DEVICES TO TRACK   FIG. 34

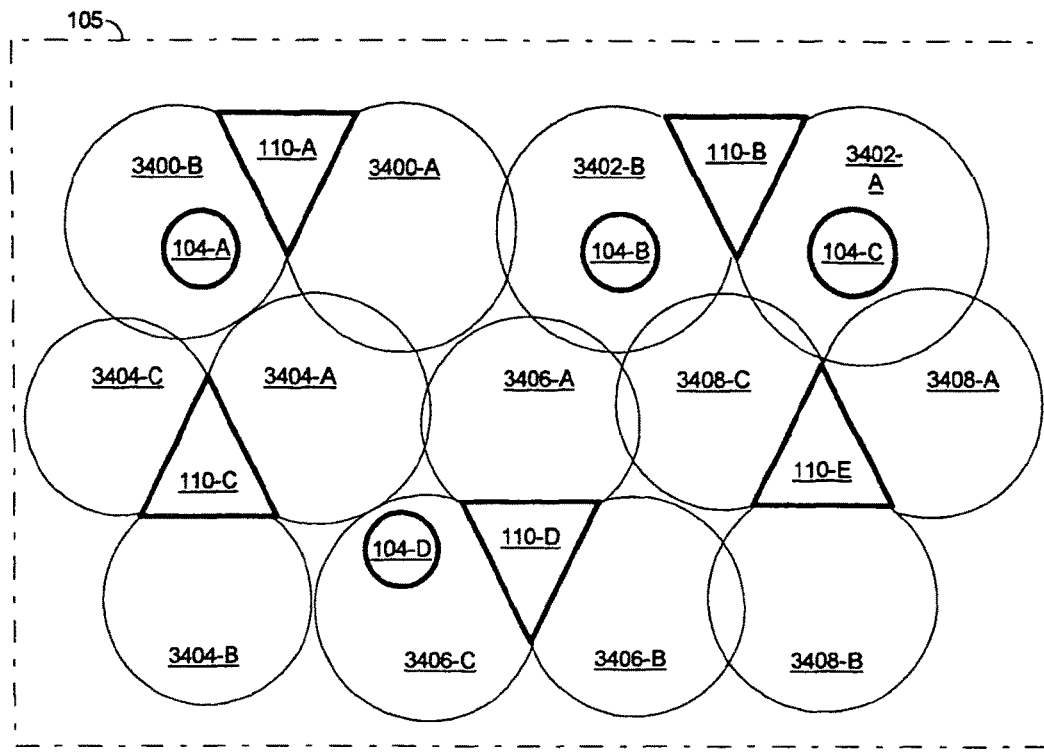

REQUEST>BTS SECTOR 3400-B
RETURN<MOBILE #104-A+ ALL WIRELESS DEVICES THAT ENTER SECTOR WHILE
   TRACKING.

REQUEST>BTS SECTOR 3402-A
RETURN<MOBILE #104-C+ ALL WIRELESS DEVICES THAT ENTER SECTOR WHILE
   TRACKING.

REQUEST>BTS SECTOR 3400-B, 3402-A, 3402-B
RREQUEST>BTS SECTOR , 3400-B, RETURN +<MOBILE #104-A+ ALL WIRELESS
DEVICES THAT ENTER SECTOR WHILE TRACKING.

REQUEST>INDIVIDUAL OR PLURALITY OF WIRELESS DEVICES
RETURN<ALL MOBILES QUERIED ABOVE.

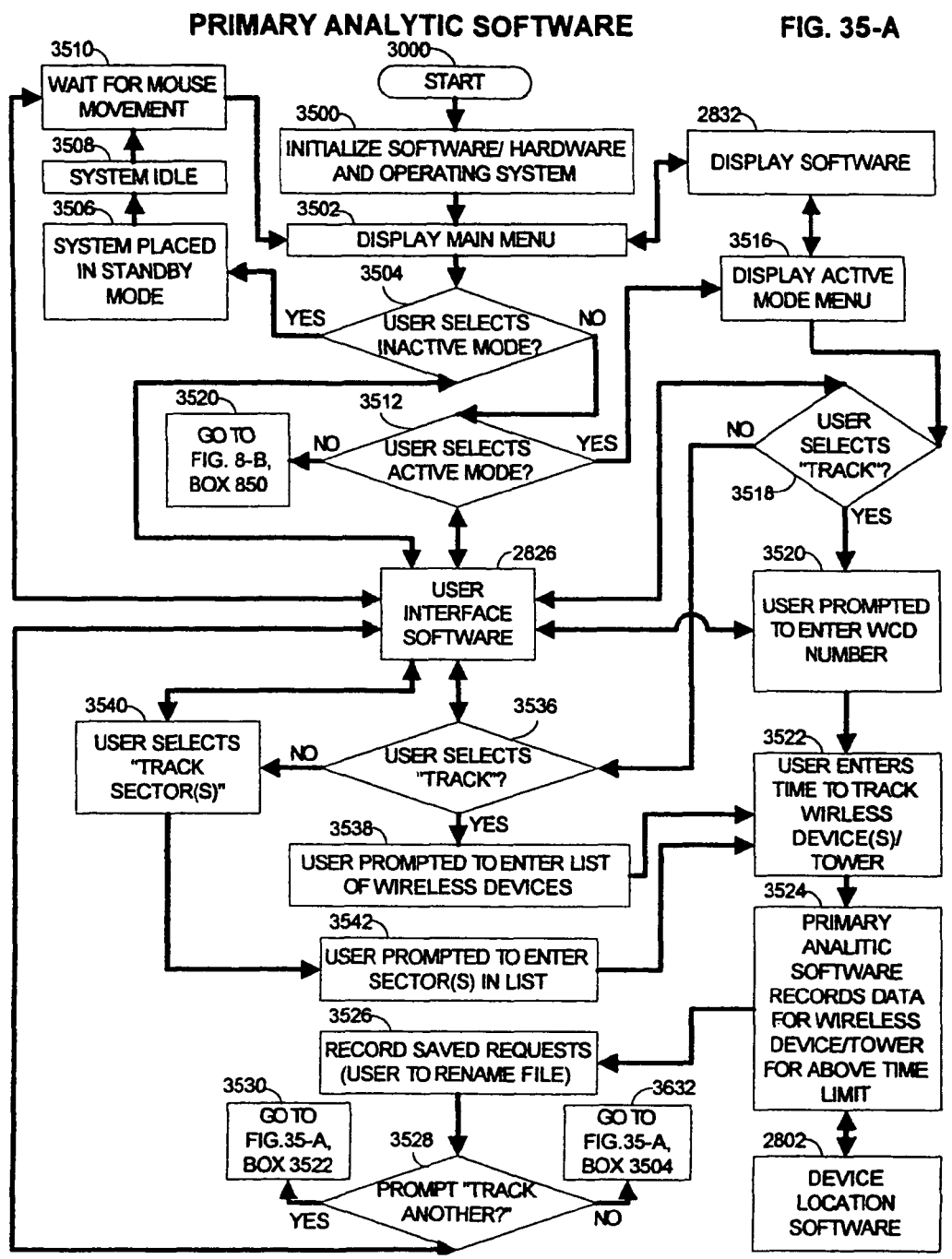

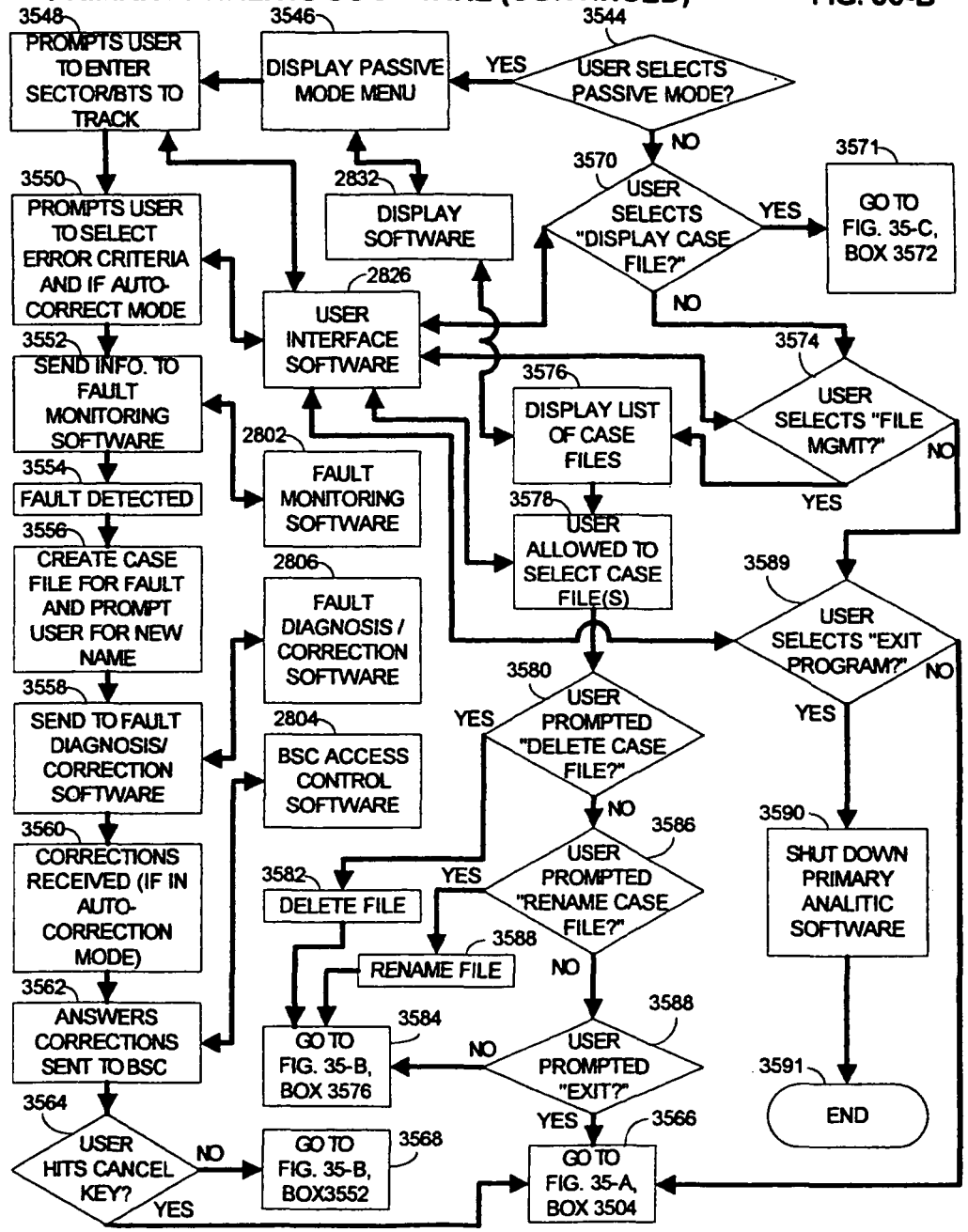
FIG. 35-B

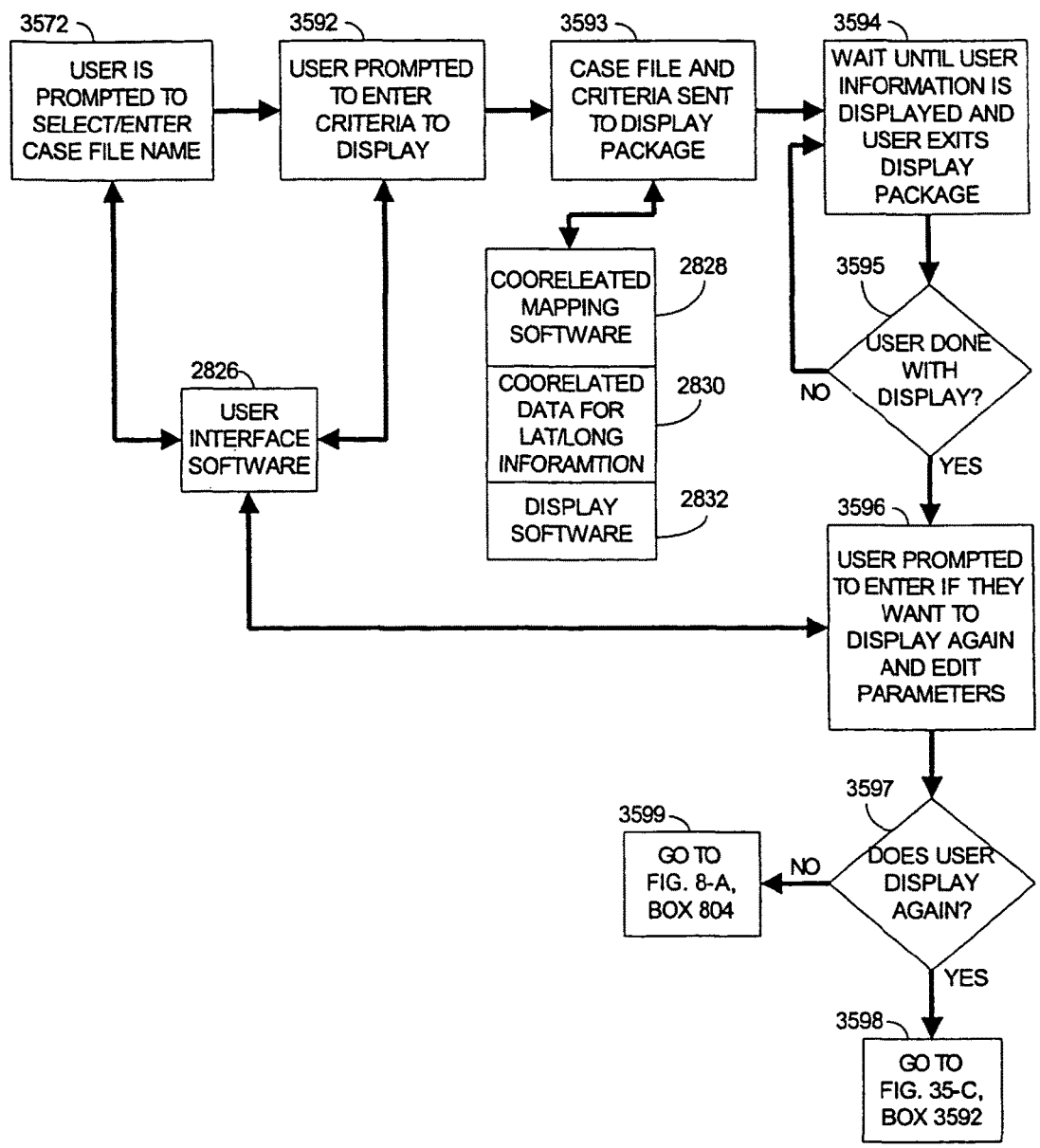
FIG. 35-C

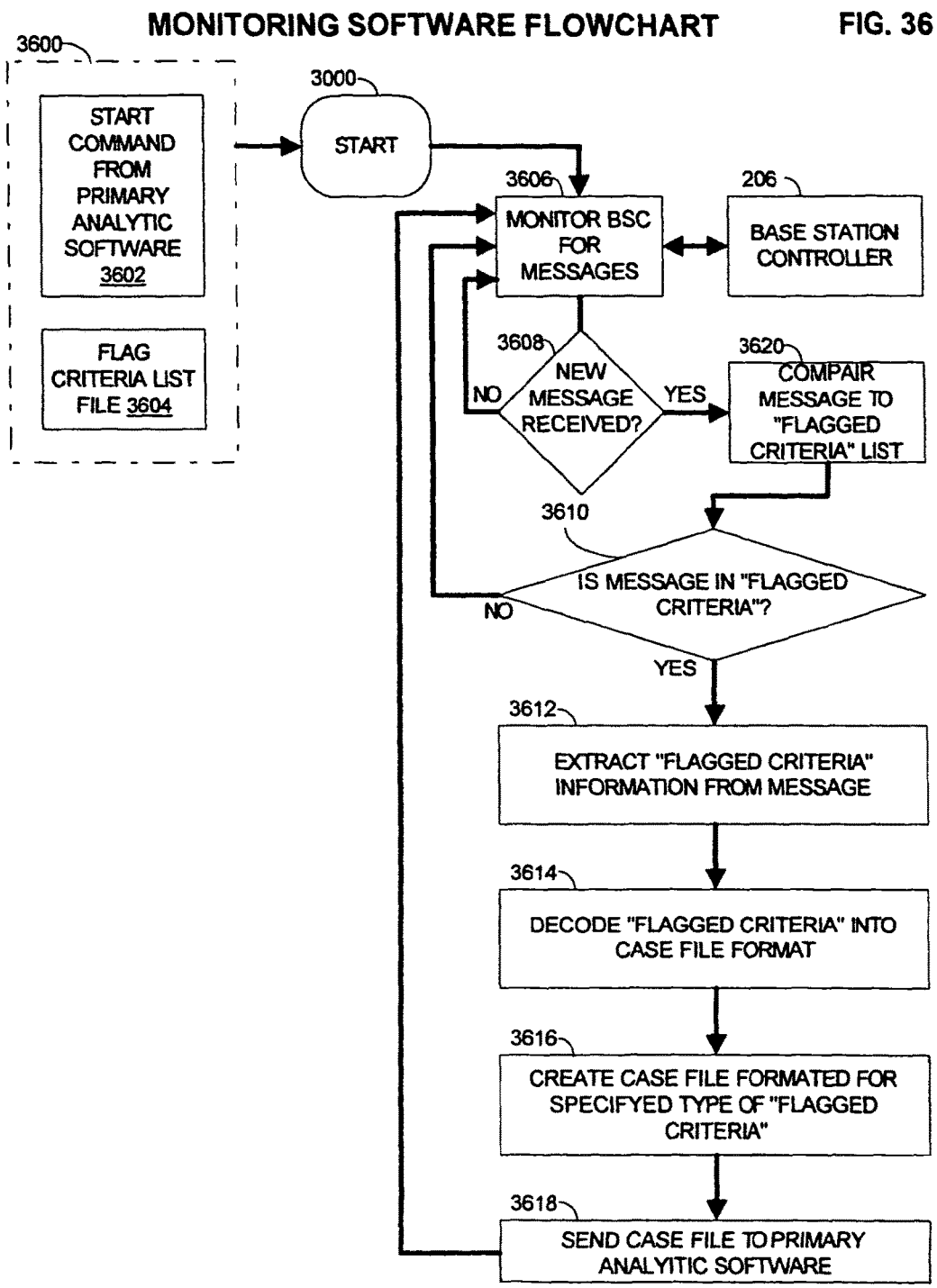

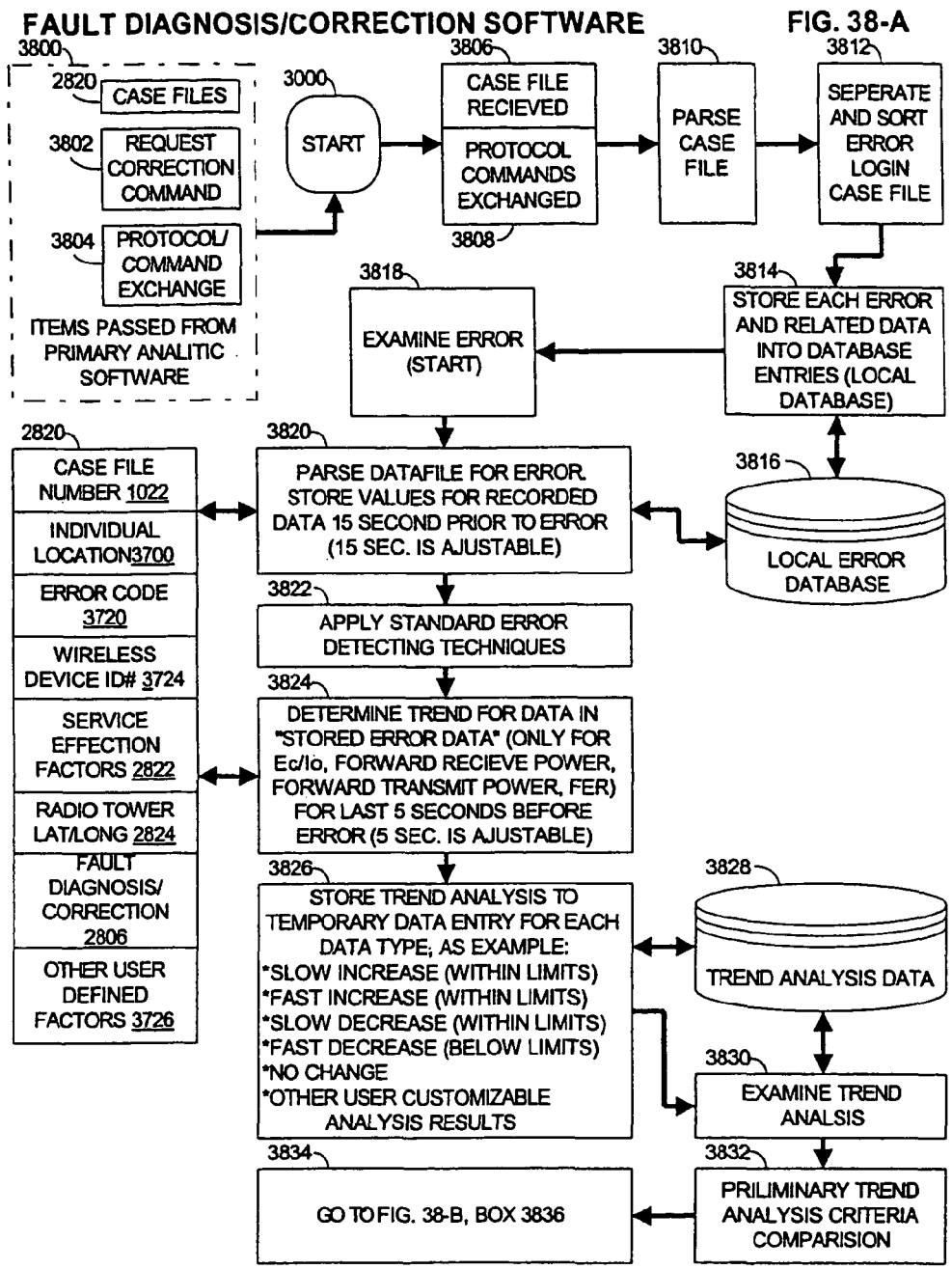

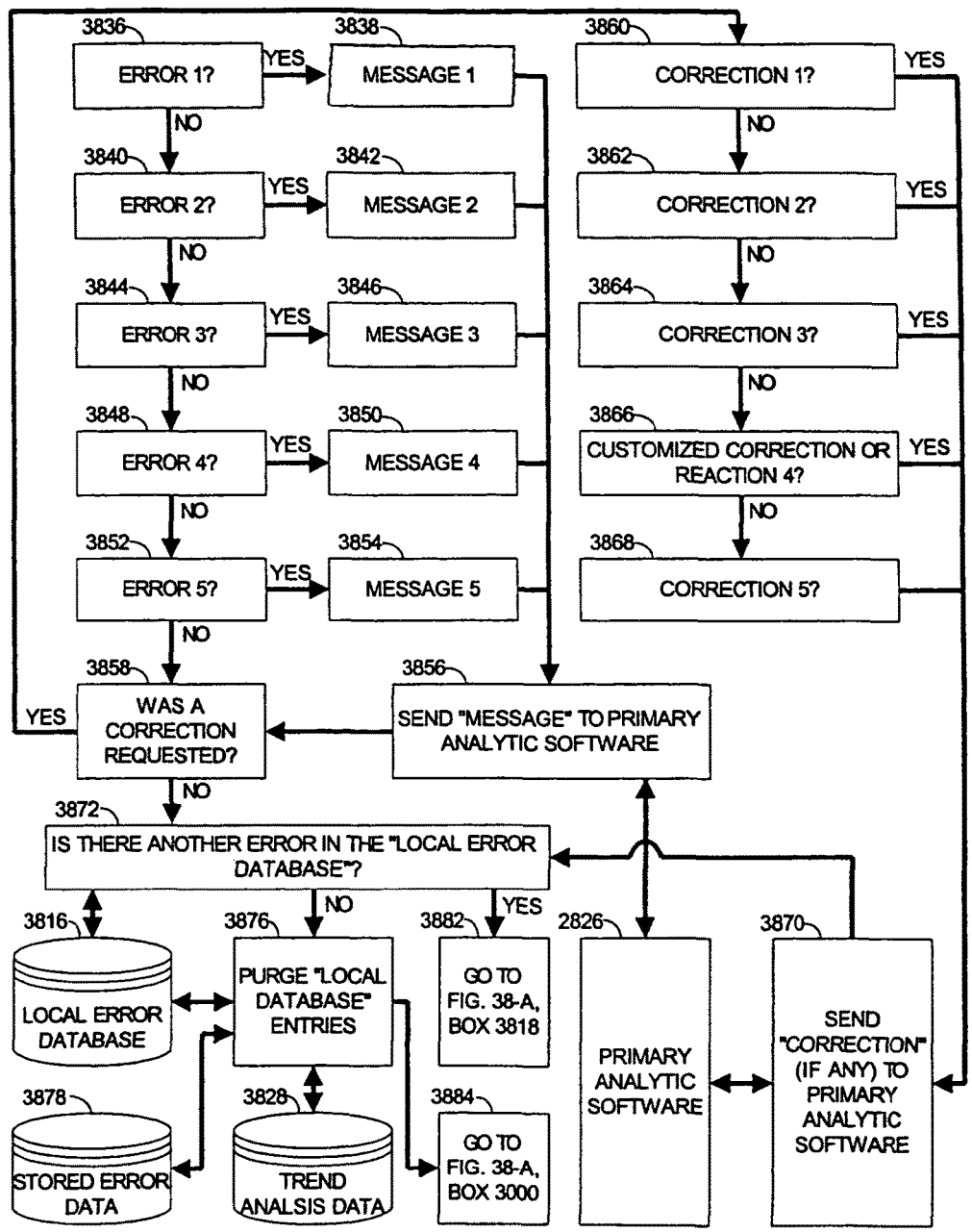

FAULT DIAGNISIS/CORRECTION SOFTWARE

| # | ERROR TABLE |
|---|---|
| 1 | FER=FAST INCREASE<br>FORWARD RECIEVE POWER=INCREASE?<br>(TOWER RECEIVE STRENGTH) |
| 2 | FORWARD RECIEVE POWER=FAST DECREASE<br>FER=FAST INCREASE? |
| 3 | Ec/Io=FAST INCREASE<br>FER=SLOW OR FAST INCREASE? |
| 4 | OTHER COMPARISION CRITERIA (USER CUSTOMIZABLE) WITH USER CONCLUSION<br>MASSAGES (CAN EXAMINE ANY DATA IN ERROR DATABASE)? |
| 5 | SEND CONCLUSION MESSAGE "UNABLE TO AUTO DETECT ERROR" |

3886

| # | MESSAGE TABLE |
|---|---|
| 1 | "MOBILE CROSS-TALK INTERFERENCE TOO HIGH" |
| 2 | "MOBILE OUT OF RANGE OF TOWER" |
| 3 | "PN POLUTION TOO HIGH FOR MOBILE" |
| 4 | USER CUSTOMIZABLE MESSAGE FOR CUSTOMIZED ANALYSIS |
| 5 | "UNABLE TO DETECT ERROR" |

3888

| # | CORRECTION TABLE |
|---|---|
| 1 | NONE |
| 2 | INCREASE TOWER FORWARD TRANSMIT POWER |
| 3 | DECREASE FORWARD TRANSMIT POWER ON PN'S IN MOBILE RECIEVE AREA WITH<br>TOWERS GREATER THAN 5KM AWAY |
| 4 | SEND CUSTOMIZED CONFIGURATION CHANGE BACK TO PRIMARY ANALITIC SOFTWARE |
| 5 | SEND NO CONFIGURATION CHANGE BACK |

PRO-ACTIVE NETWORK TUNING SOFTWARE      FIG. 42

ACTIVE WIRELESS UNIT DENSITY GEOGRAPHIC ZONING

ACTIVE WIRELESS UNIT DENSITY

● - WIRELESS UNIT COMMUNICATING TO NETWORK WITH BER/FER LESS THAN 2-20%

△ - WIRELESS UNIT COMMUNICATING TO NETWORK WITH BER/FER GREATER THAN 2-20%

★ - SECTOR HAS GREATER THAN 50% OF MOBILES WITH BER/FER OVER 20%

TERRAIN INTEFERENCE NON-RADIAL ZONING     FIG. 45

TERRAIN INTEFERENCE RADIAL DIVIDED ZONING      FIG. 46

FIG. 62 "LISTING" ADDED TO "BUILDING MEMORY"

FIG. 64 "CATEGORY" ADDED TO "BUILDING MEMORY"

FIG. 65 "ADDRESS" ADDED TO "BUILDING MEMORY"

DAN LINKING SOFTWARE FIG. 85

Traffic Time Calculation Performance Based on Variable a $\beta := 2$    b is equal to the amount of time it would take for vehicle to travel the geographic segment under normal conditions.

a is an experimentally determined scaling factor $Dr := 1$    Dr is equal to the Density Ratio, which in the example is 3.

$f(\alpha) := \alpha e^{Dr \cdot \beta}$

Traffic Time Calculation Performance Based on Variable Traffic Density Ratio

FIG. 87

$\beta := 1$      b is equal to the amount of time it would take for vehicle to travel the geographic segment under normal conditions. It is 1 for this example.

$\alpha := 1$      a is an experimentally determined scaling factor. It is 1 for this example Dr is equal to the Density Ratio, which in the example is 3.

$f(Dr) := \alpha e^{Dr \cdot \beta}$

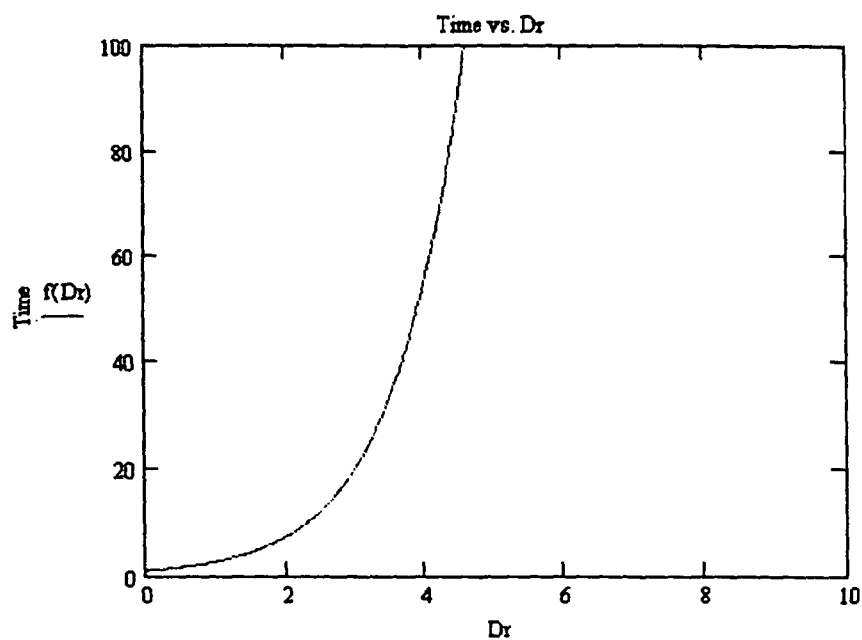

MOBILE WIRELESS COMMUNICATIONS SYSTEM AND METHOD WITH CORRECTIVE ACTION RESPONSIVE TO COMMUNICATIONS FAULT DETECTION

The present Application is a Continuation of U.S. patent application Ser. No. 14/642,408, filed on Mar. 9, 2015, which is a Continuation of U.S. patent application Ser. No. 11/505,578, filed on Aug. 17, 2006 and issued as U.S. Pat. No. 8,977,284 on Mar. 10, 2015, which is a Continuation-in-part of U.S. patent application Ser. No. 10/255,552, filed on Sep. 24, 2002, and claims priority thereto under 35 U.S.C. §120. U.S. patent application Ser. No. 10/255,552 claims priority under 35 U.S.C. §119(e) to U.S. Provisional Patent Application Ser. No. 60/327,327 filed on Oct. 4, 2001, U.S. Provisional Patent Application Ser. No. 60/383,528 filed on May 28, 2002, U.S. Provisional Patent Application Ser. No. 60/352,761 filed on Jan. 29, 2002, U.S. Provisional Patent Application Ser. No. 60/335,203 filed on Oct. 23, 2001, U.S. Provisional Patent Application Ser. No. 60/383,529 filed on May 28, 2002, U.S. Provisional Patent Application Ser. No. 60/391,469 filed on Jun. 26, 2002, U.S. Provisional Patent Application Ser. No. 60/353,379 filed on Jan. 30, 2002 and U.S. Provisional Patent Application Ser. No. 60/381,249 filed on May 16, 2002. The disclosures of all of the above-referenced U.S. Patent Applications are incorporated herein by reference.

FIELD OF THE INVENTION

The present invention is directed generally to a system and method for providing navigation using mobile wireless devices, and more specifically to a mobile wireless device having both on-line and off-line navigation capabilities.

BACKGROUND OF THE INVENTION

Wireless networks 100 are becoming increasingly important worldwide. Wireless networks 100 are rapidly replacing conventional wire-based telecommunications systems in many applications. Cellular radio telephone networks ("CRT"), and specialized mobile radio and mobile data radio networks are examples. The general principles of wireless cellular telephony have been described variously, for example in U.S. Pat. No. 5,295,180 to Vendetti, et al., which is incorporated herein by reference. There is great interest in using existing infrastructures of wireless networks 100 for locating people and/or objects in a cost effective manner. Such a capability would be invaluable in a variety of situations, especially in emergency or crime situations. Due to the substantial benefits of such a location system, several attempts have been made to design and implement such a system. Systems have been proposed that rely upon signal strength and triangulation techniques to permit location include those disclosed in U.S. Pat. Nos. 4,818,998 and 4,908,629 to Apsell et al. ("the Apsell patents") and U.S. Pat. No. 4,891,650 to Sheffer ("the Sheffer patent"). However, these systems have drawbacks that include high expense in that special purpose electronics are required.

Furthermore, the systems are generally only effective in line-of-sight conditions, such as rural settings. Radio wave multipath, refractions and ground clutter cause significant problems in determining the location of a signal source in most geographical areas that are more than sparsely populated. Moreover, these drawbacks are particularly exacerbated in dense urban canyon (city) areas, where errors and/or conflicts in location measurements can result in substantial inaccuracies.

Another example of a location system using time difference of arrival (TDOA) and triangulation for location are satellite-based systems, such as the military and commercial versions of the global positioning satellite system (GPS). GPS can provide accurate position from a time-based signal received simultaneously from at least three satellites. A ground-based GPS receiver at or near the object to be located determines the difference between the time at which each satellite transmits a time signal and the time at which the signal is received and, based on the time differentials, determines the object's location. However, the GPS is impractical in many applications. The signal power levels from the satellites are low and the GPS receiver requires a clear, line-of-sight path to at least three satellites above a horizon greater than about 60 degrees for effective operation. Accordingly, inclement weather conditions, such as clouds, terrain features, such as hills and trees, and buildings restrict the ability of the GPS receiver to determine its position. Furthermore, the initial GPS signal detection process for a GPS receiver can be relatively long (i.e., several minutes) for determining the receiver's position. Such delays are unacceptable in many applications such as, for example, emergency response and vehicle tracking. Additionally there exists no one place that this location information is stored such that a plurality of wireless devices 104 could be located on a geographic basis.

SUMMARY OF FACTORS AFFECTING RF PROPAGATION

The physical radio propagation channel perturbs signal strength, causing rate changes, phase delay, low signal to noise ratios (e.g., ell for the analog case, or $E_b$/no, RF energy per bit, over average noise density ratio for the digital case) and doppler-shift. Signal strength is usually characterized by:

Free space path loss ($L_p$)
Slow fading loss or margin ($L_{slow}$)
Fast fading loss or margin ($L_{fast}$)

Loss due to slow fading includes shadowing due to clutter blockage (sometimes included in 1.p). Fast fading is composed of multipath reflections which cause: 1) delay spread; 2) random phase shift or rayleigh fading, and 3) random frequency modulation due to different doppler shifts on different paths.

Summing the path loss and the two fading margin loss components from the above yields a total path loss of:

$$L_{total} = L_p \pm L_{slow} + L_{fast}$$

Referring to FIG. 3, the figure illustrates key components of a typical cellular and PCS power budget design process. The cell designer increases the transmitted power $P_{TX}$ by the shadow fading margin $L_{slow}$ which is usually chosen to be within the 1-2 percentile of the slow fading probability density function (PDF) to minimize the probability of unsatisfactorily low received power level $P_{RX}$ at the receiver. The $P_{RX}$ level must have enough signal to noise energy level (e.g., 10 dB) to overcome the receiver's internal noise level (e.g., −118 dBm in the case of cellular 0.9 GHz), for a minimum voice quality standard. Thus in the example $P_{RX}$ must never be below −108 dBm, in order to maintain the quality standard. Additionally the short term fast signal fading due to multipath propagation is taken into account by deploying fast fading margin $L_{fast}$, which is typically also chosen to be a few percentiles of the fast fading distribution. The 1 to 2 percentiles compliment other network blockage guidelines. For example the cell base station traffic loading capacity and network transport facilities are usually designed for a 1-2 percentile blockage factor as well. However, in the worst-case scenario both fading margins are simultaneously exceeded, thus causing a fading margin overload.

DETAILED DESCRIPTION OF THE PRIOR ART

Turning to FIG. 1 is a typical second-generation wireless network 100 architecture designed for a code division multiple access (CDMA) and is similar for a time division multiple access (TOMA) or others such as GSM. These are all digital systems that may or may not have the ability to operate in an analog mode. A general overview of the operation of this system will begin when the wireless device user 102 initiates a call with the wireless device 104. A wireless device 104 may take the form of a wireless device 104, personal digital assistant (PDA), laptop computer, personal communications system, vehicle mounted system, etc. Radio frequency (RF) signal 106 is sent from the wireless device 104 to a radio tower and base-station transceiver subsystem (BTS) 300 (FIG. 3), having a global positioning system (GPS) receiver 110-A, 110.8, or 110-C as part of the BTS. The GPS receiver 302 (described in FIG. 3) receives a GPS satellite network signal 112 from the GPS satellite network 114, used by the radio tower with network BTS 108 for timing information. That information is used by the BTS to synchronize the communications signal and allow decoding of the digitized wireless device 104 radio frequency signal 106. The call is then carried from the radio tower and BTS with GPS receiver 110-A, 110-B, or 110-C through a wired link 116 via a T1, T3, microwave link, etc, to the base station controller (BSC) 118-A with vocording 120, CIS 122, and a backhaul 1/F 124, where the call is formatted and coded into data packets by the BSS manager 126 via an intersystem logical connection 128. The call is then sent to the switch 130 via intersystem logical connections 132, where the call is then forwarded through intersystem logical connections 150 to the PSTN 138. The call may also be directly routed to another wireless device 104 on the wireless network 100.

From the PSTN 138, the call is forwarded through a connection from the PSTN 138 to communications link 140 and then to land lines 142. As the call proceeds, the words or data from the wireless device user 102 and the ultimate person or device at the receiving end of the call, are formatted, coded and decoded again and again, in the manor described above, throughout the conversation as the conversation or data volleys back and forth. Turning to FIG. 2 is a typical third generation (3G) wireless network 200. The only major difference between the second generation wireless network 100 and third generation wireless network's 200 architecture is the addition of a packet data service node (PDSN) 202 and in the inner system logical connection 204 which connects the PDSN 202 to the BSC 118-B. However, It should be noted that the expansions in architecture do not affect current implementation of this machine and/or process as described by this patent. The methodology is the same as in the second generation wireless network 100 (FIG. 1) and for completeness the periphery 3G 200 components and their logical locations have been shown.

As other technologies in network design emerge, it is important to realize that modifications and improvements can be made to this design and patent while retaining the spirit in which it was written. FIG. 1 and FIG. 2 demonstrates the logical locations in which this patent applies to current technology. It is both obvious and required that some changes would have to be made to accommodate future technologies and again are understood to be within the spirit of this patent.

Ability to Locate Wireless Device

There are numerous methods for obtaining the location of a wireless device 104, which have been taught in the prior art. Most common are in wireless networks (CDMA, TOMA, GSM, etc). All of these wireless networks 100 currently use similar hardware, which these patented location methods take advantage of Referring now to FIG. 3, details of a typical three sector radio tower 110-A. The BTS 300 with a GPS receiver 302 are shown. This radio tower 110-A exists in most current wireless networks 100 (FIG. 1) and 200 (FIG. 2) and is used most commonly. Its inclusion is for completeness of this document.

Still referring to FIG. 3, the typical three sector radio tower 110-A with BTS 300 setup includes a BSC 118-A, and 118-B which is connected to a BTS 300 through a T1 116 or a microwave link 304. The GPS has a receiver 302 that is used in its operation to establish timing information for communication synchronization. The radio tower 110-A has 3 sectors. Each sector comprises one primary receive antenna 306-A, 308-A, 310-A, and one diversity receive antenna 306-C, 308-C, 310-C. Each sector also has one transmit antenna 306-B, 308-B, 310-B. These receiver antennas and transmit antennas are elevated by the radio tower pole 312 and connected to the BTS by antenna leads 314.

FIG. 4 illustrates the typical footprint characteristics (side view) of a typical three-sector radio tower antenna 110-A, such as described in FIG. 3. Each sector has a primary lobe 400 (which corresponds with its primary directivity), multiple side lobes 402-A and 402-B, and multiple rear lobes 404.

FIG. 5 illustrates the typical footprint characteristics (top view) of a typical threesector radio tower antenna 110-A, such as described in FIG. 3. Each sector has a primary lobe 400 (which corresponds with its primary directivity), multiple side lobes 402-A, and 402-B, and multiple rear lobes 404.

Location Determined as Follows:

As many other patents go into great depth on location-based methods, for completeness, a brief description of the methods preferred by this patent will be discussed.

FIG. 6 shows general methods for triangulation with three radio towers; 110-A, 110-B, and 110-C. This method is covered in numerous other patents but the basic idea is included for completeness.

Still referring to FIG. 6 round trip delay (RTD) from each radio tower and BTS 110-A, 110-B and 110-C is used to calculate distance from radio towers to the wireless device 104. To calculate distance 600-A, 600-B, and 600-C, take the RTD (unit in seconds) and multiply by the speed of light (or speed in relative medium of propagation) and divide by two.

$$\frac{RTD * c}{2} \cdot D, D = \text{Distance in meters from tower } (c = \text{speed of light})$$

Having done so, you can calculate the position, relative to the known geological position of the towers 110-A, 110-B, and 110-C, of the wireless device 104.

To calculate position you find the intersection of three concentric spheres around each radio tower and BTS 110-A, 110-B, and 110-C with each radius equaling the distance 600-A, 600-B, and 600-C to the wireless device 104 from that radio tower and BTS. The wireless device 104 location is the intersection of the three spheres.

FIG. 7 shows a two-tower location finding method as taught in the prior art. It is included for completeness of this document. It uses two towers 110-A, and 11 OB with a wireless device 104 at distances of 700-A, and 700-B.

Because each tower has more than one sector, as the wireless device 104 approaches a radio tower 110-A or 11 O·B, it may be talking to more than one sector on a single radio tower as is illustrated in FIG. 4, FIG. 5, and FIG. 6. When this occurs, there is a critical distance below which the time it takes for two sectors on a single tower to reach the wireless device 104 is indistinguishable due to hardware calculation limitations. This would make the distance from both sectors (which are already very close, being located on the same tower) appear the same. In this case you should regard the tower as having only one sector, characterized by the distance (equal) from the two sectors. Now, using this as a base you can calculate the location at the wireless device 104 by examining the intersection on the two spheres (one from each tower) and the intersection of the vertical plane between the two towers 110-A and 110-8. This should result in a single point and hence the location of the wireless device 104.

FIG. 8 shows a one-tower 110-A location method. It shows a tower (3 sectors) and three distances 800-A, 800-B, 800-C from a wireless device 104.

In this case, the wireless device 104 has approached a radio tower 110-A so closely that is talking to three sectors on the site. Because, at this proximity, the distance 800-A, 800-B and 800-C between the three sectors (Sector 1, Sector 2, and Sector 3) on the radio tower 110-A is so negligible, the accuracy is reduced to predicting the wireless device's 104 location with one concentric sphere around the radio tower 110-A, with a radius equaling the distance 800-A, 800-B, or 800-C from any site as calculated above. Relative direction can be computed using the sector (Sector 1, Sector 2, or Sector 3) with the strongest receive power from the wireless device 104 as the likely direction to the wireless device 104 (assuming highly directive antennas are being used).

The problem with these methods is that they do not disclose a means for formatting and structuring the decoded data from a plurality of wireless devices 104 into a database or other means of collaboration of data. This database could create a universal standard that could be accessed by other applications such as navigation apparatuses; wireless networks 100 for network tuning purposes; or many other applications.

SUMMARY OF THE INVENTION

The primary object of the invention is to provide a process and machine for transferring acquired geographical data, user information, date/time information and/or user controlled settings information for a plurality of wireless devices 104 to a database providing it as a resource for other software applications.

Another object of the invention is to provide a user location database manager (ULDM) 904 (FIG. 9) comprising a machine and process for decoding and converting acquired geographical data, user information, date/time information and/or user controlled settings information into a universal standard which is a practical and usable format such as, for example, longitude/latitude for applications in other hardware and/or software.

A further object of the invention is to provide a user location database (ULD) 900 (FIG. 9) comprising a means for storing geographical data, user information, date/time information, other defined data, and/or user controlled settings information for a plurality of wireless devices 104.

Yet another object of the invention is to provide a user location database coordinator (ULDC) 908 (FIG. 9) comprising a means for interfacing a plurality of user location databases (ULD) 900 and allowing remote query of data of a herein created network of ULD's 1512 (FIG. 15) from individual or a plurality of attached ULD's 1512. A further object of the ULDC 908 is to provide a feature for redundancy and input/output capable ports for expansion.

Yet another object of the invention is to provide a user location database coordinator network (ULDCN) 1600 (FIG. 16) comprising a means for querying a plurality of user ULD's 1512 and/or ULD's 1512 attached to any ULDC 908.

Still yet another object of the invention is to provide a means for access by a plurality of "e-mobility" services 144 that could take advantage of the ULD 900.

Another object of the invention is to provide a means for interfacing directly form a BSS manager 126 to the user location database manager (ULDM) 904 for maintenance and direct access of said features.

Still yet another object of the invention is to provide a hierarchy process for query (HPQ) comprising a means for a user location database coordinator network (ULDCN) 1600 to query a plurality of user location databases coordinators (ULDC) 908 in a programmable order so as to optimize the query results.

Another object of the invention is to provide a hierarchy of user location methods (HULM) comprising a means for the user location database manager(s) to select the most accurate location method, from a programmable plurality of location methods, for locating the plurality of wireless devices 104 according to variable conditions that exist within the wireless network or location information from the wireless device 104 including GPS and triangulation.

Another object of the invention is to provide a user control setting comprising a means for a privacy flag in the ULD 900 database entry for a device to be activated/deactivated/semi-active for privacy reasons so that the user's location is not monitored or monitored anonymously.

A further object of the invention is to provide for a machine/process ULDC 908 for transferring acquired geographical data, user information, date/time information and/or user controlled settings information for a plurality of wireless devices 104 that explicitly contain GPS equipment, to a database providing it as a resource for other applications.

Still yet another object of the invention is to provide the ULD 900 as database resource for:

Applications such as "911" emergency crew, police, etc., to track/find wireless devices though ULDC 908 queries.

Applications such as wireless network tuning; in order to save engineers some of the time and expense required to gather field data, which may be used.

Applications such as navigational mapping programs and/or apparatus that may be used, for example, to aid in mapping vehicle travel routes in order to avoid traffic jams and find faster moving routes of travel.

Applications such as a vehicle traffic monitoring system, which for example, could be used by emergency vehicles, traffic engineers to monitor traffic, or by employers to monitor and track employee travels, locations and estimated times of arrival.

Applications such as a resource for a telephone recording law database for recording of telephone conversations at or near the switch 130, or on the wireless device 104, to as to comply with recording laws of the city, county, state or country.

Applications such as a geographic advertising system (GAS) resource for targeting advertising (coupons, sales, special offers, etc.) offers (solicitations) to users of wireless devices 102 based on the wireless device's 104 location or for users of wireless devices 102 to query advertising offers, prices for goods and services based on the location of the wireless device 104.

Other objects and advantages of the present invention will become apparent from the following descriptions, taken in connection with the accompanying drawings, wherein, by way of illustration and example, an embodiment of the present invention is disclosed.

A machine for transferring acquired data, user information, date/time information and/or user controlled settings information for a plurality of wireless devices 104 to a database providing it as a resource for other software applications that comprise of:

ULDM 904 having a means for decoding and converting the acquired geographical data, user information, date/time information and/or user controlled settings information into a usable format ULD 900 comprising a means for storing the geographical data, user information, date/time information and/or user controlled settings information for the plurality of wireless devices ULDC 908 comprising a means for interfacing a plurality of ULD's 1512 and allowing remote query of ULD 900 database entries.

A process for transferring the acquired geographical data, user information, date/time information and/or user controlled settings information for the plurality of wireless devices 104 to the dynamic database providing it as said resource for other applications comprising the steps of decoding and converting the acquired geographical data, user information, date/time information, other defined data, and/or user controlled settings information into a usable format for the ULDM 904. Additionally storing the decoded and converted geographical data, user information, date/time information, other defined data, and/or user controlled settings information for the plurality of wireless devices 104 into the ULD 900. Further, interfacing the plurality of ULD's 1512 into the ULDC 908 and any ULDC 908 network.

The drawings constitute a part of this specification and include exemplary embodiments to the invention, which may be embodied in various forms. It is to be understood that in some instances various aspects of the invention may be shown exaggerated or enlarged to facilitate an understanding of the invention.

BRIEF DESCRIPTION OF THE DRAWINGS

FIG. 4 TYPICAL FOOTPRINT CHARACTERISTICS OF EACH SECTOR (SIDE VIEW) (PRIOR ART)

FIG. 5 TYPICAL FOOTPRINT CHARACTERISTICS OF EACH SECTOR (TOP VIEW) (PRIOR ART)

FIG. 27 COMPONENTS UTILIZED BY ULDM

FIG. 28 INTER WORKING SYSTEM DIAGRAM

FIG. 30 STANDARDIZATION/CONVERSION SOFTWARE

FIG. 31 BSC ACCESS CONTROL SOFTWARE

FIG. 33 DEVICE LOCATION SOFTWARE

FIG. 34 TARGETING DEVICES TO TRACK

FIG. 35 A PRIMARY ANALYTIC SOFTWARE

FIG. 35 B PRIMARY ANALYTIC SOFTWARE (CONTINUED)

FIG. 35 C PRIMARY ANALYTIC SOFTWARE (CONTINUED)

FIG. 36 MONITORING SOFTWARE FLOWCHART

FIG. 38 A FAULT DIAGNOSIS/CORRECTION SOFTWARE
FIG. 38 B FAULT DIAGNOSIS/CORRECTION SOFTWARE (CONTINUED)
FIG. 38-C FAULT DIAGNOSIS/CORRECTION SOFTWARE (CONTINUED)
FIG. 39 CORRELATED MAPPING SOFTWARE FLOWCHART
FIG. 40 DISPLAY SOFTWARE FLOWCHART
FIG. 41 FINAL DISPLAY OUTPUT
FIG. 42 PRO-ACTIVE NETWORK TUNING SOFTWARE
FIG. 43 ACTIVE WIRELESS UNIT DENSITY GEOGRAPHIC ZONING
FIG. 44 ACTIVE WIRELESS UNIT DENSITY
FIG. 45 TERRAIN INTERFERENCE NON-RADIAL ZONING
FIG. 46 TERRAIN INTERFERENCE RADIAL DIVIDED ZONING
FIG. 47 TERRAIN INTERFERENCE RADIAL DIVIDED BORDER ZONES
FIG. 48 THERMAL PROCESS FLOWCHART
FIG. 49 ACTIVE WIRELESS UNIT DENSITY PROCESS
FIG. 50 TERRAIN TUNING PROCESS
FIG. 51 NETWORK EQUIPMENT TUNING FLOWCHART
FIG. 52 NTS PRO-ACTIVE SYSTEM MENU
FIG. 53 USER LOGS INTO SYSTEM
FIG. 54 ENTRY OF DESIRED TELEPHONE NUMBER
FIG. 55 USER CHOICES MENU
FIG. 56 USER SELECTS BUILDINGS TO DISPLAY
FIG. 57 ADDING) DELETING AND EDITING PHONEBOOK ENTRIES
FIG. 58 USER SELECTION ON BUILDINGS TO DISPLAY
FIG. 59 "BUILDING MEMORY" USER'S CHOICE MENU
FIG. 60 "BUILDING MEMORY" CONTINUED
FIG. 61 CATEGORIZING BUILDING MEMORY
FIG. 62 "LISTING" ADDED TO "BUILDING MEMORY"
FIG. 63 "NAME" ADDED TO "BUILDING MEMORY"
FIG. 64 "CATEGORY" ADDED TO "BUILDING MEMORY"
FIG. 65 "ADDRESS" ADDED TO "BUILDING MEMORY"
FIG. 66 "PHONE NUMBER" ADDED TO "BUILDING MEMORY"
FIG. 67 DISPLAY OF HISTORY
FIG. 68 PRINT CALL HISTORY
FIG. 69 ADD CALL/LOCATION HISTORY TO PHONE BILL
FIG. 70 FLOWCHART OF THE DIRECTIONAL ASSISTANCE NETWORK (DAN) QUERY PROCESS
FIG. 71 FLOWCHART OF DAN USER INTERFACE TO RECEIVE DIRECTIONS BY A PHONE NUMBER
FIG. 72 FLOWCHART OF DAN USER INTERFACE TO RECEIVE DIRECTIONS BY A NAME
FIG. 73 FLOWCHART OF DAN USER INTERFACE TO RECEIVE DIRECTIONS BY A CATEGORY
FIG. 74 FLOWCHART OF DAN USER INTERFACE TO RECEIVE DIRECTIONS BY AN ADDRESS
FIG. 75 FLOWCHART OF DAN USER INTERFACE TO RECEIVE DIRECTIONS BY FASTEST TRAVEL TIME
FIG. 76 FLOWCHART OF DAN USER INTERFACE TO RECEIVE DIRECTIONS BY SHORTEST DISTANCE
FIG. 77 FLOWCHART OF DAN USER INTERFACE TO BE CONNECTED TO A SELECTED LISTING
FIG. 78 FLOWCHART OF DAN USER INTERFACE TO LOCATE A WCD
FIG. 79 FLOWCHART OF DAN USER INTERFACE TO RECEIVE A MAP AND TRAVEL PLANS
FIG. 80 TRAFFIC MONITORING AND ROUTING SOFTWARE PROCESS FLOWCHART
FIG. 81 DIRECTIONAL ASSISTANCE NETWORK STRUCTURE
FIG. 82 PRIMARY EMBODIMENTS LOCATION ON A TYPICAL 2/3 G CELLULAR NETWORK
FIG. 83 PRIMARY EMBODIMENTS ALTERNATE LOCATION ON A TYPICAL 2/3G CELLULAR NETWORK
FIG. 84 PRIMARY EMBODIMENTS ALTERNATE LOCATION #2 ON A TYPICAL 2/3G CELLULAR NETWORK
FIG. 85 DAN LINKING SOFTWARE
FIG. 86 TRAFFIC TIME CALCULATION PERFORMANCE BASED ON VARIABLE A
FIG. 87 TRAFFIC TIME CALCULATION PERFORMANCE BASED ON VARIABLE TRAFFIC DENSITY RATIO

MASTER LIST OF COMPONENTS

Figure 1:
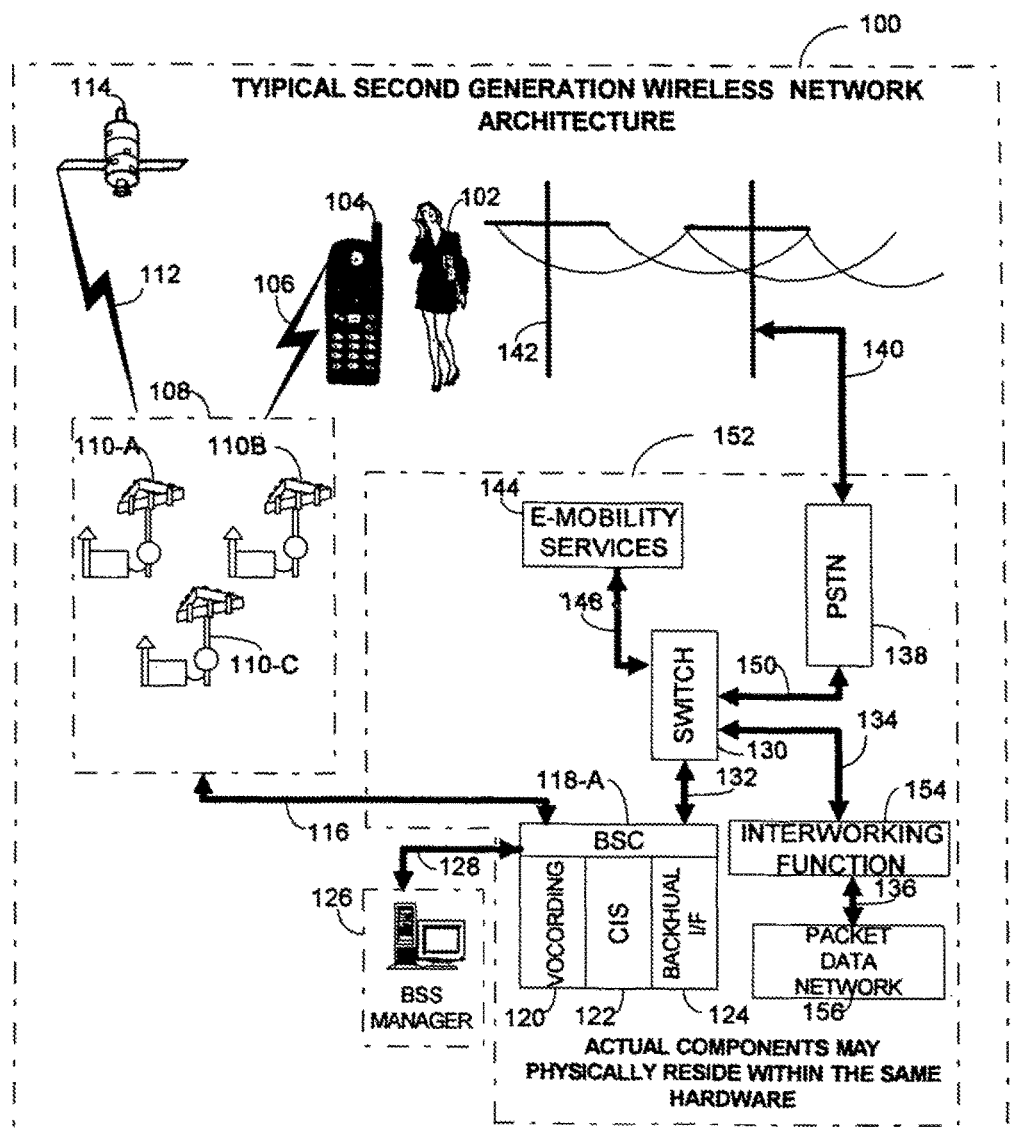
FIG. 1 TYPICAL SECOND GENERATION WIRELESS NETWORK ARCHITECTURE (PRIOR ART)

100 SECOND GENERATION WIRELESS DEVICE NETWORK
102 WIRELESS DEVICE USER
104 WIRELESS DEVICE
104-A WIRELESS DEVICE
104-B WIRELESS DEVICE
104-C WIRELESS DEVICE
104-D WIRELESS DEVICE
106 WIRELESS DEVICE RF SIGNAL
108 RADIO TOWER AND BTS WITH GPS RECEIVER NETWORK
110-A RADIO TOWER AND BTS WITH GPS RECEIVER
110-B RADIO TOWER AND BTS WITH GPS RECEIVER.
110-C RADIO TOWER AND BTS WITH GPS RECEIVER
112 GPS SATELLITE NETWORK SIGNAL
114 GPS SATELLITE NETWORK
116 COMMUNICATION LINKS (T1, T3, MICROWAVE LINK, ETC.)
118-A BASE STATION CONTROLLER (BSC) WITH VOCORDING, CIS & BACKHAUL 1/F
118-B BASE STATION CONTROLLER (BSC) WITH VOCORDING AND ATMIC
120 VOCORDING
122 CDMA INTERCONNECTION SUBSYSTEM (CIS)
124 BACKHAUL 1/F
126 BSS MANAGER
128 INTERSYSTEM LOGICAL CONNECTIONS
130 SWITCH (MTX OR OTHER)
132 INTERSYSTEM LOGICAL CONNECTIONS
134 INTERSYSTEM LOGICAL CONNECTIONS
136 INTERSYSTEM LOGICAL CONNECTIONS
138 PUBLICLY SWITCHED TELEPHONE NETWORK (PSTN)
140 CONNECTION FROM PSTN TO LAND LINES
142 LAND LINES
144 E-MOBILITY SERVICES
148 INTERSYSTEM LOGICAL CONNECTIONS

150 INTERSYSTEM LOGICAL CONNECTIONS
152 SECOND GENERATION SWITCHING STATION
154 INTERWORKING FUNCTION
156 PACKET DATA NETWORK
200 THIRD GENERATION WIRELESS DEVICE NETWORK
202 PACKET DATA SERVICE NODE
204 INTERSYSTEM LOGICAL CONNECTIONS
210 INTERSYSTEM LOGICAL CONNECTION
212 ATMIC
300 BASE STATION TRANCE VER SUBSYSTEM (BTS)
302 GPS RECEIVER
304 MICROWAVE LINK
306-A SECTOR ONE PRIMARY RECEIVER ANTENNA
306-B SECTOR ONE TRANSMIT ANTENNA
306-C SECTOR ONE DIVERSITY RECEIVER ANTENNA
308-A SECTOR TWO PRIMARY RECEIVER ANTENNA
308-B SECTOR TWO TRANSMIT ANTENNA
308-C SECTOR TWO DIVERSITY RECEIVER ANTENNA
310-A SECTOR THREE PRIMARY RECEIVER ANTENNA
310-B SECTOR THREE TRANSMIT ANTENNA
310-C SECTOR THREE DIVERSITY RECEIVER ANTENNA
312 RADIO TOWER POLE
314 ANTENNA LEADS TO BTS
400 MAIN LOBE AND PRIMARY DIRECTIVITY
402-A SIDE LOBE
402-B SIDE LOBE
404 REAR LOBE
600-A DISTANCE FROM RADIO TOWER AND BTS WITH GPS RECEIVER 110-A, TO WIRELESS DEVICE 104
600-B DISTANCE FROM RADIO TOWER AND BTS WITH GPS RECEIVER 110-B, TO WIRELESS DEVICE 104
600-C DISTANCE FROM RADIO TOWER AND BTS WITH GPS RECEIVER 110-C TO WIRELESS DEVICE 104
700-A DISTANCE FROM RADIO TOWER AND BTS WITH GPS RECEIVER 110-A, TO WIRELESS DEVICE 104
700-B DISTANCE FROM RADIO TOWER AND BTS WITH GPS RECEIVER 110-B, TO WIRELESS DEVICE 104
800-A DISTANCE FROM RADIO TOWER AND BTS WITH GPS RECEIVER 110-A, SECTOR ONE, TO WIRELESS DEVICE 104
800-B DISTANCE FROM RADIO TOWER 110-A, SECTOR TWO TO WIRELESS DEVICE 104
800-C DISTANCE FROM RADIO TOWER 110-A, SECTOR THREE TO WIRELESS DEVICE 104
900 USER LOCATION DATABASE
902 DATABASE LOGIC CENTER
904 USER LOCATION DATABASE MANAGER
906 STANDARDIZATION CONVERSION (SOFTWARE/HARDWARE)
908 USER LOCATION DATABASE COORDINATOR (ULDC)
910-A COMMUNICATIONS LINKS (T1, T3, DEDICATED LINES, MICROWAVE LINK, ETC.)
910-B COMMUNICATIONS LINK (T1, T3, DEDICATED LINES, MICROWAVE LINK, ETC.)
910-C COMMUNICATIONS LINK (T1, T3, DEDICATED LINES, MICROWAVE LINK, ETC.)
910-D COMMUNICATIONS LINK (T1, T3, DEDICATED LINES, MICROWAVE LINK, ETC.)
912 INTERSYSTEM LOGICAL CONNECTIONS
922 INTERSYSTEM LOGICAL CONNECTIONS
924 INTERSYSTEM LOGICAL CONNECTIONS
926 INTERSYSTEM LOGICAL CONNECTIONS
928 INTERSYSTEM LOGICAL CONNECTIONS
1200 TIMING (TOA, RTD, ETC.)
1210 SIGNAL STRENGTH MEASURES
1220 CALL PROCESS INFORMATION
1230 RADIO TOWER AND BTS LATITUDE/LONGITUDE
1240 RADIO TOWER ALTITUDE
1250 RADIO TOWER DOWNTILT
1260 REGION TYPE OF TOWER (RURAL, URBAN, ETC.)
1270 CALL PROCESS IDENTIFICATION NUMBER
1280 HLR/VLR INFORMATION ON CALLER
1290 AZIMUTH ON SECTORS AND RADIO TOWERS
1300-A SECOND GENERATION WIRELESS NETWORK SERVICE PROVIDER
1300-B SECOND GENERATION WIRELESS NETWORK SERVICE PROVIDER
1302-A THIRD GENERATION WIRELESS NETWORK SERVICE PROVIDER
1302-B THIRD GENERATION WIRELESS NETWORK SERVICE PROVIDER
1304 EMERGENCY MEDICAL SERVICES APPLICATIONS
1306 COMMUNICATIONS LINK {T1, T3, DEDICATED LINES, SATELLITE, MICROWAVE LINK, ETC.)
1500-A COMMUNICATIONS LINK (DEDICATED LINES, SATELLITE, T1, T3, ETC.)
1500-B COMMUNICATIONS LINK (DEDICATED LINES, SATELLITE, T1, T3, ETC.)
1500-C COMMUNICATIONS LINK (DEDICATED LINES, SATELLITE, T1, T3, ETC.)
1500-D COMMUNICATIONS LINK (DEDICATED LINES, SATELLITE, T1, T3, ETC.)
1500-E COMMUNICATIONS LINK (DEDICATED LINES, SATELLITE, T1, T3, ETC.)
1502 PLURALITY OF ULDC'S
1506 UPLINK CONNECTION COMPONENT OF THE ULDC
1508 SINGLE ULDC HIGHER ON HIERARCHY
1510 ULD ACCESS CONTROL UNIT OF THE ULDC
1512 PLURALITY OF ULD'S
1516 REMOTE ACCESS CONTROL UNIT OF THE ULDC
1518-A RF REMOTE LINK
1518-B RF REMOTE LINK
1518-C RF REMOTE LINK
1522 DATA LOGGING UNIT OF THE ULDC
1524 ULDC CONTROL HARDWARE/SOFTWARE
1526 MAINTENANCE UNIT
1528 MASTER ULDM AND LOCATION VERIFICATION PROCESS
1530 MARKET OR GROUP ULD
1532 MIRROR DATABASE
1534 MULTIPLE DOWNLINK CONNECTIONS OF THE ULDC
1536 ULDC ACCESS CONTROL UNIT OF THE ULD
1538 UPLINK/DOWNLINK ATM REDUNDANT CONNECTION
1540 PLURALITY OF REMOTE ACCESS TERMINALS
1542 ULDC OR FUTURE EXPANSION REQUIRING ULDC INTERFACE

1600 USER LOCATION DATABASE COORDINATOR NETWORK (MARKET BASED SYSTEM)
1602 NATIONAL OR INTERNATIONAL ULDC
1604 MARKET "A" ULDC
1606 MARKET "B" ULDC
1608 MARKET "C" ULDC
1610 MARKET "D" ULDC
1612 MARKET "F" ULDC
1614 MARKET "G" ULDC
1616 MARKET "H" ULDC
1618 OPTIONAL COMMUNICATIONS LINK BETWEEN MARKET ULD'S
1620 MARKET "E" ULDC
1630-A COMMUNICATIONS LINK (DEDICATED LINES, SATELLITE, T1, T3, ETC)
1630-B COMMUNICATIONS LINK (DEDICATED LINES, SATELLITE, T1, T3, ETC)
1630-C COMMUNICATIONS LINK (DEDICATED LINES, SATELLITE, T1, T3, ETC)
1630-D COMMUNICATIONS LINK (DEDICATED LINES, SATELLITE, T1, T3, ETC)
1630-E COMMUNICATIONS LINK (DEDICATED LINES, SATELLITE, T1, T3, ETC)
1630-F COMMUNICATIONS LINK (DEDICATED LINES, SATELLITE, T1, T3, ETC)
1630-G COMMUNICATIONS LINK (DEDICATED LINES, SATELLITE, T1, T3, ETC)
1630-H COMMUNICATIONS LINK (DEDICATED LINES, SATELLITE, T1, T3, ETC)
1700 USER LOCATION DATABASE COORDINATOR NETWORK (REGION BASED SYSTEM)
1702 DISTRICT "A" ULDC
1704 DISTRICT "B" ULDC
1706 REGION "A" ULDC
1708 REGION "B" ULDC
1710 REGION "C" ULDC
1712 REGION "D" ULDC
1714-A OPTIONAL COMMUNICATIONS LINK (DEDICATED LINES, SATELLITE, T1, T3, ETC)
1714-B OPTIONAL COMMUNICATIONS LINK (DEDICATED LINES, SATELLITE, T1, T3, ETC)
1714-C OPTIONAL COMMUNICATIONS LINK (DEDICATED LINES, SATELLITE, T1, T3, ETC)
1714-D OPTIONAL COMMUNICATIONS LINK (DEDICATED LINES, SATELLITE, T1, T3, ETC)
1716-A COMMUNICATIONS LINK (DEDICATED LINES, SATELLITE, T1, T3, ETC)
1716-B COMMUNICATIONS LINK (DEDICATED LINES, SATELLITE, T1, T3, ETC)
1716-C COMMUNICATIONS LINK (DEDICATED LINES, SATELLITE, T1, T3, ETC)
1716-D COMMUNICATIONS LINK (DEDICATED LINES, SATELLITE, T1, T3, ETC)
1716-E COMMUNICATIONS LINK (DEDICATED LINES, SATELLITE, T1, T3, ETC)
1716-F COMMUNICATIONS LINK (DEDICATED LINES, SATELLITE, T1, T3, ETC)
1716-G COMMUNICATIONS LINK (DEDICATED LINES, SATELLITE, T1, T3, ETC)
1716-H COMMUNICATIONS LINK (DEDICATED LINES, SATELLITE, T1, T3, ETC)
1716-I COMMUNICATIONS LINK (DEDICATED LINES, SATELLITE, T1, T3, ETC)
1716-J COMMUNICATIONS LINK (DEDICATED LINES, SATELLITE, T1, T3, ETC)
1716-K COMMUNICATIONS LINK (DEDICATED LINES, SATELLITE, T1, T3, ETC)
1716-L COMMUNICATIONS LINK (DEDICATED LINES, SATELLITE, T1, T3, ETC)
1716-M COMMUNICATIONS LINK (DEDICATED LINES, SATELLITE, T1, T3, ETC)
1716-N COMMUNICATIONS LINK (DEDICATED LINES, SATELLITE, T1, T3, ETC)
1800 USER LOCATION DATABASE COORDINATOR NETWORK (DIRECT SYSTEM)
1900 REMOTE WIRELESS DEVICE
1902 WIRELESS COMMUNICATIONS LINK (RADIO FREQUENCY LINK, ETC.)
1904 PLURALITY OF REMOTE WIRELESS DEVICES
1906 POLICE
1908 AUTHORIZED ACCOUNTS AND OTHERS
1910-A COMMUNICATIONS LINK (DEDICATED LINES, SATELLITE, T1, T3, ETC.
1910-B COMMUNICATIONS LINK (DEDICATED LINES, SATELLITE, T1, T3, ETC.)
2300 OMNIDIRECTIONAL TRANSMIT/RECEIVE ANTENNA
2302 ANTENNA LEADS
2304 TRANSMIT UNIT
2308 RECEIVE UNIT
2310 MAINTENANCE UNIT
2320 TRANSMIT CONTROL UNIT
2330 RECEIVER CONTROL UNIT
2340 ULDC INTERFACE CONTROL HARDWARE/SOFTWARE
2350 RF LINK MANAGEMENT HARDWARE/SOFTWARE
2360 POWER CONTROL UNIT
2380 CONNECTION TO EXTERNAL POWER SOURCE
2410 PCMICA INTERFACE CARD
2420 CONTROL HARDWARE
2430 ANTENNA
2440 DATA CABLE
2450 TOP COMPUTER
2460 ANTENNA LEADS
2470 CONNECTION TO EXTERNAL POWER SOURCE
1518-A RF REMOTE LINK
1902 RF REMOTE LINK
2500 RF REMOTE LINK NETWORK
2510 DENSE URBAN AREA
2520 URBAN AREA
2530 SUB-URBAN AREA
2605 TRANSMIT UNIT
2608 RECEIVE UNIT
2620 TRANSMIT CONTROL UNIT
2630 RECEIVE CONTROL UNIT
2640 RF INTERFACE CONTROL HARDWARE/SOFTWARE
2660 POWER CONTROL UNIT
2800 NETWORK TUNING SYSTEM/PRIMARY EMBODIMENT
2802 MONITORING SOFTWARE
2804 BSC ACCESS CONTROL SOFTWARE
2806 FAULT DIAGNOSIS/CORRECTION SOFTWARE
2808 DEVICE LOCATION SOFTWARE
2810 GEOGRAPHIC INFORMATION DATABASE
2812 CRISS-CROSS PHONEBOOK DATABASE WITH LAT/LONG CORRELATIONS
2814 PRIMARY ANALYTIC SOFTWARE
2816 INTERNAL CENTRAL PROCESSING UNIT AND COMPUTER
2818 INTERNAL MEMORY STORAGE
2820 CASE FILES WITH LAT/LONG

2822 SERVICING EFFECTING FACTORS WITH LAT/LONG CORRELATIONS
2824 RADIO TOWER WITH LAT/LONG CORRELATIONS
2826 USER INTERFACE SOFTWARE
2828 CORRELATING MAPPING SOFTWARE
2830 CORRELATING DATA FOR LAT/LONG INFORMATION
2832 DISPLAY SOFTWARE/HARDWARE
2834 E-MOBILE CONNECTION
2836 DISPLAY SCREEN
2838 LINK REQUIREMENTS FOR SCANNING MODE
2840-A PASSIVE LINKS
2840-B PASSIVE LINKS
2842-A PASSIVE LINK AND/OR ACTIVE LINKS
2842-B PASSIVE LINK AND/OR ACTIVE LINKS
2844-A PASSIVE LINK AND/OR ACTIVE LINKS
2844-B PASSIVE LINK AND/OR ACTIVE LINKS
2844-C PASSIVE LINK AND/OR ACTIVE LINKS
2844-D PASSIVE LINK AND/OR ACTIVE LINKS
2844-E PASSIVE LINK AND/OR ACTIVE LINKS
2844-F PASSIVE LINK AND/OR ACTIVE LINKS
2844-G PASSIVE LINK AND/OR ACTIVE LINKS
2844-H PASSIVE LINK AND/OR ACTIVE LINKS
2844-I PASSIVE LINK AND/OR ACTIVE LINKS
2846-A PASSIVE SCANNING MODE, ACTIVE LINKS
2846-B PASSIVE SCANNING MODE, ACTIVE LINKS
2846-C PASSIVE SCANNING MODE, ACTIVE LINKS
2848 USER
2900 MASTER SERVER
2902 EXTERNAL ACCESS POINT
2904 LOCAL ACCESS POINT
2906 HIGHSPEED INTERNET GATEWAY
2908 WORLD WIDE WEB
2910 INDIVIDUAL COMPUTERS
2912 CORPORATE EXTERNAL LAN (SECURE)
2914 BACK-UP SYSTEM SERVER
2916 DATA FLOW DIAGRAM
2918-A DATA FLOW CONNECTIONS
2918-B DATA FLOW CONNECTIONS
2918-C DATA FLOW CONNECTIONS
2918-D DATA FLOW CONNECTIONS
2918-E DATA FLOW CONNECTIONS
2918-F DATA FLOW CONNECTIONS
2918-G DATA FLOW CONNECTIONS
2918-H DATA FLOW CONNECTIONS
2920-A LAN CONNECTIONS
2920-B LAN CONNECTIONS
2920-C LAN CONNECTIONS
3000 START (GENERIC COMMAND)
3004 PROTOCOL DATABASE
3012 RECEIVE DEVICE PROTOCOL LIST
3110 COMMAND LIST
3200 INTERNET
3202 INTERNET
3206 LOCAL SERVER/WORK STATION
3216 USER DATABASE
3224 SYSTEM LOG
3700 LOCATION OF WIRELESS DEVICE BEING TRACKED
3704 FORWARD RECEIVE POWER
3706 FORWARD TRANSMIT POWER
3708 EC/LO
3710 NEIGHBOR LIST
3712 MESSAGING
3714 FER
3716 OTHER ERROR CODES
3718 OTHER USER DEFINED FACTORS
3720 ERROR CODE
3722 CASE FILE #
3724 WIRELESS DEVICE ID #
3726 OTHER USER DEFINED FACTORS
3816 LOCAL ERROR DATABASE
3828 TREND ANALYSIS DATA
3878 STORED ERROR DATA
3886 MESSAGE TABLE
3888 CORRECTION TABLE
3920 DATA LAYER
3926 MASTER DATA LAYER
3936 MASTER MAP LAYER
3940 FILTERED MASTER DATA LAYER
3942 FILTERED DATE LAYER
3944 FILTERED MASTER MAPPING LAYER
3946 FILTERED MAPPING LAYER
3950 PRIMARY DISPLAY LAYER DATA FILE
4002 PRIMARY DISPLAY LAYER
4004 SECONDARY DISPLAY LAYER
4100 RADIO TOWER LOCATIONS DISPLAY LAYER
4110 WIRELESS DEVICE LOCATIONS DISPLAY LAYER
4120 SERVICE AFFECTING FACTORS DISPLAY LAYER
4130 ERROR CODES DISPLAY LAYER
4140 CRISS-CROSS PHONEBOOK ENTRIES DISPLAY LAYER
4150 AUXILIARY OBJECT LOCATIONS DISPLAY LAYER
4160 GEOGRAPHIC/TOPOLOGICAL STREET MAP OVERLAY DISPLAY LAYER
4170 FINAL DISPLAY OUTPUT
5300 LOCATION TRACKING SYSTEM
5304 USER NAME AND PASSWORD
5306 INTERNAL STORAGE MEMORY
5312 USER RECORDS
5322 HELP MENU/SERVICE AGENT/OPERATOR
5326 MERCHANT CREDIT CARD SERVICES ACCOUNT
5400 MEMBERSHIP DATA
5420 FAX ON DEMAND
5422 POSTAL ADDRESS CONVERSION HARDWARE/SOFTWARE
5424 AUTOMATED ANSWERING HARDWARE/SOFTWARE
5426 VOICE TEXT READ-UP HARDWARE/SOFTWARE
5502 USER CHOICE MENU
8100 directional assistance network (DAN)
8101 primary logic software
8105 voice interface software
8110 voice mapping software
8115 device location software
8120 routing software
8125 traffic monitoring software
8130 data interface software
8135 external DAN query interface software
8140 external connections to query device
8145 PSTN phone location database
8150 criss-cross lat/long geographic database
8155 geographic database mapping software
8160 standardization and conversion software/hardware
8165 external network connection
8170 computer system
8202 wireless communication
8205 wireless communication device 8212 PSTN/PSTN location database communication interface
8220 telephone
8222 MTX/PSTN interface
8227 MTX/BSC interface
8232 BSC/BTS interface
8237 MTX/user location database interface
8242 MTX/e-mobility services interface
8247 MTX/PDN interface
8252 PON/internet gateway interface
8255 internet gateway
8257 internet gateway/internet interface
8260 internet
8262 a-mobility services/DAN interface
8267 MTX/WCD location software interface
8270 WCD location software
8300 DAN linking software
8310 DAN/internet interface
8320 a-mobility services/DAN linking software interface
8410 DAN/PSTN interface
8515 interim linking software
8517 interim linking software/packet routing software/hardware interface
8520 packet routing software/hardware
8522 interim linking software/DAN data query software interface
8525 DAN data query software

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 9:
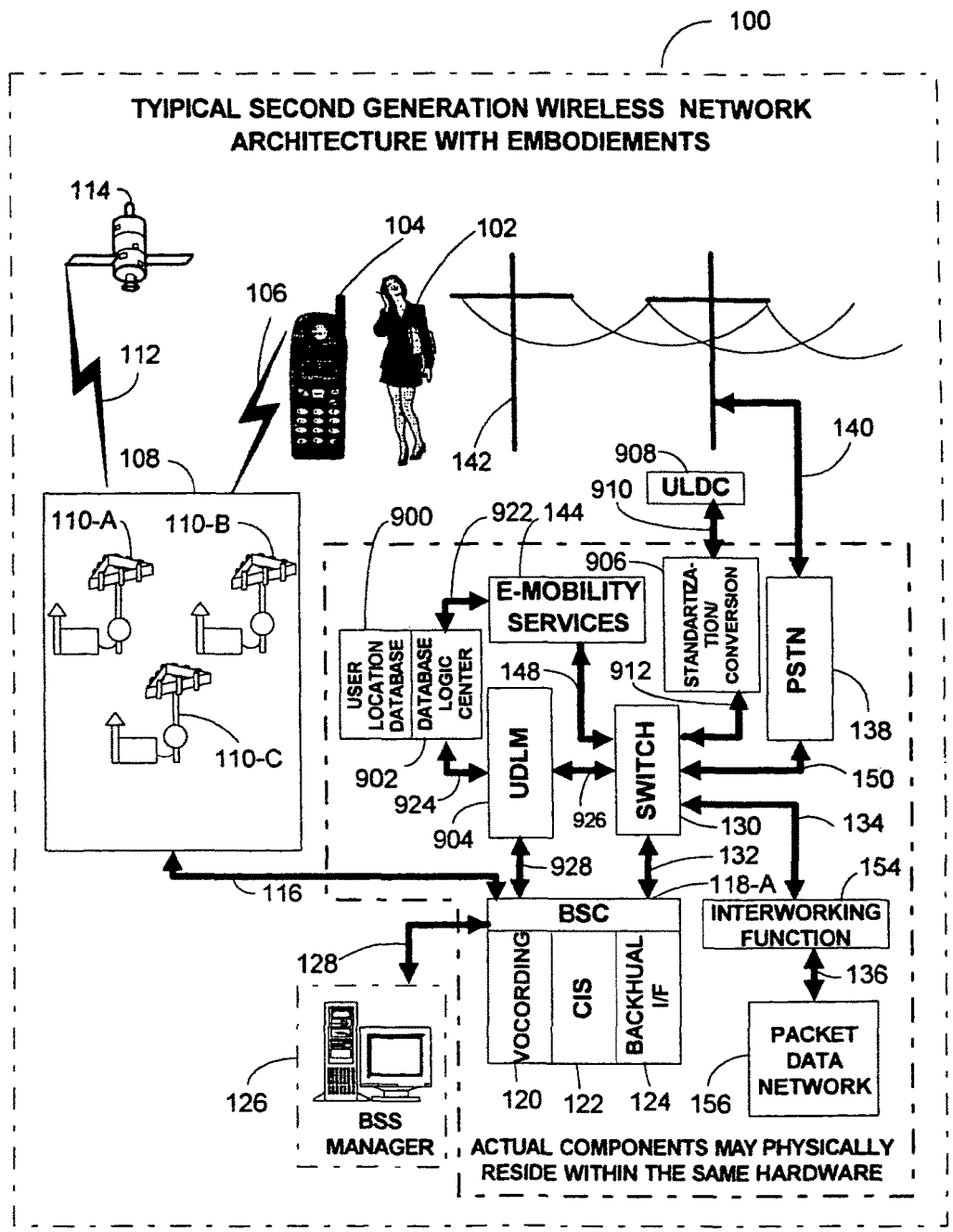
FIG. 9 TYPICAL SECOND GENERATION WIRELESS NETWORK ARCHITECTURE WITH EMBODIMENTS

Referring to FIG. 9, this invention of both a machine and process focuses directly on the ability to use dynamic location based information of a plurality of wireless devices 104 in the form of latitude and longitude, store that data to a dynamic software database user location database (ULD) 900, via the database logic center 902, and allow a means by which to share the software database ULD 900 with other entities (either software or hardware). The hardware shown in FIG. 9 (possibly logically integrated into existing hardware) consists of a ULD 900, a database logic center (DLC) 902, a user location database manager (ULDM) 904, standardization conversion hardware/software 906, and a user location database coordinator (ULDC) 908.

These systems/machines and the software/processes defined within this invention add a unique and novel ability that in its entirety will benefit both business and public as a whole. This benefit will be financially profitable for businesses by allowing the creation of a universal standard that software applications can be developed off of, greatly reducing individual project cost by using this invention as resource. Additionally, as many new wireless software programs are increasingly using location based technology in the form of GPS, this invention would then increase the profitability of companies by using this technology for their software because it is based on existing infrastructure and would not require a consumer, who possesses a wireless device 104, to purchase any additional equipment. This would require less investment by a company using this invention, and increase immediate profit of any hardware/software/firmware applications developed using this invention.

The fundamental machine is defined by the inclusion of the ULD 900, DLC 902, ULDM 904, standardization conversion hardware/software 906, and ULDC, 908. Basic functions as expanded on in subsequent sections of this invention are as follows:

ULD 900: Software database for data that includes user entries consisting of a user identifier, latitude and longitude, and other aspects as described in subsequent sections.

DLC 902 converts data into a storable format for the ULD 900

ULDM 904: Responsible for reading/writing/appending user entries in the ULD 900 and calculating the data that will be entered into those entries by gathering information from the BSC 118-A and the switch (MTX or other) 130.

Standardization Conversion Hardware/Software 906 converts data into a standardized format for the ULDC 908.

ULDC 908: Allows remote access of a singular or plurality of ULD's 1512 by a remote database query.

The machine and process are compatible with existing 2nd generation wireless device network 100 and future 3rd generation wireless device networks 200. Current wireless networks such as in FIG. 1 are commonly referred to as 2G or second-generation networks 100.

Still referring to FIG. 9, the components that have been added to the architecture of the second-generation wireless network 100 comprise of the primary embodiments of the machine and process. The ULDM 904 is used for acquiring geographic location data from the BSC 118-A (call processing information/TDOA/RSSI and other data such as predetermined location) and user identifying information (phone number) from the switch (MTX or other) 130.

It then creates a database entry using the user information {phone number}, date/time information and user controlled settings of a plurality of wireless devices 104 and puts it into the ULD 900 in its software database entry format via the DLC 902. The ULD 900 is a software database resource, containing user entries created by the ULDM 904, for other software/hardware applications such as the shown a-Mobility services 144. The ULDC 908 connects to the switch {MTX or other} 130 and allows remote access to the ULD 900. Logical and physical connections between these physical and logical bodies are illustrated as intersystem logical connections 922, 148, 924, 926, 928 and the wired link {T1, or other} 910-A between the switch {MTX or other} 130 and the ULDC 908.

Still referring to FIG. 9, also within the scope of this invention, is the ability for location to be determined at the wireless device 104. This could be accomplished if the device contained a GPS unit itself, or a other means of determining location and could acquire its geographic location {latitude/longitude/altitude/time}. In such a case, information would be transmitted back to the switch {MTX or other} 130 by the phone and reported to the ULDM 904. The location would then be transmitted directly into the DLC 902 (of the ULD 900), and stored in the ULD 900. In this case, the wireless device 104 is responsible for the determination of its location. Regardless of where the location at the wireless device 104 is computed, this invention's integrity remains the same. The ability to compute the location at the wireless device 104, or within the wireless device network 100 or 200 is covered by numerous previous patents.

Still referring to FIG. 9, the data can be sent/received by the e-mobility services 144 or directly to the BSC 206 as data. Location information in this case would be sent continuously or limited by features on the wireless device 104. Implementation of this method with wireless device 104 having GPS equipment, requires the wireless device 104 to be in relative sight to the sky. The GPS unit would require integration and other procedures to integrate with the wireless device 104. Other methods (as taught in the prior art) of determining the location of the wireless device 104 at the wireless device 104 may not require the wireless device 104 to be in plain sight or relative to the sky. Regardless, the final results once the longitude/latitude data is sent from the wireless device 104 is the same if the data is calculated at the wireless device 104, or calculated at the ULDM 904.

Still referring to FIG. 9, to utilize any calculations of locations at the wireless device 104, that data will need to be transmitted to the radio towers and BTS 110-A, 110-B, and 110-C, along with voice. Various systems exists to accommodate this including time divided multiple access (TOMA), code divided multiple access (CDMA) and others.

Figure 2:
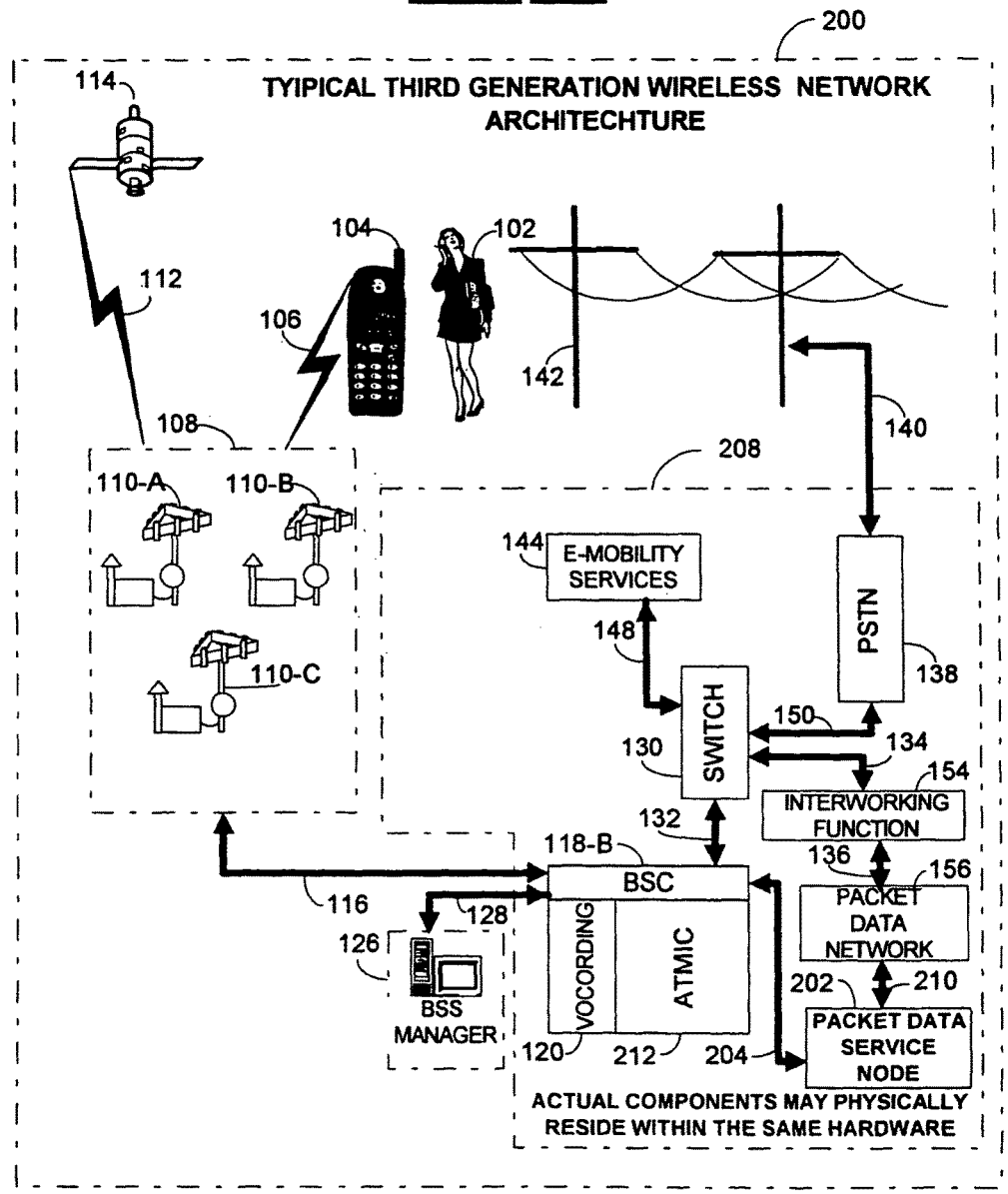
FIG. 2 TYPICAL THIRD GENERATION WIRELESS NETWORK ARCHITECTURE (PRIOR ART)
Figure 3:
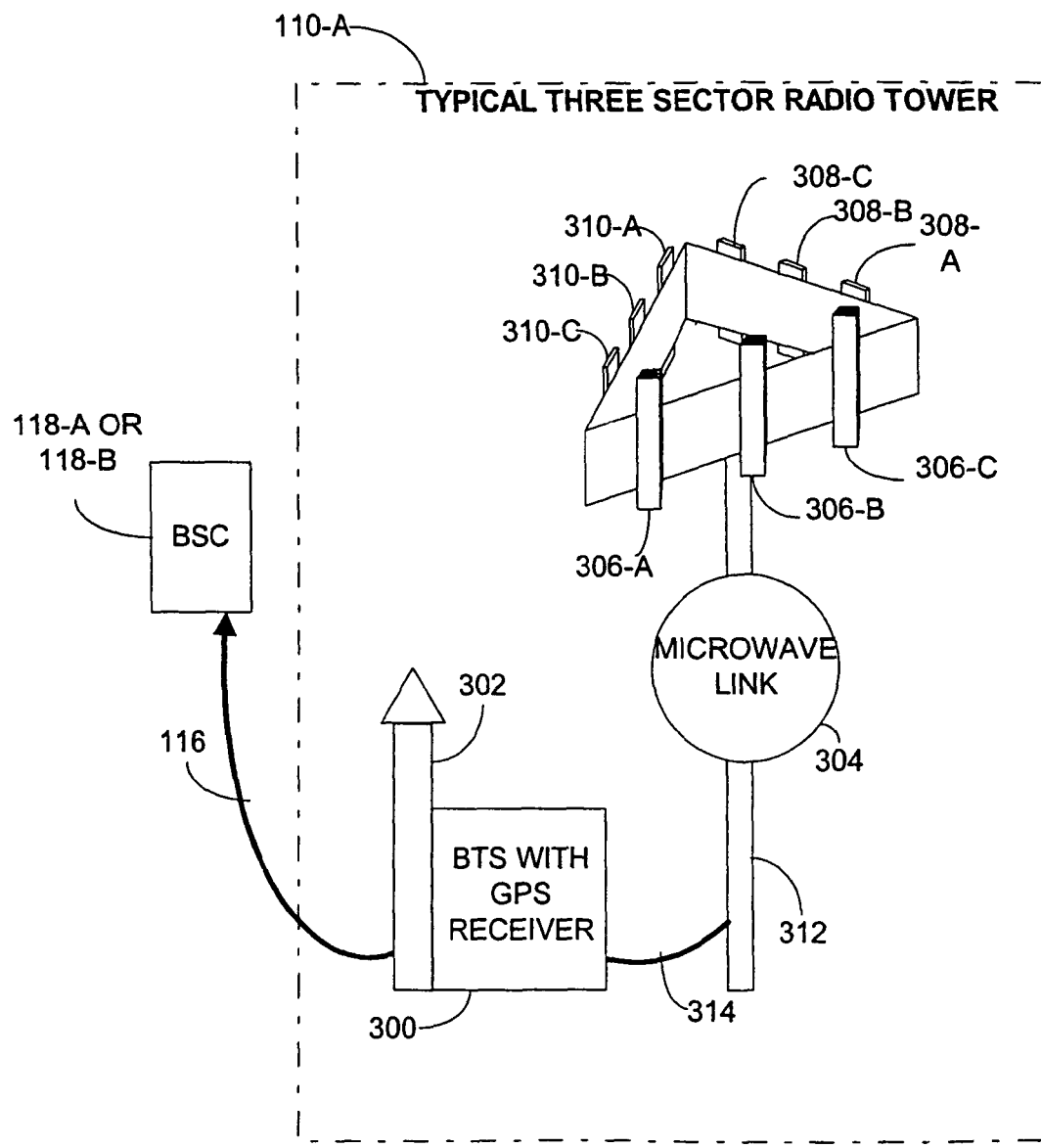
FIG. 3 TYPICAL THREE SECTOR RADIO TOWER CONFIGURATION (PRIOR ART)
Figure 6:
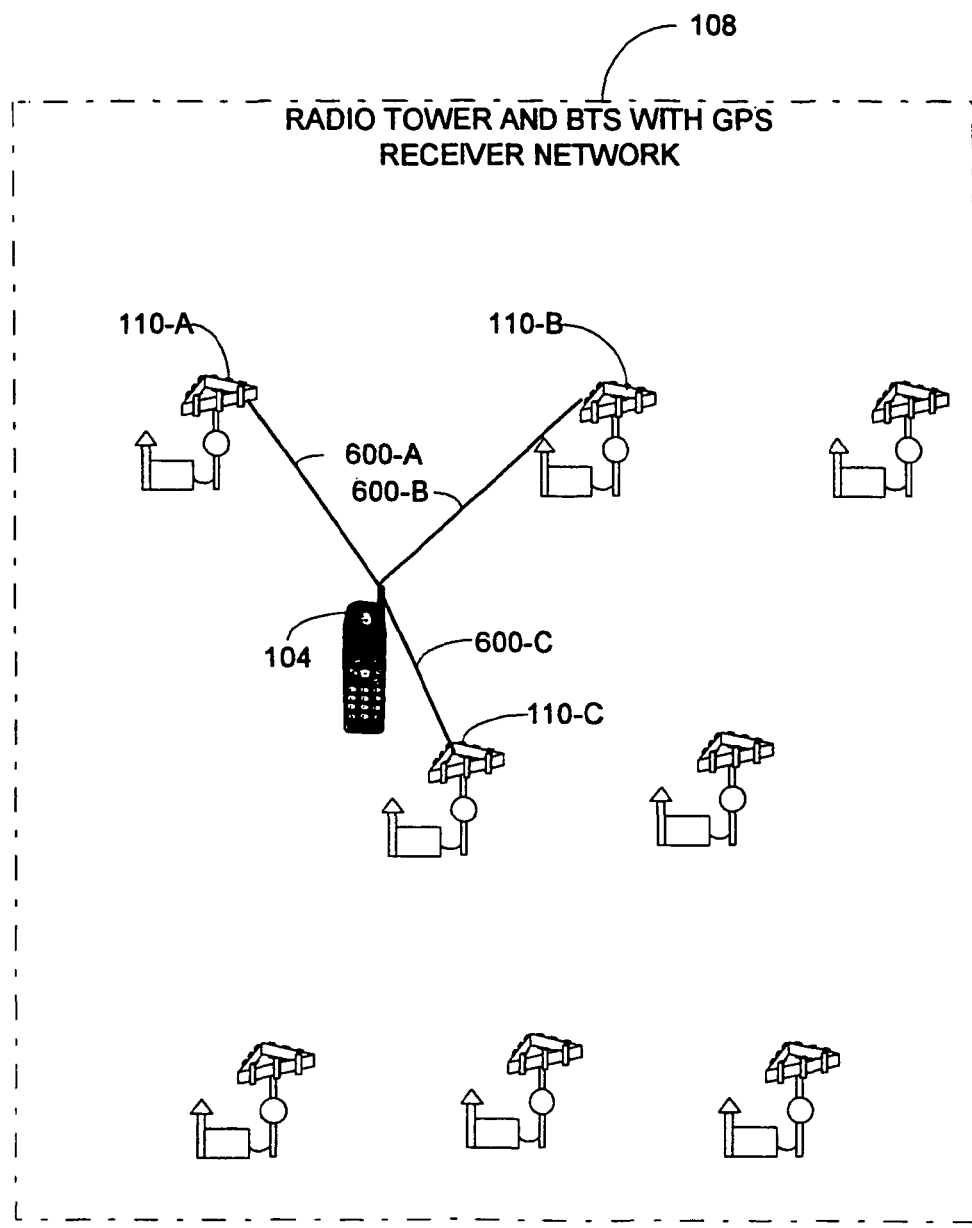
FIG. 6 THREE TOWER LOCATION METHOD (PRIOR ART)
Figure 7:
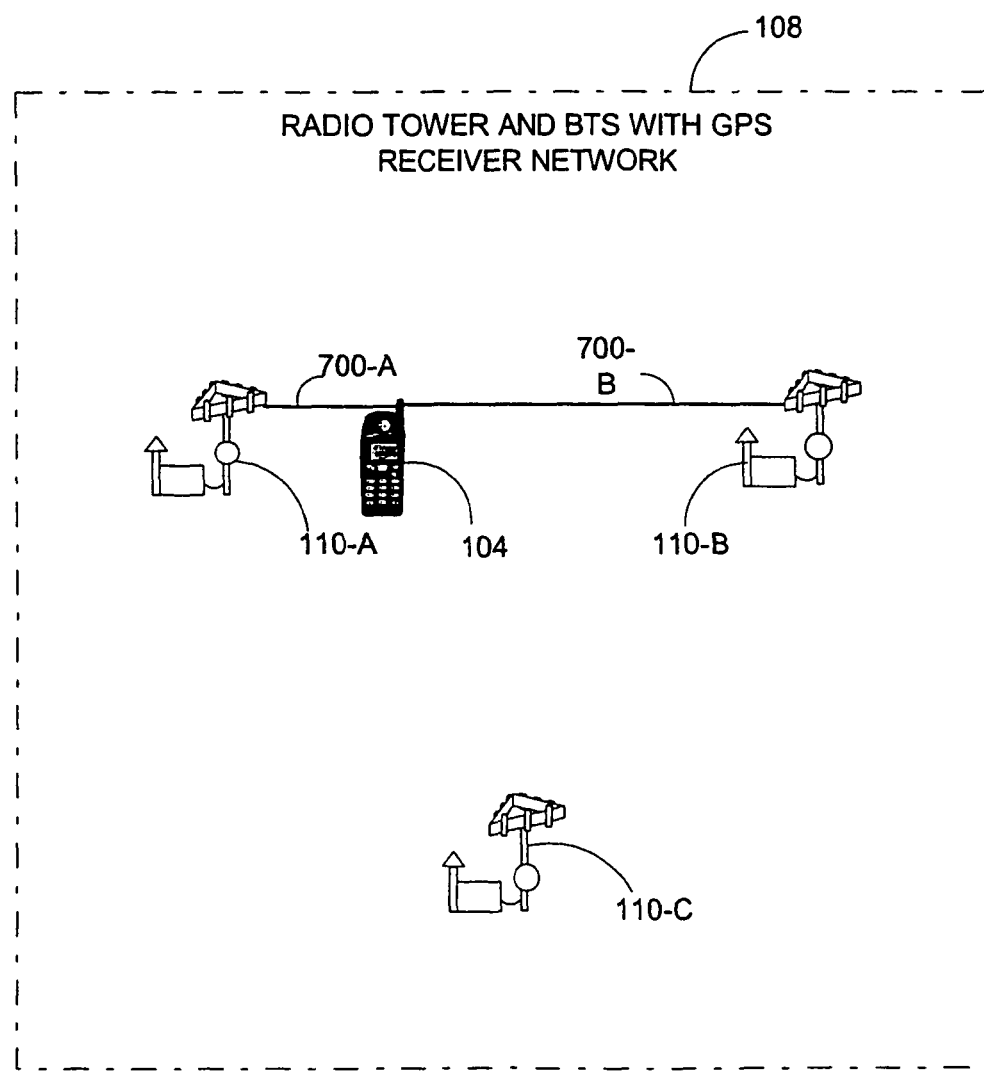
FIG. 7 TWO TOWER LOCATION METHOD (PRIOR ART)
Figure 8:
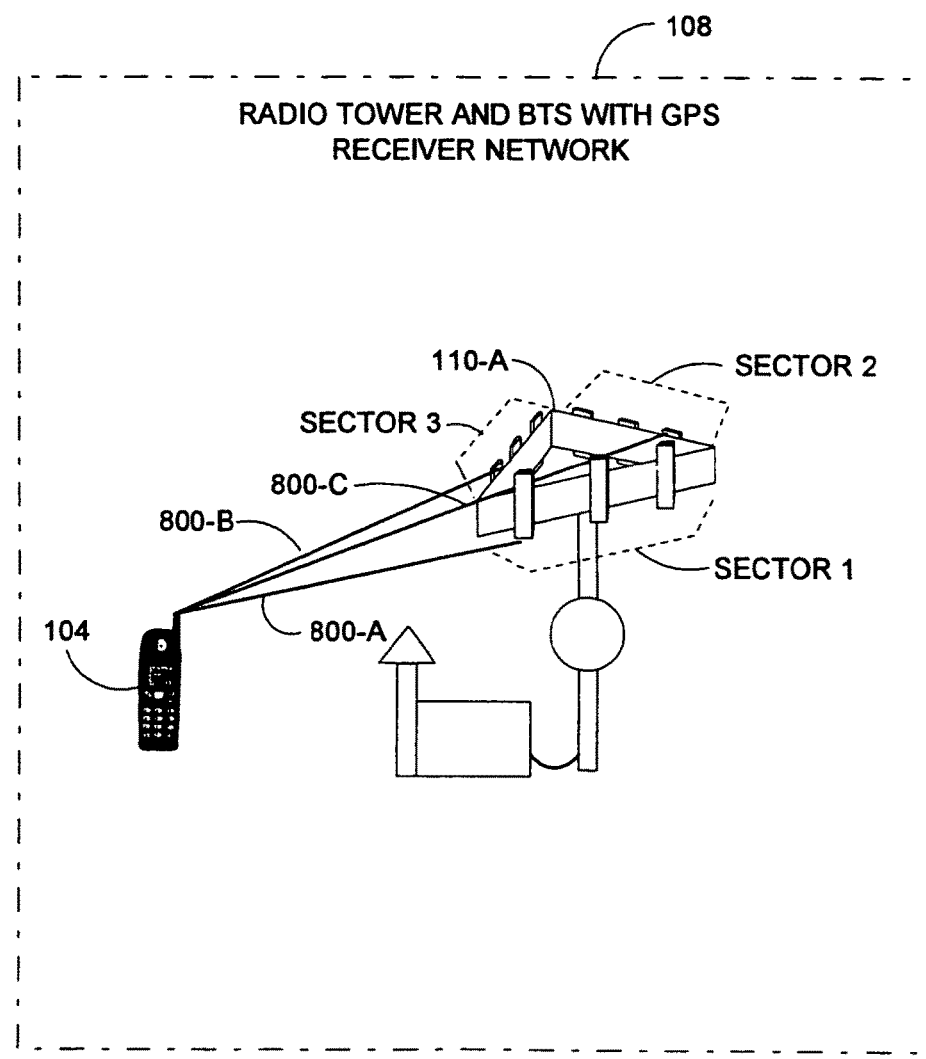
FIG. 8 SINGLE TOWER LOCATION METHOD (PRIOR ART)

Beyond the 2G wireless device networks 100 (FIG. 1) exists an emerging technology called 3G (FIG. 2), or third generation (networks) 200. These wireless networks offer greater features and bandwidth to wireless devices 104 on the network. Integration as shown in FIG. 2 is identical to FIG. 1, or to the 2G wireless device network 100.

Additional Embodiments

Additionally embodiments include a means for a plurality of "e-mobility" services 144 to access the ULD 900 through software (possibly SQL or other similar database query methods). Further included is a means for interfacing directly from the BSS manager 126 to the ULDM 904 for maintenance and direct access of said features.

Further embodiments include adding to the ULDC 908 a means for redundancy in case of hardware/software failure, using optional input/output capable ports. Additionally, creating a user location database coordinator network (ULDCN) (FIG. 16) 1600, comprising a means for querying a plurality of user location database coordinators (ULDC's) 1502 and their respective ULD's 1512.

A further additional embodiment details a process for querying a plurality of ULDC's 1502 in a programmable order so as to optimize the query results.

A method also claimed is the hierarchy of user location methods (HULM) that comprises a means for the ULDM 904 to select the most accurate location method from a plurality of location methods, for locating the plurality of wireless devices 104 according to variable conditions which exist within the wireless device network 100. To ensure consumer privacy, a user control setting comprising a means for a "full" privacy flag (meaning an electronic register indicating the user does not want their phones location information tracked) to be set by a wireless device user 102, alerts the ULDM 904 if it can record latitude and longitude location data to the ULD 900 for that given wireless device user 102. An "anonymous" privacy flag allows the location of a wireless device 104 to be monitored on a limited basis, by not reporting the identification information of the wireless device 104.

An additional embodiment is the addition of a RF remote link 1518 and remote mobile device 1900, which can be added to the ULDC 908 in order to allow queries of the ULDC 908 from remote locations. Although the ULDC 908 can be queried by the wireless device 104, the use of the RF remote link 1518 and remote mobile device 1900 allow queries to be performed on a broader RF band than would be found on the wireless device 104. This broader RF band allows for more data to be transferred at a greater speed than is possible by a typical wireless device 104.

Alternative Embodiments

Alternate embodiments to the invention include the ability for the hierarchy process for query (HPQ) to be programmed by a designated entity, person, or group in such a way as deemed appropriate by that party to ensure a desired search procedure. Additionally the hierarchy of user location method's used by the ULDM 904 could be modified, appended, reprioritized or otherwise changed to use a plurality of location methods as programmed by a person, group or other entity to obtain any desired level of detail regarding the accuracy of the latitude and longitude calculations.

Other alternatives include the ability for the privacy flag to be locked in the inactive position by the owner of the wireless device 104, by remote access, if it is to be used for example, by an employee, a child, a thief or if the wireless device 104 is lost. Having the ability for the privacy flag to be automatically turned in the off position when the user of the wireless device 104 dials emergency services such as for example "911" is also an alternative embodiment. Additionally, the ability for the privacy flag to be turned off by the service provider in the case of, for example, court ordered surveillance. Alternative ways to access the privacy flag are having it be controlled and/or implemented from the wireless device 104 or the BSS manager 126.

A further alternative embodiment is transferring acquired geographical data, user information, date/time information, other defined data, and/or user controlled settings information for a plurality of wireless devices 104 containing GPS equipment, or other location means, to the ULDM 904 (from the wireless device itself) and then to the ULD 900. This also includes the approach of having the means for the location of the wireless device 104 to be computed at the wireless device 104 and then transmitted to the radio tower and BTS 110-A, to the BSC 118-A or 118-B, and then into the ULDM 904 and finally to the ULD 900.

Detailed Description of Drawings with Embodiments

Referring to FIG. 9, is a typical second-generation (2G) wireless device network 100 architecture similar to that found in FIG. 1. However, in FIG. 9, some of the embodiments of this invention, which include a ULDM 904 a ULD 900 combined with the database logic center (DLC) 902, a standardization conversion software/hardware apparatus 906, and a ULDC 908 have been added. When the wireless device user 102 sends voice or data through the wireless device 104, the voice and data are sent via a radio frequency signal 106 to the radio tower network 108. The RF signal 106 from the wireless device 104 is then received by the radio tower and BTS (with GPS receiver network 108). For illustration purposes, the radio towers and BTS 110-A, 110-B, and 110-C receive the RF signal 106. The user's voice and data information, along with other information (described in greater detail in FIG. 12) is then sent through a dedicated line (T1, T3, microwave or other dedicated line) 910, to the base station controller (BSC) 118-A. Information, which has been gathered from the radio tower and BTS with GPS receiver network 108, is then dispensed from the BSC 118-A to the switch (MTX or other) 130 and the ULDM 904.

The ULDM 904 then decodes the information that is gathered from the base station controller (SSC) 118-A and the switch (MTX or other) 130. It computes the location of a wireless device 104 in accordance with another embodiment of this invention, the hierarchy of user location methods (HULM). The hierarchy of user location methods is a series of changeable and programmable algorithms, which incorporates the appropriate location methods as taught in the prior art. The appropriate method for determining the location of the wireless device 104 would consist of many factors including rural or urban locations of radio towers and other BTS information. Many other factors are covered under the prior art.

Figure 12:
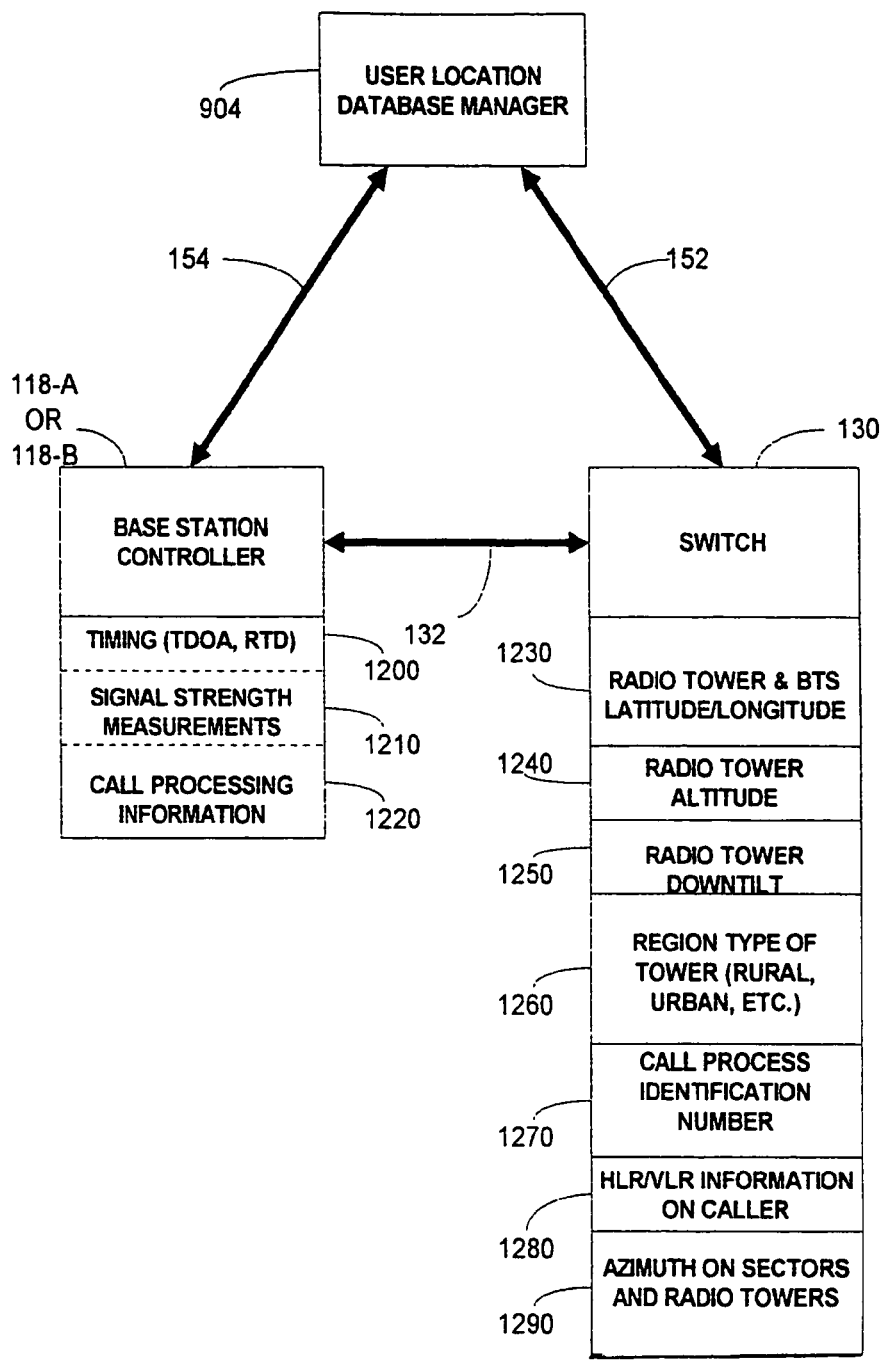
FIG. 12 INTERWORKING BETWEEN BSC, SWITCH, AND ULDM

The ULDM 904 then communicates with the DLC 902 through an intersystem logical connection 150. The DLC 902 then stores the decoded data in the ULD 900 in the form of longitude and latitude information, date and time information, user identification information, user selected settings and other factors (as illustrated in FIG. 12). The switch (MTX or other) 130 is simply the place where the ULDC 908 communicates data. The ULDM 904 converts and sends the query via the intersystem logical connection 924, to the ULD 900 through the DLC 902. The ULD 900 then uses its DLC 902 to convert query into internally recognized code and then retrieves it from the entry from the ULD 900. The results are passed back to the DLC 902, which converts the entry back into a format used by the ULDM 904. The entry is passed back through the switch, (MTX or other) 130, to the ULDC 908. This decoded data can also be sent through an intersystem logical connection 922 toe-mobility services 144 where the decoded data can be accessed and used by a plurality of entities and applications.

Still referring to FIG. 9, these e-mobility services 144 can be accessed by other applications within a single service provider's second-generation wireless device network 100. This networking of ULD's 1512 between service providers and other entities is accomplished through the use of two additional embodiments of this invention, a standardization conversion software/hardware 906 and a ULDC 908. The wireless device 104 can interface with a plurality of applications that are accessed through e-mobility services 144. The wireless device 104 can also query the ULD's 1512 and ULDC's 1502 and use this data for applications within the wireless device 104 or other equipment attached to the wireless device 104. These e-mobility service(s) 144, ULD's 1512 and ULDC's 1502 can also be interfaced via the Internet and the publicly switched telephone network (PSTN) 138.

The standardization conversion software/hardware 906 is known in the prior arts, however its use in this application is considered to be a point of novelty. The purpose of this device is to facilitate a standardization of the software and hardware transmissions from the service providers second generation wireless device network 100, to device is comprising software and hardware outside of the second generation wireless device network 100. However the standardization conversion software/hardware 906, may not be needed within the second generation wireless device network 100 if it is already operating with a hardware and software system which is compatible with the interfacing of hardware and software outside of the second generation wireless device network 100.

In an alternative embodiment the standardization conversion software/hardware 906 is comprised within, or as a peripheral of the device external to the second generation wireless device network 100 such as the ULDC 908.

As previously stated the ULDC 908, which is referred to in FIG. 9, enables the networking of a plurality of ULD 900 which can be accessed through e-mobility services 144 so as to provide a resource, as an embodiment of this invention, for locating individual wireless devices 104 for such applications as (for example) emergency medical services locating a loss or injured wireless device user 102, or to assist a wireless device user 102 to locate a loss or stolen wireless device 104. The ULDC 908, can also be used, in an alternative embodiment of this invention, as a resource to view and monitor the location of a plurality of wireless devices 104 at the same time, which would be useful in such applications such as (for example) vehicle traffic monitoring so as to enable vehicle trip route planning for emergency medical service vehicles trying to find the fastest route of travel to a particular emergency by avoiding congested traffic areas, or for vehicle trip route planning by individual drivers.

Yet another alternative embodiment of the user ULDC 908 is to provide a resource for monitoring the location of a plurality of selected wireless devices 104 so as to be useful in such applications (for example) as monitoring the location of wireless devices 104 operated by police 1906, so as to enable faster response time by the police 1906 in an emergency situation, or location of wireless devices 104 operated by taxi services or delivery services in order to improve efficiency, or for businesses to monitor the location of employs.

Figure 10:
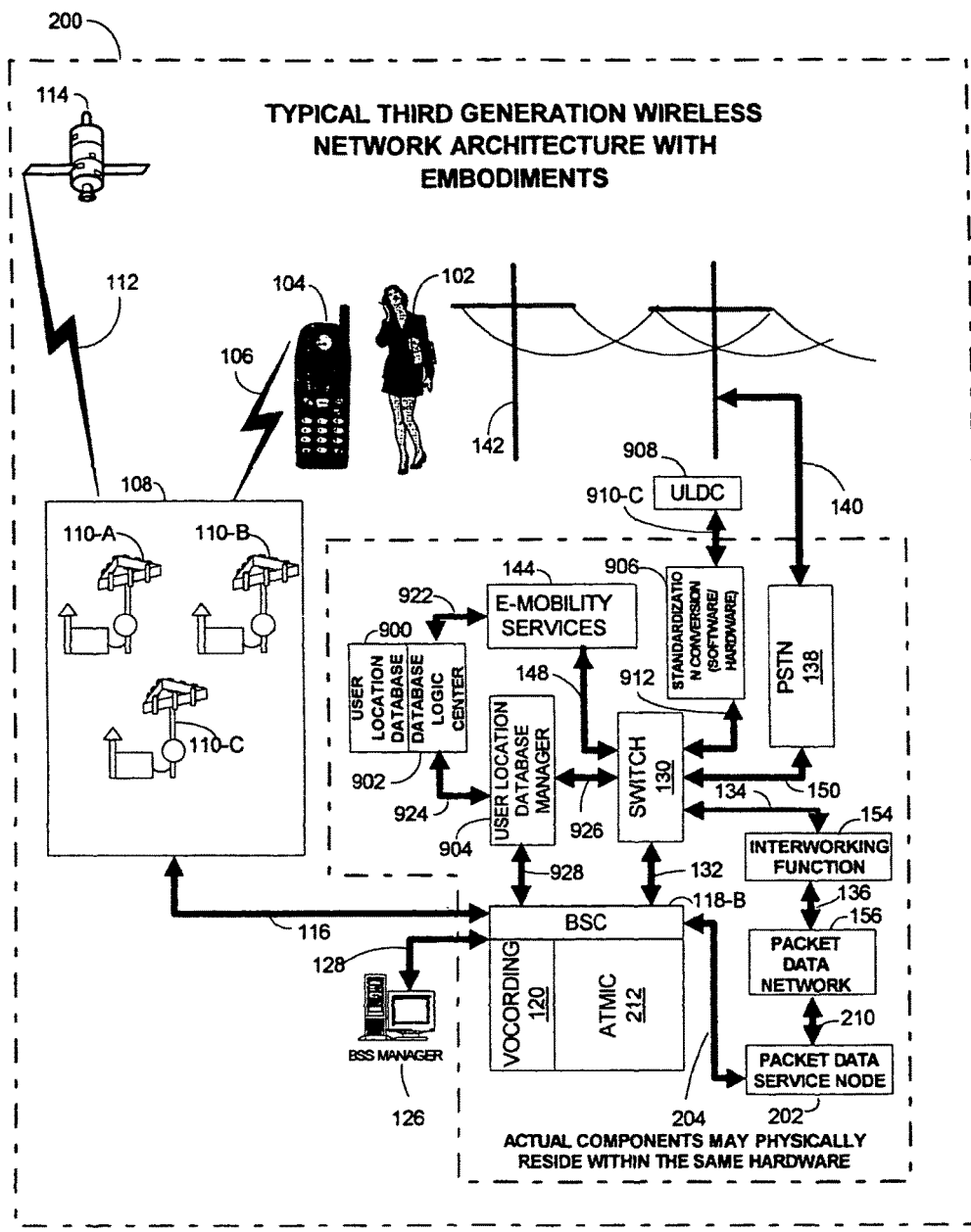
FIG. 10 TYPICAL THIRD GENERATION WIRELESS NETWORK ARCHITECTURE WITH EMBODIMENTS

Now referring to FIG. 10, the same embodiments of this invention, as illustrated in FIG. 9, are illustrated here in the third-generation wireless device network architecture 200. These embodiments operate the same as in FIG. 9.

For a third generation wireless device network 200, the differences involved are minor. Primary operation of the embodiment does not change. However, additional embodiments do exist. The ability to send data at higher rates and to allow faster bi-directional communication between the wireless device 104 and the wireless device network 200 are key. These factors allow the realization of real-time applications to be run from the wireless device 104 that could access various E-mobility services 144 and consequently the ULD 900.

Figure 11:
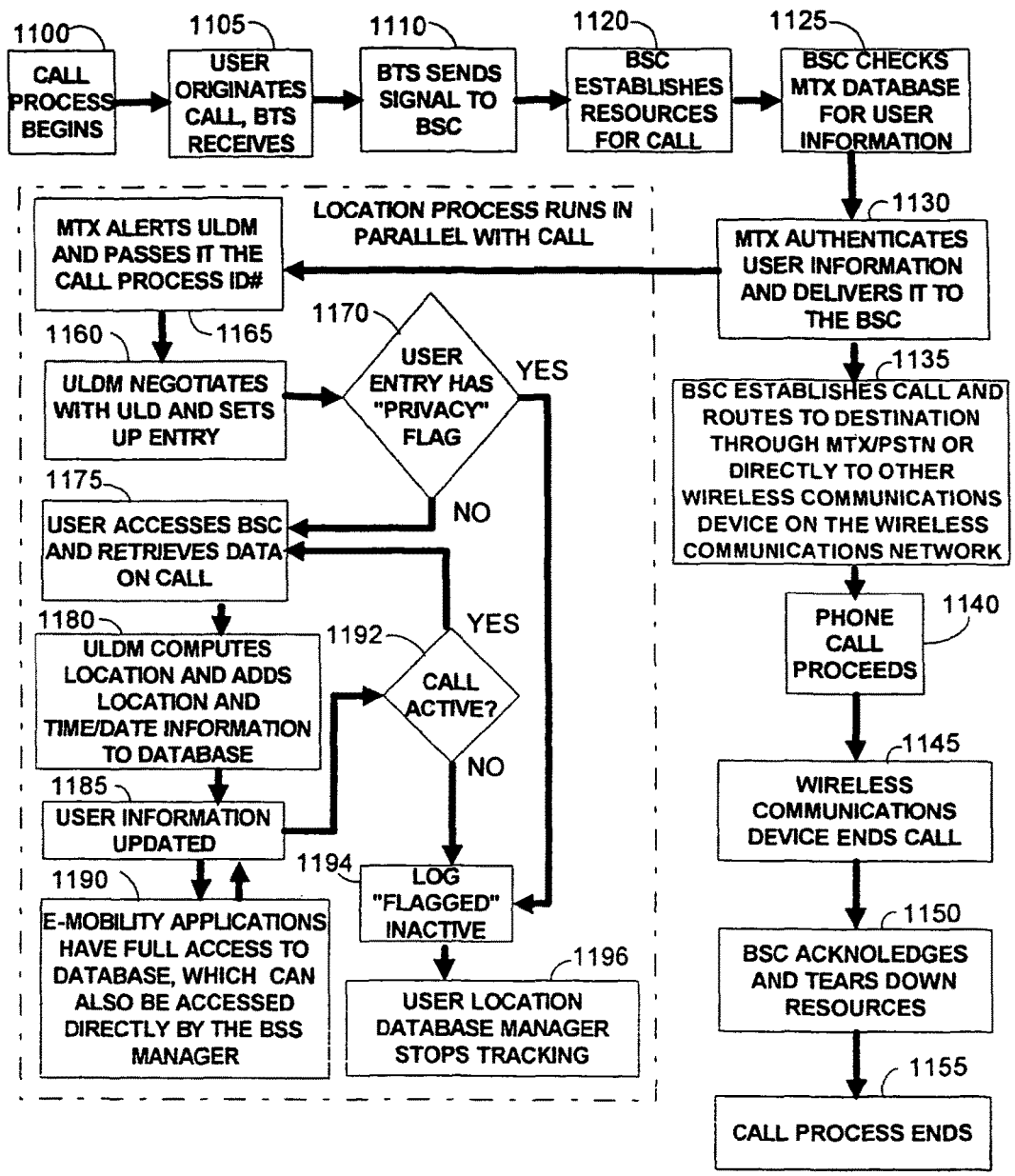
FIG. 11 FLOWCHART OF TRACKING WIRELESS DEVICE'S LOCATION

Now referring to FIG. 11, is a flowchart of tracking wireless device's 104 location. The items of this flowchart, which are numbered from 1100 through 1196, are intended to demonstrate the current state-of-the-art regarding the processing of a call transmission from a wireless device 104 and are therefore prior art. The items of this flowchart, which are numbered 1100 through 1196, are unique to this convention and should be considered points of novelty. The call process begins 1100, when the user originates a call 1105, and the base-station transceiver subsystem (BTS) 300 receives the call 1105. Information is then sent from the base station transceivers subsystem to the base station controller (BSC) 1110, at which point the base station controller 206 establishes resources for the call 1120. The base station controller 206 checks the switch (MTX or other) 130 database for user information 1125. The switch {MTX or other) 130 authenticates user information and delivers it to the BSC 1130. From this point the BSC 206 establishes the call and routes the call to its destination 1135, through the switch (MTX or other) 130 and then to the publicly switched telephone network 138 or directly to other wireless devices 104 on the wireless network 1135. The call proceeds 1140, until the call is terminated 1145. The BSC 206 then acknowledges the end of the call and tears down the resources 1150 at which point the call process ends 1155.

Still referring to FIG. 11, the location process runs in parallel with the call and begins when the switch (MTX or other) 130 authenticates user information and delivers the call to the BSC 1130. It is at this point that the switch (MTX or other) 130 passes the call process identification number 1165 to the ULDM 904. The ULDM 904, negotiates with the ULD 900 and sets up the entry 1160. It is at this point when the ULDM 904, checks to see if the user has activated the full privacy flag 1170. The full privacy flag 1170, is an embodiment of this invention. The privacy flag 1170, is intended to allow the user to choose whether or not his/her location can be monitored by the ULDM 904. If the user has chosen to turn his full privacy flag 1170, on the ULDM 904, then logs user inactive 1194 and the ULDM 904, stops tracking 1196. If the user has not turned their full privacy flag 1170 on, the BSC retrieves data on the call 1175. This also applies to when a user may opt to have an 'Anonymous Privacy Flag'. In this case, the user's location can only be accessed by external applications as part of an anonymous location query. In such case, the location of a said user could not be associated with any user information. The difference between the "full privacy" flag and the "anonymous" flag is that the full privacy flag will not let any external program access any data, personal or location information. While, on the other hand, the anonymous flag when set, will allow location-based information to be released, but not personal identifying information. These are both electronic registers that exist in the database entry of the user. The querying software checks them first, to discover the access rights to the user's personal and location-based information.

The ULDM 904, then computes the location and the location time and date information and other information 1180, which is acquired from the BSC 206 and the switch (MTX for other) 130. It then sends the updated data information 1185 to the ULD 900, via the database logic center 1180. As the call proceeds, user information is updated 1185. If the call is still active, the ULDM 904 computes the location and adds location time/date information 1180 and other desired information from the BSC 206 and the switch (MTX or other) 130 and then enters this information into the ULD 900, via the database logic center 1180. At this point the user information is updated again 1185. During this process the e-mobility service 144, applications have full access to the ULD 900, which can also be accessed directly by base station subsystem (BSS) 1190. When the user information is updated 1185 and it is determined that the call is not active 1192, the ULDM 904, logs the ULD 900, entry as inactive 1194 and the ULDM 904, stops tracking the wireless device 1196.

Referring to FIG. 12, this diagram illustrates in greater detail, the inter-working communication between the base-station controller (BSC) 118-A or 118-8, the switch (MTX or other) 130 and the ULDM 904. The ULDM 904 and the BSC 118-A or 118-B are connected by an intersystem logical connection 154. The ULDM 904 and the switch (MTX or other) 130 are also connected by an inner system logical connection 152. The BSC 118-A or 118-B and the switch (MTX or other) 130 are connected by an inner system logical connection 132. A wide variety of information is available to be shared between the ULDM 904, the BSC 118-A or 118-B, and the switch (MTX or other) 130 and can be used in the algorithms of the hierarchy of user location methods. Of these, the items that are most important in determining location, include timing (time difference of arrival (TDOA) and round trip delay (RTD) 1200, signal strength measurements 1210, and call processing information 1220, which are obtained from the BSC 118-A or 118-B. In addition, the switch (MTX or other) 130 provides the following information which is used to determine the location, including, radio tower and BTS latitude/longitude 1230, radio tower altitude 1240, radio tower down tilt 1250, region type of tower (rural, urban, etc.) 1260, call process identification number 1270, HLRNLR information on caller 1280, and Azimuth on sectors and radio towers 1290. However, if a location algorithm of the HULM requires an additional item, they would be available to the ULDM 904, from the switch (MTX or other) 130, and BSC 118A or 118-B. In an alternative embodiment, location information from the wireless device 104 can also be obtained from the BSC, if the wireless device 104 is equipped with GPS or other location equipment.

Figure 13:
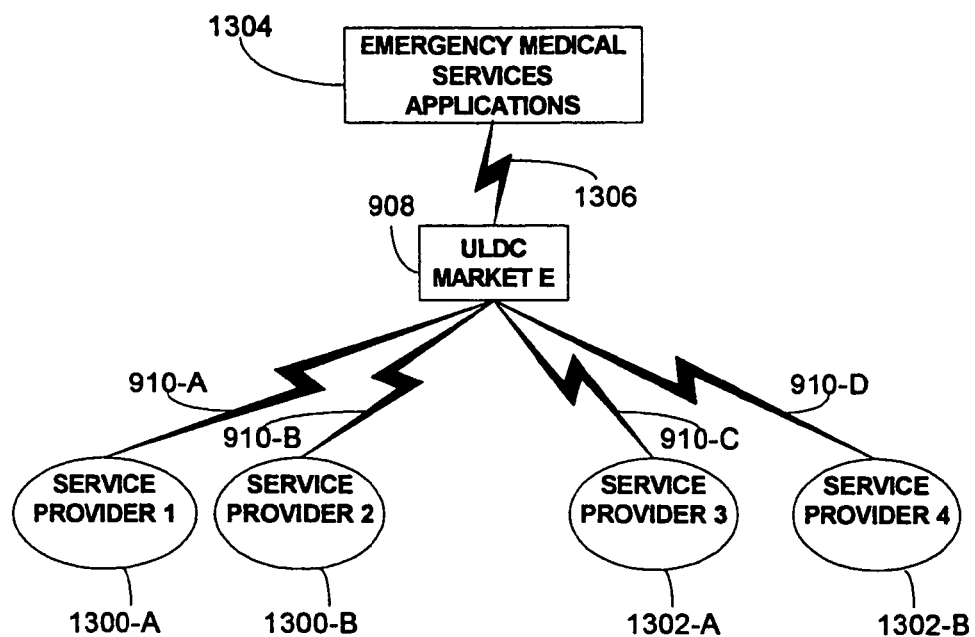
FIG. 13 USER LOCATION DATABASE COORDINATOR (MARKET LEVEL QUERY)

Now referring to FIG. 13, this diagram illustrates a market level query of the ULDC 908. This ULDC 908, is an embodiment of this invention and has been previously illustrated in FIG. 9 and FIG. 10. The ULDC 908, facilitates the interfacing of a plurality of wireless service providers 1300-A, 1300-B, 1302-A and 1302-B. In this example of a market level query, the ULDC 908, is queried by an emergency medical services application 1304, (for example) for the location of the individual wireless device 104. In this case a query is sent which is carried through a communications link 1306, to the ULDC 908. The ULDC 908, then evaluates the query using another embodiment of this invention, the hierarchy of process for query (HPQ). The hierarchy of process for query (HPQ) is a changeable and programmable method performing queries within a ULDC 908 or a user location database coordinator network 1600. It simply instructs the ULDC 908, on which devices to query for the results of the requested information (query).

Figure 14:
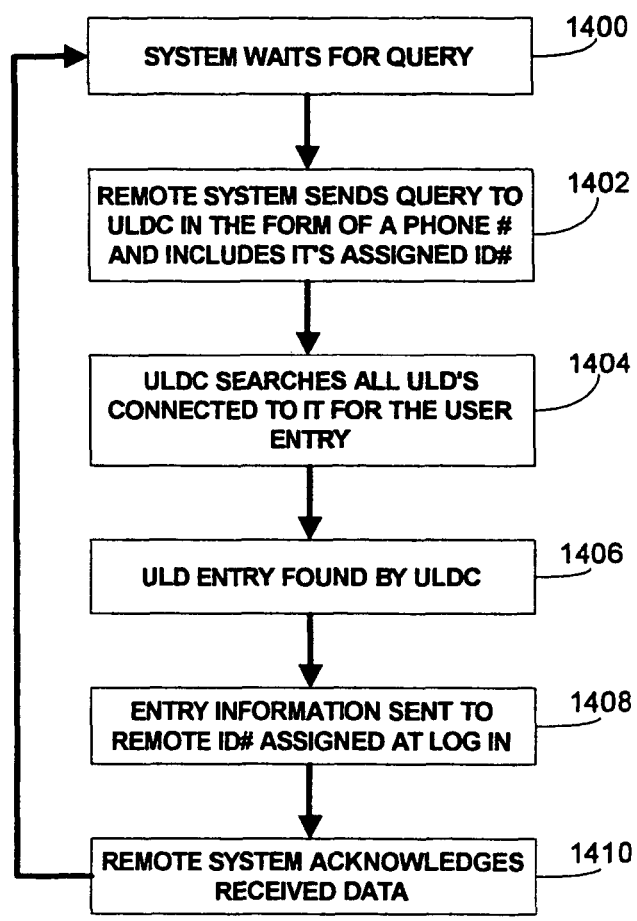
FIG. 14 USER LOCATION DATABASE COORDINATOR FLOWCHART

Now referring to FIG. 14, is a flowchart, which illustrates a query for information pertaining to a single wireless device 104. As illustrated, the ULDC 908, waits for a query 1400. Then, a remote system (for example, emergency medical services for a service provider) sends a query to the ULDC 908 in the form of a phone number and includes its assigned query ID number 1402. The ULDC 908, searches all of the ULD 900, connected to it, in accordance to the parameters set by the hierarchy process for query (HPQ), for the user entry 1404. The entry that was requested by the remote system would then be found in a ULD 1406. The entry information is then sent back to the querying remote system, via the query ID number assigned at the beginning of the process 1408. The remote system then acknowledges the received data from the ULDC 1410.

Figure 15:
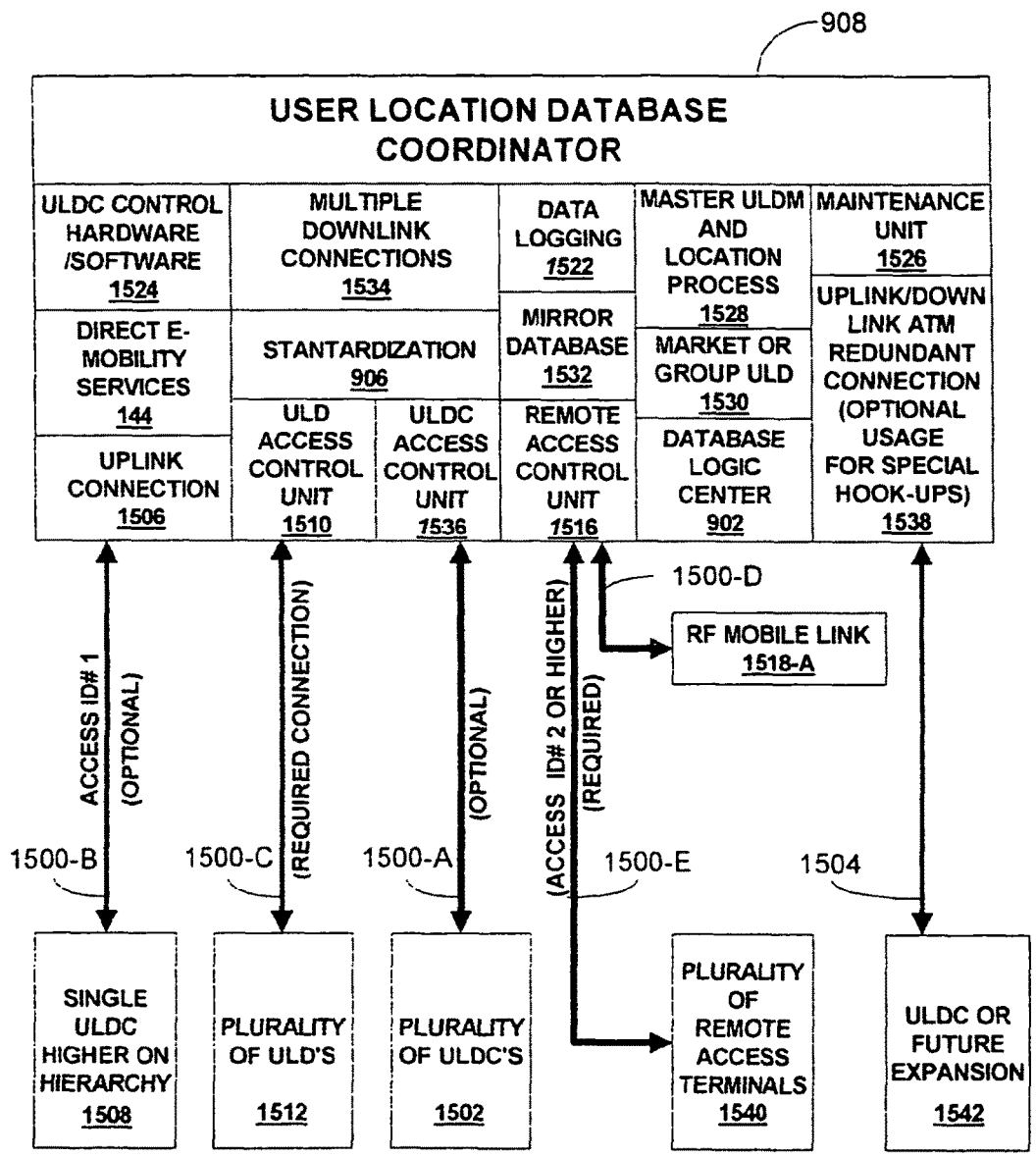
FIG. 15 GENERIC USER LOCATION DATABASE COORDINATOR COMPONENTS

Now referring to FIG. 15, is an illustration of components of the ULDC 908 that has an ATM/direct connection 1500-A with a plurality of a ULDC 908, in a hierarchy. 1500-B connects to the ULDC's 908, uplink connection 1506, to higher ULDC 908. The connection 1500-B should be dedicated in the sense that interruptions are only when planned for and are expected. Suitable connections are T1, T3, microwave or other similar methods. The ULD 900, access control unit 1510, allows interface with a plurality of ULD's 1512, having bi-directional connections 1500-C to each. These connections 1500-C, are communications links (T1, T3, microwave or other dedicated lines) 1306. CRC checking and other error checking methods are recommended when implementing the software design in the ULDC 908, control unit interface.

Still referring to FIG. 15, the remote access control unit (RACU) 1516, allows dial-up, permanent, or other connections/other external source access to the ULDC 908. The RACU 1516 has accommodations for a plurality of connection options so-called dial-up or regular phone line connections and will require an internal modem to allow external connections of this type. The speed of the modem should not need to exceed to a 1400 kbs per port, although a faster modem could be used. Also accommodations for permanent connections should exist. Data line connection adapters for T1, or other digital sources should be integrated. As specific on this integration prior art, simply their presence as a whole is claimed in this invention as unique. The RF mobile link 1518-A, could also be connected to the RACU 1516, via a communications link 1500-D.

The data-logging unit 1522, is responsible for storing/logging queries. It records queries and results from the queries, as well as the user/ID number of the requesting entity to an internal software database. This database should be permanent (but replaceable). A hard drive with the storage capacity of 40 GB should suffice and if it reaches its storage threshold data entries are erased starting ((starting with the oldest first). This storage capacity should allow for up to 1-year worth of entries (if not more) to be reported before old entries are erased.

Still referring to FIG. 15, other components comprised with the ULDC 908, include; ULDC 908 control hardware/software 1524, a maintenance unit 1526, a master ULDM 904 and location verification process 1528, a market or group ULD 1530, and a mirror database 1532. The mirror database 1532, would mirror connected ULD's 1512, for faster access to information.

Still referring to FIG. 15, in an alternative embodiment, the ULDC 908, may comprise a DLC 902, e-mobility services 144 and standardization conversion hardware/software 906. This standardization conversion hardware/software 906 would enable the ULDC 908 to be more compatible with hardware/software which is external (for example, service provider, user applications, etc.) to the ULDC 908. Adding e-mobility services 144 to the ULDC 908 would add efficiency to the query process when the ULDC 908 is asked to query a plurality of locations of wireless devices 104, from a plurality of service providers comprising a plurality of ULD's 1512.

Figure 16:
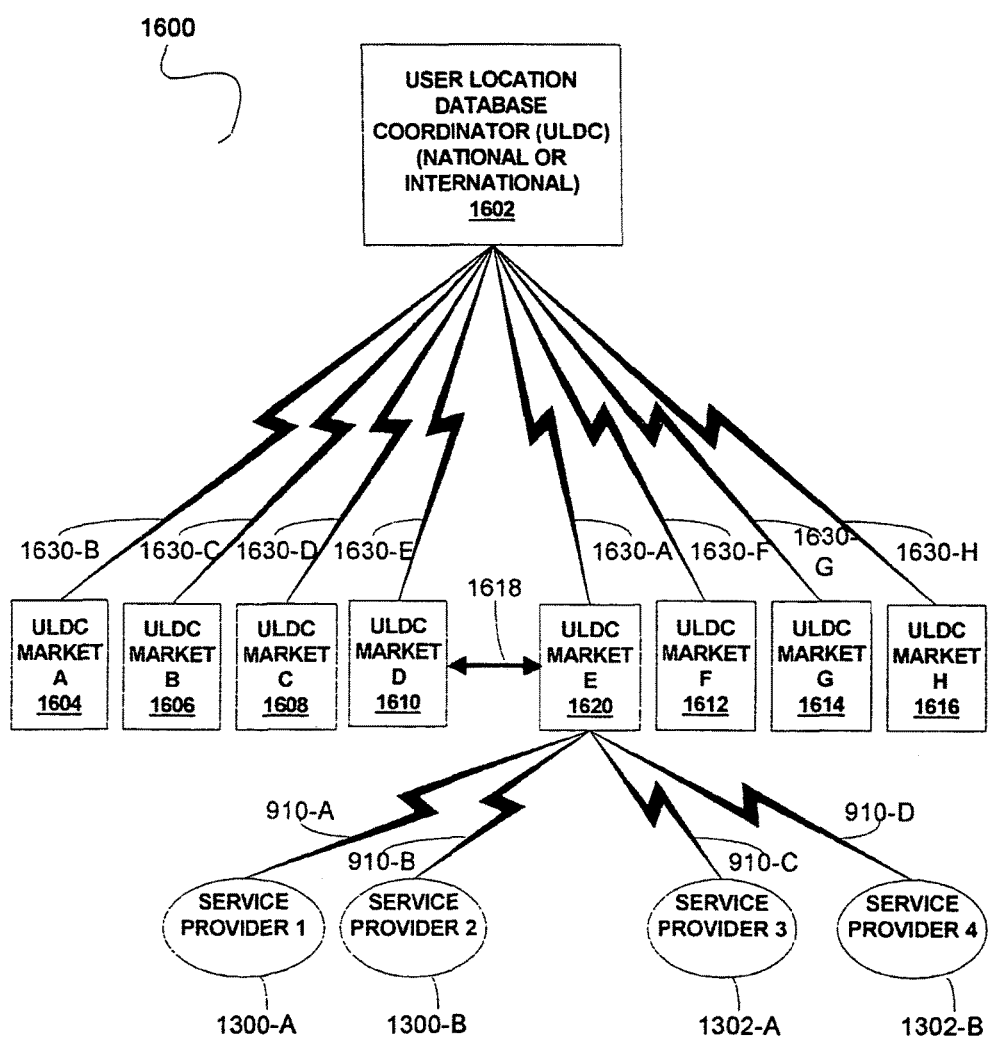
FIG. 16 USER LOCATION DATABASE COORDINATOR (MARKET BASED SYSTEM)

FIG. 16 shows an illustration of an alternative architecture of a ULDCN 1600. This alternative architecture illustrates the operation of a market-based system. In this architecture, a remote query, (for example) may be sent by an application comprised within the service providers network, to the service provider's e-mobility services 144, for the location of a wireless device 104. If it is determined, by the search of the service providers ULD 900, that the wireless device 104, is not operating within the service providers wireless device network 100, the query would be forwarded from the market level ULDC 908, via a dedicated communications link 910-A, and then to a national/international user location database coordinator 1602, via a dedicated line 1630-A. This national/international ULDC 1602, will then query other market level ULDC's 1604, 1606, 1608, 1610, 1612, 1614, 1616, in the process specified by the hierarchy process for query (HPQ), for the location of the specified wireless device 104, which may be roaming outside of its home wireless network 100. This architecture offers the advantage of easily accessible viewing of market level ULDC's 1502, on the market level and also on a national/international level 1602.

Still referring to FIG. 16, another notable embodiment which is illustrated in this architecture is the optional communications link 1618, between the various market level ULDC 1604, 1606, 1608, 1610, 1620, 1612, 1614, 1616. These optional communications links 1618, are notable because it offers two important features; the ability from one market to another without using the national/international level ULDC 1602, and also as an alternative communications link between the market level ULDCN 1600, and the national/international level ULDC 1602, in case there is a break in one or more of the communications links 1630-B, 1630-C, 1630-D, 1630-E, 1630-A, 1630-F, 1630-G, or 1630-H.

Figure 17:
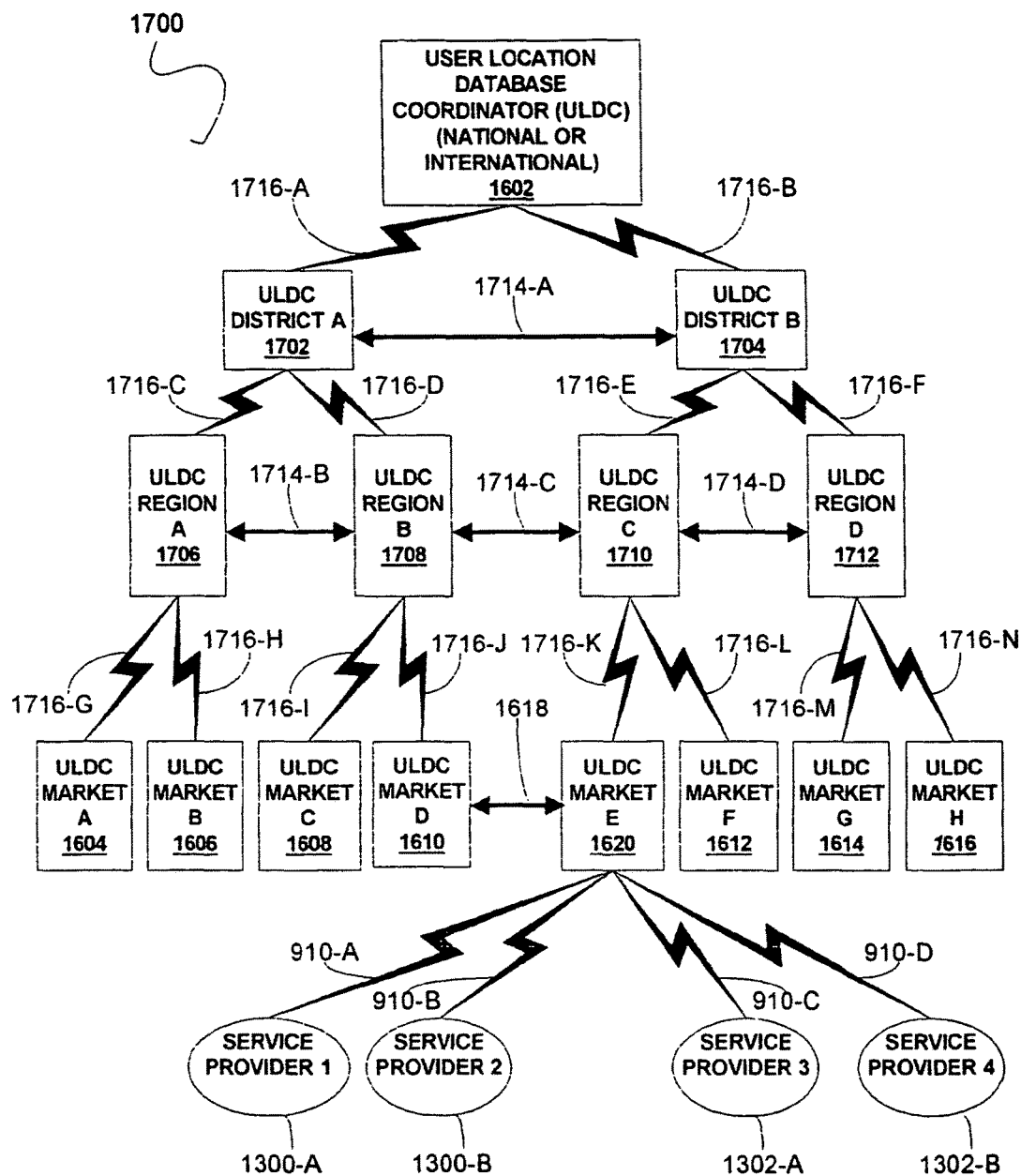
FIG. 17 USER LOCATION DATABASE COORDINATOR NETWORK (REGION BASED SYSTEM)

Now referring to FIG. 17, is an illustration of the architecture of a regionally based ULDCN 1700. Underneath the national/international ULDC 1602, exists a plurality of district user location database coordinator's 1702 and 1704, with regional user location database coordinator's 1706, 1708, 1710, and 1712, and market user location database coordinator's 1604, 1606, 1608, 1610, 1620, 1612, 1614, and 1616, under them respectively. Service providers 1300-A, 1300-B, 1302-A, and 1302-B, are positioned below the market user location database coordinators 1620, mentioned above. Optional communications links 1714-A, 1714-B, 1714-C and 1714-D, exists between district and regional ULDC's 1502, in order to provide a more efficient means for routing queries, to provide alternative routing possibilities in case of a communications link break, or to compensate for hardware/software problems within the ULDCN 1700. Queries within the ULDCN 1700, are performed in accordance with the hierarchy process of query (HPQ). Queries are routed through communications links, which are permanent connections such as (for example) TI lines 13 lines or microwave links 1716-A, 1716-B, 1716-C, 1716-D, 1716-E, 1716-F, 1716-G, 1716-1-1; 1716-I, 1716-J, 1716-K, 1716-L, 1716-M, 1716-N. These communications links 1716-A through 1716-N, represent uplink (From ULD/ULDC) and downlinks (From ULD/ULDC).

Figure 18:
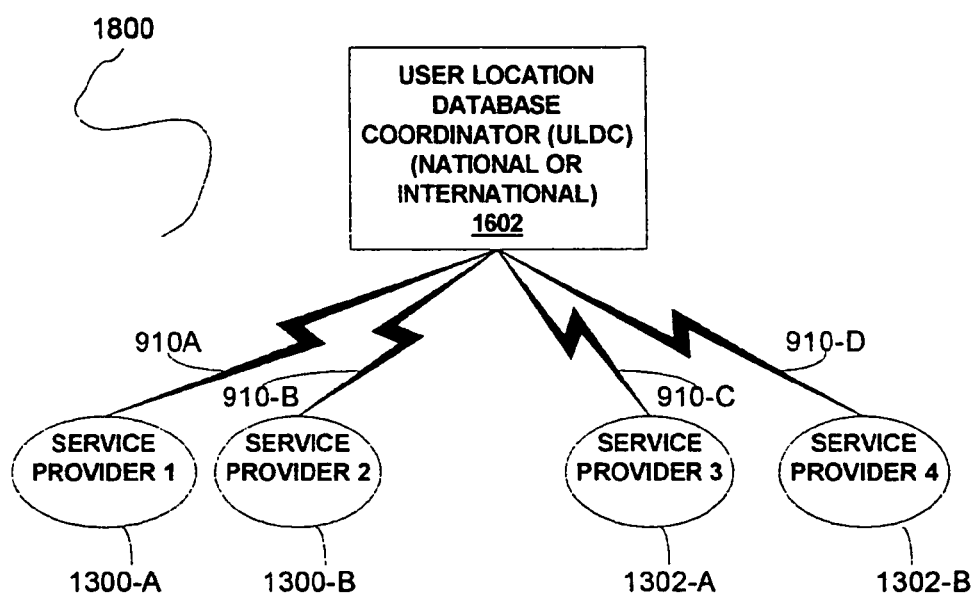
FIG. 18 USER LOCATION DATABASE COORDINATOR NETWORK (DIRECT SYSTEM)

Now referring to FIG. 18, a direct system is illustrated for connecting to a user location database coordinator network 1800. This alternative embodiment illustrates the means for service providers a plurality of wireless network, to query a national/international user location database coordinator 1602 directly. These service providers 1300-A, 1300-B, 1302-A, and 1302-B are linked to the national/international user application database coordinator 1602 via communications links 910-A, 910-B, 910-C, and 910-0, which are permanent connections such as (for example) TI lines T3 lines or microwave links. In an alternative embodiment, the service provider may use an optional communications link 1618 in order to provide an alternative method for routing queries.

Figure 19:
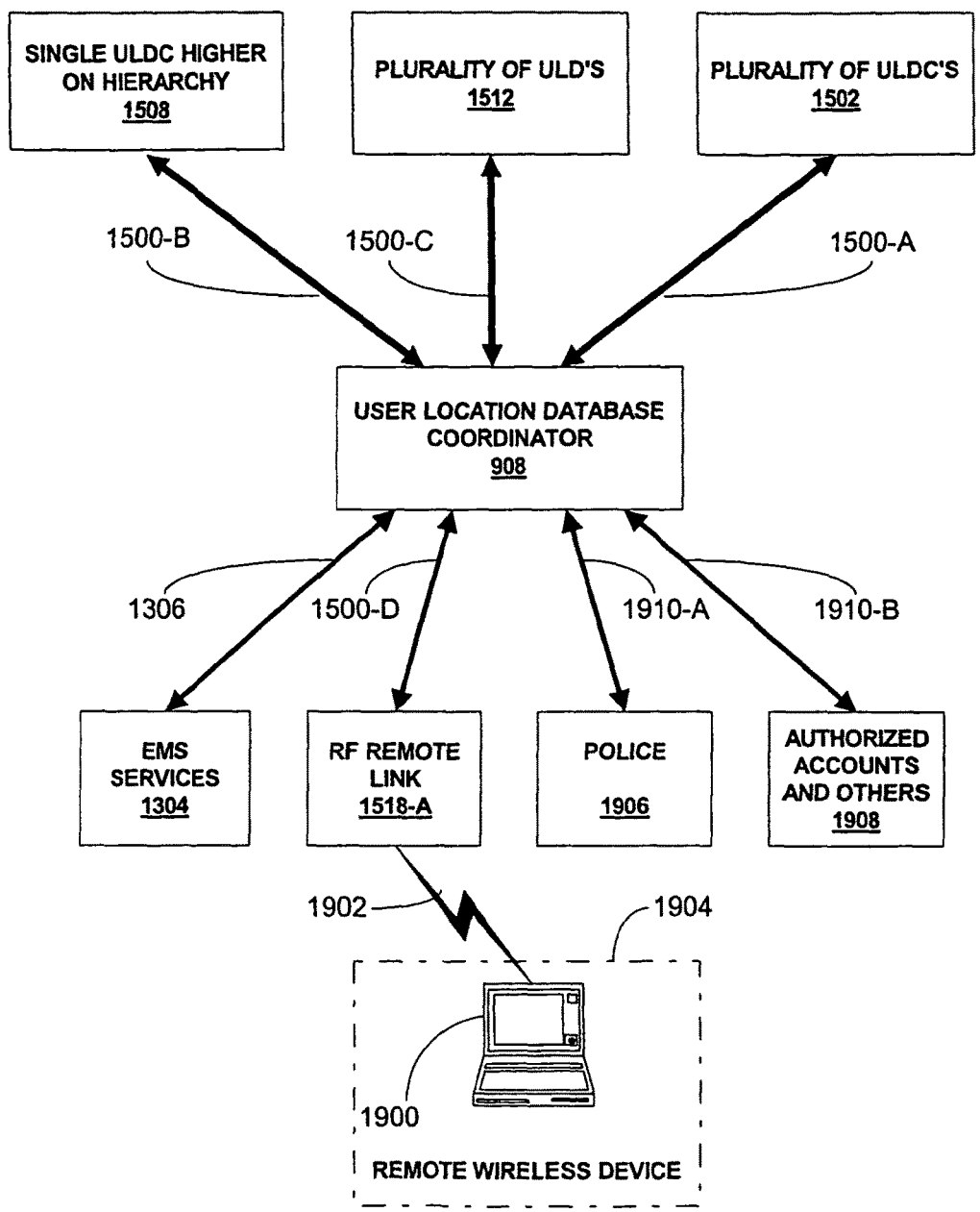
FIG. 19 ULDC EXTERNAL QUERY CONNECTIVITY

Now examining FIG. 19, illustrates the external connectivity for sending queries to the ULDC 908. A plurality of sources as defined in the embodiments can query the ULDC 908. Additionally, an RF remote link 1518-A could be set up that would allow queries from remotely enabled remote wireless devices 1900, such as laptop computers 2450, and other devices via a radio frequency (RF) link 1902. These devices would allow queries to come from a plurality of remote wireless devices 1904. Queries can also come from services such as police 1906, emergency medical services 1304 or authorized accounts and other entities 1908. The queries flow to the ULDC 908 and then to the ULD's 1512 and ULDC's 1502 connected. The ULDC 908 follows the HPQ to collect results from queries.

Defining the external connectivity for queries of the ULDC 908 is a list of externally connected devices. These devices consist of a plurality of users/devices that can request data from the ULDC 908. They include:

A single ULDC higher on the hierarchy 1508

A plurality of ULD's 1512

A plurality of ULDC's 1502

EMS Services 1304

RF remote link 1518-A, and indirectly remote wireless query devices 1904

Police 1906

Authorized accounts and others 1908

The ULDC 908 is able to multitask and process these connections simultaneously and can be controlled via software multitasking operations (common knowledge). This allows a large number and complexity of ULD 900 queries to occur simultaneously at the ULDC 908.

These devices each connect to the ULDC 908 in different ways. The parallel or lower ULDC's 1502, and ULD's 1512 are attached connection with dedicated lines, satellite, T1, T3, microwave, etc. 1500-C and 1500-A. The plurality ULDC's 1502 higher in the hierarchy 1508 are connected with a dedicated line, satellite, T1, T3, microwave, etc. 1500-B through the uplink port (see FIG. 15) of the ULDC 908. The remaining devices connect individually through the dialup/fixed connections 1306, 1500-D, 1910-A and 1910-B to the ULDC 908. The services using this method are the EMS services 1304, Police 1906, RF remote link 1518-A, and other authorized accounts 1908.

Each of the connected devices 1304, 1518-A, 1906, and 1908 using the dialup/fixed connection lines 1306, 1500-D, 1910-A, and 1910-B would need software to interface with the ULDC 908. This software is common knowledge by and software engineer to develop. It would consist of a program that would have database query abilities, a graphical user interface, and ways to display and organize queries of the ULDC 908.

The RF remote link 1518-A connected to the ULDC 908 has special requirements. Itself, it cannot submit queries alone to the ULDC 908. Its primary function is to act as a bridge between the ULDC 908 and wireless device 104, specifically connected to the RF remote link 1518-A. It converts signals from land lines 142, (TI coaxial, other) into a RF spectrum to be sent to the remote mobile devices 1900 designed for the RF link 1910-C. Similarly the remote mobile devices 1900 that communicate with the ULDC 908 send SF links 1910-C back to the ULDC 908. The RF remote link 1518-A organizes these signals by users and then converts them to landlines 142, (Ti, coax, other) and transmits the signal back to the ULDC 908.

The functionality of this RF remote network 2500 (see FIG. 25) is to allow remote mobile devices 1900 in the field to be able to query the ULDC 908 on a secure wireless RF link 1902 connection. The SF spectrum for this FR link 1902 would most likely be between 200 MHz and 10 Ghz (or any desired frequency). This frequency would have to, however, be authorized by the FCC for use.

The remote wireless devices 1900 could exist as laptop computers 2450. They would require an additional piece of hardware with a remote RF transmitter/receiver 1518-A and an attached antenna 2430. This hardware could exist as a PCMCIA card with a connection to control hardware and the antenna 2430. Software control would occur on the laptop computer 2450, itself. The laptop 2450, would simply have to have the following minimum requirements:

Sufficient processor/memory and computing ability to run the query software

At least one PCMCIA type 1 or 3 slot.

Ability to function on battery power or other wireless power source

Ability to power transmitting antenna sufficiently

Computable software operating system (OS) for query software.

The RF link 1902 would be sent using a secure method such as spread spectrum with frequency hopping. Its signal would be sent as RF signals. The receiving antenna at the RF remote link 1518-A would therefore have to be within the range of the remote wireless devices 1900 signal. It would require a transmit and receive antenna 2430 to send and receive signals from the remote wireless devices 1900. This antenna 2430 should be an omni directional antenna such as a quarter wave monopole. The range of signals it can send and detect would be a function of the receivers sensitivity and noise rejection ability. The rejection of noise should be greatly increased with the use of a spread spectrum signal.

The benefits of the RF remote link 1518-A and its connected remote mobile devices 1900 it is a secure way to query the ULDC 908. The remote wireless devices 1900 could be carried by police 1906, EMS 1304, and authorized accounts and other entities 1908 that may need to locate wireless devices 104 and their users 102 for emergencies or for any lawful reason.

Figure 20:
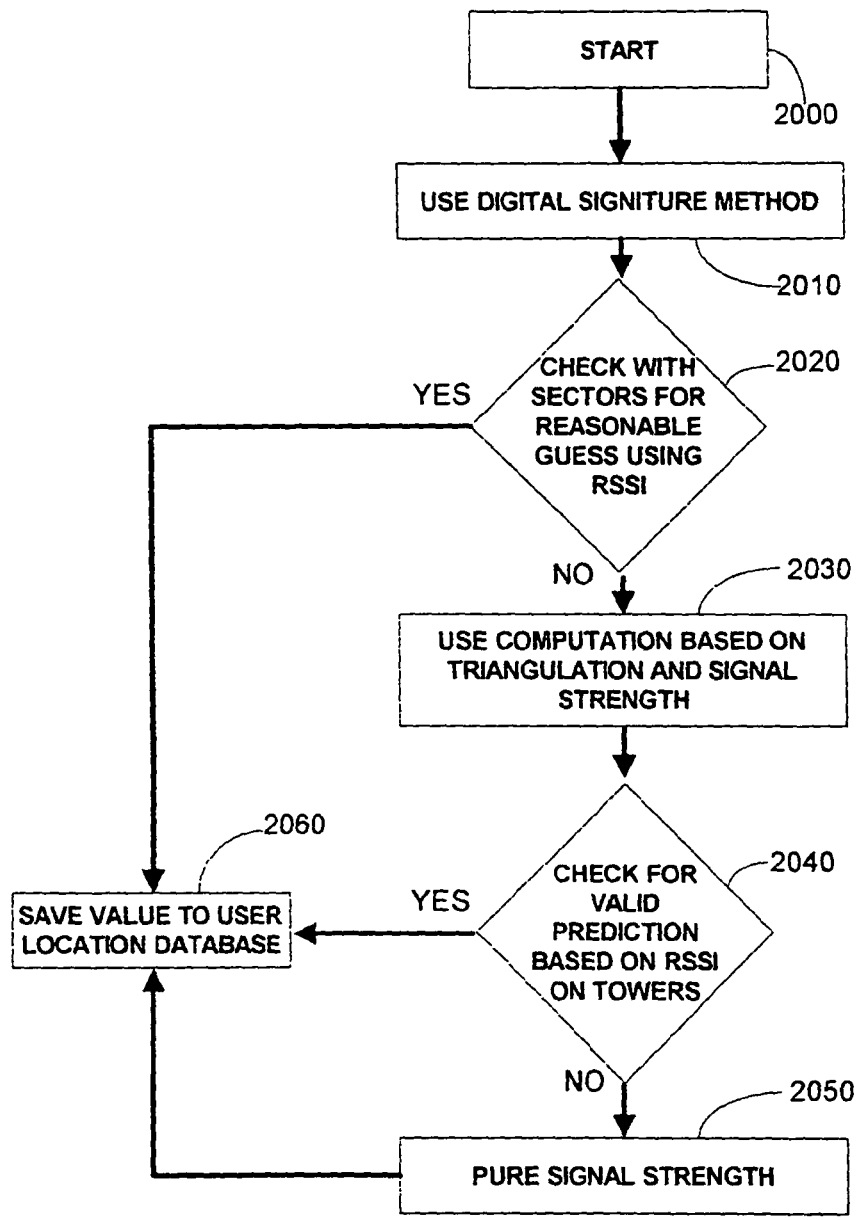
FIG. 20 HIERARCHY OF LOCATION METHODS

FIG. 20 demonstrates the logic of the hierarchy of location methods. The hierarchy decision algorithm is polled 2000 and the decision process proceeds. First the hierarchy attempts to calculate the location (latitude/longitude) of the mobile wireless device 104, using the digital signature method 2010 as covered in prior art. Next it verifies the validity of the result by looking at the RSSI of surrounding towers 2020. If the guess is valid it allows the result to be saved to the ULD 2060. If the guess is invalid, the location is calculated based on triangulation and RSSI 2030. Location is compared to fore mentioned criteria (RSSI) 2040 and if the calculation is approved, the location is saved 2050 to the ULD 900. If the calculation was incorrect, the location is calculated based on RSSI 2040 only, and stored 2050 to the ULD 900 (least accurate method).

Figure 21:
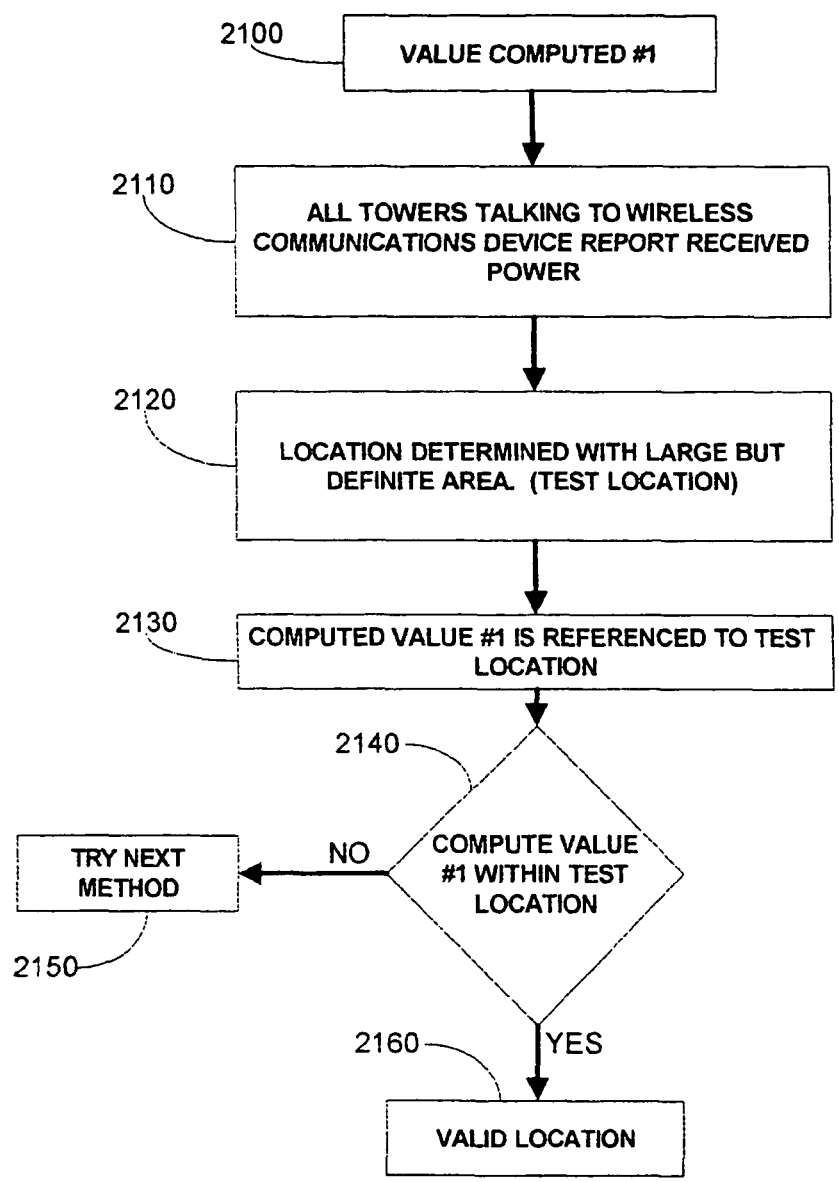
FIG. 21 VALIDATION OF LOCATION METHODS

In FIG. 20 the HULM is described. It begins when data is sent from the BSC. The first method used is the digital signature method of U.S. Pat. No. 6,249,252 or similar. If the selection is validated (as shown in FIG. 21) the value is added to the ULD 900 entry. If not, combination method based on triangulation and signal strength is used. If that method is not valid the least accurate method based only on RSSI is used 2050. FIG. 27 provides examples of location methods. It should be noted that these location methods are only examples and can be changed or modified in order to accommodate new location techniques.

FIG. 21 demonstrates the Compare (validation method in FIG. 20 (2020, 2040) method when validating location. First, the computed value 2100 is passed to the algorithm. It looks at whether all the towers in the range of the wireless device 104 are communicating with the wireless device 104 (and their RSSI) 2110. Then are test zone is established 2120 that is a large but definitive area based on the towers communicating with the wireless device 104 is computed. The computed (original location) is compared to the test zone 2130. If the computed value resides within this zone then the location is checked as valid 2160. If it is not, the next method for location 2150 as shown in FIG. 20 is requested.

In FIG. 21 the error check method of the FIG. 20 is shown. After the value is computed for location, it is checked. All towers first report RSSI of the wireless device 104. Location zone is then determined in a rough sized area. If the measurement falls within this area then the location is accurate. If not a signal to use the next method is returned. Alternatively, wireless devices 104 comprising location equipment such as, for example, GPS, may also be considered as a source for location information, and evaluated on the accuracy of the location method utilized at the wireless device 104.

Figure 22:
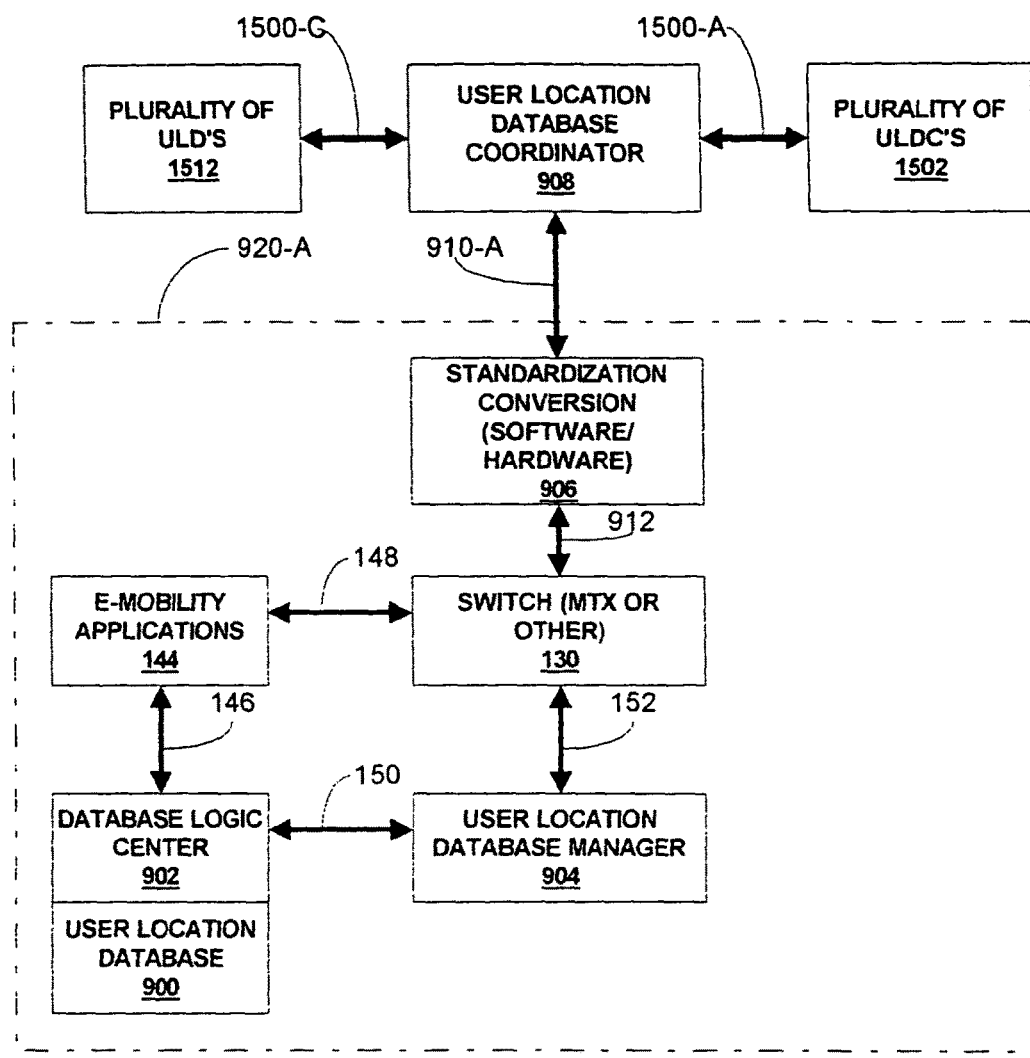
FIG. 22 E-MOBILITY USER LOCATION DATABASE QUERIES

FIG. 22 illustrates e-mobility ULD queries 2200. E-mobility applications 144 can directly query the local ULD 900 through its DLC 902. These e-mobility applications 144 can also query remote ULD's 1512 by sending queries through the switch (MTX or other) 130, through and standardization process 906, to the upper ULDC's 1502 and consequently to any attached ULD's 1512 or ULDC's 1502.

When queries are returned they are passed based on the query ID back to the e-mobility applications 144 by passing the result to the ULDC 908, though any standardization processes 906, to the switch (MTX or other) 130, and then back to the original e-mobility application 144.

In FIG. 22 the method in which e-mobility applications 144 query remote ULD's 1512 is shown. They first send a query to the ULDC 908 through the switch (MTX or other) 130 connection. The query is then sent to relative ULD's 1512 and ULDC's 1502 based on the HPQ. Results are then forwarded back to the ULDC 908 and to the switch (MTX or other) 130. At this point the result is then sent to the e-mobility applications 144.

Figure 23:
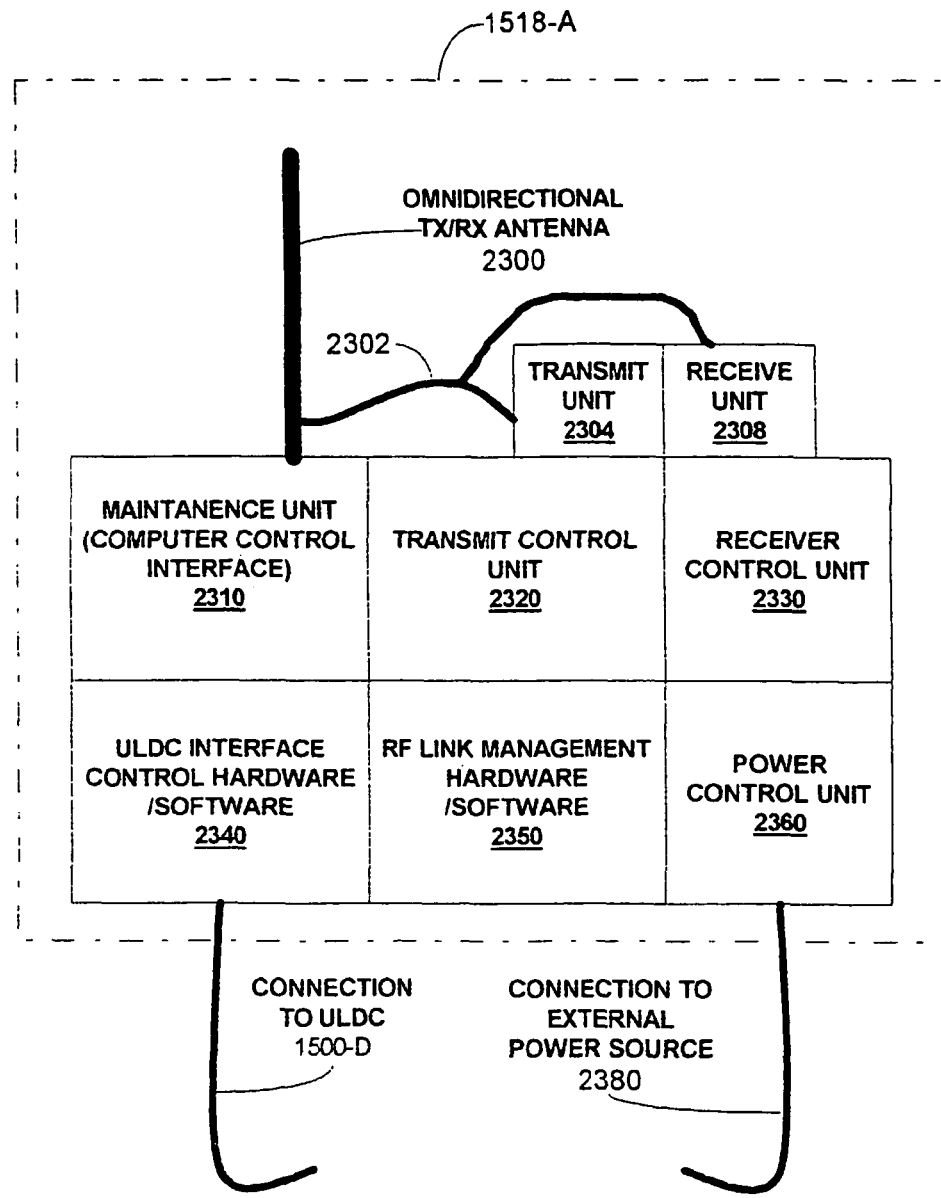
FIG. 23 RF REMOTE LINK COMPONENTS

FIG. 23 shows an illustration of the RF remote link 1518-A components. The ULDC 908 connects to the ULDC interface control hardware/software 2340. Residing logically or physically in the unit is the RF link management hardware/software 2350 that controls decoding/coding of message queues sent between the wireless query devices 1940 and the ULDC 908. Next is the power control unit 2360 that powers the RF remote link 1518-A and it's transmit/receive hardware. The maintenance unit 2310 allows for external diagnostics and repair of the unit. The transmit control unit 2320 controls data conversion to RF signals. The receiver control unit 2330 controls conversion of received RF Signals. The transmit unit 2304 amplifies and sends signals to the attached antenna 2300 via coax antenna lead cable 2302. The receive unit 2308 connects to the antenna and detects and isolates the received signals from the antenna 2300 originating from the wireless query devices.

Figure 24:
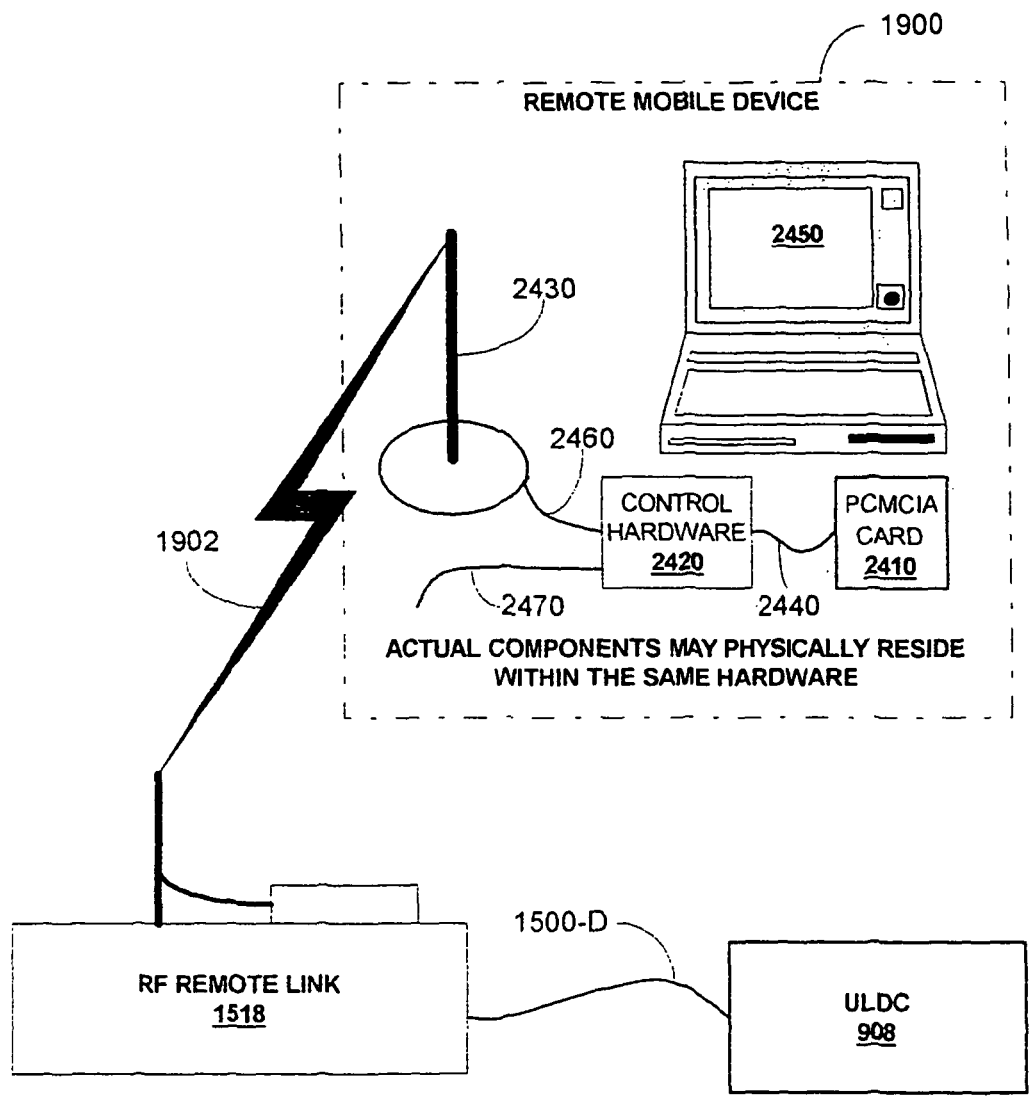
FIG. 24 RF REMOTE LINK TO REMOTE MOBILE DEVICE

Now referring to FIG. 24, the remote wireless devices can exist as laptop computer 2450 or any other mobile computing device. They would require an additional piece of control hardware 2420 to control RF coding and decoding as well as the ability to function as a RE transmitter/receiver 2420 for an attached antenna 2430. This hardware could exist as a PCMCIA card 2410 with a connection 2440 to control hardware and the antenna 2460. Software control would occur on the laptop 2450 itself. The laptop 2450 would simply have to have the following minimum requirements:

Sufficient processor/memory and computing ability to run the query software
At least one PCMCIA type 1 or 3 slot.
Ability to function on battery power or other mobile power source
Ability to power transmitting antenna sufficiently
Computable Software operating system (OS) for query software.

The transmitted RF signals 1902 would be sent/received from the RE remote Ink 1518-A that would process queries and send them to the ULDC 908 via a data line 1500-D (Ti/fixed/or other).

Figure 25:
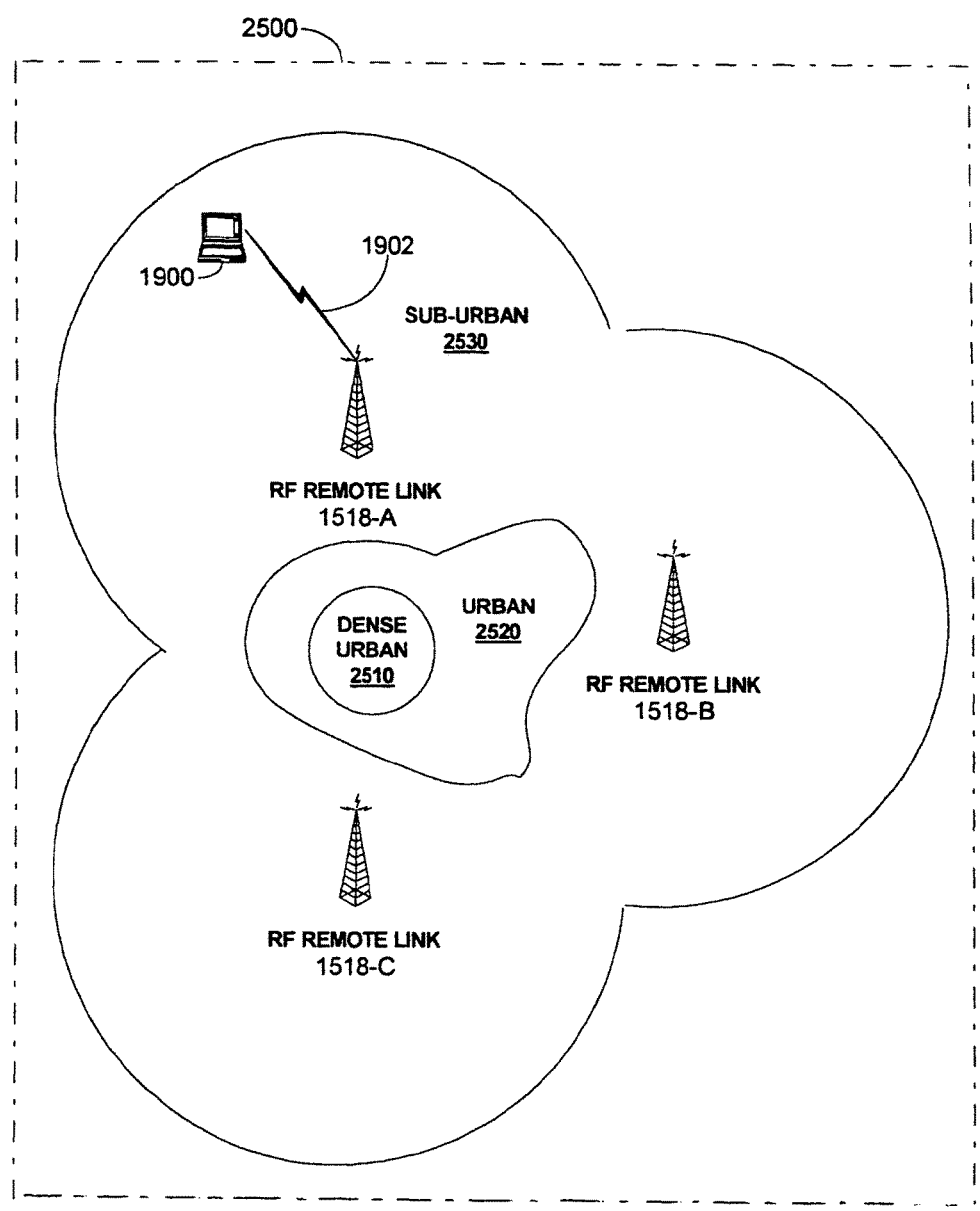
FIG. 25 RF REMOTE LINK NETWORK

FIG. 25 illustrates an RF remote link RF network 2500. To cover the desired land area, towers should be placed as to target, first, dense urban areas. Ideally one RF remote link tower 1518-A would have coverage for this are. Secondarily other antenna 1518-B and 1518-C could cover this area. Then coverage for less populated areas such as urban 2520 and the sub-urban 2530 would be covered subsequently. The frequency and separation of towers 1518-A, 1518-B, and 1518-C in areas such as sub-urban 2530 area need not be as dense because less call/queries from mobile query devices 1900 would occur here. The primary coverage is the dense populated 2510 areas.

Figure 26:
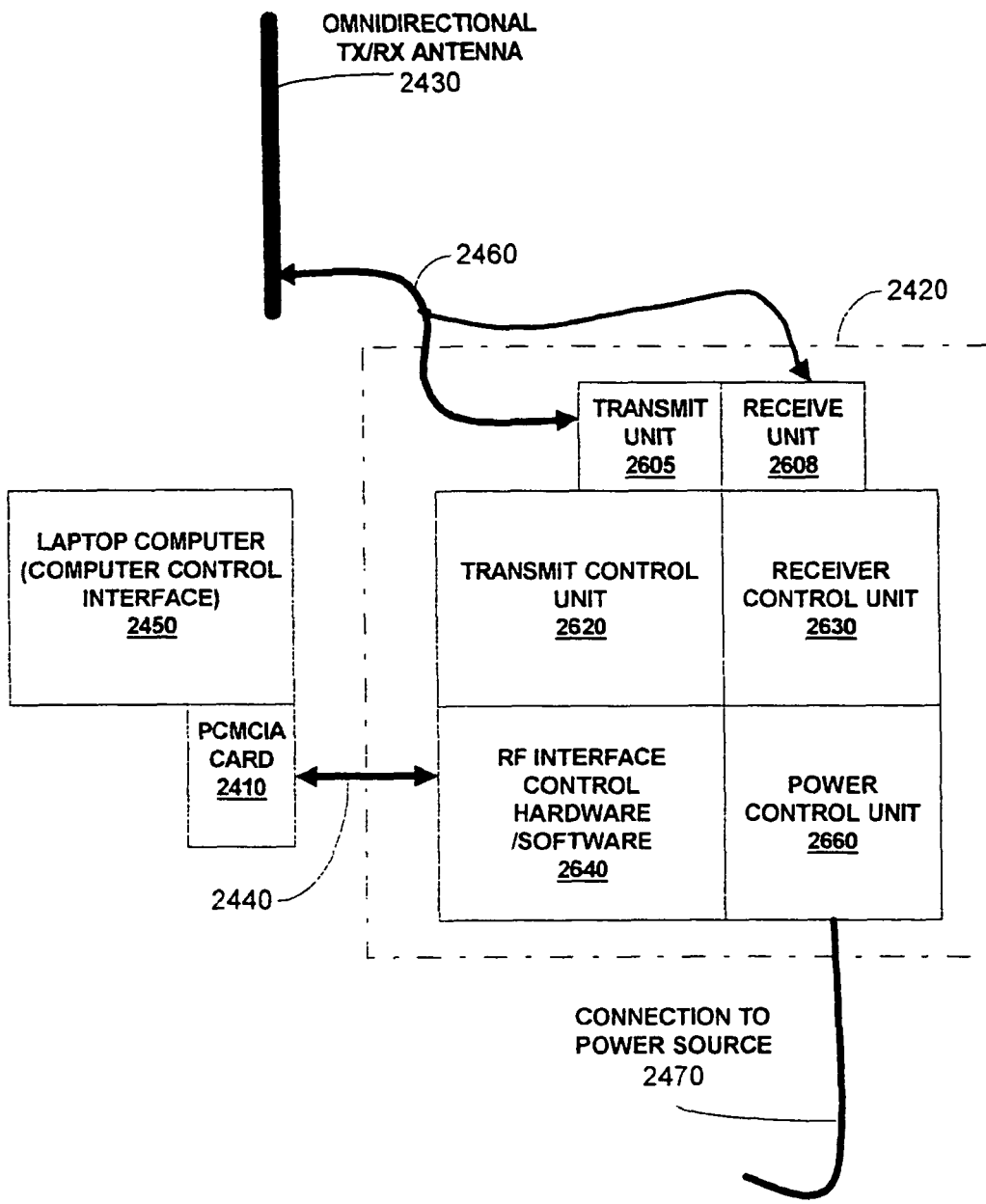
FIG. 26 REMOTE MOBILE DEVICE CONTROL HARDWARE

FIG. 26 illustrates the design of a remote mobile query device 2440. The primary unit is a laptop computing device 2450 that has the required software for its functionality to send/receive queries to the RF remote link 1518-A. It then connects via a control card (possibly PCMCIA card interface 2410) to the RF interface control hardware/software unit 2640. This unit includes transmit and receive control units 2620, 2630 RF front ends 2605, 2608 and an attached antenna 2430 to communicated via RF signals with the RF remote link 1518-A. Queries to the ULDC 908 originate from the wireless query device 1900 and are sent to the ULDC 908 via RF transmissions to the remote RF link 1518-A.

FIG. 27 illustrates to hardware and data that is required by the four recommended methods of location. These methods each require different elements to work appropriately. When deciding which method to use, care should be taken that all elements are available (or substitutes). These elements include: switch (MTX), HLR, VLR, ULD, BSC, SIBS Shelves, BTS, wireless device, timing data, signal strength, call processing information, latitude/longitude of BTS's, radio tower, down tilt, region type, azimuth on sectors, HLRIVLR data. Other location methods may also be utilized. Alternatively, wireless devices 104 comprising location equipment such as, for example, GPS, may also be considered as a source for location information, and evaluated on the accuracy of the location method utilized at the wireless device 104.

Operations

Call Process—Interaction of Invention

To make clear the interactions of this invention and how it actually functions, refer to FIG. 11. It illustrates what happens when a wireless device 104 makes a call and how it is tracked. The diagram shows each logical function in the process.

Here is the process as described in the FIG. 11.

Call Originates 1100
1. ULDM 904 gets user information from the switches user database 1165.
2. ULDM 904 checks ULD to see if the user already has a previous entry 1160.
3. If user exists in the ULD, then the records' "log status" flag is turned on 1160.
4. If user does not exist in ULD 900, then a new entry is made for the user and flagged (log status) to "on" 1160.
5. The ULDM 904 now checks the entry for the "private" status of the log 1170 (more specifically, existing entries that have been modified by customer request as private).

6. If the entry is private, then the ULDM flags the entry as "inactive" 1194 and stops monitoring 1196 phone.
7. If log is NOT private, the ULDM 904 accesses the BSC with the call number, processes the ID number and retrieves data on the call 1175.
8. ULDM 904 decodes data and calculates user's geographical location (latitude/longitude) 1180.
9. ULDM 904 updates user entry in ULD 900 with geographic information 1185.
10. ULDM 904 updates ULD 900 entry with the current time and date 1185.
11. ULDM 904 continues updating ULD 900 entry for user while BSC reports call as active 1185.
12. When call ends, ULDM 904 flags log as inactive 1194 and stops monitoring 1196 call process ID number in BSC.

Still referring to FIG. 11, the user entry is created 1160. It first checks if the entry exists and then, if not, creates one using the format subsequently described. Now referring to FIG. 9, to make this process above work, the ULDM 904 has to gather timing information and other measurements, such as in U.S. Pat. No. 6,249,252, from the BSC 118-A to make its calculations. Additionally, it combines this with wireless device 104 and radio tower with BTS 110-A, 110-B, and 110-C information acquired from the switch (MIX or other) 130.

Information gathered from the BSC 118-A includes:
Timing (TDOA, RID) information from radio towers 110-A, 110-B, and 110-C talking to the wireless device 104.
Signal strength measurements from radio towers 110-A, 110-B, and 110-C talking to wireless device 104.
Call Processing information in the call control hardware/software of the BTS.

Information gathered from the switch (MTX or other) 130 include:
Directionality of each radio tower 110-A, 110-B, and 110-C talking to wireless, such as AZIMUTH, DOWTILT, etc.
Telephone number and call processing ID#.
Latitude/Longitude/Altitude of the BTS/Radio Towers 110-A, 110-B, and 110C talking to the wireless device 104.

Specifically, the ULDM 904 uses multiple methods (covered in the forementioned patents) to determine latitude and longitude of a wireless device 104 that involves the gathering of the fore mentioned data. Many major methods as covered under numerous patents have described, in detail, individual methods for acquiring a target location. The most prominent and robust is covered in U.S. Pat. No. 6,249,252. As its methodology is quite complex, any individual seeking to understand it should read it in its entirety. However good U.S. Pat. No. 6,249,252 is, it is recommended that a single method not be relied upon solely. Whereas some methods are good for dense urban terrain (conquering, RF multi-path issues) as in the case of U.S. Pat. No. 6,249,252, others are better for suburban type terrain.

The choice in methodology as programmed into the software in the ULDM 904 should be transparent to the effect that based on decision protocols one method or a series of methods should be used in various circumstances automatically.

For dense urban areas with high multi-path, a method such as U.S. Pat. No. 6,249,252 or #6249680 should be used. These patents deal with high RF multi-path in a dense urban environment. As described in their disclosures, they use digital signatures for key "reference" locations, allowing a wireless device's geographic location to be acquired with reasonable accuracy.

For suburban, rural or other relatively similar environments, simpler location determining methods should be used. Multi-path RF signals are less of an issue and the suburban methods above are far too complicated and would require a high cost to implement, due to tuning. The recommended method is a simpler TDOAJTOA method such as in U.S. Pat. No. 6,167,275. These methods often also use receive strength as a function.

Often as the case may be, in practical purposes, one of the location determining methods may still not be enough. In this case a third method based mainly on receive strength could be used (as covered in other available patents). What is unique and should be a part of the location determining software portion of this method, is the decision making process on choosing which method to use is determined.

As a wireless network is deployed, sectors/antennas are classified as rural, suburban, etc., the decision-making software should first reference this type' and then choose which type of methods to use (U.S. Pat. No. 6,249,252 or like U.S. Pat. No. 6,167,275).

A final check should be to use signal strength (RSSI) to verify/discount an erroneous locations. If the location determined does not correspond to a reasonable value (latitude and longitude plus some degree of error) relative to receive strength, the other primary location determining method should be used to calculate to location.

The selective use of these two location-determining methods, with a validity check using RSSI of receiving antennas, should ensure a reasonable location.

**Note: If both primary location-determining methods fail to give a reasonable location, a very inaccurate estimate on RSSI could be used.

The selection of the location determining methodologies used to determine geographic location, and priorities on each, should be selected based on the geographic conditions (terrain, tree density, building density, and other) of the wireless communications network. Therefore, the preceding recommendations could be altered and still remain in the spirit of this invention.

ULD User Entries

All entries in the ULD 900 must have a coding standard. The ULDM 904 uses this to create entries in the ULD 900. It is recommended that the following standard coding technique be used for entries, as it is very efficient.

| Bits (ordered left to right) | Data Type |
|---|---|
| 0-39 | User# |
| 40-103 | Location |
| 104-151 | Date + Time |
| 152 | Log |
| 153 | Private |
| 154-167 | Spare |

User ID# Format -----XXX-XXX-XX)(X (10 digit) phone number of user
4 bits per digit = 40 bits
Bits 0-39 Example: 813-513-8776
Binary----10000001001 1010100010011100001101110110

Location:

| | |
|---|---|
| Bit 40 | 1 = North, 0 = South |
| Bits 41-48 | degrees (0-179) |
| Bits 49-54 | minutes (0-59) |
| Bits 55-60 | seconds (0-59) |
| Bits 61-64 | hexiseconds (0-59) |
| Bits 65 | 1 = West, 0-East |
| Bits 66-73 | degrees (0-179) |

-continued

| | |
|---|---|
| Bits 74-79 | minutes (0-59) |
| Bits 80-85 | seconds (0-59) |
| Bits 86-89 | hexiseconds (0-15) |
| Bits 90-103 | spare (possibly used to denote accuracy) |
| Example: | 39 degrees 13 minutes 12 seconds 8 hexiseconds North |
| | 8 degrees 25 minutes 18 seconds 5 hexiseconds West |
| Binary: | |
| 100100111001101 | |
| 001100100010000100001100101001001010000000000000 | |
| HEX: 939A644219494000 | |
| Time & Date: | |
| Bits 104-108 | hour (0-24) |
| Bits 109-114 | minute (0-59) |
| Bits 115-120 | second (0-59) |
| Bits 121-124 | hexiseconds (0-15) |
| Bits 125-128 | month (0-12) |
| Bits 129-133 | day (0-31) |
| Bits 134-145 | year (0-4095) |
| Bits 146-151 | extra |
| Example: | 2248:05 12 hexiseconds Jul. 18, 2001 |
| Binary: 101101100000001011100011110010011111101000100 | |
| HEX: B602E3C9F44 | |
| Log Status: Bit 152 | 1 = logging |
| | 0 = not logging |
| Full Private: Bit 153 | 1 = Full private mode |
| | 0 = not full private |
| Anonymous | Bit 154    1 = Anonymous Private |
| Private | 0 = Not Anonymous Private |
| Spare | Bits 154-153 extra for future development/expansion. This area may be designated for future registers for other programs which need to add data tot the users database configuration. |
| Final data entry formatted value-using values in examples: | |
| HEX: 81351 38776939A64421 9494000B602E3C9F44000 | |

Accessing the ULD

Repeating this process for every user creates the database on the ULD 900. This database is now accessible via software three ways:

The ULDM 904
   ULDM 904 is controlled by the BSS Manager 126
   The BSS Manager 126 can then have access to the ULD 900 through the ULDM 904.
E-Mobility services 144 (having read only access to the ULD 900)
   The ULDC 908 connection that allows remote queries (Connects via switch (MTX or other) 130)

The first and most direct way to access the ULD 900 is from the BSS manager 126. This device is allowed read, write, and append access to the ULD 900 via the DLC 902. It can perform maintenance (editing entries) and other system level events. Querying the ULD 900 can be developed on the software level by SQL or other database query techniques. This patent does not cover nor intend to limit the creative ability of a programmer in developing ways in which to design the software interfaces. These creative approaches would be within the spirit of the patent, as all software written for this invention would have to be written into existing hardware that has proprietary design. However, is should be noted that this does limit the scope of this patent in any way. It is easily achievable though common approach to a software engineer skilled in the area of database management, to write software that could make direct queries of entries by multiple criteria specified by a user at the BSS manager 126.

The second method of accessing the ULD 900 is by e-mobility 144 software applications that have read only privileges. These software applications, by means of software SQL statements or other similar database query techniques, access user entries in the ULD 900: Software applications such as these can include features like direction finding software (accessible from the "wireless web") where knowing the wireless devices 104 location is necessary. This type of e-mobility 144 software application is made possible by this unique invention—greatly simplifying the amount of time needed in development of the code because it can use the information in the ULD 900.

The third method is by a connection to a remote ULDC 908. A ULDC 908 is an important element that should be (but is not required) available in conjunction with any ULD 900 or plurality of ULD's 1512. Its primary function is to allow a plurality of connected devices, which can include ULD's 1512 and additional ULDC's 1502, to be remotely queried (using SQL or any other similar method) by any entity, person or other system connected to the ULDC's 1502 access ports. Uses of this could be for emergency services (911, EMS, etc), government requested "taps" and other purposes where locating a wireless device 104 would be useful.

ULDC Architecture

FIG. 17 shows a generic representation of the ULDC network (ULDN) 1600. Design can very, but the general hierarchy is always the same, with ULDC's 1502 having only one parent (a ULDC 908) and having multiple children (either ULDC's 1502 or ULD's 1512) The connections 910-A, 910-B, 910-C, and 910-D are dedicated data lines (Ti or other).

The internal diagram of a ULDC 908 is shown in FIG. 15. Its components are:
   Direct e-mobility services 144
   Standardization control hardware/software 906
   Database logic center 902
   Uplink connection 1506
   Multiple downlink connections 1534
      ULD access control unit 1536
      ULDC access control unit 845
   Remote access control unit 1516
   Data logging unit 1522
   Uplink/downlink optional expansion port 1538
   Maintenance unit 1526
   ULDC control hardware/software 1524
   Master ULDM and location process 1528
   Mirror database 1532
   Market or group ULD 1530

The uplink connection 1506 should only be established with a single ULDC 908 higher in the hierarchy of the ULDCN 1600. This connection 1500-B is a 2-way ATM connection carried on a Ti or other similar dedicated line, which allows queries from another ULDC 1508 higher on the network hierarchy. The downlink consists of ULD's 1512 and ULDC's 1502 with can be queried (by SQL or other database query means) directly by the ULDC 908. There are two access control mechanisms, the ULD access control unit 1510 and the ULDC access control unit 1536, which control access protocols for each type of query. These two devices negotiate and talk to ULD's 151 2 and ULDC's 1502 sending and receiving data between them (queries and responses). The connections should be dedicated lines (Ti or other similar) 1500-A or 1500-C.

The remote access control unit 1516 is responsible for negotiating remote hosts 1540, either by dial-up or a dedicated means of connection, to the ULDC 908 for purposes of database query submission to obtain geographic location information on wireless devices 104. These connected devices connect through the remote access control unit 1516 and submit queries to it that then are sent to all connected devices for the search, finally returning the results to the logged on host.

To facilitate the querying process, any connected device should be assigned an ID#. These numbers are so when a query is sent, its original "owner" can be passed with it so the results are passed back to the right entity.

The data logging 1522 unit logs queries and the ID# of the user who made the query, to an internal storage device (internal hard drive or other large data storage device). Lastly, the uplink/downlink optional port 1538 is for future expansions such as redundant connections to other ULDC's 1502 to allow querying laterally in the hierarchy of the ULDC network 1700, as in FIG. 17. Any alterations for specific needs or for compatibility issues to the ULDC's 1502 architecture are conceded to be within the scope of this invention.

To expedite searches and to give a general flow, the following search method is recommended for the ULDC 908 architecture. Alterations for specific integration needs are within the spirit of the invention.

Searching the ULDC

Each ULDC 908 should contain data about itself in an internal register that is set when devices are attached to it. Such information includes the area code of all the "home" user entries on its system. "Home" users are users that and listed in the HLR's (home location registrars) of the connected devices. This indicates that users with these area codes have a high probability of being found in certain databases. So, generally the area codes listed could include the area codes of users in the HLR of the switch (MIX's or others) 130 (connected to their respective ULD's 1512) that are connected to the ULDC 908.

Each ULDC 908 contains a list (stored in data register) of all the area codes off all searchable devices attached. These devices could be ULD's 1512 or even other ULDC's 1502, where the list of the ULDC 908 (the ULD's 1512 attached to it) would be added to the other higher ULDC'sl 502 connected to their uplink ports. In this way any ULDC 908 would have all area codes of the database's HLR's below it in the hierarchy.

Access ID#'s are assigned to any entity or connection to the ULDC 908 that can submit a query. For example, the uplink connection could be by default #1, the plurality of remote terminals could be #2 or higher. This ID is referenced to all queries so results can be associated with the original owner.

When a search begins, the ULDC 908 query first searches the "chain" of connected devices FIG. 15 looking first at the ULD's 1512 that contains the area code of the queried entry. If no attached ULD 900 contains the area code, then the ULDC 908 then looks at the ULIJC's 1502 with the area code. Doing so causes a great decrease in search time. This continues on until the ULD 900 with the user entry is found.

The general flow of a query is in FIG. 14. It begins by the ULDC 908 being in IDLE mode (not being queried) waiting for a query. A logged on device sends a query in the form of a phone number and includes it ID#. The query and ID# are logged to the internal logging database. The ULDC 908 searches all connected devices, then when the result is found, it is returned to the ID# included with the query. The logged on device, or host, then acknowledges the data. At this point the ULDC 908 goes back to idle mode.

A pseudo-code for a search algorithm may look similar to this. Done in SQL or any similar database query language, this would access the ULDC 908 and search for entries.

Input Query From Host
//check attached devices for area code
//descriptor
m=(number of attached devices)
Let n=0
Start n-n+1
If attached device n (list of area codes) includes query area code
Then go to Find {directly query ULD 900)
Else if n=m go to end
Else if n<m go to start
Find (repeat process for all layers of devices)
*When this search gets to a ULD 900 it should directly query it. If no entry is found it should continue then by search all devices under the ULDC 908 (queried) in the hierarchy.

Conclusions, Ramifications and Scope

Possible issues that could arise involve privacy and the concern for misuse/abuse. These issues have been considered while developing this technology, and measures to eliminate these worries are implemented in the device.

Marking user entries as private can reduce privacy worries. Customer service or any other entities connected to the ULD 900 control software would make the change.

When the system is told to track a user (when the user communicates with the network on his/her wireless device the ULDM 904 automatically starts) a check by the ULDM 904 is immediately done to see if a "full privacy" flag 1170 has been set. If it is, tracking location of the wireless devices 104 by the ULDM 904 and any modification of the entry in the database does not occur. Using this technology, the system cannot inadvertently track users, and privacy is assured. If an "anonymous privacy" flag is set, location information for a user account can only be retrieved—but no user information will be sent. This can be used by external applications that only require the location of a plurality of devices, without regard to user information. Such an application like the Directional Assistance Network uses this to anonymously find devices on roadways.

Additional concerns lie in who can access this information. Because all information is stored at the switch (MTX or other) 130 of the network, direct access (and append/write access) to the database can only occur there. This assures that no other wireless device 104 on the network can tamper with this information. Only authorized personnel at the switch (MTX or other) 130 or persons remotely accessing it through the ULDC 908 have access.

Results of this database and control system are that a diverse range of software applications can be developed that could access and utilize the database. Emergency services could find users on wireless devices 104 on the network, increasing general public health in medical emergencies when users have a wireless device 104.

Other "e-mobility" 144 software applications could also access the database giving the users of the wireless device 104 access to services such as direction finding software, location/mapping information and many other portals. The benefit is that this information is controlled and stored by a central entity (the ULD 900 on the network, creating a universal portal that is centrally manageable.

This technology was previously only available to a limited extent by GPS software. GPS requires that a device have its antenna outdoors or in relatively plain view of the sky to work properly. Cost and bulky sizing are also problems with GPS equipment as compared to cellular mobile devices 104.

Additionally, adding GPS to wireless devices 104 would integrate smoothly into this invention. It would simply make it not necessary for location calculations to be done at the ULDM 904. Currently, with an increasing amount of wireless devices 104 connected to wireless (CDMA, TDMA, GSM or other) networks 100, it only seems natural that expanding this technology would benefit the population as a whole.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

Network Tuning System; Summary of the Invention

The present invention is directed generally to a machine and process for calculating and displaying wireless device locations and wireless network service problems with reference to related wireless devices on the said wireless network. The present invention can be referred to as a display system and a wireless network tuning system (WNTS). This invention uses a method(s) for locating wireless devices and referencing their location and performance with wireless network known parameters. The invention allows more readily accessible representation of wireless device locations on a display screen and problems to be presented to wireless network engineers.

More generally, the present invention is directed to a computational machine and process for displaying wireless device locations, and for detecting and referencing wireless network errors with specific geographical location information of the affected wireless devices. The present invention then can allow a detailed display of the wireless network's problems, and correct the network's problems with a fault diagnosis and correction system. In an additional embodiment, the present invention can provide a means to display other user selected objects including, locations of radio towers and BTS's, service effecting factors, criss-cross phonebook database entries, and a geographic/topographic map overlay. Other customized user-selected objects may be displayed as an auxiliary overlay to the display screen.

In an alternative embodiment, this customized display criteria can be created and viewed by users within the wireless network and to users outside of the wireless network and can act as a resource for other hardware and software which have a need to display locations of wireless devices.

In a second alternative embodiment, the present invention provides a means for generating "case files" which can be customized by a user to provide customized queries when a user has a need for information based on, or relating to, the location of a single wireless device or a plurality of wireless devices. This customized criteria is retrieved in the form of a "case file" that can be created and interfaced by users within the wireless network and to users outside of the wireless network.

The abilities of this invention would be to offer a means of displaying the location of a plurality of wireless devices on a display screen, and to allow wireless network engineers to monitor and debug wireless network problems from the switch (MTX or other) with little or no actual field testing. Problems recorded in the field could be resolved without delay. The WNTS functions in a basic sense by monitoring the wireless network for problems that affect service to connected wireless devices. When these problems are detected the WNTS can then monitor and track all wireless devices in the problem area and record data on faults and problems these wireless device incur relevant to their latitude/longitude. The WNTS can then correct the problem automatically, or make suggestions to the wireless network engineers for the possible cause of the problem and corrective actions, which may fix the problem.

The most common method to debug these problems is for engineers to go to the field and take limited "snaps shots" of the wireless network that only record data for brief periods of time on limited wireless devices. The process and machine as claimed within, allows a plurality of wireless devices to be monitored and recorded over a period of time, as well as wireless network parameters as they interact with the wireless devices, and additionally record faults these wireless devices incur at specific geographic locations.

To be able to employ the embodiments of this method, process, and machine, you must have the ability to find and locate wireless devices on the wireless network. Also, an additional technology that would allow rapid access to this data would be a dynamic database or system designed to store and hold information including latitude and longitude of the said wireless devices. The ability to determine the user's geographic location in the form of latitude and longitude data is disclosed in an attached document entitled, "A machine for providing a dynamic database of geographic location information for a plurality of wireless communications devices and process for making same". This document referenced above, is a U.S. Provisional Patent, U.S. Ser. No. 60/327,327, which was filed on Oct. 4, 2001. This provisional patent application references the use of user location databases (ULD), user location database coordinators (ULDC), and other location means. The use of ULD, ULDC, and other location means is disclosed (offered only as an example of location means) in the fore mentioned provisional patent application, but can also include other means of location including a wireless device comprising a global positioning system (GPS).

The fore mentioned provisional patent provides a system that allows a plurality of wireless devices on a plurality of wireless networks to have their geographical location as well as other bit, of data stored to easily accessible databases continually.

A system such as this allows a plurality of wireless devices to be tracked, and have their locations stored on a dynamic database for query from a plurality of sources. In an alternate embodiment, the dynamic database could be created and contained within the current invention, and could track and store in memory or a physical database, the geographic location and data of designated wireless devices.

This current invention provides a machine and process with a primary goal to allow a new and novel way to correlate wireless network problems and the manner in which they affect wireless devices on the wireless network and also to provide a trouble shooting system to suggest corrective actions to correct wireless network problems. Such a WNTS would allow a fast and efficient way to optimize a wireless network, without the need for field-testing by wireless network engineers.

In an alternative embodiment, the current invention also offers a means for displaying the geographic location of an individual wireless device or a plurality of wireless devices on a display screen. The ability to display the location of wireless devices on a display screen is a useful and novel feature which can be utilized by other applications which require the ability to view and monitor the location of wireless devices. This alternative embodiment also allows for overlays of a geographic street map display and a criss-cross phonebook display and other user selected displays.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner. For example, the components contained within the current invention may reside within the same physical hardware, or the components may reside outside the physical hardware.

Detailed Description of the Preferred Embodiment

Figure 28:
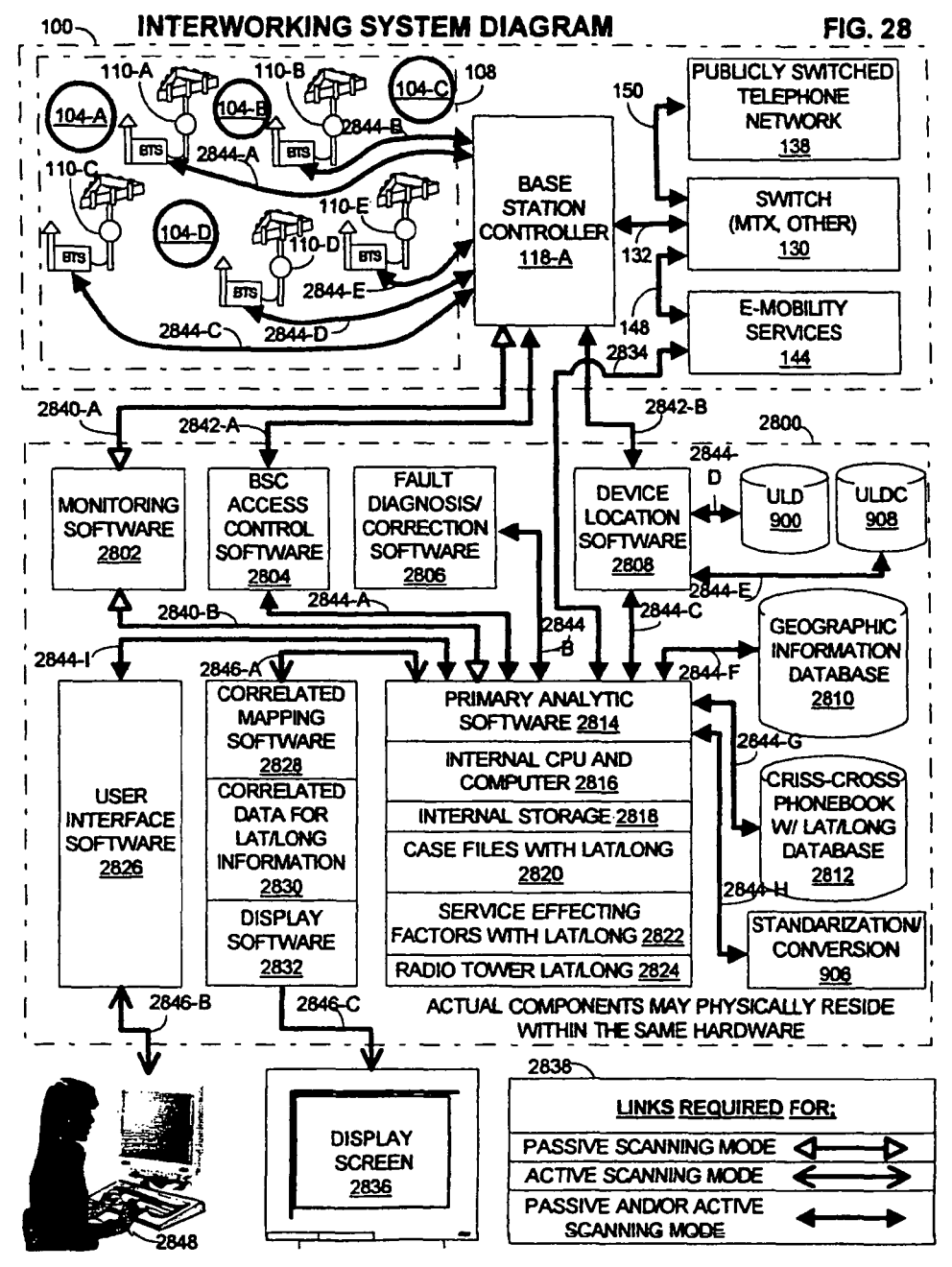

Referring to FIG. 28 the primary architecture of the embodiments 2800 are illustrated. The main divisions between an existing wireless network 100, and the primary embodiment 2800 are illustrated. The components in the primary embodiments are:
Elements of the Machine and Process (2800)
The primary elements of the machine and process include:
Monitoring software 2802
BSC access control software 2804
Fault diagnosis and correction software 2806
Device location software 2808
User location database 900
User location database coordinator 908
Geographic information database 2810
Criss-cross phonebook database with lat/long correlations 2812
Standardization/conversion hardware/software 906
Primary analytic software 2814
Internal central processing unit and computer 2816
Internal memory storage 2818
Case files with lat/long correlations 2820
Service effecting factors with lat/long correlations 2822
Radio tower lat/long correlations 2824
User interface software 2826
Correlating mapping software 2828
Correlating data for lat/long information 2830
Display software 2832

These elements are considered to be the basic requirements for such a system. Additional software and or hardware could easily be added to customize or extend the abilities of this invention (FIG. 28, Box 2800) without escaping the limits of its intentions and the spirit of its novelty.

Monitoring Software 2802:

The monitoring software 2802 is designed to monitor a wireless network 100 for errors or problems that result in service disruption to wireless devices 104-A, 104-B, 104-C, 104-D within the radio tower network 105. These errors could result in degradation or even loss or service to the wireless devices 104-A, 104-B, 104-C, 104-D. The monitoring software 2802 interacts directly with the base station controller (BSC) 118-A and the primary analytic software 2814.

The monitoring software 2802 intercepts and decodes error codes produced by the BSC 118-A and interprets their effects on the wireless device 104-A, 104-B, 104-C, 104-D. If the error is service affecting then the fault is send to the primary analytic software 2814. The fault monitoring software 2802 acts as an accessory to the primary analytic software 2814, which is where any interpretations of faults are made.

Base Station Controller (BSC) Access Control Software 2804:

The base station controller (BSC) access control software 2804 is responsible for interfacing the components and processes of the current invention 2800 with the BSC 2804 of a wireless network 100. The BSC 2804 contains all the call information as well as all the information on wireless network faults. It should be noted that some wireless network designs have the network fault information stored elsewhere, and that the BSC access control software 2804 could be used to access that information at any other location also. The BSC access control software 2804 interacts directly with the BSC 118-A and the primary analytic software 2814.

The BSC access control software 2804 has the primary function of serving as an intermediary software package that can interlace the current invention 2800 and the BSC 118-A and switch (MTX or other) 130.

Fault Diagnosis/Correction Software 2806:

The fault diagnosis and correction software 2606 is activated when a service-affecting fault is sent from the monitoring software 2802 to the primary analytical software 2814. When the primary analytical software 2814 receives the fault, the primary analytical software 2814 generates a case file 2820. The fault diagnosis and correction software 2806 examines the factors of the case file 2820, the service effecting factors with lat/long 2822, the radio tower and BTS with lat/long 2824, and the geographic information database with lat/long 2910.

The fault diagnosis and correction software 2806 comprises a programmable diagnosis and correction system, which can be serviced and updated through a user input device (BSS manager or other) 126. When a case file 2820 is generated by the primary analytic software 2814, the possible causes of the fault are determined by matching the data contained in the case file 2820 against a list of possible fault causing factors. Once a number of possible causes for the fault have been isolated, the fault diagnosis and correction software 2806 can then perform diagnostic testing within the wireless network 100 to eliminate false positives, and provide a list of possible causes and corrective actions which may by preformed by the wireless network engineers.

The fault diagnosis and correction software 2806 can operate in three modes:
Passive diagnosis mode
Active diagnosis mode
Automatic correction mode The passive diagnosis mode examines contents of the case file 2820, along with the service effecting factors with lat/long 2822, the radio tower and BTS with lat/long 2824, and the geographic information database with lat/long 2810. Once the circumstances of the fault has been matched against the list of possible fault causing factors, and a list of likely causes and corrective actions are determined and tested, the list possible causes and suggested corrective actions is added to the case file 2820. When wireless network engineers examine the case file 2820, they can view the list possible causes and suggested corrective actions generated by the fault diagnosis and correction software 2806.

The active diagnosis mode allows network engineers to use the automated diagnostic features of the fault diagnosis and correction software 2806 to automate the diagnosis and correction process. The active diagnosis mode is a completely user definable mode. It allows the user to define certain radio towers with BTS's 110-A, 110-B, 110-C, 110-D, 110-E, wireless devices 104-A, 104-B, 104-C, 104-D, or other criteria to be monitored for faults. This mode requires actual input from the wireless network engineers and cannot start automatically.

Benefits of this mode would be to monitor problems or areas that would not be triggered in the passive mode, or to monitor problems that are anticipated in advance.

The automatic correction mode can be programmed by the wireless network engineers to operate both in the passive diagnosis mode and the active diagnosis mode. When the automatic correction mode is activated, the fault diagnosis/correction software 2806 is allowed to make adjustments to the wireless network 100 if the result of the fault diagnosis testing prove conclusively (or to a very high probability) that the cause of the fault has been determined and that a determined corrective action will fix the problem. When a corrective action is made in the automatic correction mode, the cause of the fault and corrective action taken are recorded in the case file 2820.

Device Location Software 2808:

The device location software 2808 is the package that when activated by the primary analytic software 2814 is able to retrieve information from a database such as a ULD 900, or a ULDC 908, that holds geographic information (as well as time, date of the acquired geographic information). Additionally, as an alternative embodiment this device location software 2808 can directly query the BSC 118-A and calculate the location of a wireless device 104-A, 104-B, 104-C, 104-D, as instructed by the primary analytic software 2814. The device location software 2808 interacts directly with the BSC 118-A, the primary analytic software 2814, the ULD 900 and/or ULDC 908.

The device location software 2808 should be able to be passed queries to return the location of:

A specific wireless device

All wireless devices on specific BTS's

All wireless devices on a plurality of BTS's

The device location software 2808 would directly query a dynamic database as discussed above (ULD 900, ULDC 908) to retrieve individual locations for wireless devices 104-A, 104-B, 104-C or 104-D. Alternatively, if no ULD 900 or ULDC 908 were available, the device location software 2808 would directly access and decode the BSC 118-A in order to determine the individual location of the wireless device 104-A, 104-B, 104-C, 104-D. The device location software can also retrieve the location of wireless devices 104-A, 104-B, 104-C, 104-0, equipped with a GPS system, or other means of determining geographic location such as triangulation, round trip delay, or other means.

If a plurality of individual wireless devices 104-A, 104-B, 104-C, and 104-D were queried, they would all be sequentially resolved by queries to the ULD 900, the ULDC 908, device location software 2808, by direct access and decoding of the BSC 118-A, or by querying the wireless device 104-A, 104-B, 104-C, 104-D.

If a specific radio tower and BTS 110-A, 110-B, 110-C, 110-D, 110-E (and thus all wireless devices connected 104-A, 104-B, 104-C, 104-D) is requested. Then the device location software 2808 would first query, by means of the BSC access control software 2804, the BSC 206 and retrieve information on which wireless devices 104-A, 104-B, 104-C, 104-D where connected to a given radio tower and BTS 110-A, 110-B, 110-C, 110-D, 110-E. The results of this action would be to retrieve the ID#'s for all the wireless devices 104-A, 104-B, 104-C, 104-D connected to any radio tower and BTS 110-A, 110-B, 110-C, 110-D, 110-E.

If plurality of radio tower and BTS's 110-A, 110-B, 110-C, 110-D, 110-E (and thus all wireless devices 104-A, 104-B, 104-C, 104-D connected to) are requested, then the device location software 2808 would first query, by means of the BSC access control software 2804, the BSC 118-A and retrieve information on what wireless devices 104-A, 104-B, 104-C, 104-D where connected to all given radio towers and BTS's 110-A, 110-B, 110-C, 110-D, 110-E. The results of this action would be to retrieve the ID#'s for all the wireless devices 104-A, 104-B, 104-C, 104-0, connected to all requested radio towers and BTS's 110-A, 110-B, 110-C, 110-D, 110-E.

User Location Database 900:

A user location database (ULD) 900, is covered under U.S. Provisional Patent, U.S. Ser. No. 60/327,327, which was filed on Oct. 4, 2001, is an important element of this invention, but is not required. A ULD 900 is a database comprising a means for obtaining and storing the geographical data, user information, date/time information and/or user controlled settings information for the plurality of wireless devices 104-A, 104-B, 104-C, 104-D. This information can be retrieved through e-mobility services 144 as well as though direct queries of either the BSS manager 126 or ULDC 908.

As related to the current invention 2800, the ULD 900 is accessed through an e-mobility connection 2834 and can then supply location information about wireless devices 104-A, 104-B, 104-C, 104-D connected to the wireless network 100. The ULD 900 may physically reside within the current invention 2800 or as an alternative embodiment, may be physically located outside the current invention 2800, and accessed, for example through e-mobility services 144. Availability of the entries in the database of wireless devices 104-A, 104-B, 104C, 104-D depends on the implementation of the ULD 900 into the switch (MTX or other) 130 architecture, as not to be covered by this Patent. Noted, should be the ability of an e-mobility service 144 to be able to calculate location information by direct query of the BSC 118-A or using other hardware, and following similar methods in acquiring this data as done by the ULD 900.

User Location Database Coordinator 908:

A user location database coordinator (ULDC) 908, is covered under U.S. Provisional Patent, U.S. Ser. No. 60/327, 327, which was filed on Oct. 4, 2001, is an important element that should be (but is not required) available in conjunction with any ULD 900 or plurality of ULD's 1512. Its primary function is to allow a plurality of connected devices, which can include ULD's 1512 and additional ULDCs 1502, to be remotely queried (using SQL or any other similar method) by any entity, person or other system connected to the ULDC's 1502 access ports. Uses of this could be for emergency services (911, EMS, etc), government requested "taps" and other purposes where locating a wireless device 104-A, 104-B, 104-C, 104-D would be useful.

The current embodiment 2800 can use a ULDC 908 to access information on other switches (MTX or other) 130 or physical devices such to obtain location information not contained in its own database. This is especially important when there may be more than a single switch (MTX or other) 130 in a given geographic area. The usefulness is that a ULDC 908 will integrate a plurality of switch (MTX or other) 130 networks together and for a super network, in which a larger diagnostic area can be established.

Geographic Information Database 2810:

A geographic information database 2810 is a software database. The geographic information database 2810 can reside physically separate as in part of any other storage media connected to the primary analytic software 2814. It contains in part or in whole database information on:

- Roadway locations (correlated to latitude/longitude)
- Landmark locations (correlated to latitude/longitude)
- Residential locations
- Commercial building locations
- Railway locations
- Other user defined objects
- Topological survey information
- Altitude referenced to latitude/longitude
- Ground slope
- Other topological data (user customizable)
- Location information of wireless network equipment
- BTS
- BTS repeaters
- Other equipment
- Ground clutter
- User defined class of objects The geographic information database 2810 is used to implement a layer of geographic information onto a display screen 2836, which is seen by a user of the current invention 2800. When the data from the geographic information database 2810 is combined with factors accumulated by the primary analytic software 2814, the primary display software 2832 can produce useful and convenient data analysis to a user.

Criss-Cross Phonebook with Lat/Long Database 2812:

The criss-cross phonebook with latitude and longitude database 2812 enables internal or external applications to request phonebook listings on a cross-referenced basis. The criss-cross phonebook database 2812 comprises the longitude and latitude of listings sorted by names, addresses and phone numbers of residences, businesses, wireless devices, and government agencies, as well as category of goods/services sold (for business listings) and the price and availability of said goods and services. The criss-cross phonebook database 2812 can be queried and cross referenced by name, telephone, street address, category of goods and/or services, availability of product and price of goods/services, latitude and longitude, These requested listings may be overlaid onto the display screen 2836 along with other requested display layers.

This criss-cross phonebook database 2812 is a novel and useful embodiment to the current invention 2800, because it would allow a display screen 2836 to display, for example, the location of local area hospitals overlaid on the display screen 2836 with the location of a wireless device 104-A, 104-B, 104-C, 104-D, and a street map from the geographic information database 2810. This embodiment would enable a user of a wireless device 104-A, 104-B, 104-C, 104-D to easily determine their geographic position and the geographic location and direction to the closest hospital. Another example would be that it would enable a police department to monitor the locations of the wireless devices 104-A, 104-B, 104-C, 104-D used by police officers. When the police department receives a call for police response, the police department would be able to determine which police officer is best able to respond. May other examples exist regarding the usefulness of this embodiment for government, business and private users.

Standardization/Conversion Hardware/Software 906;

The standardization/conversion hardware/software 906 provides a means to standardize and convert protocols thereby providing standardized and converted protocols. These standardized and converted protocols provide a means for the elements of the present invention 2800 to interface with elements outside of the present invention 2800. See FIG. 30 for flowchart of this embodiment.

Primary Analytic Software 2814:

The primary analytic software 2814 is the actual processing center of the current invention 2800. The primary analytic software 2814 is where correlations between wireless network problems and the related wireless devices 104-A, 104-B, 104-C, 104-D occur. The primary analytic software 2814 controls all claimed embodiments as listed in FIG. 28, Box 2800. The primary analytic software 2814 connects to the monitoring software 2802, BSC access control software 2804, fault diagnosis/correction hardware/software 2806, device location software 2808, geographic information database 2810, criss-cross phonebook database 2812, standardization/conversion hardware/software 906, the user interface software 2826 and display software 2832.

The primary analytic software 2814 can run in three ways
- Passive scanning mode
- Active scanning mode
- Inactive In the passive scanning mode of the primary analytic software 2814 is able to monitor and decode all the wireless network errors received from the monitoring software 2802. All the errors have been pre-filtered by the monitoring software 2802 and include only service affecting errors.

A configurable element of the primary analytic software 2814 is the level or specific errors that would be considered for the passive mode. These level or specific errors are user defined by configuring them in the primary analytic software's 2814 configuration file. This method would allow specific errors to be monitored passively without supervision by a network engineer.

When a valid error occurs, the primary analytic software 2814 begins logging the error to a case file 2820. Then the primary analytic software 2814 analyzes the case file 2820 and retrieves the wireless device's 104-A, 104-B, 104-C, 104-D ID# and additionally retrieves the radio tower and BTS's 110-A, 110-B, 110-C, 110-D, 110-E involved in the error (or alternatively all the radio towers and BTS's 110-A, 110-B, 110-C, 110-D, 110-E talking to the wireless devices 104-A, 104-B, 104-C, 104-D. Using this information, the primary analytic software 2814 knows what area of the radio tower network 108 to monitor.

Figure 37:
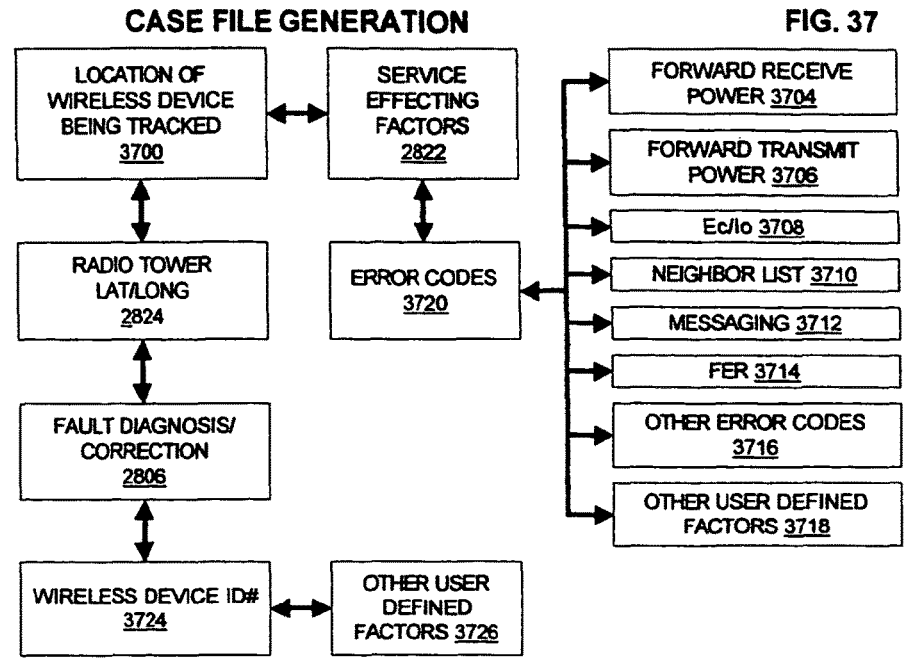
FIG. 37 CASE FILE GENERATION

Now, the device location acquisition software 2802 will be queried by the primary analytic software 2814 to retrieve the identity of the radio tower and BTS 110-A, 110-B, 110-C, 110-D, 110-E ID#'s that were involved with the error codes in the open case file 2818. The result of the query will contain the latitude and longitude as well as the time of the error. The primary analytic software 2814 then continually queries the device location software 2808 with the given radio tower and BTS's 110-A, 110-B, 110-C, 110-D, 110-E thus monitoring all activity on them. The data recorded to the case file 2820 is:

- Latitude and longitude of wireless devices 104-A, 104-B, 104-C, 104-D on the radio tower and BTS's 110-A, 110-B, 110-C, 110-D, 110-E
- Errors codes on the radio tower and BTS's 110-A, 110-B, 110-C, 110-D, 110-E coded to the wireless devices 104-A, 104-B, 104-C, 104-D involved
- Service effecting factors for each wireless device 104-A, 104-B, 104-C, 104-D tracked on the radio tower and BTS's 110-A, 110-B, 110-C, 110-D, 110-E
    - Forward receive power (FIG. 37, BOX 3704)

Forward transmit power (FIG. 37, BOX 3706)
Ec/Io (FIG. 37, BOX 3708)
Neighbor lists (FIG. 37, BOX 3710)
Other user definable factors (FIG. 37, BOX 3712)
Fault diagnosis and correction software's diagnosis and corrective action recommended and/or taken.
Radio tower and BTS latilong 2824

The primary analytic software 2814 continues to update the case file 2820 for a user definable time period. When the time is up the case file 2820 is closed and saved to a hard disk. A message is sent to the user input device 126 (BSS manager or other) 126 alerting that a case file 2820 has been created and giving the initial error that caused the case file 2820 to be started.

The active scanning mode of the primary analytic software 2814 is a completely user definable mode. It allows the user to define certain radio towers and BTS's 110-A, 110-B, 110-C, 110-0, 110-E, wireless devices 104-A, 104-B, 104-C, 104-D, or other criteria to be monitored. This mode requires actual input from the network engineers and cannot start automatically.

Benefits of this mode would be to monitor problems or areas that would not be triggered in the passive mode, or to monitor problems that are anticipated in advance.

Internal CPU and Computer 2816:

The internal CPU and computer 2816 are a user preference based on system demand. They could be part of or even exist as hardware currently in the wireless network 100. Alternately, new hardware could be supplied that can power and run the current invention's 2800 software. The memory bandwidth and CPU power would have to be server level. RAM should be of the ECC type, and a parallel process architecture would surely result in higher performance.

Internal Storage 2818:

Internal storage 2818 of the current invention's 2800 data can be contained in any hardware realizable data storage unit. This internal storage 2818 unit must have the ability to change its size dynamically or have sufficient size such that expansion or reduction in database size will not exceed the physical storage maximum.

For redundancy a suggested method is to employ a RAID storage system where multiple physical storage units contain the same data. They operate simultaneously to protect the data. If one unit fails then another is still running and can provide the data.

Speed is also an important factor. Additional RAID designs employ striping techniques to increase access time of stored data on the physical storage device. The physical storage devices can be hard-drives, magnetic storage media, or other storage methods commonly available.

The RAID design would be particularly valuable with regards to the ULD 900 and ULDC 908. The RAID design offers a "mirror" database, thereby limiting the demands created by continues quires to the wireless network 100.

Case Files 2820:

Still referring to FIG. 28, this diagram also illustrates the translation of a case file 2820. The interaction from the user is initiated in the user interface software 2826. The primary analytic software 2814 then sends a queue to the primary display software 2832 for the requested case file 2820.

Figure 41:
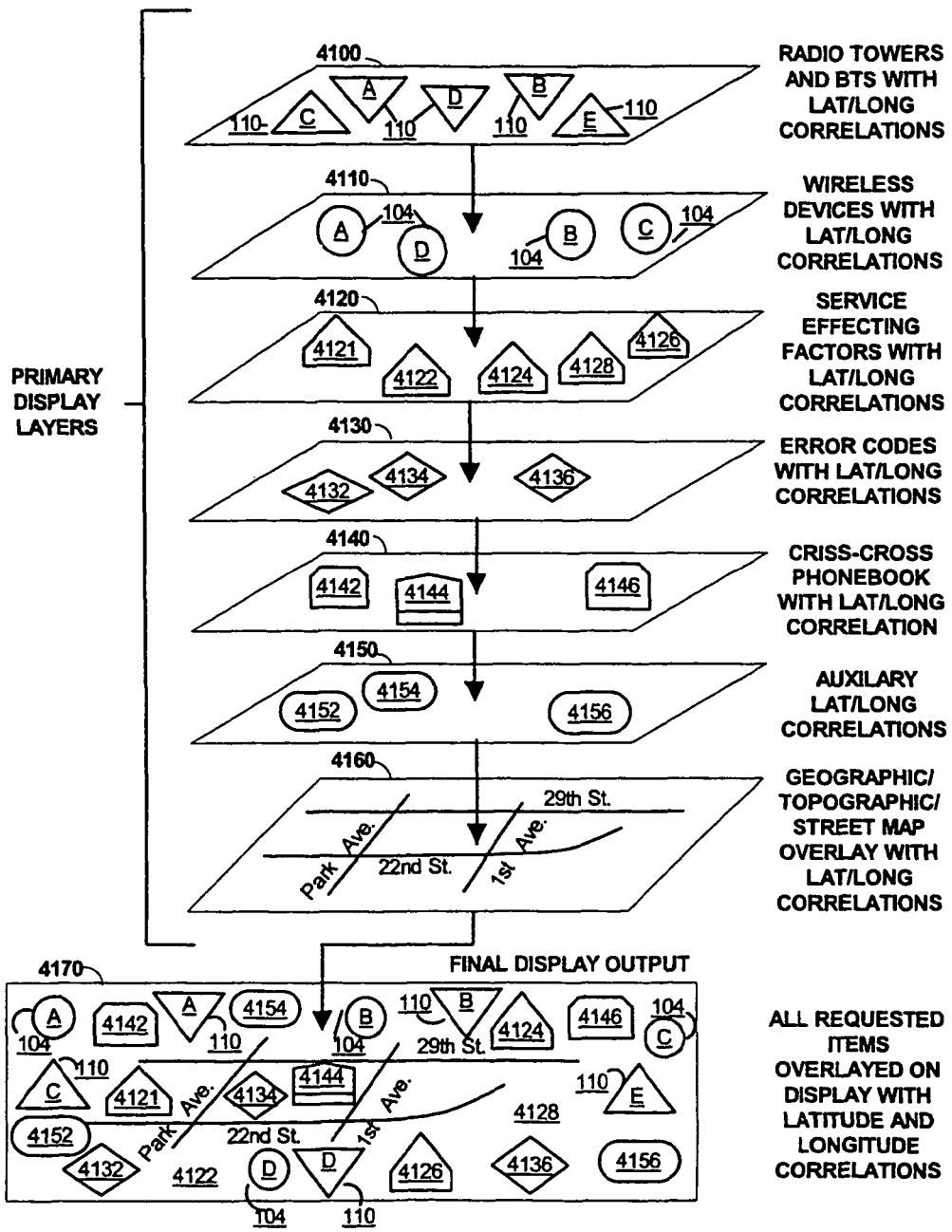

Operating in parallel, the case file 2820 is accessed and data is interpreted by the display software 2832. The lat/long information is calculated and correlated with the recorded data. The correlating mapping software 2828 then brings this information together as shown in FIG. 41 and displays it to the display screen 2836 for the user 2848.

Service Effecting Factors with Lat/Long 2822:
Factors that can be elected to be contained as part of a case file or simply to be track can contain in part or in whole:
RF signal parameters
Forward receive power
Forward transmit power
Packet/frame loss (frame error rate)
Signal/noise level
Fading
Other user defined objects
Call success factors
Dropped calls
Blocked calls
Access failures
Handoff sequences
Hard hand-offs
Soft-hand-offs
Inter-system hand-offs
Call initiate
Call end
Other user defined objects
Messaging
BTS forward messaging
Mobile acknowledgements
BTS reverse messaging
Error codes
Call process messaging
Hand-off messaging
Call initialization messaging
Call ending messaging
Other user defined objects
Mobile connection type
Active—voice
Active—data
IDLE (paging)
Other user defined objects Radio Tower and BTS Information 2824:

Radio tower and BTS 110-A, 110-B, 110-C, 110-D, 110-E location information should be located in the switch (MTX) 130 as part of current 2G/3G wireless network 100/200 information. The following information is copied into the geographic information database 2810 from the radio tower and BTS information 2824:
Latitude
Longitude
Antenna height
Azimuth
Down-tilt
Beam-width
Other user defined objects User Interface Software 2826:

The user interface software 2826 is a simple software package that simply defines the look and feel for interfacing with the said machine and process 2800. It allows setting to be adjusted, configuration files to be created, and a plurality of other factors to be interfaced with. It also allows a graphical user interface (GUI) to be presented to the user 2848. It connects to the user input devices (BSS manager or other) 126 and the primary analytic software 2814. As the step is purely and interface problem and is common knowledge to a software programmer, any method employed here is easily within the scope of this invention, Correlated Mapping Software 2828:

The correlated mapping software 2828 is a realizable software package that the current invention 2800 uses to integrate information from the user location database 900, the user location database coordinator 908, the geographic information database 2810, the criss-cross phonebook database 2812, the device location software 2808, the case files 2820, the service effecting factors 2822, the radio tower and BTS's 110-A, 110-B, 110-C, 110-D, 110-E and other sources as directed by the display software 2832.

Figure 39:
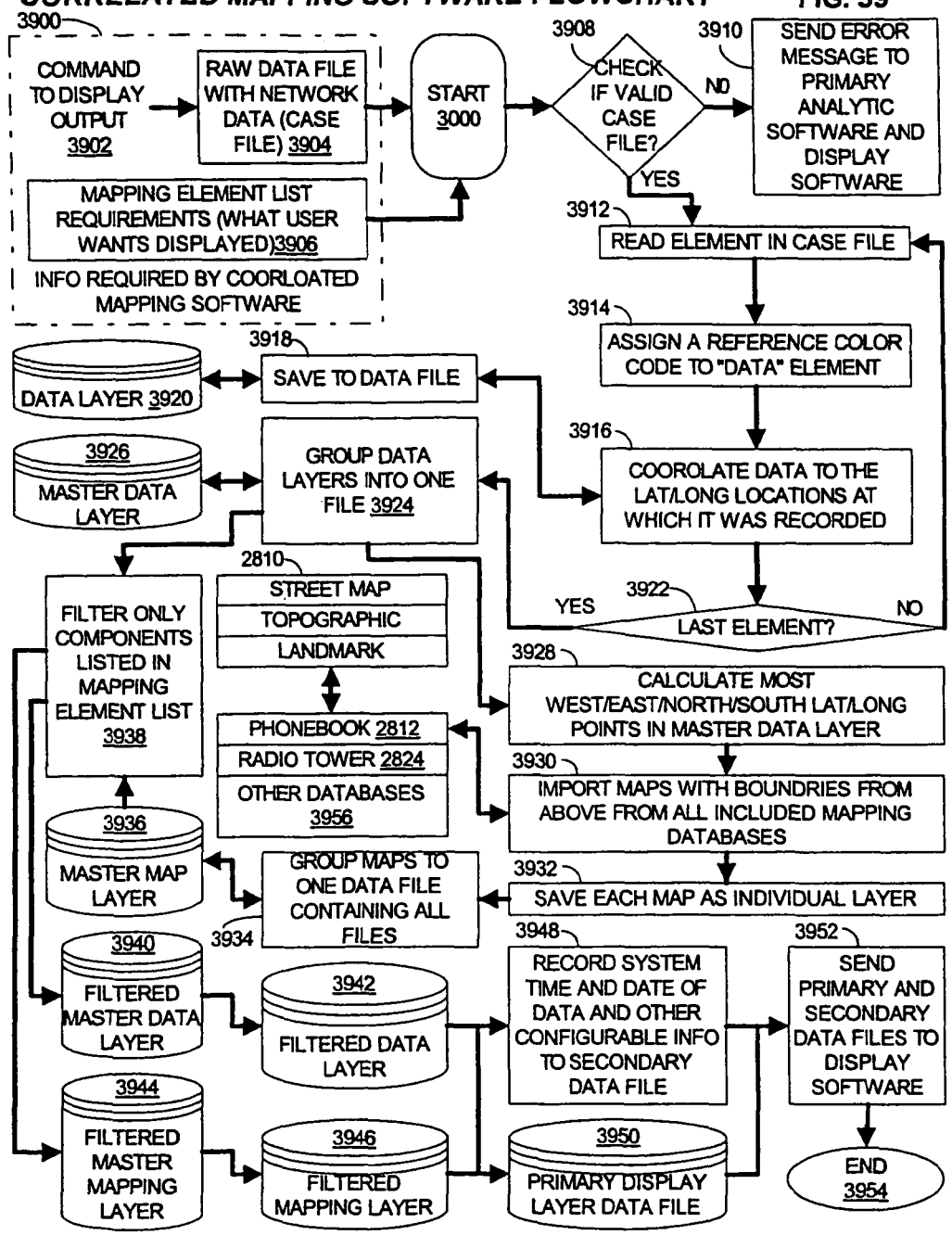

This correlated mapping software 2828 takes all these factors and visually overlays them as to produce an output containing a complete output to the user. The correlated mapping software 2828 extrapolates locations of the case files 2820 contents over time. The physical display can be programmed by the end user for a plurality of display options. These options can include:

- Service affecting factors 2822 related to individual radio tower and BTS's 110-A, 110-B, 110-C, 110-D, 110-E
- Case files 2820 data at specific times
- Receive strength over entire case file 2820 plotted geographically
- Individual call messaging and indicated with symbols (ex: square for a drop call placed geographically where the drop occurred.)
- User location database 900 data
- User location database coordinator 908 data
- Geographic information database 2810 data
- Criss-cross phonebook database 2812 data
- Device location software 2808 data
- Other user defined objects 2848
- See FIG. 39 for flowchart of this embodiment.

Correlated Data for Lat/Long Information 2830:

This information is simply the final form of the data before it is processed into the final display output for a user 2848. It has processed by the correlated mapping software 2828 already.

Display Software 2832:

The display software 2832 is where the visual output for a case file FIG. 41 is generated. When the user input device (BSS manager or other) 126 requests a case file 2820, the display software 2832 is activated to decode and display a meaningful representation to a person at the console. It connects to the display screen 2836 and the primary analytic software 2814.

First the display software 2832 generates an error code list that that displays all the case files 2820 and which radio towers and BTS's 110-A, 110-B, 110-C, 110-D, 110-E, were involved. The display software 2832 then decodes the errors and correlates them to the specific wireless devices 104-A, 104-B, 104-C, 104-D involved and plots the errors on a map. This map would have to location of wireless devices 104-A, 104-B, 104-C, 104-D when the error occurred. It also superimposes the network factors it recorded for the wireless device 104-A, 104-B, 104-C, 104-D for a user defined time, before and after the error occurred.

Alternately, the latitude and longitude coordinates could be translated. Current common knowledge software packages (example: Street Atlas software) allow latitude and longitude coordinates to be translated into addressing information relative to roads and specific postal addressing. Latitude and longitude coordinates obtained by GPS systems on the wireless device 104-A, 104-B, 104-C, 104-D or a location retrieved though a ULD 900 or ULDC 908 or similar device would be converted to standard addressing.

Using this method, the engineer can see every wireless device 104-A, 104-B, 104-C, 104-D that had problems and generated errors, and look at what happened before the problem, and what the result of the error had on the wireless device 104-A, 104-B, 104-C, 104-D. The huge benefit is that the actual location that the error occurred can be seen without having to do field-testing. For example, a case file 2820 could show a dropped call for a wireless device 104-A, 104-B, 104-C, 104-D, and show that the ec/lo increased dramatically before the drop. It would also show exactly where it occurred and include the all the network factors at the time of the error.

This is a very beneficial visual display because the engineer can see a plurality of wireless devices 104-A, 104-B, 104-C, 104-D that had the same problem and quickly find a solution to the problem.

Interactions between components in FIG. 28 are indicated as communications links which are used as passive links 2840-A, 2840-B in the primary analytic software's 2814 passive scanning mode, active links 2846-A, 2846-B, 2846-C in the active scanning mode, and passive link and/or active links 2834, 2844-A, 2844-B, 2844-C, 2844-D, 2844-E, 2844-F, 2844-G, 2844-H, 28444 and 2846-A in both the passive and active scanning modes. These passive and active links may by T-1 lines, T-3 lines, dedicated lines, intersystem logical connections 132 and/or other, depending on the actual physical configuration and geographic location of the components.

Other links which are illustrated in FIG. 28, and which also act as passive and active links include the 1-1 lines 2844-A, 2844-B, 2844-C, 2844-D and 2844-E, which connect the radio towers and BTS's 110-A, 110-B, 110-C, 110-D 110-E in the radio tower and BTS network 108, to the BSC 118-A. The BSC 118-A is connected to the switch (MTX or other) 130 by an intersystem logical connection 132. The switch (MTX or other) 130 is connected to the publicly switched telephone network 138 with an intersystem logical connection 150. The switch (MTX or others) 130 is connected to the e-mobility services 144 by an intersystem logical connection 148. The intersystem logical connections 132, 150 and 148 can also act as passive and active links for the primary analytic software 2814.

Figure 29:
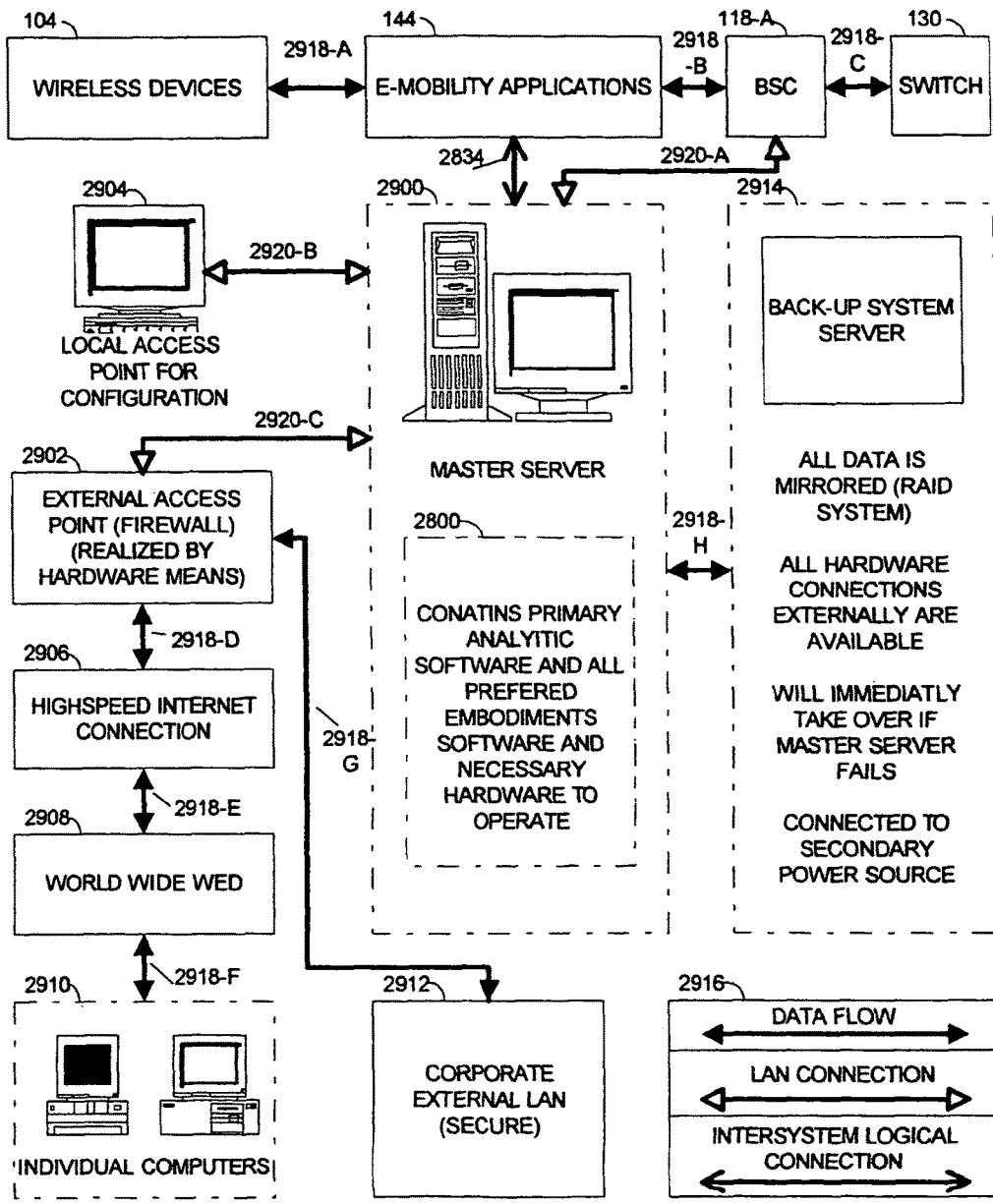
FIG. 29 PHYSICAL REALIZATION OF PREFERRED EMBODIMENTS

Now referring to FIG. 29 is a description of the physical realization of the preferred embodiment. It shows the way in which the embodiment of the said invention can be realized by the use of its supporting hardware. The software detailed by the said embodiment is contained in the hardware. The hardware is required though for a successful implementation of the embodiment, and should be seen as such.

Shown also, is a network with a central master server 2900 that contains the preferred embodiment 2800 and all software. Access points to the master server 2900 are:

- External access point 2902
- E-mobility applications 144
- Local access points 2904
- BSC 118-A

In FIG. 29 the external access point 2902 are isolated from the master server 2900 by a hardware firewall. It then connects to a high speed Internet gateway 2906 and then to the worldwide wed (Internet) 2908. From this point, individual computers 2910 or devices are able to route commands to the master server 2900 using this said connectivity. Additional external connectivity is allowed by use of a corporate LAN 2912 being tied directly to the external access point 2902. This access is NOT via any Internet connection, and is thus a secure connection.

E-mobility applications 144 may also access the system directly. The e-mobility applications 144 system is tied into the BSC 118-A and switch 130, and connects to the wireless devices 104 where the e-mobility applications 144 are interfaced by the user.

Shown in FIG. 29 is the local access point 2904 connection, which constitutes any local connection to the network. Of these types (external access 2902, e-mobility applications 144, local access point 2904 and BSC 206) local access points 2904 this is the most secure. The local access point 2904 connection is used for configuration and other administrative activity. Any available command for the said embodiment can be executed here through a local connection.

Still referring to FIG. 29 a back-up system server 2914 is also installed and attached to the master server 2900. All data/software/connections are mirrored using a redundant array of independent disks (RAID) or similar method to add redundancy to protect the operational ability of the said embodiment if the master server 2900 were to fail.

The fourth type of connection, the BSC 118-A, is shown in its logical connection to the network. The BSC 118-A provides a means to access the master server 2900 through the switch 130 and the publicly switched telephone network (PSTN) 138. The ability to access the master server 215 through the BSC 118-A can allow for alternate connection means including access from internet 3200 and remote sources connected to the BSC 118-A. The uses could include data exchange or remote operational commands.

Still referring to FIG. 29 is the data flow diagram 2916, which illustrates the type of connections between the components of the network. These connections include; data flow connections, local area network (LAN) connections, intersystem logical connections.

Now referring to FIG. 30 is an illustration of the standardization and conversion hardware and software 906 that may be used to interface the said primary embodiments 2800 with hardware and software, which are external to the primary embodiments 2800. The standardization and conversion hardware and software 906 are an SISO (single input single output) type control structure, where a single input results in a single output. In this case, a command from one protocol is input, and the correct protocol for the receiving machine is sent (after being converted internally).

The flow of this process begins by a start command 3000 being sent to the standardization and conversion hardware and software 906. The standardization and conversion hardware and software 906 checks the protocol against known types using its internal protocol database 3004. If there is a match, and the protocol is recognized 3006, then it checks device attached 3008 and determines (or is pre-configured) the appropriate protocol by checking receive devices protocol 3010 from the receive device protocol list 3012 it then determines if a conversion can be made 3014. If it can convert the command, then it is converted 3016. The command is then sent 3018 to the connected device 3020. The conversion would end" 3022 at this point, and wait for another command. If any of the decision boxes (3006, 3014) are 'no" then a 'protocol error" 3024 is recorded and the recorded "protocol error" 3024 is send back to the sending source.

Still referring to FIG. 30 the standardization and conversion process operates the same in either direction, from the source to destination or the destination to the source. The standardization and conversion process is bidirectional.

Now referring to FIG. 31 is an illustration of the BSC access control software 2804. The BSC access control software 2804 is responsible for negotiating a connection between the primary analytic software 2814 and the BSC 118-A.

Still referring to FIG. 31, the execution of its internal operations begins when the primary analytic software 2814 sends a request 3100 to the BSC 118-A. The BSC access control software 2804 then interrupts the start-idle state 3102 that the BSC access control software 2804 functions in when in idle mode. The BSC access control software 2804 checks to see if there is a new request 3104 form the primary analytic software 2814. If there was a new request, then the BSC access control software 2804 sends a command to receive the message 3106 from the primary analytic software 2814. It then compares the command 3108 to a command list 3110 of convertible commands (converting to BSC 118-A native commands).

The next step is to check if the command is convertible 3112. If the command is convertible 3112, then the command is converted 3114 to the BSC 118-A native code (or protocol). The message (code) is then sent 3116 to the BSC 118-A. The system then goes back into the start (idle-wait for response mode) 3102 waiting for a new command or a returned answer from the BSC 118A. If however, prior to step 3112 the command was not convertible, then a 'command error" will be sent 3118 to the primary analytic software 2814, and the system will return to the start (idle-wait for response mode) 3102. In this case, steps 3114, 3226, 206, 3102 are skipped.

Figure 32:
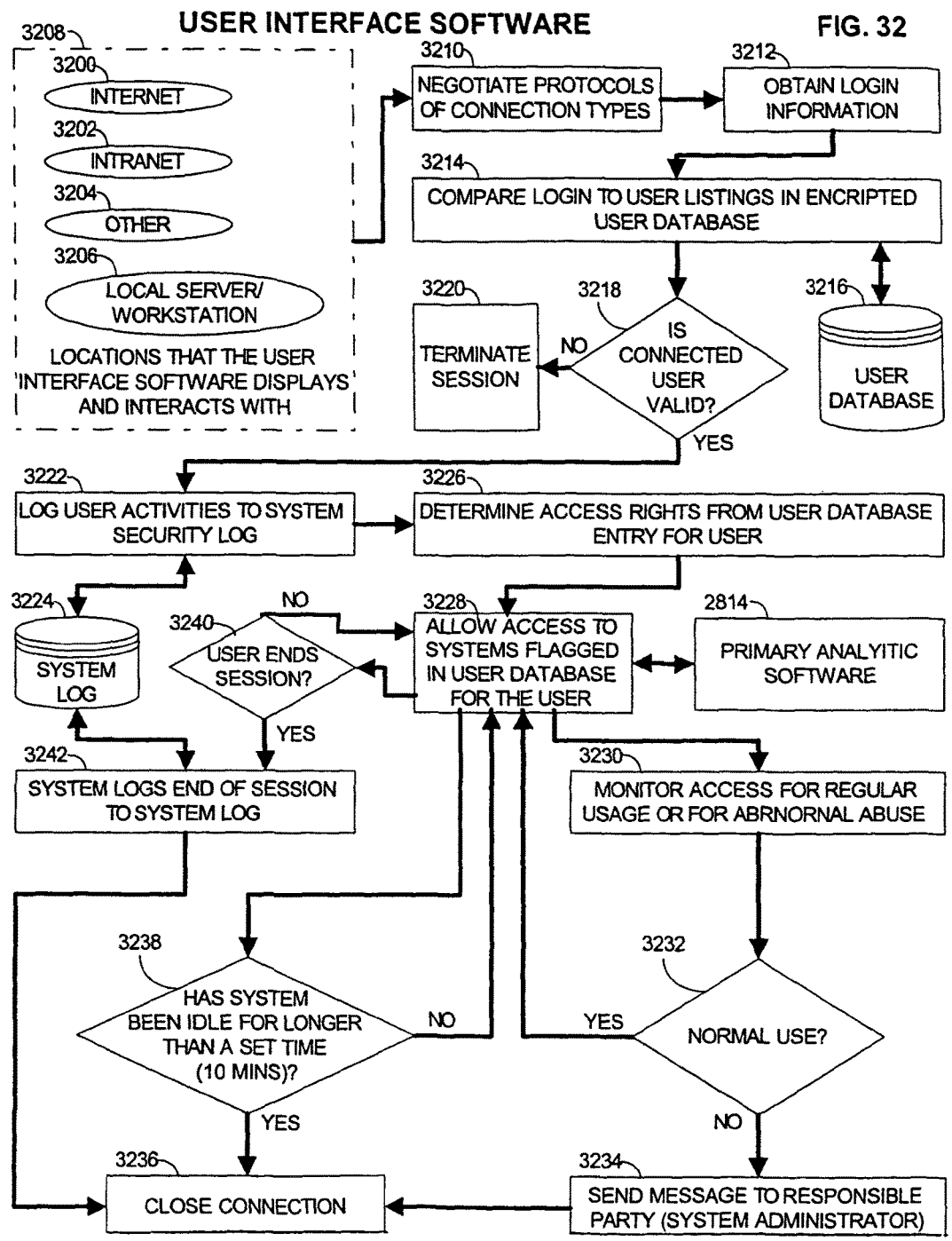
FIG. 32 USER INTERFACE SOFTWARE

Still referring to FIG. 32, if no new command from the primary analytic software 2814 is received 3104, but a result from the BSC 206 is returned 3118, then the reverse conversion process begins. The BSC 118-A native code is converted into primary analytic software 2814 native messaging 3120. The message is then sent 3122 to the primary analytic software 2814. If no result was received from the BSC 118-A, then the system would have returned to the start (idle-wait for response mode) 3102. If a message was sent back 3122 to the primary analytic software 2814. The system then also returns to the start (idle-wait for response mode) 3102.

Now referring to FIG. 32, the user interface software 3200 is illustrated. The user interface software 3200 is responsible for interfacing the user with the primary analytical software 2814 and other subsystems. It allows a plurality of connections to be used as interfaces:

Internet 3202
Intranet 3204
Other user defined objects 2848
Local server/workstation 3206

When these four types begin to negotiate 3210 with the user interface software 3200, all protocol and other pure connectivity issues are resolved by commonly known techniques, the standardization/conversion hardware/software 906, or through standard protocols. The first step is for the user interface software 3200 to obtain the login information 3212 from the user. The user interface software 3200 then compares the user's login information 3214 against an encrypted database containing the user list. The database containing this information is termed the "user database" 3216. If the user is not authenticated 3218, then the session is terminated 3220. If the user is authenticated 3218, then the user interface software 3200 begins to log the user's activities, including login information 3222 to the system log 3224.

Still referring to FIG. 32, the user interface software 3200 now determines the access rights 3226 of the users and allows the user to access 3228 the primary analytics software's 2814 features that it is allowed to. The system monitors continually the user's activity 3230 for abnormal usage. If there is abnormal usage 3232 then a message is sent to the system administrator 3234 and the session is closed 3236. If there was normal usage 3232 then the user may continue to access the system 3228.

Again referring to FIG. 32, the user interface software 3200 also monitors for the users activity duration and when the user has been idle for more than a set time 3238 then the session is closed 3236. When the user ends the session 3240 the system logs the normal closure of the connection 3242 to the system log 3224 and closes the connection 3236.

Now referring to FIG. 33 is a description of the device location software 2808. This device location software 2808 package is used to determine the location of a wireless device 104 connected to a wireless network 100/200 or other similar network to which a wireless device 104 may be connected. The commands 3300 form the primary analytic software 2814 to the device location software 2802 is a command to locate 3302 a wireless device 104, as well as an identifier such as the phone number 3304 of a wireless device 104. The device location software "starts" 3306 and receives the phone number 3308 of the wireless device 104. It then checks the phone number to see if it is valid for tracking. If the number is invalid 3310, meaning the number is not valid for any traceable device, an error message is sent 3312 to the primary analytic software 2814 If the number is valid 3310, then the device location software 2802 first can query (if it is connected to) a ULD 900 for the location 3314. If the number and location is found 3316, then the latitude/longitude of the device is retrieved 3318, and then a message is sent 3320 with the latitude/longitude to the primary analytic software 2814 and then finishes 3322.

Still referring to FIG. 33, if the number of the wireless device 104 was not found 3316 then it queries 3324 a similar device such as a ULDC 908. If the number of the wireless device 104 and latitude/longitude location is found 3326, then the latitude/longitude of the wireless device 104 is retrieved 3318, and then sent 3320 to the primary analytic software 2814 and then finishes 3322. If the wireless device 104 location is not found 3326, then the device location software 2802 queries the BSC 118-A for location information 3328 including timing information on the number of the wireless device 104 including all radio tower sectors in use. The device location software 2802 can then compute the latitude and longitude directly 3330 from information derived from the BSC 118-A and radio tower latitude/longitude database 2824 by using calculation techniques 3332. These calculation techniques include triangulation of round trip delay (RTD) from network timing information, triangulation from the signal strength and other commonly known locations techniques. Referred to by this patent are location techniques disclosed in the Provisional Patent, U.S. Ser. No. 60/327,327 that was filed on Oct. 4, 2001.

Still referring to FIG. 33, the location of the wireless device 104 may also be retrieved from the BSC 118-A if the wireless device 104 contains a global positioning system (GPS) that may transmit the wireless device's latitude/longitude to the BSC 118-A via the "keep alive" signal or other signal from the wireless device 104. Alternatively the location of the wireless device 104 can be determined at the wireless device 104 using triangulation, or other location techniques. If the wireless device 104 is equipped with a GPS unit, this would be the preferred location technique due to the GPS's inherent accuracy. The latitude/longitude of the device is returned, and then sent to the primary analytic software 2814 and then finishes 3322.

Now referring to FIG. 34 is a diagram that illustrates methods, which can be chosen to track and isolate wireless devices 104-A, 104-B, 104-C, 104-D on a radio tower network 108. These methods are used by the device location software 2802. In a generic radio tower network 108, consisting of a plurality of radio towers with base-station transceiver subsystem (BTS)('s) 110-A, 110-B, 110-C, 110-D, 110-E, there are three primary ways to track wireless devices 104-A, 104-B, 104-C, 104-D. These three ways are to specify:

1. BTS
  a. a single BTS (eg. 110-A, 110-B, etc)
  b. a plurality of BTS's 110-A, 110-B, 110-C, 110-D, 110-E
  c. all BTS's
2. Sector
  a. a sector on a BTS (eg. 3400-B or 3400-A)
  b. a plurality of sectors on BTS's (eg. 3400-A, 3400-B, 3402-A, 3402-B) etc.)
  c. All Sectors
3. Wireless device
  a. a specific wireless device (eg. 104-A or 104-B)
  b. a plurality of wireless devices (eg. 104-A, 104-B, 104-C, 104-D)
  c. All wireless devices Still referring to FIG. 34, these tracking methods are initiated by the primary analytic software 2814. The primary analytic software 2814 chooses which method to use based on the user's choice which is interfaced at the user input device (BSS manager or other) 126 and consequently the fault monitoring software and other internal configurations.

Again referring to FIG. 34, examples of tracking would be if the primary analytic software 2814 instructed the device location software 2802 to track wireless devices 104-A, 104-B, 104-C, 104-D on radio tower and BTS 110. The result returned would be wireless device 104-B, 104-C. If the primary analytic software 2814 instructed the device location software 2802 to track wireless devices 104-A, 104-B, 104-C, 104-D on sector 3400-B the result would be wireless device 104-A.

Now referring to FIG. 35-A describes the primary analytic software 2814. The process used by the primary analytic software "starts" 3000 by initializing the primary analytic software/hardware 2814 along with the operating system 3500. The primary analytic software 2814 then brings up a main menu 3502 for a user using the display software 2832. The user can select:

Active mode
Inactive mode
Passive mode
Display case file
File management
Exit program Still referring to FIG. 35-A, if the user selects inactive mode 3504 then the system is placed in standby mode 3506 and then goes into an idle state 3508. The primary analytic software 2814 then waits for mouse movement or input action 3510. When this occurs (mouse or input action) the system returns to the display menu 3502.

If the user selects the active mode 3512, then the system displays the active mode menu 3516. The user is then prompted with a menu selection for the following:

Track a single wireless device
Track a list of wireless devices
Track wireless device by sector Again referring to FIG. 35-A, if the user selects 'track a single wireless device 3518, then the user is prompted to enter an identifier for the phone such as the number for a wireless device 3520. The user is then prompted to selects a time period to track the wireless device 3522. The primary analytic software 2814 then will record the data for the given time on the wireless device 3528. The primary analytic software 2814 utilizes the device location software 2802 to perform this process. The primary analytic software 2814 then records the file to a storage medium and the user is prompted to rename file 3526. The user is then prompted if they wish to continue tracking/track 3528 another wireless device. If the answer is yes 3528, the user is brought back to the active menu 3530. If they chose no 3528, then the user is brought back to the main menu 3536.

If the user is in the active mode 3512, they can also select to "track a list of wireless devices" 3536. If the user selects yes, they can enter them into a plurality phone numbers of wireless devices 104-A 104-B, 104-C, 104-D they wish to track 3538. The user then selects a time period 3522 to track the wireless devices 104. The primary analytic software 2814 then will record the data for the given time on the wireless device 3524. The primary analytic software 2814 uses the device location software 2802 to record the data on the given time of the wireless device 104. It then records the file to a storage medium and the user is prompted to rename the file 3526. The user is then prompted if they wish to continue tracking/track 3528 another wireless device 104. If the answer is yes 3528, the user is brought back to the active menu 3530. If they chose no 3528, then the user is brought back to the main menu 3532.

Still referring to FIG. 35-A, the user can also select to track wireless devices by sector(s) delineation (choosing sectors track on) 3540. The user is prompted to enter/select/choose a list of sector(s) to track wireless devices on 3542. The user then selects a time period 3522 to track the wireless devices. The primary analytic software 2814 then will record the data for the given time on the wireless devices 104 with the selected sectors being tracked 3524. The primary analytic software 2814 utilizes the device location software 2802 to perform this process. The primary analytic software 2814 then records the file to a storage medium and the user is prompted to rename the file 3526. The user is the prompted if they wish to continue tracking/track 3528 another wireless device. If the answer is yes 3528, the user is brought back to the active menu 3530. If they chose no 3528, then the user is brought back to the main menu 3532.

The user interface software 2826 is used to allow the user it interact with the various processes of the primary analytic software.

FIG. 35-B

Now referring to FIG. 35-B, the user is prompted to select the passive mode at the main menu 3544. If the user selects the passive mode then the system displays the passive mode menu 3546 using the display software 2832. The user is prompted to enter the sector/BTS (or list) to track in passive mode 3548. The primary analytic software 2814 then asks the user to enter (if any) the 'error criteria' and if the auto-correct mode should be enabled 3550. The software then sends the information 3552 to the fault monitoring software 2802. When a fault is detected 3554, then the system creates a case file and prompts the user for a name (if none is entered then a default is used) 3556. The primary analytic software then sends 3558 the case file to the fault diagnostics/correction software 2806.

If the user enables the 'auto-correction mode' then corrections are received 3560 from the fault diagnosis/correction software 2806. These corrections, contained within the case file, are then sent 3562 to the BSC via the BSC access control software 2804. The user can then select to hit the cancel key 3564 and go back to the main menu 3566, or not hit the cancel key, go back to the passive mode menu 3568.

Still referring to FIG. 35-B, from the main menu, if the user selects to "display case files" 3570, the user is forwarded to FIG. 35-C, BOX 3572. If the user selects file management 3574, (via the user interface software 2826) from the main menu, then a list of case files in the user's storage medium are displayed 3576 via the display software 2832. The user can select a plurality of case files 3578 via the user interface software 2826. The user is then prompted to delete 3580 selected case files. If the user selects to delete 3582 a chosen case files, the case files are deleted and returned 3584 to a display of listed case files. If the user selects to rename 3586 chosen case files, the case files are renamed 3588 and the user is returned 3584 to the display of stored case files. If the user selects 3586 to not "rename case files", the user is then prompted to "exit" the system 3588. If the user selects to 'exit" the system 3588, they are returned 3566 to the main menu. If the user does not choose to "exit" the system 3588, the user is returned 3584 to the display which lists the stored case files.

Again referring to FIG. 35-B, the user can at any point select to "exit program" 3589, from the main menu, shut down the primary analytic software 3590, and exit the program 3591.

Now referring to FIG. 35-C, the user can select from the main menu to "display case file". The user is then prompted to select/enter a case file name 3572 (via the user interface software 2826). Then the user is prompted to enter a list of criteria to display 3592 (via the user interface software 2826). The case file criterion is then sent to the display package 3593 which includes:

Correlated mapping software 2828
Correlated lat/long information 2830
Display software 2832

Still referring to FIG. 35-C, the primary analytic software 2814 then waits until the user information is displayed 3594 and the user exits the display package 3595. When the user is done with the display package 3595, the user is asked if they want to modify the parameters displayed 3596 (via the user interface software 2826). If the user chooses to display and edit parameters 3597, then the user is returned back to enter criteria to display 3598. If the user does not chose to display and edit parameters 3599, then they are returned to the main menu (FIG. 35-A, BOX 3502).

Now referring to FIG. 36 is a flow chart, which describes the monitoring software. The monitoring software begins by receiving a "start" command 3602 from the primary analytic software 2814, and a list of flagged criteria 3604 form the primary analytic software 2814. The monitoring software then "starts" 3000 by monitoring 3606 the BSC 118-A for new messages. The monitoring software does so by accessing the BSC 118-A. If no new message is received 3608, it continues to monitor the BSC for new messages unless a software interrupt is called. If a new message is received from the BSC 3608, then the new message is compared 3606 to the flagged criteria list. If the new message 3610 is not in the flagged criteria list, then the monitoring software resumes looking for new messages from the BSC 3606.

Still referring to FIG. 36, if the new message was in the flagged criteria list 3608, then the monitoring software extracts 3612 the "flagged criteria" information from the new message. The monitoring software then decodes 3614 and encodes the flagged criteria data into a case file format. The monitoring software then creates 3616 a customizes case file based of the specific flagged criteria. The monitoring software then sends 3618 the case file to the primary analytic software. Following the case file formatting process, the monitoring software then resumes waiting for error messages in the flagged criteria list 3606.

Now referring to FIG. 37, this diagram illustrates the case file generation process and how a case file 2820 is organized.

Information included in case files, and encoded in any industry standard database format includes:
- Case file distinguisher (number) 3722
- Individual wireless device number 3724
- Individual wireless device location 3700
- Error codes of device 3704
- Forward receive power 3704
- Forward transmit power 3706
- Echo 3708
- Neighbor list 3710
- Messaging 3712
- FER 3714
- Other error codes 3716
- Service effecting factors 2822
- Radio tower latitude/longitude locations 2824
- Other user defined factors 3718

The actual case file 2820 is composed of a software database entry as shown. It would include 'N' number of entries for all wireless devices 104-A, 104-B, 104-C, 104-D being monitored as requested by the primary analytic software 2814.

Still referring to FIG. 37, the format of the industry standard database can be determined by a software engineer, but one approach may be to use the logical format shown in case file 2820 illustrated herein. Table column labels referring to the above types of criteria are in the case file 2820 structure. Any deviation or other structure can be considered within the scope of this patent because this format is a less than critical element of the patent.

Now referring to FIG. 38-A is a description of the fault diagnosis/correction software 2806. The inputs 3800 which are past from the primary analytic software 2814, and utilized by the fault diagnosis/correction software 2806 include case files 2820, request correction command 3802, and protocol command exchange 3804. The fault diagnosis/correction software 2806 then "starts" 3000 when the case file 2820 is received 3806 and the protocol commands are exchanged 3808 from the primary analytic software 2814 and the fault diagnosis/correction software 2806. The case file 2820 is then parsed 3810 to extract information from the case file 2820. The case files 2820 data is then separated and sorted into defined (by input data) categories 3812 and each error and related data is stored as database entries 3814 into the local error database 3816. The fault diagnosis/correction software 2806 then 'starts" to examine the error 3818. The fault diagnosis/correction software 2806 accesses 3820 the stored case files 2820 (stored in the local error database 3816) and creates an additional entry based on data for 15 seconds (or a length of time determined by a network engineer for a particular configuration) prior to the error, including the following data:
- Case file distinguisher (number) 3722
- Individual wireless device number 3724
- Individual wireless device location 3700
- Error codes of device 3720
- Forward receive power 3704
- Forward transmit power 3706
- Ec/Ib 3708
- Neighbor list 3710
- Messaging 3712
- FER 3714
- Other error codes 3716
- Service effecting factors 2822
- Radio tower latitude/longitude locations 2824
- Other user defined factors 3718

Still referring to FIG. 38-A, the fault diagnosis/correction software 2806 can now proceed to apply standard (common knowledge by engineers in the field) techniques to detect and identify errors by type 3822. The fault diagnosis/correction software 2806 determines data value trends 3824 for data leading up until the error begins. The trend analysis is then stored 3826 as a trend analysis database entry 3828.

Again referring to FIG. 38-A, the fault diagnosis/correction software 2806 then examines 3830 the trend analysis database entry 3828 and compares preliminary trend analysis criteria 3832 against patterns that indicate error types and resolutions. These patterns are unique to networks, and should be programmed by network engineers for specific networks/setups. Default patterns are suggested by the embodiment of this patent in FIG. 38-B. These can be modified or appended and stay within the scope of this patent's claims.

Now referring to FIG. 38-B, the resulting patterns/error resulting from calculations (as described in FIG. 38-A, BOX 3832) are compared 3836, 3840, 3844, 3848, 3852 to defined error criteria. The resulting error code/pattern evaluation produces messages that are then sent back 3856 to the primary analytic software 2814. If the auto-correction mode was enabled by the user 3858, (correction requested) then the fault diagnosis/correction software 2806 makes corrections based on the error codes/patterns. The shown default corrections are 3860, 3862, 3864, 3866, 3868.

Still referring to FIG. 38-B, corrections that are a result of the fault diagnosis/correction software's 2806 analysis are then sent 3870 to the primary analytic software 2814 where they are processed. If no correction was requested 3858 (auto-correction mode is off), or if there are no more errors 3872 in the local error database 3874, then the trend analysis data 3828, stored error data 3878, is purged 3876. If there is another error in the 'local error database" 3872, then the fault diagnosis/correction software 2806 returns to the "start" point 3000 of the error examination process 3884. If there are more errors 3872, the system returns back to the idle "start" point 3884 were the fault diagnosis/correction software 2806 waits for new messages to be passed from the primary analytic software 2814.

Now referring to FIG. 38-C is a description of the default error table 3878, message table 3886, and correction table 3888. These tables are used in FIG. 38-B as defaults for the fault diagnosis/correction software 2806. Additions and modifications can be made to these tables 3878, 3886, 3888 and stay within the scope of this patent. These tables 3878, 3886, 3888, can be customized depending on the configurations of the wireless network, hardware and software considerations, the parameters set by network engineers, or other considerations which would require customizing the configurations of these tables 3878, 3886, 3888.

Now referring to FIG. 39 is a description of the correlated mapping software 2828 flow. Output 3900 methods supplied by the primary analytic software 2814 include command to display an output 3902, raw data file with network data (case file) 3904, and mapping element list 3906. The mapping element list 3906 contains all the elements (types of data) that the user wants to map.

The correlated mapping software 2828 now "starts" 3000 by checking if the case file is valid 3808. If the case file is not valid 3808, the correlated mapping software 2828 sends an error message to the primary analytic software 2814 and the display software 2832. If the case file is valid 3908, the correlated mapping software 2828 reads an element from the case file 3912. The correlated mapping software 2828 then assigns a reference color code to the data element to be used later for mapping 3914. The correlated mapping software 2828 then correlates the data to latitude/longitude values where the data was recorded 3916, and stores the correlated data 3918 to a data layer 3920 in memory. If this is not the last element in the case file 3922, then the correlated mapping software 2828 returns to read a new element in the case file 3912, and continues reading new elements until all elements have been read 3922. When the last element has been processed 3922, the correlated mapping software 2828 groups data layers into one file 3924, and stores all the file data to a 3926 master data layer 3920 file as a database entry.

Still referring to FIG. 39, the correlated mapping software 2828 then calculates the most extreme west/east/north/south points in the data layer 3928. The correlated mapping software 2828 then imports 3930 maps 2810, 2812, 2824, 3956 based on these extremes. The correlated mapping software 2828 then saves each of these new maps as an individual layer 3932. The correlated mapping software 2828 follows by grouping these maps to one data file containing all the layers 3934 and stores them in the master map layer 3936. Based on the requirements of the mapping element list 3906, the correlated mapping software 2828 filters the case file data and map layers 3938 so that the resulting data contains only data and map layers 3938 relevant to what needs to be mapped. The filtered data 3942 is saved to the filtered master data layer 3940 and filtered mapping layers 3946 are saved to the filtered master mapping layer 3944. Both the filtered data layer 3942 and the filtered mapping layers 3946 are combined into the primary display layer data file 3950. The correlated mapping software 2828 records time and date of data and other configurable information and saved into a secondary data file 3948. The primary display layer data file 3950 and the secondary data file 3948 are then sent to the primary display software 3952. The correlated mapping software 2828 now closes itself and purges temporary data 3954.

Figure 40:
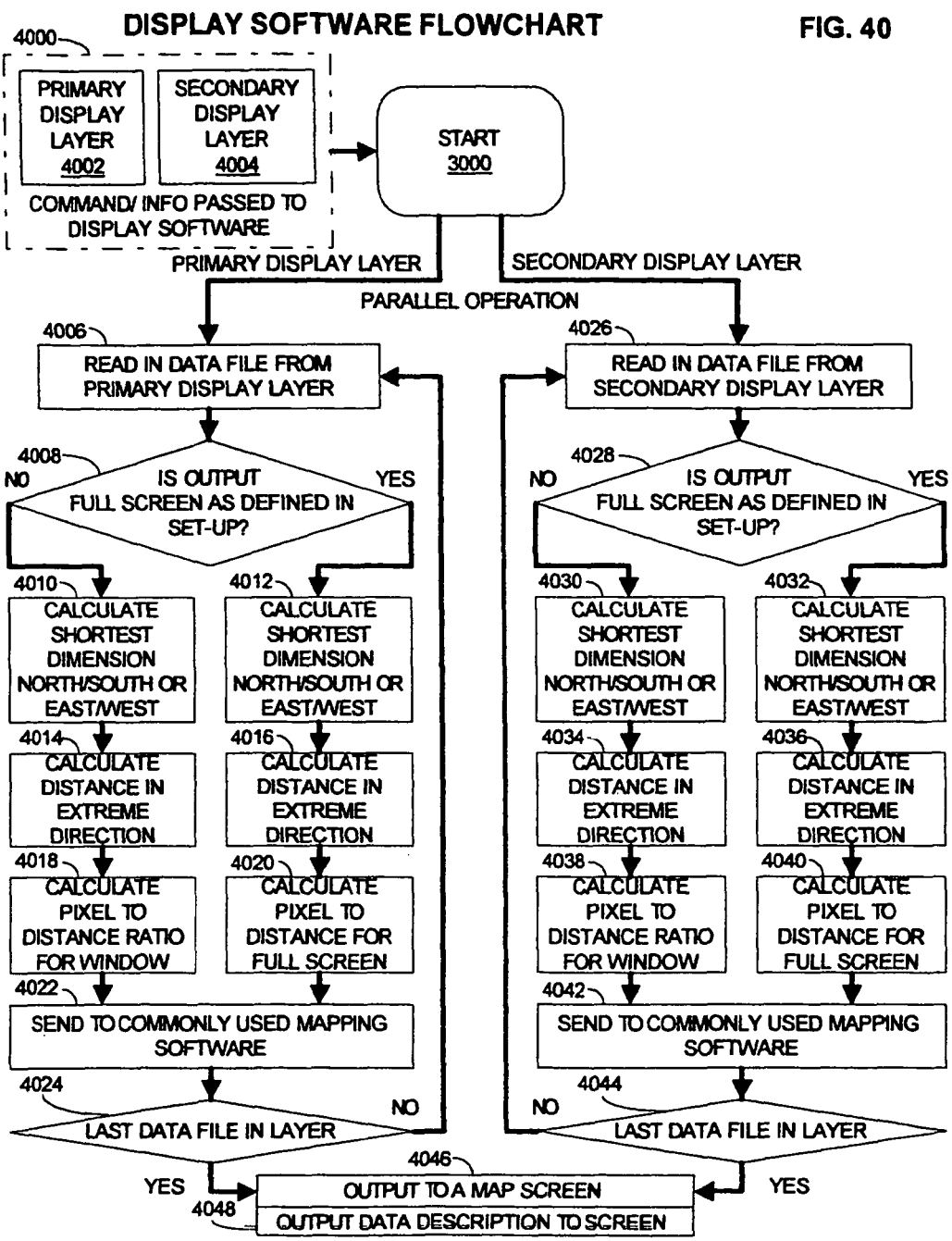

Now referring to FIG. 40 is description of the display software's operations. The display software's inputs 4000 are the primary display layer 4002, the secondary display layer 4004, and command/info passed to the display software 2832 from the primary analytic software 2814. The display software 2832 "starts" 3000 by sending the primary display layer 4002 and secondary display layers 4004 to two sub routines.

Still referring to FIG. 40, the primary display layer's 4002 subroutine begins 4006 by reading data from the primary display layer 4002 data file data file. The display software 2832 then checks if the output for the user is defined as full screen 4008. If the output is a full screen 4008, as defined in the set-up, the display software 2832 then calculates dimensions for the screen size 4012/4016/4020 for full screen operation. If the output is a "window" screen 4008, as defined in the set-up, the display software 2832 then calculates dimensions for the screen size 4010/4014/4018 for the window screen operation. The display software 2832 then sends the results 4022 to commonly used/known mapping software 2828. If this is not the last data layer 4024, the system reads the next layer in 4006 and continues as before.

Again referring to FIG. 40, the secondary subroutine starts 3000 by reading data 4026 from the secondary data file. The display software 2832 checks if the output is defined as full screen 4028. The display software 2832 then calculates dimensions for the screen size 4032/4036/4040 for full screen operation. If the output is defined as window screen 4028, the display software 2832 then calculates dimensions for the window screen size 4030/4034/4038 for window screen operation. The display software 2832 sends the results 4024 to commonly used/known mapping software 2828. If this is not the last secondary data layer, the system reads the next layer in 4006 and continues as before. After both subroutines are finished, the display software 2832 outputs the graphic display to the screen 4046/4048 using commonly known techniques.

Now referring to FIG. 41 is a description of the final display output format. The final display has seven or more layers. These layers are:

Radio tower locations display layer 4100
Wireless device locations display layer 4110
Service affecting factors (mapped to locations) display layer 4120
Error codes (mapped to locations) display layer 4130
Criss-cross phonebook entries (i.e. landmarks such as buildings) display layer 4140
Auxiliary object locations display layer 4150
Geographic/topological street map overlay display layer 4160

The final display output is the sum of the above display layers. A plurality of auxiliary object location display layers may be added by the user via the user interface software. By doing so, the user may expand the mapping And display features of the resulting maps.

Still referring to FIG. 41, layer one 4100 is the location (latitude and longitude) of all the radio towers and BTS's 110-A, 110-B, 110-C, 110-D, 110-E in the radio tower and BTS network 108.

Layer two 4110 overlays the latitude/longitude of the wireless devices 104-A, 104-B, 104-C, 104-D (and the previous locations relative to time) of the wireless devices 104-A, 104-B, 104-C, 104-D.

Layer three 4120 plots the service effecting factors in the case file based on the recorded latitude and longitude where the factors 4121, 4122, 4124, 4126, 4128 were recorded.

Layer four 4130 plots the error codes in the case file based on the recorded latitude and longitude where the factors 4132, 4134, 4136 were recorded.

Layer five 4140 plots selected entries from the criss-cross phonebook database with lat/long correlations. The displayed entries 4142, 4144 and 4146 could represent such entries as, for example, hospitals, gas stations, restaurants, or a private residence.

Layer six 4150 plots auxiliary latllong correlations of user selected/inputted entities 4152, 4154, 4156.

Layer seven 4160 overlays a topographic map with road locations with correlated to their actual latitude and longitude locations.

Still referring to FIG. 41, the final display output 4170 is sent to the user and shows all layers above combined together.

Alternative Embodiments

Now referring to FIG. 28, two alternative embodiments are contained within the current invention. The first alternative embodiment provides a means for providing a display screen machine and process, which enables access to the current invention by other applications through e-mobility services 144 or other interfaces. This alternative embodiment could be used by other applications which have a need to display the geographic location of wireless devices 104-A, 104-B, 104-C, 104-D, geographic location of entries contained with the crisscross phonebook database 2812, maps of or other data contained within the geographic information database 2810, user selected auxiliary entries, or other entries contained within the current invention 2800. The primary elements required by this first alternative embodiment include:

Expansion to current embodiment to allow external queries to be processed (e-mobility services 144)

Alternative Embodiment Requirements
- a BSC access control software 2804 and/or a user location database 900 or user location database coordinator 908
- Monitoring software 2802
- Device location software 2808
- Geographic information database 2810
- Criss-cross phonebook with lat/long database 2812
- Standardization/conversion hardware/software 906
- Primary analytic software 2814
- Internal CPU and computer 2816
- Internal storage 2818
- User interface software 2826
- Correlated mapping software 2828
- Correlated data for lat/long information 2830
- Display software 2832
- Inner system logical connection and other connections 132

The primary external queries will initiate from the e-mobility services 144 of a wireless network 100. This implementation greatly reduces the necessity for excessive amounts of integration to occur.

E-mobility services 144 already in current wireless networks 100 have access to the internet though certain firewall, LAN routing, and data protection schemes. This can be exploited by allowing external software to query, using a secure data connection via the internet, the said first alternative embodiment. All calculations, and processing would occur at the wireless networks server.

Access to this data would be limited by defined settings such as.
- Viewable layers in final output
- Topological data
- Roadways
- Location of wireless devices
- Criss-cross phonebook data
- Geographic information data
- Other user defined data
- Service affecting factors
- Receive strength
- Signal to noise ratio
- Other user defined data
- Location and or previous location of the wireless device
- ULD database tracking
- ULDC queries to track mobile
- Other user defined data
- Types of queries
- Individual wireless device 104
- Sector of BTS
- BTS
- Network
- ULD 900
- ULDC 908
- Device location software 2802
- Other user defined queries
- Amount of time until processing occurs
- Level of precision in latitude and longitude
- Multiple query submission
- Have a predefined list of criteria to be submitted at regular intervals to the system
- Have reports automatically generated and sent through E-mobility applications 144 back to Internet user.
- Ability to report System errors
- Internet connected user can report false information reported by the system.
- Internet connected user can report missing information reported by the system.
- Other user defined objects 2848

External Connectivity of Preferred Embodiment

Now referring to FIG. 29, the physical realization of the preferred embodiment and the alternative embodiments is illustrated. These embodiments include a plurality of methods to develop case files and hence detailed information on users/conditions that exist on a wireless network 100. When these case files are generated they are stored on the server—which is located at the switch (MTX or other) 130. This allows rapid use of these case files for debugging and optimization.

The wireless network 100 can however be accessed from access points other than the switch 130. These locations are the corporate LAN 2912 and the Internet 3202. Both connections offer secure connections. Examples of secure connections would be secure server language (SSL) and other similar connections.

Still referring to FIG. 29, the ability to access the switch (MIX or other) 130 from an external software package is integrated into the preferred embodiments. These preferred embodiments allows a plurality of software packages to access the databases and primary analytic software 2814 contained within these embodiments. These external software packages can be assigned certain security allowances in addition to individual user privileges. These restrictions would be able to limit software packages that the wireless network 100 has not authorized to various levels of access.

An example of third-party I remote internet 3202 access programs could be a program that a wireless service provider uses to integrate billing information with communications (call, page, text message, etc.) logs. The wireless service provider could set up a location information program that could be marketed to users as a way to access location information regarding communications made on their wireless devices 104 billing statement. This location information program could be accessed by users, allowing them to remotely access the preferred embodiments and initiate a continuous tacking ability on the wireless device 104, when communications are made or at any other time. A user could also retrieve location information from a web site on the Internet 3202 for any communication (call, page, text message, etc.) on his wireless device bill, for example, thereby allowing the user to access a log of the geographic location information correlated to the user's logged communications. This would allow an employer to monitor the locations of employees at the time communication are sent and received.

Another example would be for a program issued to police or law enforcement agencies to track a list, of a plurality of wireless devices 104 that could be submitted over the Internet 3202. This list would get updated at the switch (MTX or other) 130 in the users account and allow case files to be generated on the list of wireless devices 104 the user submitted.

There are many possible ways to use this external connectivity option, however any use of its features would be considered within the realm of this patent's legal claims.

The primary elements (access of many options could be defined by access rights of user/connection type) of this external connectivity would be the following:
- Ability to negotiate a secure connection via the internet 3202/corporate LAN 2912
- Ability to authenticate software package and user Ability to negotiate commands to create a new user account with the preferred embodiment for the said new user. This account would contain profile, preferences, and storage ability for case files generated for the user.

Ability to send a list of wireless device identifications 3726 (phone #s, ESN's, etc) of mobile devices that would allow the preferred embodiment to track these items.

Ability to set tracking modes for the list of identified mobiles that are submitted to the said embodiment. These modes are: Manual (one time tracking only) and automatic (track and record mobile devices for a said period of time at any given interval. These intervals can include time of day, time of call (when the mobile makes a call), and default settings (every 24 hours).

The ability to submit criteria for tracking other than a unique identifier phone a said wireless device 104. This can include:
  Geographic criteria (track—create case files—for wireless devices in a said geographic region.
  Demographic criteria (track wireless devices of users of a said demographic profile
  Other customizable criteria The ability to simply locate a wireless device 104 and return its Location® The ability to view any saved case files in the user home directory. This includes any manually developed case files as well as case files automatically generated by the user's profile settings—per prior request of the user. The viewing of these said case files would be generated by the preferred embodiments display software 2832 and could have limitations placed n it by access rights. These access rights could limit what layers are displayed on the output. Levels such as network information, cellular tower location, etc could be removed.

Ability to negotiate file maintenance on a user directory from the remote connection is another option that could have restrictions based on access levels. Maintenance commands could include:
  Delete file
  Rename file
  Copy file
  Etc.

The ability to remotely submit case files manually for auto-correction (user would require high access).

A specific concern that users would need to be aware of is the ability of their records to be accessed by this system. Wireless devices 104 should be able to submit preference flags that will control access to the tracking and access of their accounts by the said embodiment. The levels that could be defined for this type of preference are:

1. Open access—any party may access all information about user
2. Limited access (Default option)—information such as the users name, and other private information is masked. Demographic information and the ability to anonymously track the mobile (ex: tracking by demographic information).
3. Polling access—No information is listed under the account, however tracking can still occur but only by geographic region. Results of the track would not include any information other than a generic identifier for the phone
4. No access—under this mode the user may not be tracked, but certain features such as the ability for the user to track him/her self will be disabled.

Ramifications and uses stemming from these access levels are beneficial to the wireless service providers. The wireless service provider can choose to only allow certain levels to be used by a wireless customer. To this regard, under most circumstances they could make it mandatory for most wireless devices to be tracked.

This information is a very valuable commodity. Many applications stemming from this exist beyond the ability for third party applications to simply access, view case files, and setup tracking options.

Two specific claimed additional uses and processes would be:
  Allowing marketing companies access to tracking based on their target audience (demographic/geographic location/etc)
  Traffic Analysis and route planning software The first process would allow marketing or interested organization/persons to use software to access information about users based on customizable criteria. These criteria could be used to:
  Send wireless messages to the wireless device 104 when it enters a definable geographic region.
  Research consumer habits based on the consumer's profile/demographic information.
  Allow unsolicited interaction with a customer based on a profile set-up by a marketing company with the said process. (for example, and out of town user receives a solicitation for a discounted hotel rate as they enter town).
  Allow a user to request solicitations for specified products or services based on the users geographic location. (For example, the user is at Broadway and $V^t$ Ave. and wants to know which restaurants in the area have a lunch special.
  Receive a 'wireless coupon" for wireless device users 102 on user selected goods and services, based on the users geographic location.
    This "wireless coupon" would be realized by transiting the user a coupon code, number or word, etc.,
    By putting the user on a "wireless coupon" list comprising the user names and/or wireless device phone numbers 3724. This "wireless coupon" list is distributed to the service provider's business.
  Direct the user of the wireless device 104 to the closest service such as a hospital, gas station or restaurant for example.

Of concern to users would be the abuse of this technology. They would be able to block any such attempts by limiting their access rights in their profile, or by wireless providers reaching agreements with its consumers.

The second process is the ability for a directional assistance network (DAN) application to be developed that could analyze traffic patterns and determine alternate travel patterns that my offer a less congested path for a consumer while driving.

This DAN application would function by first querying the wireless network 100, ULD 900, ULDC 908, or other systems to track all wireless devices 104 in a traffic grid (the geographic criteria would include roadways but not accessible—drivable land). It would then determine which devices are considered to be part of the traffic on a particular roadway.

Because the wireless devices 104 are being tracked by a case file, they can be monitored for movement. If a device is in motion along a roadway grid for more than an allocated (a tunable) time, then it is considered traffic. When this has been calculated, all wireless devices 104 that are not selected are considered to be non-traffic devices.

The system would now look at all moving devices and calculate four attributes:

Average speed of all wireless devices on a given section of a roadway

Density of wireless devices on the roadway

Peak/Min speed of all devices on a road way

Other programmable criteria

The system would access internal databases to obtain posted traffic speeds on the various road segments. If the average speed is below the posted limit by a programmable amount, then it is deemed congested. If the traffic density is also to dense for the roadway (indicating bumper to bumper) then the traffic density is defined as heavily congested.

Based on these criteria a traffic flow analysis can be done on the entire wireless network 100. Using the results a program can display to a user where traffic is bad/good in a visual display.

Users can enter into this software a starting location and a destination location. Commonly used software packages are capable of finding simples routes. The standard method would first be used. If the resulting route had a congested element on it, a change would need to be made for the user.

The DAN application can then find the fastest route based on roadway congestion. It would tell the route finding software to recalculate a route but NOT use the congested area. The resulting route would be analyzed for congestion again and resubmitted, as before, if necessary.

The resulting information could easily be sent to the user via the wireless web as a message to their wireless device 104. The additional programming need would be to interface with an e-mobility application 144 that controls wireless messaging over the wireless web (for example). The route would then be sent directly to the mobile device.

The user could also select for the route to be continually checked and updates sent to the wireless device 104 until the feature is disabled (by the user reaching the destination) or the feature is timed out by the user entering a time limit. The system knows the identification of the wireless device 104 of the user 102 and then could access the primary embodiment to access the mobile location and travel direction and speed. It could then recalculate the routing information if the user of the wireless device 104 were to get off the primary route. Updates could then be sent to the phone alerting of the change.

Second Alternative Embodiment

Customized Case File Generation

The second alternative embodiment comprised within the machine and process of the primary embodiments is a powerful feature for a consumer point of view, which allows the user to have external access to the primary analytical software 2814. This access, as described in more detail later, can take place from the Internet 3202, corporate LAN 2912 and from a local computer at the switch (MTX or other) 130. This access to the primary analytic software 2814 is through a secure connection, and allows the user access to stored case files, the ability to generate customized case files and for use of the primary access software.

A specific feature of the second alternative embodiment is its ability to allow subprograms the ability to create customized case files. These customized case files contain monitoring data on the wireless network 100 that allow a plurality of data analysis to be made on the network. This analysis takes place by the fault diagnosis and correction software 2806. Additional analysis can be done by outside, third party, software. For this reason, special provisions in the preferred embodiments have been made to allow customizable case files to be generated. These custom case files better meet the needs and demands from consumers.

While in normal operation, case files are generated by subprograms as part of their activities. For example, when the user selects the system to monitor for faults and correct them (auto fault correction mode) the system generates case files and then submits them to the fault diagnosis and correction software 2806. In this instance the generation of the case file is said to be autonomous.

Contrary to this method, case files can also be generated monitoring for specific activities other than faults.

A second mode of generating case files is when the user chooses to have the system create customized case files for specific criteria and simply save the results to a local storage medium. This local medium is defined as part of the storage system that the primary analytic software 2814 is running on. The medium is allocated for storage and divided into user directories that can have information stored into by specific users. A user has the option of looking for wireless network 100 variables other than just errors. The system is capable of recording data on the network based on several other criteria such as:

Single or plurality of said wireless devices based on phone #, ESN, etc.

Specific sectors on BTS's.

Plurality of sectors on one or more BTS.

Time of day

Geographic criteria (track—create case files—for wireless devices in a said geographic region)

Demographic criteria (track wireless devices of users of a said demographic profile)

Other user defined criteria

The first of the customizable criterion is being able to locate devices by a unique identifier that corresponds to the wireless device 104. A user may submit a single, or plurality, of identifiers for wireless devices 104 to the preferred embodiment. The monitoring software 2826 will then begin to monitor the network for activity by these devices. Activity can be defined as active calls, active data transfers, or any other form of activity from the wireless device 104, which would allow tracking on its location to occur. The monitoring software 2802 uses the BSC access control software 2804 to acquire data on these devices and stores it to a local case file for the user's later review.

The next two tracking methods (other than for errors on the network) is when the user specifies specific or a plurality of sectors to track. The primary analytic software 2814 will again use the monitoring software 2802 subprogram to monitor (using the BSC access control software 2904) the sectors that were specified. All data recorded on these sectors will be stored to a case file 2820 that allows the user to retrieve information and perform data analysis by a third party program at a later time.

The next criteria can be used in conjunction with the above and below criterion for creating case files. The time parameter equals the amount of time for which monitoring should occur on any specified prerequisite criteria. If a user asked for a specific sector to be tacked, the user could then specify for how tong (if he didn't then the default time limit—as defined in the software setup—would be used.

Two specialized formats that allow very precise consumer oriented potential are case files 2820 being generated based on geographic and demographic criteria. The first, geographic criteria, is specified by a user in 3 ways: latitude/longitude coordinates and boundaries; geographic criteria that can be chosen from the primary analytic software's 2814 geographic information database 2810; or from predefined segments. The primary analytic software 2814 responds by translating these inputs into actual sectors that cover these areas. The monitoring software 2802 as well as the device location software 2808 then read in data on active devices in these areas.

A further filter is then applied that removes devices not in the specified geographic region by comparing their locations with the locations acquired from the device location software 2808. The result is only devices in the desired region will be recorded to the case file. It also reduces computation power by only monitoring sectors that cover the geographic region chosen by the user. All data recorded on the geographic region will be stored to a case file that allows the user to retrieve information and perform data analysis by a third party program at a later time.

The demographic criterion selection is different, however, in that it can use many of the above criteria to refine its monitoring pattern. Alone, the demographic criterion allows a user to specify demographic information on the user of wireless devise 104 on the network to track. This occurs by the user entering the demographic information and the primary analytic software 2814 looking up corresponding users in its local user database. This local user database is derived from a customer profile kept on record by the telecommunication company. Only relevant demographic information can be stored here. Sensitive financial information is not copied here to prevent fraudulent misuse or abuse. The matches are then sent to the monitoring software 2802 to be tracked and recorded to a case file 2820. Refinements can be used by combining this be geographic tracking to limit the area of geographic interest. Time, sector, and other combinations can also be used.

The customizable ability for creating case files 2820 is a component of the preferred embodiment that would allow internal and external programs to generate analysis's that could be beneficial to consumer needs. These needs could be to track a list of employee wireless devices 104 to prevent misuse. Another example is tracking people for targeted marketing strategies.

An important use of case file generation is for non-visible file operations. In these operations, case files are generated for internal programs and used as intermediate steps. When the case file is no longer needed, it is deleted. Its classification would be as a temporary file. Subprograms that use these temporary case files are:

Monitoring software 2802
Display software 2832
Fault diagnostic and correction software 2806

The monitoring software 2802 continually creates temporary case files 2820 for internal use. The reason this subprogram uses the temporary case files is so it can capture events that contain errors and send them to the fault diagnostic and correction software 2806. This software, listed above, then parses the case file and discovers corrections that can be made to the network. Once the corrections are made, the case file can be deleted. This type of internal operation is transparent to the end user, but critical to the normal operation of the primary preferred embodiment.

The display software 2832 also uses temporary case files when it is required to display certain information to the screen. It parses larger case files into smaller case files so specific information can be analyzed, displayed, and outputted back to the system for further diagnostics. The temporary case files are again transparent to any user's perception.

Specific examples of a case file being used by the display software 2832 is if a user looks at a larger case file 2820 and then decides to only display certain information (time frame/geographic region/etc). The new display creates a new smaller case file. If the user finds a problem, he can submit the smaller case file for manual correction by the fault diagnostic and correction software 2806. When this process is done, the temporary case file is again deleted leaving the only original file.

Circumstances under which temporary case files are not deleted are when a system administrator sets the system to retain these files for debugging or for validation reasons. Modifications to the network by the fault diagnostic and correction software 2806 may need to be checked by engineers after the system makes changes. In this case, retention of the temporary case files is critical.

Manual deletion, or time marked deletion (delete temp files older than a certain age) is also possible by setting customizable configuration options.

These listed uses of case files are in no way limiting to the scope of this claimed patent. Derivations and extensions of these ideas are completely within the scope of this patent, and in no way exceed the spirit in which the herein claimed embodiment is expressed.

Pro-Active Tuning of a Wireless Device Network

Where the primary embodiment of the said patent refers to analyzing the wireless network 100 for errors and then the resulting said processes, there exists the ability for the Network Tuning System (NTS) 2800 to take a pro-active role in network tuning. To allow this possibility to occur, the network must be able to support additional overhead processing. The pro-active tuning requires that the physical hardware used to run the MTX 130 will have enough processing clock cycles and available RAM and storage stage to accommodate this addition. As processing ability various by MTX 130 design and original provisioning of resources, it is simply stated that the resources will have to be added if they cannot be repositioned from the current architecture.

The NTS 2800 primary role is to monitor a plurality of sectors or clusters (group of geographically close sectors) for load bearing factors. As a wireless network increases its user load, or due to many other factors, optimum performance is often not obtained. The increased user load can often result in loss of coverage for wireless subscribers. Using the ULD 900 to locate wireless devices and then analyzing network parameters; the pro-active approach allows the NTS 2800 to compensate for various factors the influence network performance.

Network engineers currently using current industry methods can only design one configuration, which runs until a problem is encountered. At that point, the NTS 2800 could make changes or the network engineer could make modifications based on the network tuning systems reported data and/or recommendations.

Network Factors

Factors that can cause the network to perform poorly can occur for varying reasons, and at varying times. The results are the same however, that the perceived Quality of Service, or QoS, is reduced for the user. The primary factors are:

Thermal interference
Active Wireless Unit Density
Terrain Interference
Network Equipment Performance Thermal Interference Thermal interference causes Radio Frequency (RF) interference in the RF bands used by wireless subscribers of wireless networks. The core result is that the range a wireless device 104 (cellular phone for example) on a radio tower and BTS network 108 may transmit is reduced significantly. The reduction occurs because the receiver cannot recover the signal in the presence of the thermal noise.

The significance of the noise is that is causes the affective range of a radio tower and BTS network 108 coverage to be reduced. Based on the level of solar activity by the sun this can vary during the daylight hours. The amount of direct daylight is closely proportional to the level of thermal interference causing the strongest periods to be at mid-day and the weakest and sunrise and sunset.

The direct daylight causes the affective area of wireless coverage to vary as the time of day does. Secondly, at nighttime when thermal interference is less; signals can be received/transmitted at much greater lengths. At nighttime the wireless coverage becomes larger than during daylight hours. The primary goal by the pro-active ability of the NTS 2800 is to reduce or eliminate coverage loss due to shrinking radio tower and BTS network 108 coverage area. A secondary goal is to reduce the cross-interference of radio tower and BTS networks 108 when thermal noise is less.

Active Wireless Unit Density

Another factor in network coverage is active wireless unit density. Active wireless unit density primarily concerns CMDN/CDMA2000 and other spread spectrum technologies, but has minor implications in technologies such as TDMA, GSM, and other frequency division protocols. The reason that the factor is more affecting to spread spectrum protocols is that due to the fact that users share the same bandwidth, RF activity by individual users are seen as interference to others. The wireless density causes the noise floor to rise and results in a similar situation as in the thermal noise case.

Technologies such as frequency division typically use guard bands to prevent intra-cluster interference from happening to users in close geographic proximity. There can still be a problem though when frequency reuse levels allow users in relatively close geographic proximity to interfere with each other RF signals.

The typical case would be to consider a sector of a CDMA network. (Note, that this is a real situation using hypothetical numbers that closely approximate actual performance) With only one user, a radio tower and BTS network 108 can send and receive signals to a wireless device 104 at a range of 10 km. When a second user in close proximity to the first user and in the coverage of the radio tower and BTS network 108 becomes active, the second user begins to interfere with the wireless device's ability to recover signals from the radio tower and BTS network 108. The Ec/lo reduces from the wireless devices perspective.

As more wireless devices become active, the Echo for each device reduces until the receiver in the wireless device reaches its detection threshold. At this point the wireless device can no longer receive a signal from the tower. The wireless device must move geographically closer to the radio tower and BTS network 108 to receive the signal. The trend tends to decrease coverage for all wireless devices on the sector.

Typical network planning allows for sector coverage overlap and prevents coverage gaps under ideal conditions. When highly dense areas of wireless phones are active, however, coverage may reduce to the point that the typical overlap is no longer present. The high density results in coverage gaps, and loss of wireless device service in the affected areas.

Terrain Interference

Terrain Interference is a factor that can be caused by either manmade or natural terrain objects. Man made objects can include:
New Buildings
Power Lines
Artificial Manipulation of natural terrain (cement)
Other man made objects Natural terrain interference can be caused by the following factors:
Foliage Density
New Foliage
Leaf Attenuation (density of leafs on Foliage)—Seasonal
Bodies of Water (water level, location, etc)
Rain
Snow Both natural and manmade factors tend to simply impede RE propagation and cause signal loss. The factors result in radio tower and BTS network 108 coverage that can vary in size. The affect of this is much more gradual than that of active wireless unit density with respect to time.

Network Equipment Performance

Network equipment performance inaccuracies are often the case for problems to go unnoticed by a network engineer. The system may be set to have a radio tower and BTS network 108 transmit at a particular power level, but in fact will not. The network equipment performance inaccuracies cause the actual field performance not to follow computer models.

The performance can be seen by evaluation of the sector as it communicates to users. Using the location of users from the ULD 900 the system can determine if the appropriate sectors are communicating with the device. If the incorrect sectors are communicating the transmit level and/or orientation should be changed on the radio tower and BTS network 108 to correct for the field inaccuracies in the equipment.

Network Compensation Techniques

To compensate for performance factors, the system dynamically adjusts the configuration of the network. The transmit power, intensity, or other transmit measure must be able to be adjusted from the MTX 130, to make the required changes. The system then can vary the performance dynamically, thus altering RF coverage properties of the network to compensate for the less than optimal network performance.

An additional adjustable factor that is not required but is useful when correcting network hardware performance issues is a variable orientation control for radio tower and BTS network 108 sectors. The variable orientation control would however require additional hardware to be installed to allow remote orientation control of radio tower and BTS network 108.

Thermal Noise

Thermal noise in most cases affects all sectors of a wireless device network relatively equally. The exception is when antennas and hardware on the sectors are exposed to varying amounts of sunlight due to mounting design or location (in a shadow, etc).

Figure 48:
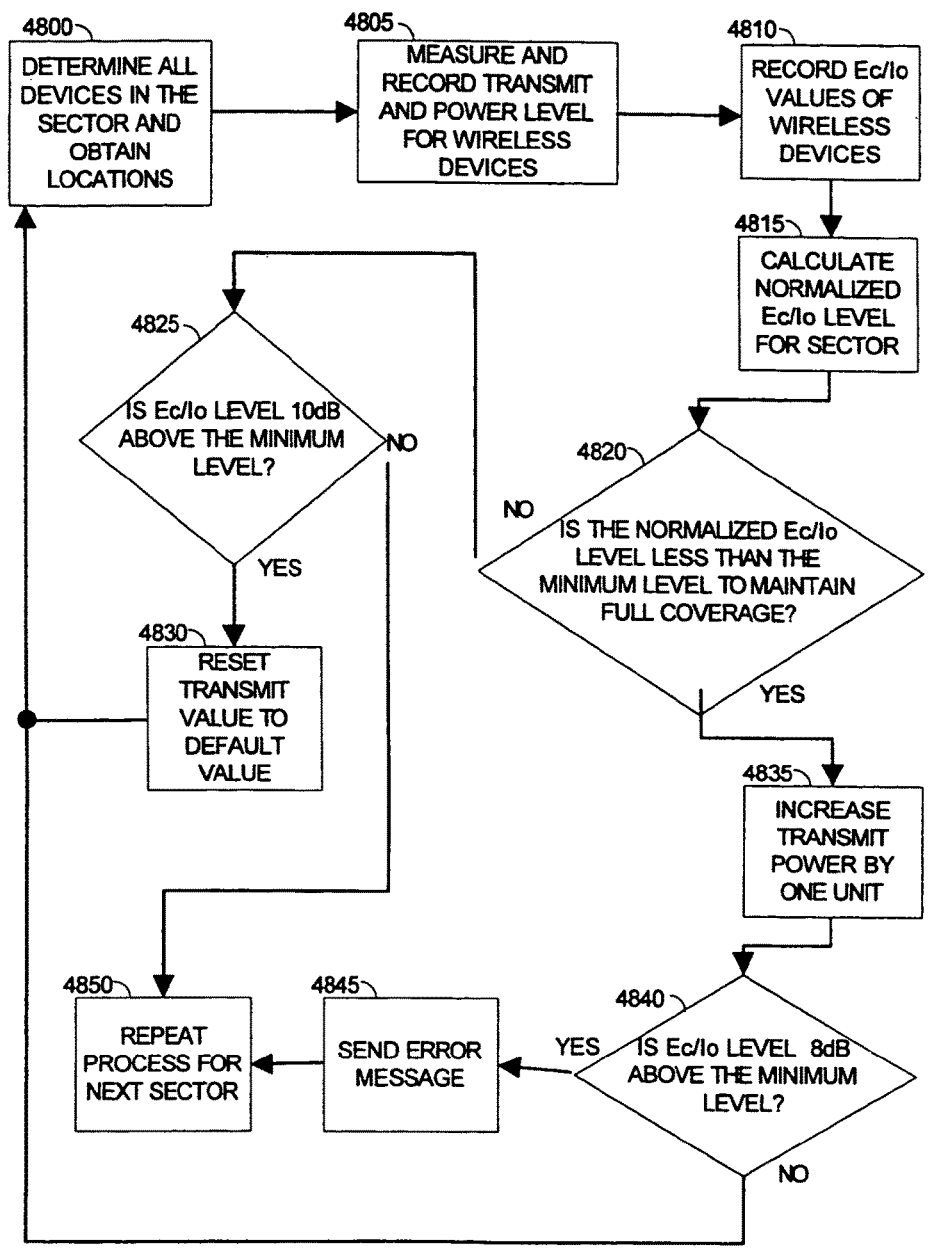

The coverage area must be broken into sectors. Computer simulations establish the coverage zone for each sector using ideal factors. FIG. 48 describes the process for each sector. Each sector undertakes the following process. To adjust for thermal noise interference, the system must first establish the location of all active wireless devices in the predicted coverage zone for a sector 4800. When the NTS 2800 obtains the location for each device from the ULDIULDC 900/908 or other method, the NTS 2800 records all send and receive powers all devices communicating with the sector via the BSC 300, BOX 4805.

The measurements are used as follows. The wireless device will transmit at a particular level and report its transmittal strength and/or Ec/lo 4810. The radio tower and BTS network 108 receives the signal from the devices and receives and calculates the normalized Ec/lo for the entire sector 4815.

The network engineer establishes a typical free space loss per unit distance and establishes a minimal Ec/Lo value for the entire sector. The minimum value can be an included item in the configuration file so the free space loss per unit distance is available to the software. To establish a minimum value for loss, nighttime measurements would be ideal. The NTS 2800 compares the normalized sector base loss with the minimum loss value. The resulting number indicates the amount of noise affecting the signal 4820. To insure that the noise is mainly due to thermal conditions, the system can also mathematically remove the added noise by other devices by subtracting the power levels at the distance from the secondary device to the primary devices. The system then increases Ec/lo levels to a ratio that compensates for the reduction due to thermal noise. In other words, calculate the amount of reduction in Ec/lo due to thermal noise, and then increase the transmit power of the sector until it has increased the Ec/lo values to target levels. The increase should be such that the Ec (energy per chip) increases the ratio back to the base level.

If the recorded Ec/lo value of the system is above the normal level by greater than 10 dB when the above calculations are done 4825, the system should reset the transmit power level to its default value and then resample the sector to attempt to get the Ec/lo to be at a level that compensates for thermal noise 4830. If the Ec/Lo value is less than 10 dB above the minimum value 4825, the NTS 2800 repeats the process for the next sector 4850. If the Ec/lo level is less then the minimum value to maintain coverage, the system should increase the transmit power by some small unit 4835. If the Ec/lo level is 8 dB above the minimum level 4840, the NTS sends an error message to the network engineer 4845. The NTS then repeats the process for the next sector 4850. If the Ec/lo level is 8 dB below the minimum level 4840, the NTS repeats the process for the same sector 4800.

Active Wireless Unit Density

Figure 43:
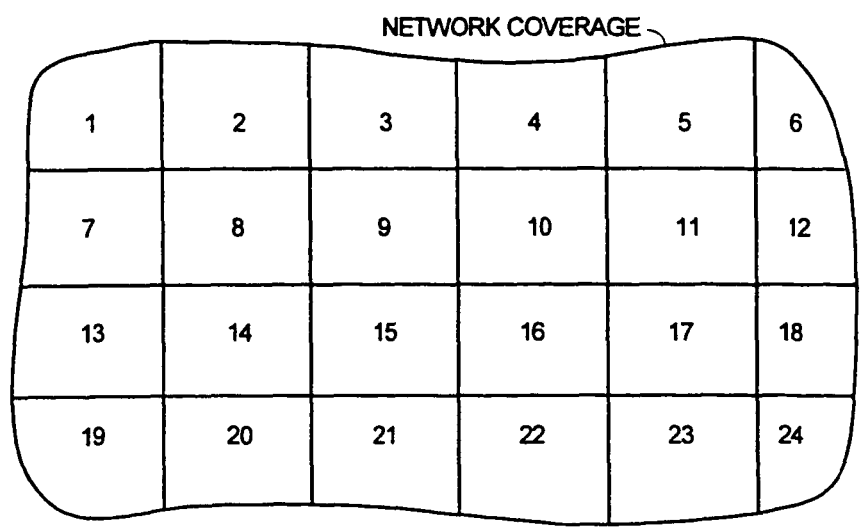
Figure 49:
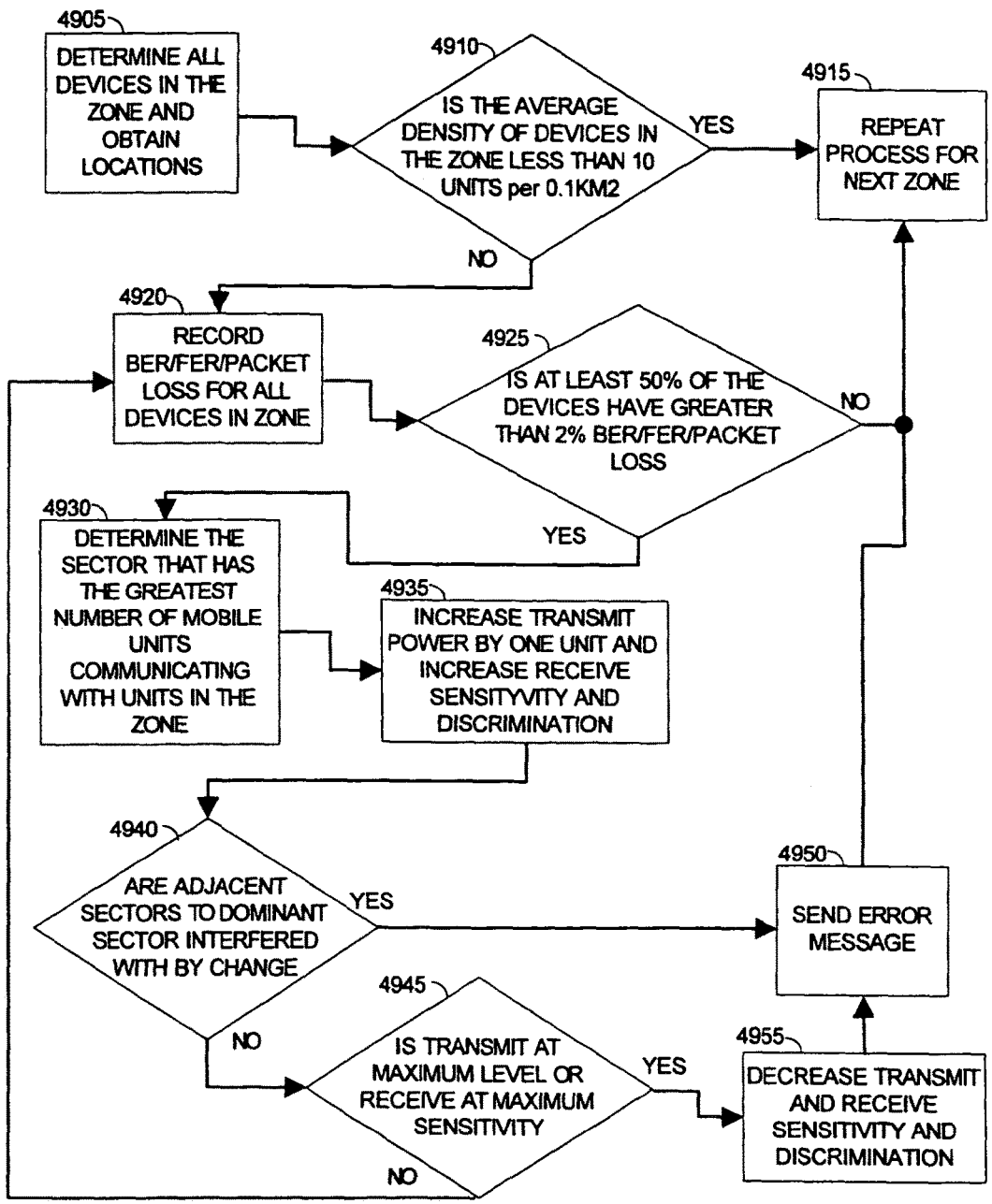
Figure 50:
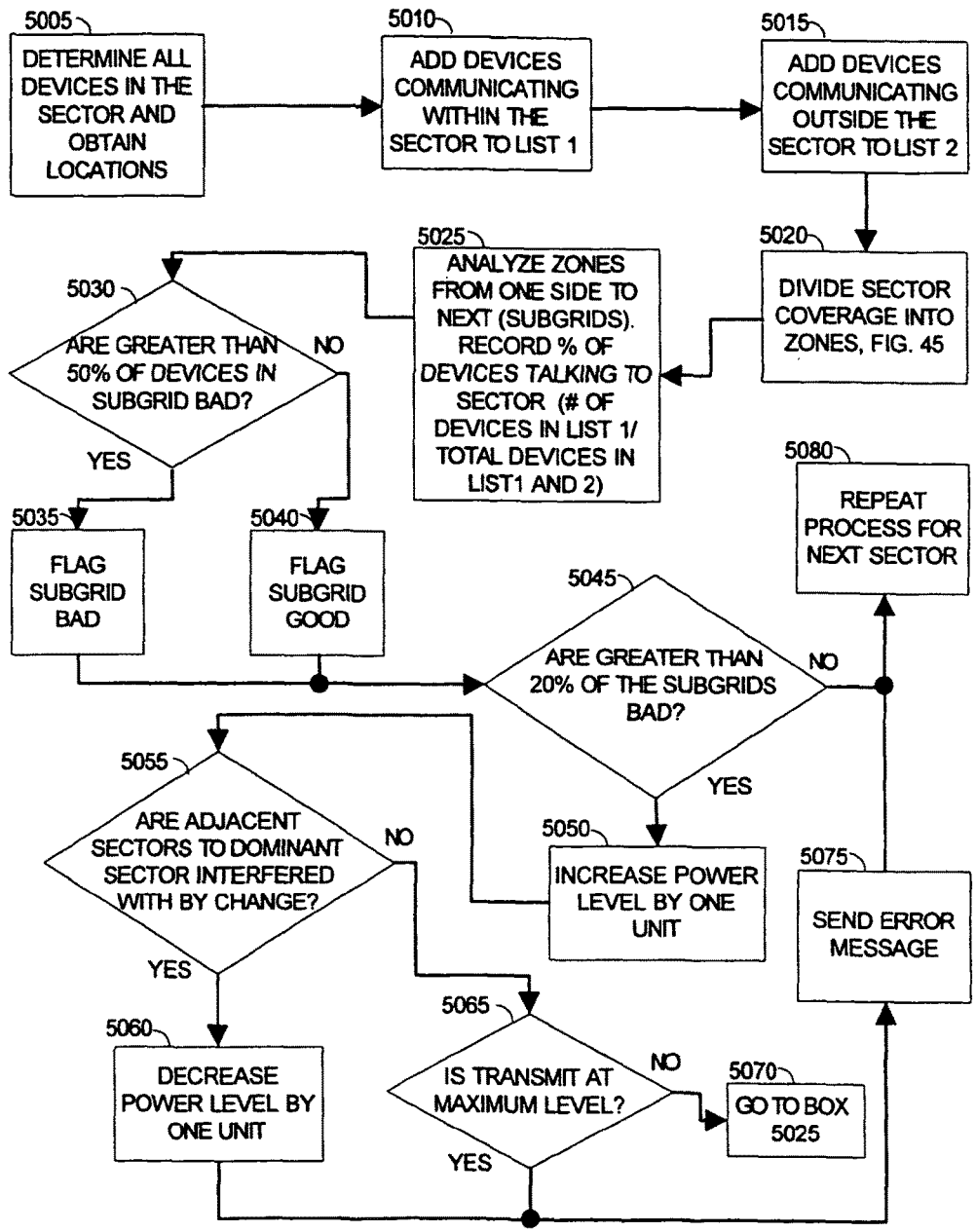

FIG. 49 displays the process to tune a wireless network using the active wireless unit density. To tune the wireless network by active wireless unit density, the NTS 2800 breaks up the coverage area into grids. An example of a grid layout is presented in FIG. 43. The number of zones will be determined by the size of the network and the size of each zone. Each zone should be in the range of 0.05-0.25 square-km in size. The zones are analyzed one at a time; say zone 'n' of "m" total zones.

To compensate for active wireless unit density, the network must first determine the location of all the mobile units in a particular area 4905. To get the location of all the wireless devices, the system can submit the coordinates of the zone to the device location software 2808 of the NTS 2800 that queues the ULD 900 for the location of the devices in the sector. It may also retrieve location results via GPS information or direct query of the BSC/MTX 118-A/130.

When the location has been determined for the wireless devices, the system then determines other sectors currently communicating with the wireless devices. Because QoS is the primary goal and wireless density is a very rapidly changing factor, the Packet loss, Bit Error Rate (BER), or Frame Error Rate (FER) are good standards for measuring the QoS for users. A general practice is that above 2% on any of these parameters is unacceptable for users. A network engineer could however choose the value of this percentage at their discretion for any network configuration.

The NTS 2800 checks if the average density of wireless devices is less than 10 units per 0.1 km$^2$ 4910. If the average density is less than 10 units per 0.1 km$^2$, the NTS 2800 repeats the active wireless unit density tuning process for the next zone 4915. If the average density is greater than 10 units per 0.1 km$^2$, the BER/FER/Packet Loss value is calculated for each wireless device in the zone 4920.

Figure 44:
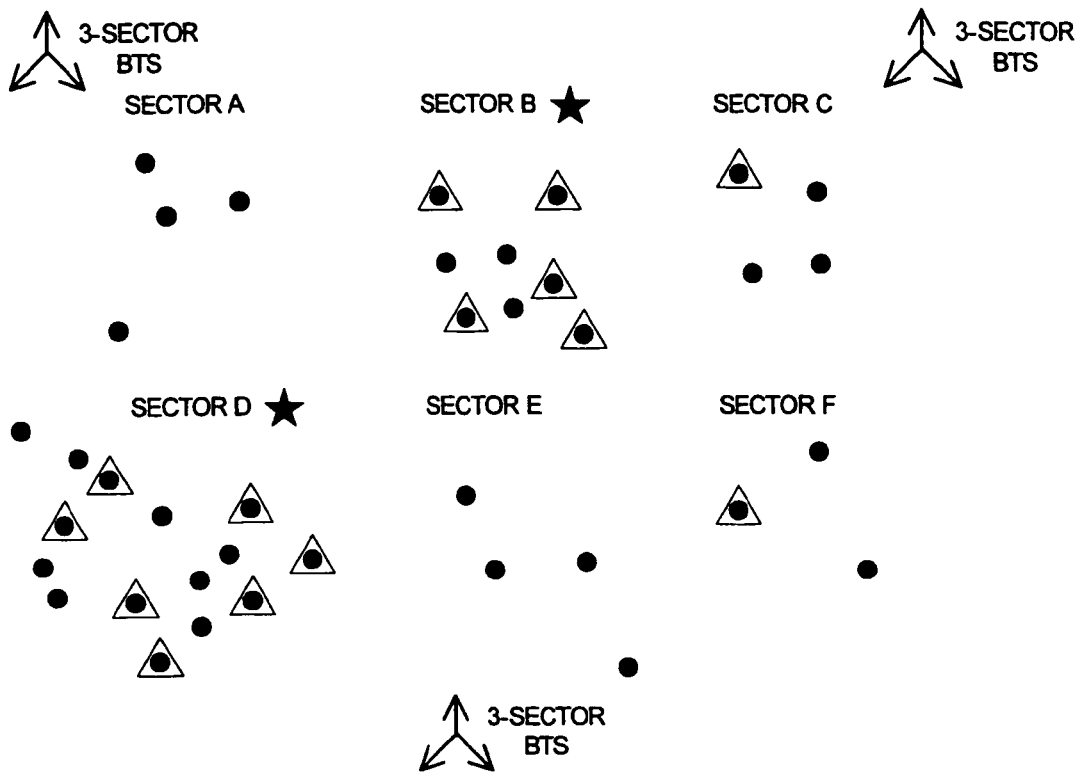

The NTS 2800 determines if of the users are experiencing BER, FER, etc of over the threshold limit 4925. Commonly published studies have shown that if 50% of users with a wireless transmit density of 10 wireless units per 0.1 sq km are experiencing error rates greater than 2-20% than they are with a 75-90% likelihood interfering with each other and reducing QOS and coverage. FIG. 44 shows a typical layout in a wireless network with 3 sector BTS's. Zones B and D have greater than 50% of the active units transmitting with greater than 2-20% BER/FER. QoS is the best measure of network perceived usability and these factors (BER, etc) are used as a gauge by this embodiment to prevent coverage gaps.

Next, the NTS 2800 determines which sector has the largest percentage of users in the zone 4930 and increases the transmit power of the BTS 108 by one unit 4935. A typical power increase increment would be 1-1 0dBmW for the transmit strength. The system then checks the geographically adjacent sectors and makes sure that the unique users on those sectors are not affected by the change (no increase in BER and other determining factors) 4940. If adjacent sectors are interfered with, the NTS 2800 sends an error message to the network engineer 4950 and the NTS 2800 processes the next zone 4915. If adjacent sectors are not interfered with, the NTS 2800 checks if the maximum transmit power is reached 4945.

The maximum level prevents 'overshoot', which is when a sector will project its RF inadvertently into distant sectors coverage. A typical limit could be in the range of 5 dBmW to 100 dBmW. If the transmit power has not reached the maximum level 4945, the NTS 2800 repeats the process starting with recording the BER/FER/Packet Loss 4920. The system will then continue to increase transmit power until the percentage of users failing the 2-20% criteria has either been reduced to below the designated level 50% in spot areas (or another network-engineer prescribed level) or the increase causes an increase in the BER of adjoining sectors polled. If the maximum level is reached, the system sends a report to the network engineer 4950. The NTS 2800 then analyzes the next zone 4915.

The technique should be done on every zone in the network. The frequency of the polling and resulting adjustments should be fast, so as stated, adequate processing ability should exist.

Terrain Interference

Terrain interference has in some cases limited recoverability in network performance by the pro-active system. In most cases the obstruction cannot be overcome by parameter modifications. To begin the system should query the ULD 900 for the location all wireless devices in the 'theoretical' zone of coverage for a sector 5005. This 'theoretical' zone consists of a predefined geographic area that network engineers expect full coverage from for any giver sector on a radio tower and BTS network 108. Such geographic zones are usually determined during initial network provisioning and are updated when physical changes in RF equipment are made.

A list of all the sectors that all wireless devices in the theoretical zone are communicating with are listed. Devices that are communicating with the sector being diagnosed are kept in a list (or database entry, file, etc). A list of these sectors, for naming purposes it is called list one, is made for diagnosis. The devices in list one consist of all devices that are both in the theoretical zone and communicating with the sector being diagnosed 5010. A second list, for naming purposes list two, should be created that contains all devices in the theoretical zone that are not talking to the sector being diagnosed 5015. Basic interpretation of list two will show all the devices that cannot communicate with the sector being diagnosed. With the exception of software errors, the primary reason is lack of RF coverage from the sector. Software errors can be ruled out by the network tuning system or by a qualified RF engineer using commonly known techniques in the field.

Figure 45:
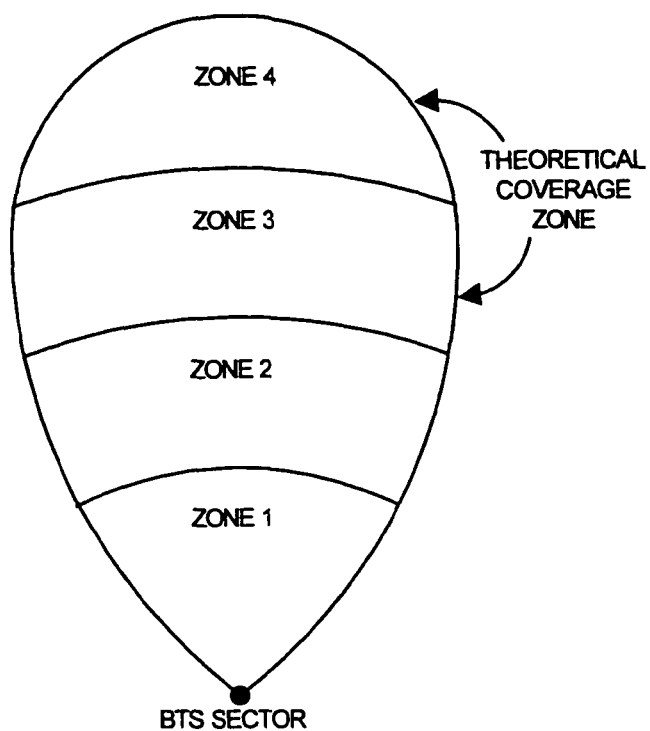
Figure 46:
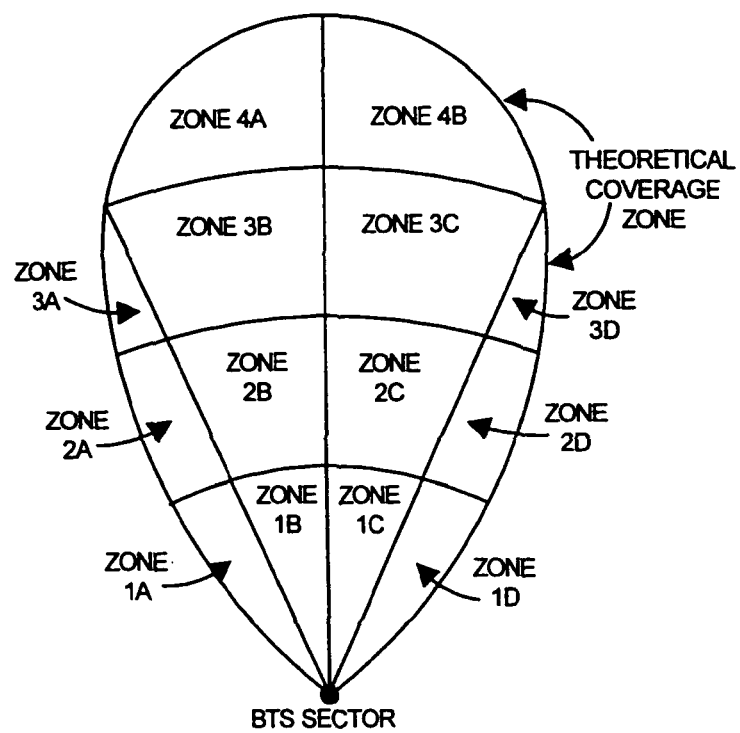

The performance evaluation should be done in zones 5020. The zones can be defined by percentages of distance from the radio tower and BTS network 108 to the theoretical ending of coverage for the sector FIG. 45. Another defining range could be in units of distance, for example meter, miles, feet, etc. There can be an arbitrary number of zones in the system. Further expansion of this method that would only need additional software programming, and does not take away from the novelty of this design, would be to add additional zones in a radial pattern from the radio tower and BTS network 108 in FIG. 46. A radial pattern allows multiple zones at the same distance from the radio tower and BTS network 108. Examples of zones in a 4-zone non-radial divided system are:

Zone 1—0%-25% distance from Sector
Zone 2—25%-50% distance from Sector
Zone 3—50%-75% distance from Sector
Zone 4—75%-100% distance from Sector The zones should be scanned starting from 1 to 4. For a radial divided system, the sub zones should be examined from one radial side to the other, in a sweeping direction that repeats in the same direction for each zone. The scanning should examine list one. List two does not need to be examined because devices are not talking to the sector and would waste both time and resources.

Figure 47:
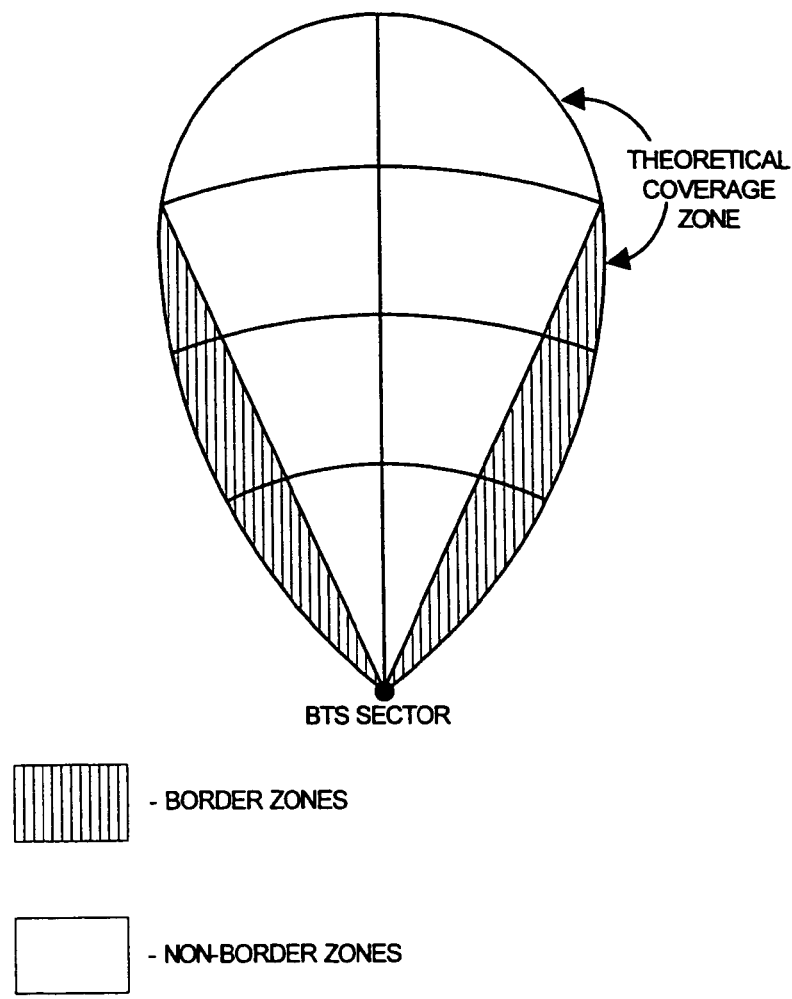

For each zone a calculation of the percentage of devices in list one versus the over all devices in list one and two for each sector should be made 5025. If less than 50-80% of the devices in a zone (or sub-grid) are communicating with the radio tower and BTS network 108 sector then an obstruction may exist 5030. Each sub-grid is flagged either bad or good depending on the communications of the devices in the zone 5035, 5040. In most cases, the problem areas will result at the extreme edges of the theoretical zone. A second calculation should then be made to calculate the overall coverage of this sector 5045. The best method is to first disregard all zones on the edges (border zones) of the theoretical coverage FIG. 47. The disregard of border zones is most appropriate in radial divided zoning displayed in FIG. 46.

With the zones disregarded, the percentage of zones that failed the first criteria (less than 50-80% of the devices in a zone (or sub-zone) are communicating with the radio tower and BTS network 108 sector) should be calculated 5045. If over 1-20% failed than the system then can attempt to increase transmit power to compensate for this problem 5050. The power is increased one unit level at a time (as listed in the configuration file). The NTS 2800 checks the power against adjacent sectors as it was with the wireless density factor resolution process as described in this embodiment 5055. If the wireless density causes interference with an adjacent sector, the NTS 2800 reduces the level by one unit 5060, sends an error message to the network engineer 5075 and then moves to analyze the next sector 5080. If there is not interference with adjacent sectors 5055 and the maximum power is not reached 5065, the NTS 2800 reanalyzes the zones 5070. The power should be increased until less than 20% of zones in the fail the second calculation (over 1-20% failed) or until a threshold limit is reached on transmit power 5065. If a limit is reached an error message is sent to the network engineer 5075.

Figure 51:
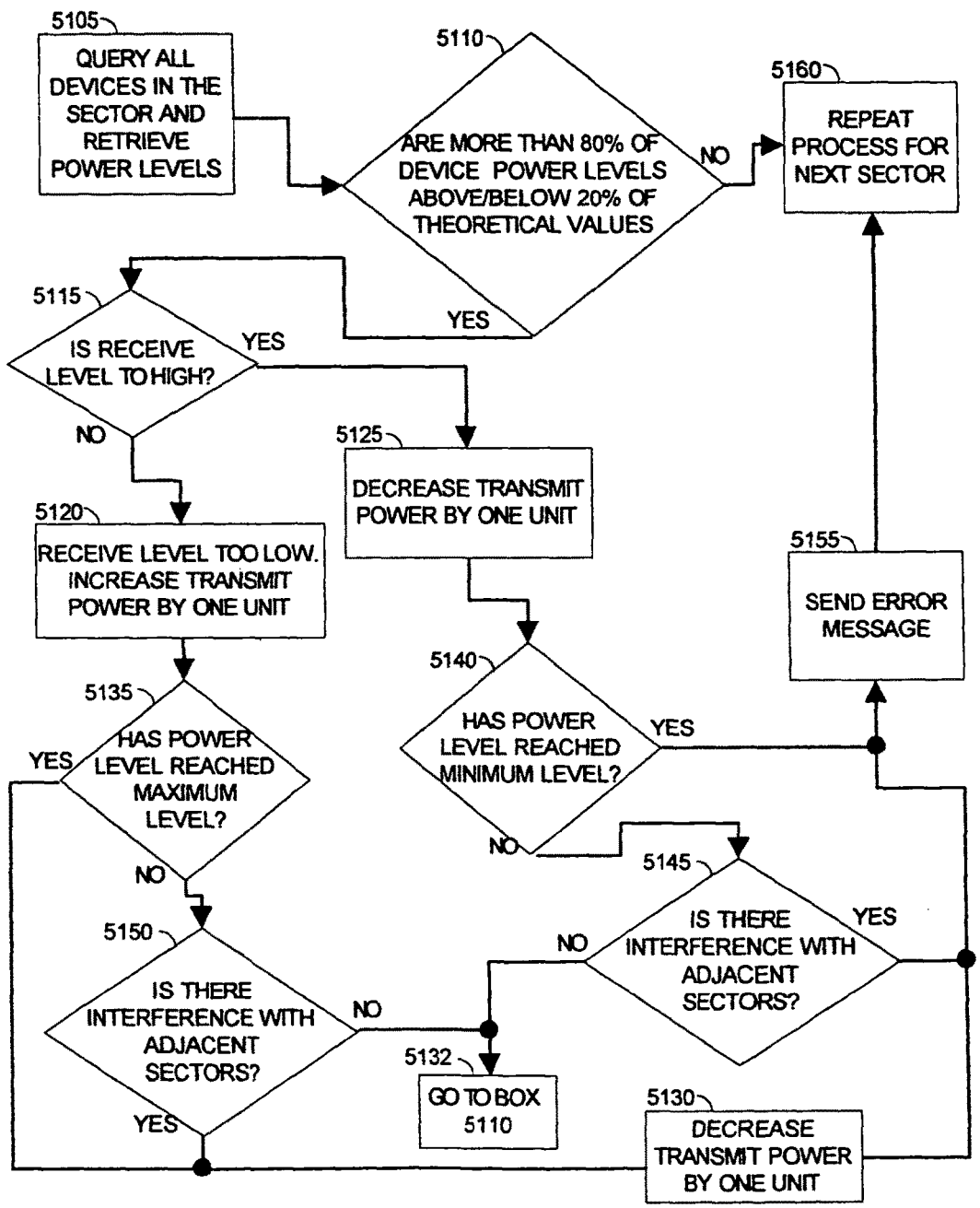
Figure 52:
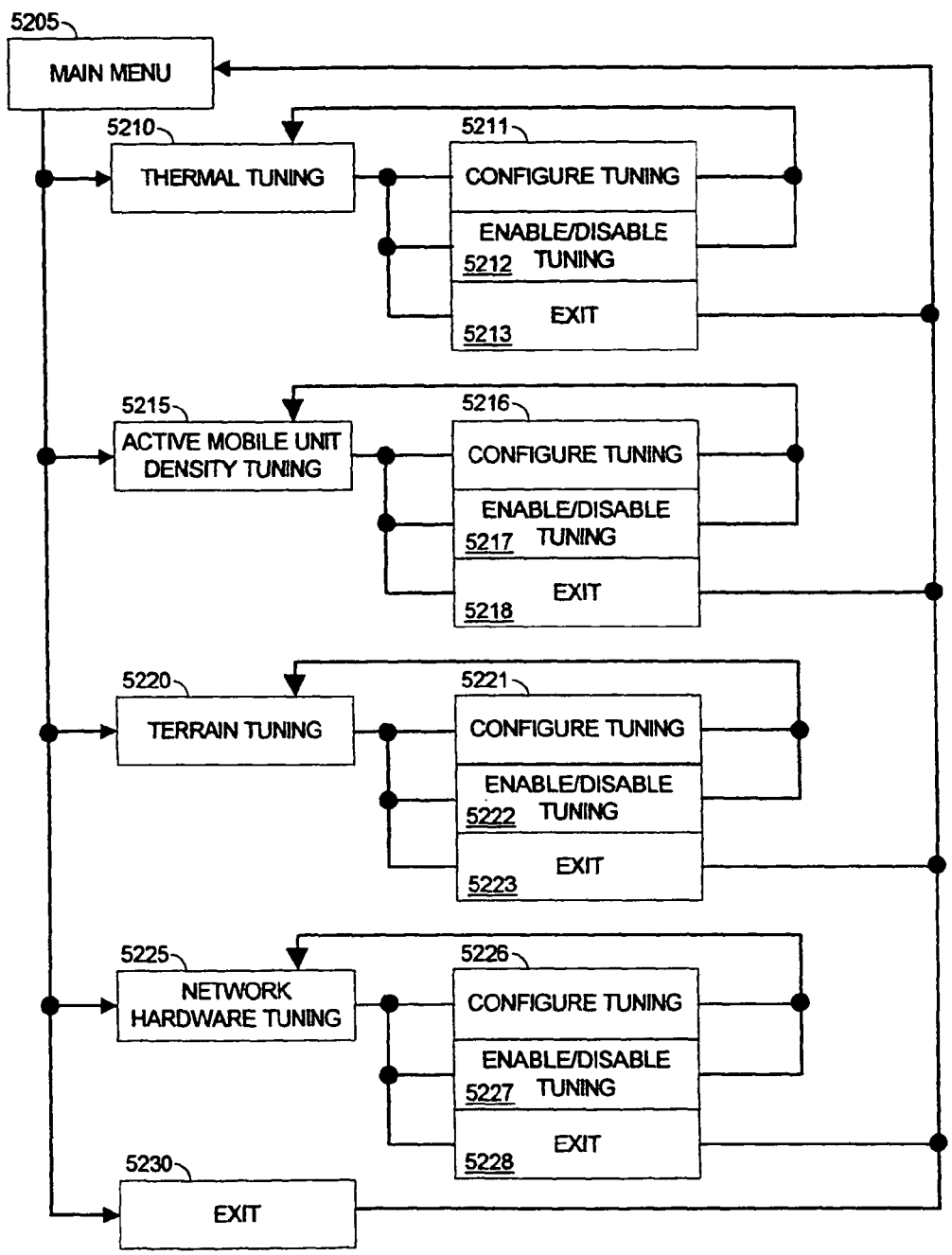

The technique should be done on every sector in the network. The frequency of the polling and resulting adjustments should be fast, so as stated, adequate processing ability should exist Network Equipment Performance The network equipment performance of a network can be evaluated by comparing simulated results to actual numbers. FIG. 51 displays the process to analyze a wireless network using network equipment performance. The NTS 2800 queries the location of all devices on the theoretical coverage of a sector (say sector "n" of "rn" total sectors in the network) from a ULD 900 and then the received powers (relative to wireless device) are recorded 5105.

The figures are compared against theoretical numbers for the antenna arrays and their power relative to the locations for wireless units communicating to the hardware. If the measured power levels (receive level) are to off by +/−20% (compared to theoretical predicted values for the current transmit power) for 80% of the devices then the network equipment is most often the cause 5110. If the receive level is to high 5115, the NTS 2800 decreases the transmit power by one unit 5125. The NTS 2800 then checks if the minimum power level has been reached 5140. If the minimum level has not been reached, the NTS 2800 checks for interference with adjacent sectors 5145. If there is no interference, the NTS 2800 repeats the process again for the same sector 5132. If the minimum power level is reached 5140, or there is interference with adjacent sectors 5145, the NTS 2800 sends an error message to the network engineer 5155, and repeats the process for the next sector 5160.

If the receive level is too low, the NTS 2800 increases the transmit power by one unit 5120. The NTS 2800 then checks if the maximum power level has been reached 5135. If the maximum level has not been reached, the NTS 2800 checks for interference with adjacent sectors 5150. If there is no interference, the NTS 2800 repeats the process again for the same sector 5132. If the maximum power level is reached 5135, or there is interference with adjacent sectors 5150, the NTS 2800 decreases the transmit power by one unit 5130, sends an error message to the network engineer 5155, and repeats the process for the next sector 5160.

Implementation with Network Tuning System

Implementation using the Network Tuning System requires individual components to perform special functions to accommodate the added functionality of the pro-active monitoring features. The additional features add to the ability of the tuning software allowing it to both correct faults in the system reactively but also proactively monitor and optimize the network to reduce the faults from occurring in the first place.

Figure 42:
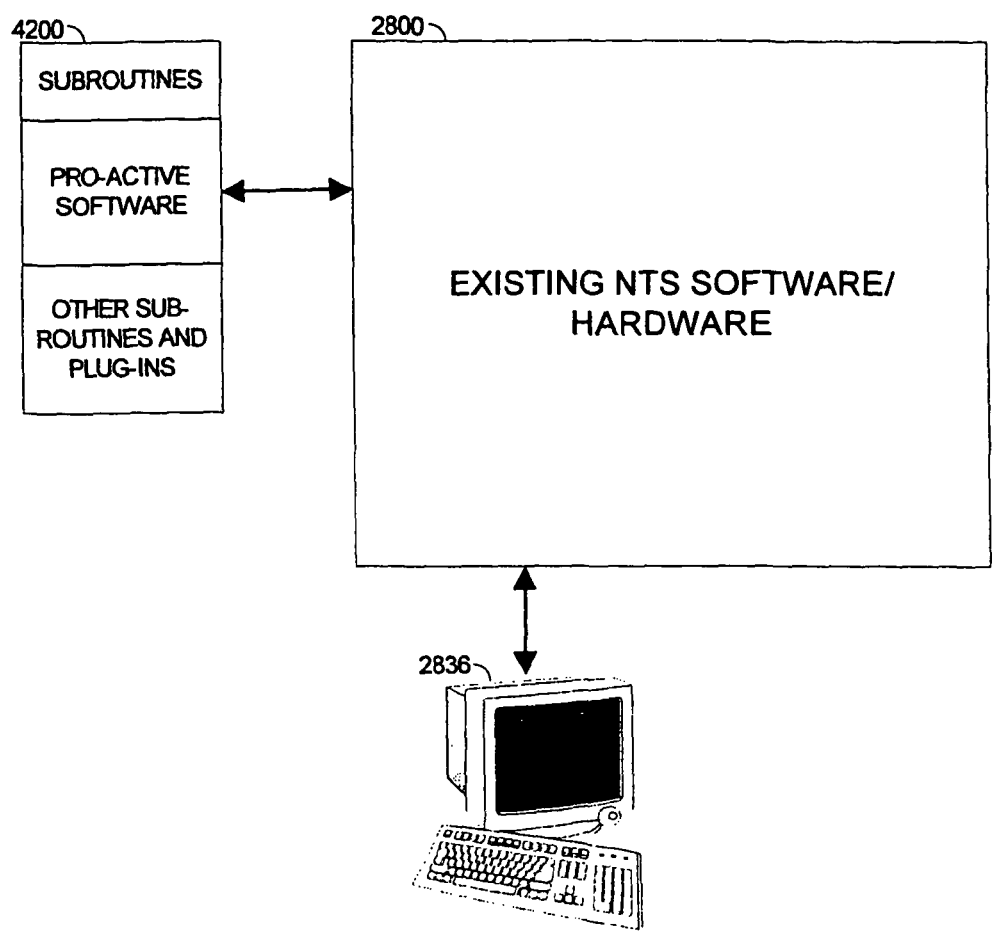

As stated, the pro-active software 4200 can access the components of the network tuning system 2800. The primary analytic software 2814 on the NTS 2800 will run the pro-active software 4200 as an additional subroutine FIG. 42 and integrate pro-active software 4200 with its native components. The proactive software 4200 can integrate into the NTS 2800 native software structure. The below components of the NTS 2800 are described in regards to their interaction with the pro-active software 4200 and any modifications necessary to allow the NTS 2800 and pro-active software 4200 to integrate seamlessly. The NTS 2800 reference numbers refer to the NTS FIG. 28.

Monitoring Software (2802)

The monitoring software 2802 in the NTS 2800 is responsible for monitoring the network for error codes generated that indicate irregular network problems and or other indications. The monitoring software 2802 intercepts and decodes error codes produced by the BSC 118-A and interprets their effects on the wireless device. If the error is service affecting then the fault is sent to the primary analytic software 2814.

To modify the monitoring software 2802 to allow integration of the proactive system, the monitoring software 2802 should monitor for messaging other than just 'error-codes'. The system needs to monitor for network messaging on individual sectors and clusters of sectors. The primary analytic software 2814 sends a request to the monitoring software 2802 for the network parameters of a single or plurality of sectors. The typical parameters gathered by the monitoring software 2802 and returned to the primary analytic software 2814 for these 'new' types of queries are:

Echo Forward Link Statistics for active connections
Ec/Io Reverse Link Statistics for active connections
Receive Power Forward Link Statistics for active connections
Receive Power Reverse Link Statistics for active connections
Reverse Link Transmit Power Statistics for active connections
Forward Link BER/FER Statistics for active connections
Reverse Link BER/FER Statistics for active connections
Reference List of Mobile Identifiers for all Mobile Devices on Sector(s)
Other User Defined Variables BSC Access Control Software (2804)

The base station controller (BSC) access control software 2804 is responsible for interfacing the components and processes of the current invention with the BSC 118-A of a wireless network. The BSC 118-A contains all the call information as well as all the information on network faults. It should be noted that some wireless network designs have the network fault information stored elsewhere, and that the BSC access control software 2804 could be used to access that information at any other location also. The BSC access control software 2804 interacts directly with the BSC 118-A and the primary analytic software 2814 as well as the monitoring software 2804.

The monitoring software 2804 specifically uses the BSC access control software 2804 to retrieve network statistics such as Echo and Receive Powers from the BTS/Sectors(s) for pro-active queries of the pro-active software 4200.

Fault Diagnosis and Correction Software (2806)

The fault diagnosis and correction software 2806 is typically responsible for obtaining case files from the primary analytic software 2814 and generating a solutions and implementing changes to the network to resolve the problem. The modifications necessary to accommodate the pro-active software 4200 are a new set of protocols that are defined for pro-active network monitoring. The protocols are specifically designed to address the four issues: Thermal Interference, Active Wireless Unit Density, Terrain Interference, and Network Equipment Performance. The protocols as described in the 'Network Compensation' section allow the fault diagnosis and correction software 2806 to react to case files that contain the pro-active data and make appropriate changes to the network, as it would do for reactive 'fault' case files.

Device Location Software (2808)

The device location software 2808 is the package that when activated by the primary analytic software 2814 is able to retrieve information from a database such as a ULD 900, or a ULDC 908, that holds geographic information (as well as time, date of the acquired geographic information). Additionally, as an alternative embodiment this device location software 2808 can directly query the BSC 118-A and calculate the location of a wireless device 104, as instructed by the primary analytic software 2814. The device location software 2808 interacts directly with the BSC 118-A, the primary analytic software 2814, the User Location Database 900 and/or User Location Database Coordinator 1600.

To modify the device location software 2808 to allow integration of the proactive software's 4200 new features only limited changes must be made. The first change is that the queries from the primary analytic software 2814 must be given a higher priority than normal queries when they regard pro-active monitoring. When the primary analytic software 2814 queries the monitoring software 2802 for the network statistics of a single of plurality of sectors, the primary analytic software 2814 receives a list of wireless identifiers. The primary analytic software 2814 then immediately queries the device location software 2808 for the location of the said devices returned from the monitoring software 2802.

To allow for the location to be as synchronized to the data from the sectors, the location should be retrieved quickly. In this case, and messages queued with lower priorities should be bypassed and these queries should be processed first. In practice, the pro-active location queries should only be superceded by manual location submissions (or overrides by an administrator).

User Location Database Coordinator (1600)

No modifications to the User Location Database Coordinator (ULDC) 908 or similar software/hardware and necessary because it is simply used as an intermediary to resolve the location of mobile devices.

User Location Database (900)

No modifications to the User Location Database (ULD) 900 or similar software/hardware and necessary because it is simply used as an resource to obtain the location of mobile devices.

Geographic Information Database (2810)

No modifications to the geographic information database 2810 or similar software/hardware and necessary because it is simply used as an resource to obtain the mapping information that is not specifically needed for the pro-active software 4200 to operate.

Case Files with Lat/Long Correlations (2820)

Case files are typically created to contain the appropriate information for reactive diagnostics for the fault diagnosis and correction software 2806. For the case of a pro-active diagnostic to be performed by the fault diagnosis and correction software 2806, a modified version of the standard case file must be submitted.

The modifications to the standard case only need to include an additional database field indicating pro-active or reactive case files type. Having this field allows the fault diagnosis and correction software 2806 to determine what diagnostic protocols to use to analyze the case file. In the case of the pro-active field being marked, the system would use the new protocols listed in the 'Network Compensation Techniques' section.

Radio Tower Lat/Long Correlations (2824)

No modifications to the radio tower lat/long correlations 2824 or similar software/database entries and necessary because it is simply used as a resource to obtain the mapping and analytical iQformatiorl. Its uses are the same in the new configuration that includes the pro-active software 4200.

Internal Memory Storage (2818)

Additional memory should be added to allow the pro-active software 4200 to function with additional overhead and not require hard disk caching of data. The amount may vary by final software implementation and network hardware design. Software engineers using standard provisioning techniques should determine the final amount of additional memory.

Internal Central Processing Unit and Computer (2816)

Additional CPU processing power should be added to allow the pro-active software 4200 to function with additional overhead clock cycles and not encounter CPU maximum utilization at peak operating conditions. The amount of additional processing ability may vary by final software implementation and network hardware design. Software engineers using standard provisioning techniques should determine the final amount of additional processor ability.

User Interface Software (2826)

The modifications to the user interface software 2826 are simply to add additional menu systems to the software to allow integration with the pro-active software 4200. The following commands should be available for the user and be displayed by the display software for the user. The order and menu placement is suggested to be as follows:

Main Menu Item: Pro-Active Features
<Pro-Active Features>
Thermal Interference
Configure Thermal Interference
Activate/Deactivate Thermal Interference
Exit Thermal Interference
Active Wireless Unit Density
Configure Active Wireless Unit Density
Activate/Deactivate Active Wireless Unit Density
Exit Active Wireless Unit Density
Terrain Interference
Configure Terrain interference
Activate/Deactivate Terrain Interference
Exit Terrain Interference
Network Equipment Performance
Configure Network Equipment Performance
Activate/Deactivate Network Equipment Performance
Exit Network Equipment Performance Exit Pro-Active Menu In the manual verification mode any changes will not occur until a network engineer verifies the change. A list of suggested changes and the case file that is created will be sent to engineers as the changes are created. In auto correction mode all changes will be made immediately. To reduce any system catastrophes network wide changes are limited to certain tolerances in the diagnostic protocols to eliminate network instability issues.

Correlating Mapping Software (2828)

No modification to the correlated mapping software 2828 or similar software/hardware is necessary because it is not specifically needed for the proactive software to operate.

Correlating Data for Lat/Long Information (2830)

No modification to the correlated data for lat'long information 2830 or similar software/database entry(s) is necessary because its uses are the same in the new configuration that includes the pro-active software 4200.

Display Software (2832)

The display software 2832 does not need modified because it is used in the same way when the pro-active software is integrated.

Primary Analytic Software (2814)

The primary analytic software 2814 is the controlling software of the NTS and integrates all the elements into a single software package for a user. From the software, a user may access all features of the system and run either active, passive, or inactive modes. The pro-active system 4200 can integrate in the primary analytic software 2814 in the active and passive modes. However, many features can only be available in the active mode due to the real-time requirements for some pro-active tuning features. Passive mode will always prompt the network engineer before making changes and therefore is unrealistic for most pro-active features.

All features are available in the active mode while only the terrain and network features are available in the passive mode. The specific reason is listed below for each feature.

Thermal Interference—The ability for the system to react to thermal interference requires a CASE file to be generated frequently to record network performance factors that indicate thermal interference. A typical interval will be at 10-30 minute intervals. The primary analytic software 2814 then submits the changes to the fault diagnosis and correction software 2806 where modifications for pro-active diagnostics are implemented. The frequency in manual mode is to frequent for network engineers to manually approve each time. Active mode allows case files to be sent automatically and modifications to be made also.

Active Wireless Unit Density—Active mobile unit density is a rapidly changing factor that changes every second or faster. The processing ability and excess overhead internal trunking affect the time necessary to calculate density. CASE files are generated as fast as possible without affecting other vital processes. The system could not send network engineer approval requests before making changes.

Specific changes to accommodate the inclusion of the pro-active features are very specific. First, all CASE files created that are for pro-active features must have a flag set that indicates that fact. The flag allows fast routing of the diagnostics to be considered by new pro-active decision algorithms. Second, the system must first allocate additional processing power and other resources for pro-active features as the active wireless unit density specifically requires additional processing power that can take away from other processes.

User Interaction with the Pro-Active System

The user's primary interaction will be through the display software 2832 and will interact will the additional menu items. As described in the display software section, the user may access these menus to control the new features. Specific interaction and the results are listed below for all the new menu items. Also to be noted, the user may access this system using the existing tuning system's architecture that allows for remote access via intranet, Internet, and other devices.

Main Menu Item: Pro-Active Features 5205: The additional menu item appears at the main menu, which is presented to a user after logging on to the system and being authenticated.

Thermal Interference 5210: Selecting this feature enables the system to monitor and adapt to thermal interference.

Configure Thermal Tuning 5211: The selection allows the user to edit the thermal tuning configuration file.

Enable/Disable Thermal Tuning 5212: The selection toggles enable or disable thermal tuning.

Exit 5213: Exits the thermal tuning menu.

Active Wireless Unit Density 5215: Selecting this feature enables the system to monitor and adapt to active wireless unit density.

Configure Active Wireless Unit Density Tuning 5216: The selection allows the user to edit the active wireless unit density tuning configuration file.

Enable/Disable Active Wireless Unit Density Tuning 5217: The selection toggles enable or disable active wireless unit density tuning.

Exit 5218: Exits the active wireless unit density tuning menu.

Terrain Interference 5220: Selecting this feature enables the system to monitor and adapt to terrain interference.

Configure Terrain Tuning 5221: The selection allows the user to edit the terrain tuning configuration file.

Enable/Disable Terrain Tuning 5222: The selection toggles enable or disable terrain tuning.

Exit 5223: Exits the terrain tuning menu.

Network Equipment Performance 5225: Selecting this feature enables the system to monitor and adapt to network equipment performance.

Configure Network Equipment Tuning 5226: The selection allows the user to edit the network equipment tuning configuration file.

Enable/Disable Network Equipment Tuning 5227: The selection toggles enable or disable network equipment tuning.

Exit 5228: Exits the network equipment tuning menu.

Exit 5230: Exits the pro-active tuning menu.

Location Tracking System

Detailed Description of the Operations Drawings

FIG. 53

Figure 53:
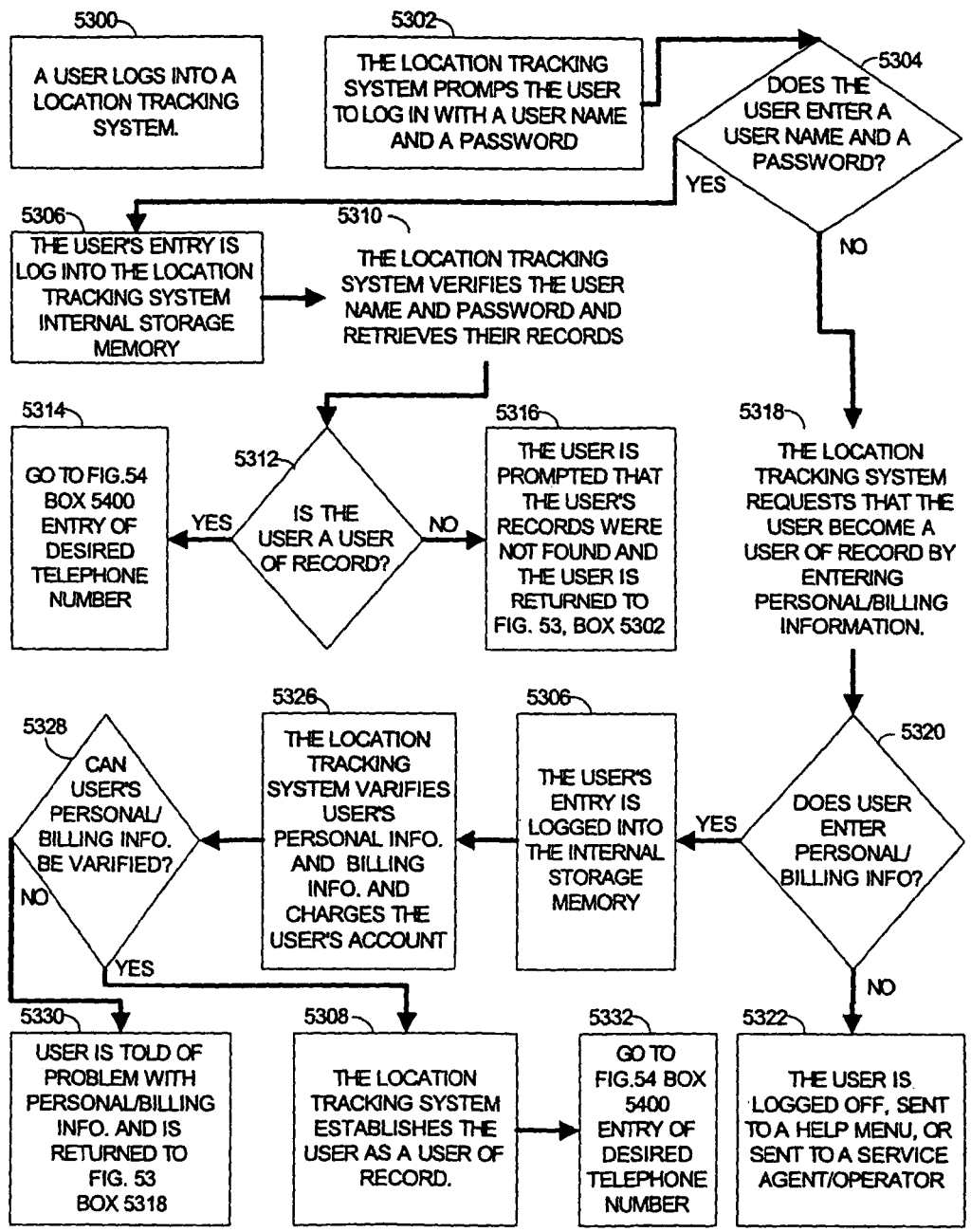

FIG. 53 is a flowchart illustrating the process of a user logging into the location tracking system (LTS) 5300. The LTS 5300 may be provided by a wireless service provider, an internet website provider, an asset tracking service, an employee tracking service, a personal tracking service or other types of service providers. The user accesses the LTS 5300 thru an internet 3202 website, a wireless interface, a wireless service provider, publicly switched telephone network 138, a fax on demand service, an automated telephone system, a laptop/desktop computer 2910, a PDA, a wireless device 104, or other types of devices.

Figure 54:
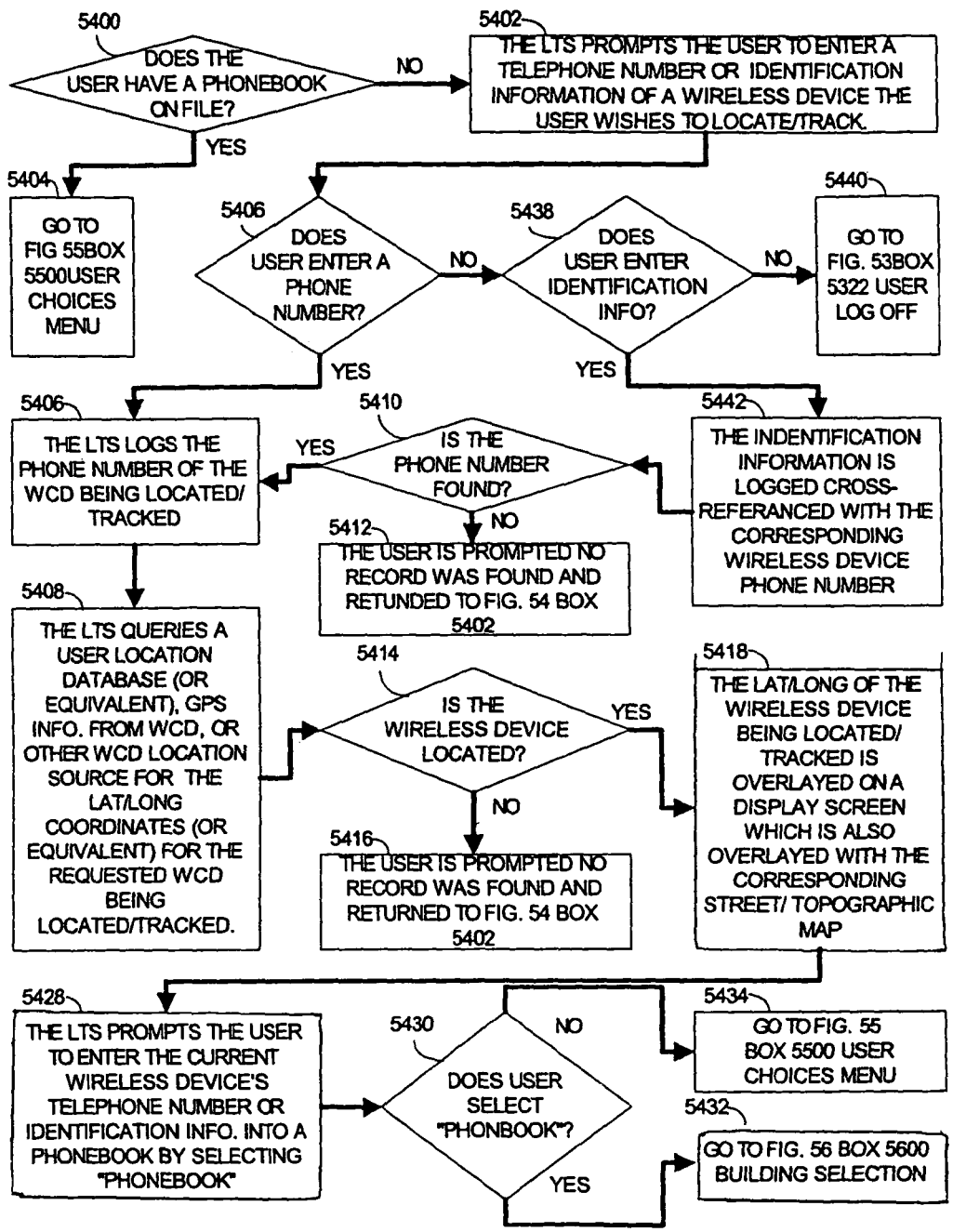

To begin the login process, the LTS 5300 prompts the user to enter a username and password 5302. The LTS 5300 then waits for the user to respond with a username and password 5304. If the user responds 5304, the LTS's 5300 internal CPU and computer 2816 logs the entered username and password 5304 into its internal storage memory 5306. The LTS 5300 checks the LTS's 5300 membership database for the username and password 5304. If the LTS 5300 finds the user's record 5312, the user then enters the desired telephone number, FIG. 53, BOX 5314. FIG. 54 displays the complete entry process. If the user's records cannot be found 5312, the LTS 5300 informs the user that there is a problem with the username or password 5302, and the user is returned to FIG. 53, BOX 5302, as shown in FIG. 53, BOX 5316. The LTS 5300 then prompts the user to enter username and password 5302.

If the user does not enter a username and/or password 5304, the LTS 5300 prompts the user to become a user of record 5312 by entering personal information and billing information into the LTS 5318. The LTS 5300 then waits for the user to enter personal and billing information 5320. If the user does not enter personal and billing information within a specified period of time 5320, the user is logged off 5322 the LTS 5300, sent to help menu or forwarded to a service agent or operator 5322, depending on the configuration of the LTS 5300 settings and the users choice. If the user enters personal and billing information 5320, the LTS's 5300 internal CPU and computer 2816 logs the personal information and billing information into its internal storage memory 5306. The LTS 5300 then attempts to verify the user's personal information and billing information 5326 by placing a call through a modem to the LTS's 5300 merchant credit card services account and charges to the users credit card 5326. If the user's personal and billing information can be verified 5328, and the users credit card is billed, the LTS 5300 establishes a user record 5312 by transferring the logging the personal and billing information from the internal storage memory 5306 to the LTS's membership database 5308. The user is then enters the desired telephone number, FIG. 53, BOX 5332. FIG. 54 displays the complete entry process. If the user's personal information and billing information cannot be verified 5328, the user is notified is a problem with their personal information and billing information and returned to FIG. 53, BOX 5318, as shown in FIG. 53, BOX 5330.

The user login, personal information and billing information are optional features of this embodiment. The LTS 5300 may be provided at no charge, or offered as a value added feature in conjunction with other services. Whoever, if the user wishes to utilize all the features of the LTS 5300, a login is required to enable the LTS 5300 to retrieve and access the user's settings and user's entries from the LTS's 5300 memory.

FIG. 54

Figure 55:
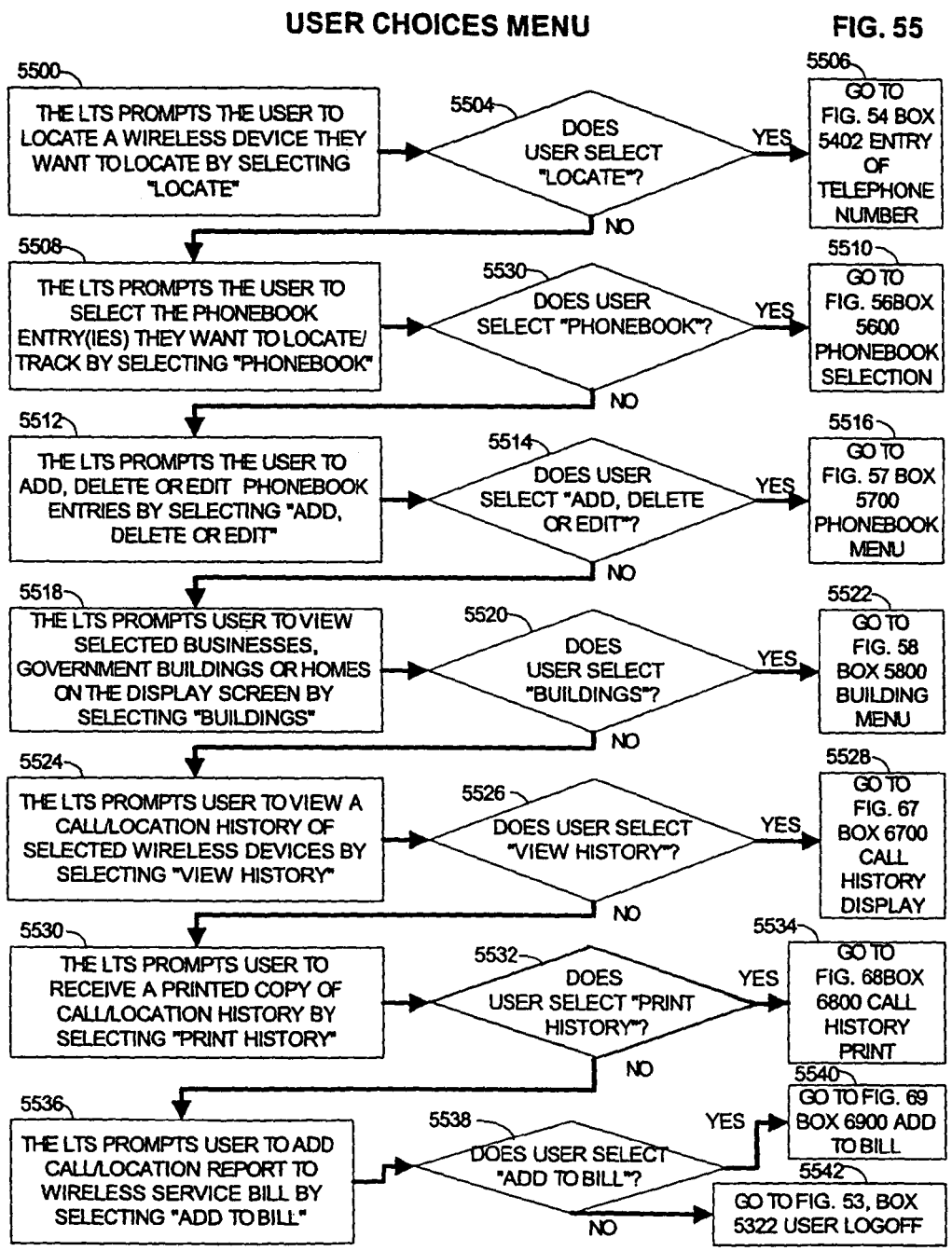

FIG. 54 illustrates the initial entry of a phone number that the user wishes to track. Once the user has logged onto the LTS 5300, the internal computer and CPU 2816 checks the users records 5312 if the user has a phonebook saved in the membership database 5400. If the user has phonebook entries saved as part of the user's records, the LTS 5300 gives the user menu choices, 5404. This process is illustrated in FIG. 55.

If the user has not previously saved an entry into the phonebook 5400, the LTS 5300 then prompts the user to enter the telephone number or identification information of the wireless device 104 the user wishes to locate and/or track 5402. The LTS 5300 then waits a specified period for the user to enter a telephone number 5406. If the user enters a telephone number for a wireless device 104 that they wish to track, the LTS 5300 logs the user's entry into the internal storage memory 5306. The LTS 5300 then queries a user location database (ULD) 900, user location database coordinator (ULDC) 908, access users case files 2820, queries the base station controller (BSC) 206 of a wireless network 100 with the LTS's device location software 2808 for the lat/long coordinates of the wireless device 104 being tracked, Global Positioning System (GPS) Information, or other means of obtaining locations of wireless devices 5406. The use of ULD 900, ULDC 908, and other location means is disclosed (offered only as an example of location means) in a Provisional Patent Application Ser. No. 60/327,327; and was files on Oct. 4, 2001. If the wireless device 104 is not located, the user is informed of the problem, and returned to FIG. 54, BOX 5402, as illustrated in FIG. 54, BOX 5416.

If the wireless device 104 is located 5414, the LTS 5300 receives the lat/long coordinates and displays the lat/long coordinates to the user in their choice of formats. For example, the location may by overlaid on a display screen 2836 along with a street map overlay 5418, a map of the overlaid screens may be faxed to a user via a fax on demand service, the location may be converted to a postal address 5422 or cross-street using the LTS's postal address conversion software 5422 and displayed on a screen 2836, faxed to a user, or read to a user over the phone using the LTS's 5300 automated answering system and voice text read-up software 5426. Once the wireless device 104 has been located and displayed 5418, the LTS 5300 prompts the user to enter the specific wireless device 104 into a user phonebook by selecting "phonebook" 5428. If the user selects "phonebook" 5428 to save the entry to their Phonebook 5430, the user is forwarded to the phonebook menu section, FIG. 56, BOX 5600, as illustrated in FIG. 54, BOX 5432. If the user does not select to save the current entry to their phone book 5330, the user is forwarded to the phonebook section of the user's choice menu FIG. 55, BOX 5500, as illustrated is FIG. 54, BOX 5434.

When prompted by the LTS 5406, if the user does not enter a phone number of the wireless device 104 they wish to locate and/or track, the LTS 5300 prompts the user to enter other identification information such as a persons name, company name, or other identifying information 5438. If the user does not enter identification information within a specified period of time 5438, the LTS 5300 logs off the user 5440. If the user enters identification information 5438, the LTS 5300 logs the user's entry, and the identification information is then cross referenced against the LTS's Cuss-Cross Phonebook database 2812 or other supplies sources to obtain the phone number for the desired wireless device 5442. If the LTS 5300 finds the phone number 5410, the LTS 5300 logs the phone number 5406, and the location process continues as described as if the user entered the number described above 5408. If the phone number of the wireless device 104 cannot be located in the Criss-Cross Phonebook database 2812, the LTS 5300 informs the user the number could not be found and prompts the user to enter a phone number 5412.

FIG. 55

FIG. 55 illustrated the processing of the user's choice menu 5502. The user's choice menu's 5502 physical realization may be in the form of a display screen 2836 navigated by a mouse, keyboard/keypad, interactive display screen, voice recognition or other forms of selection. The user's choice menu 5502 also may be an automated answering system and could be navigated by voice recognition, a keyboard/keypad or other forms of selection.

Initially, the LTS 5300 prompts the user to enter a phone number of a wireless device 104 that the user wants to locate or track by selecting 'locate" 5500. The LTS 5300 waits a specified period for the user to select 'locate" 5504. If the user responds by selecting 'locate" 5504, the LTS 5300 asks the user to enter a phone number by the process described in FIG. 54, FIG. 55, BOX 5506.

Figure 56:
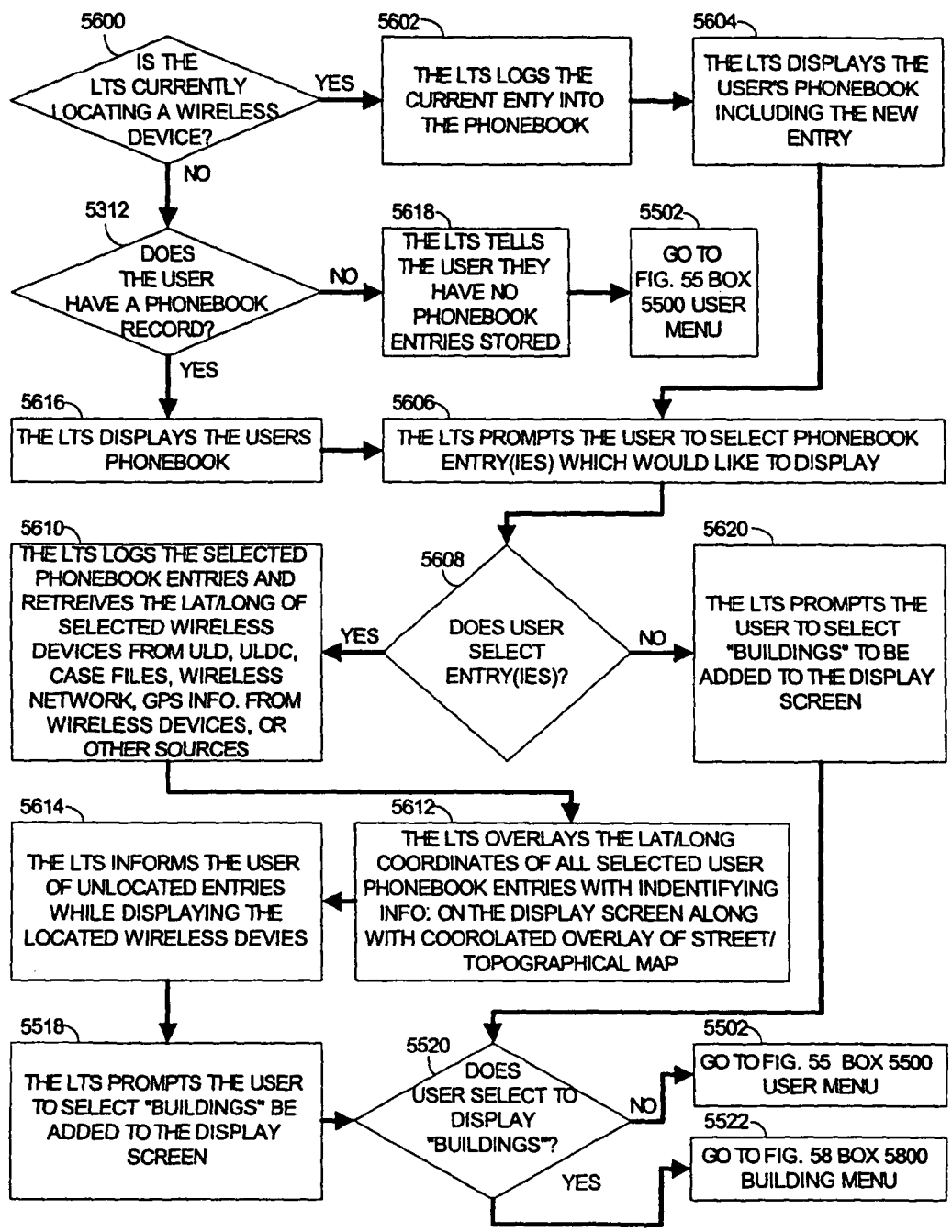

If the user does not respond within the specified period of time 5504, the LTS 5300 prompts the user to select a phonebook entry he wishes to locate 5508. The LTS 5300 then waits a specified period for the user to select "phonebook" 5530. If the user responds by selecting "phonebook" 5330, the user selects the building he wants to display 5510. FIG. 56 describes the process.

Figure 57:
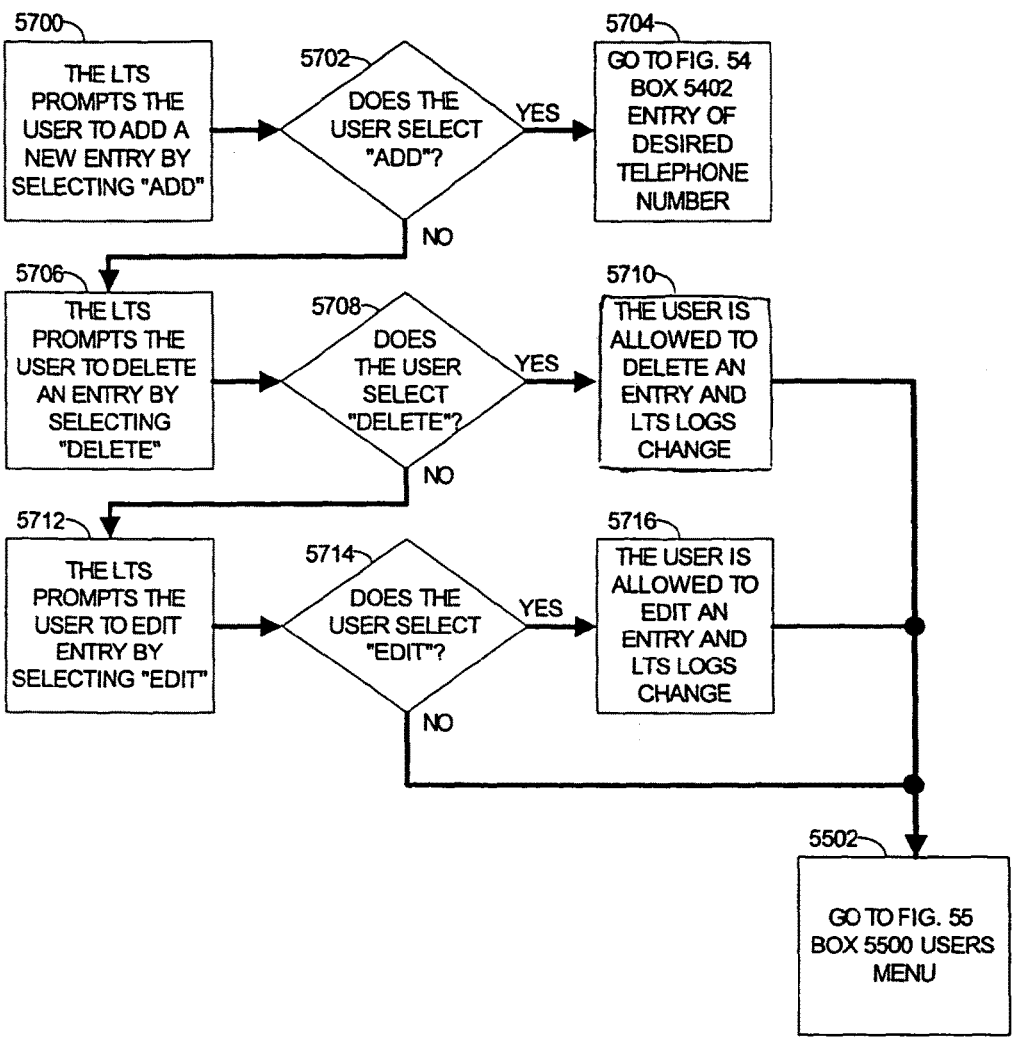

If the user does not respond within the specified period of time 5530, the LTS 5300 prompts the user to add, delete or edit a phonebook entry(ies) to a wireless device(s) 104 that the user wants to locate/track by selecting 'Add, Delete or Edit" 5512. The LTS 5300 then waits a specified period for the user to select "Add, Delete, or Edit" 5514. If the user responds by selecting "Add, Delete or Edit" 5514, the LTS 5300 prompts the user to add, delete, or edit phonebook entries 5516. FIG. 57 describes the process.

Figure 58:
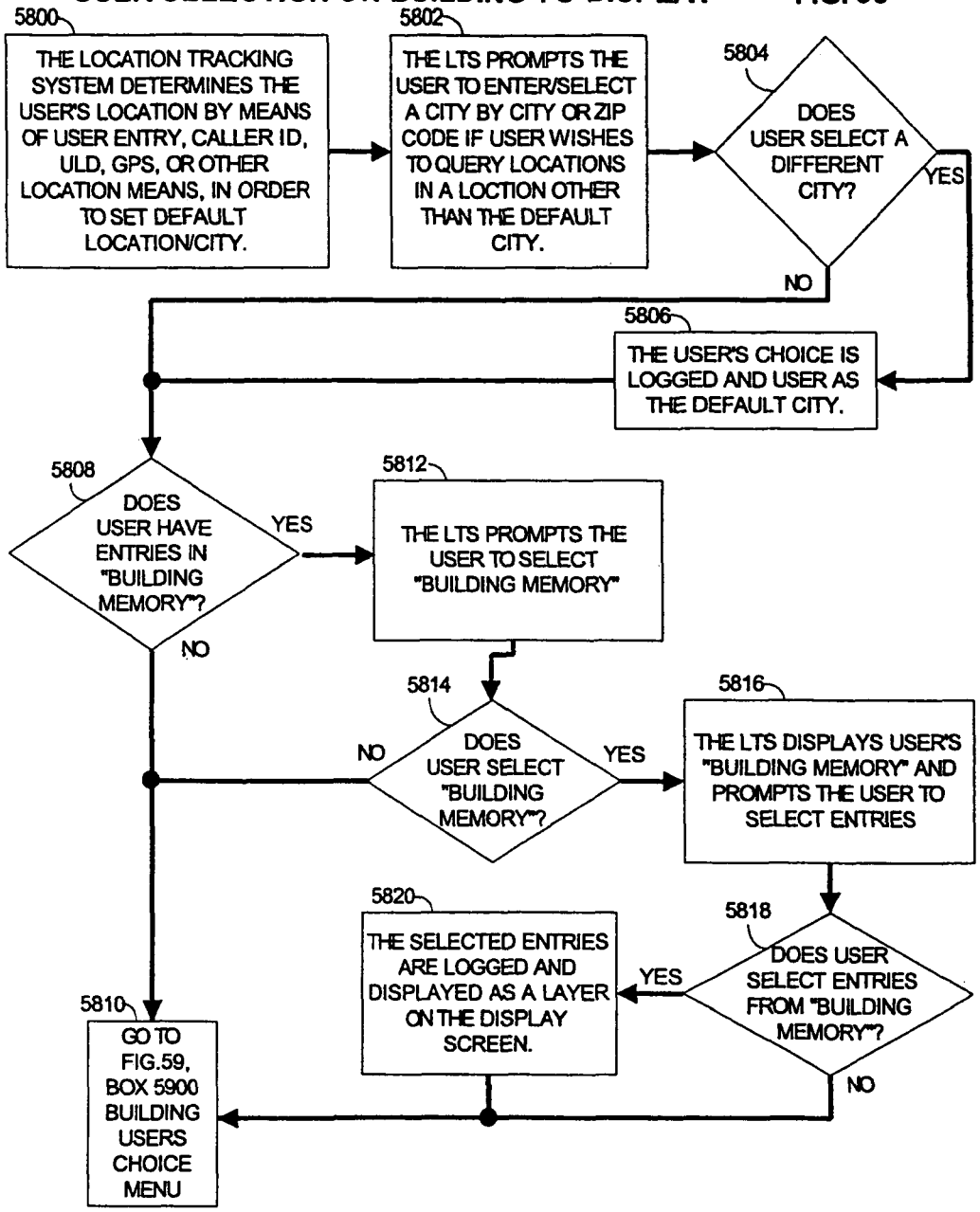

If the user does not respond within the specified period 5514, the LTS 5300 prompts the user to view selected businesses, government buildings, and/or homes on the display screen by selecting "buildings" 5518. The LTS 5300 then waits a specified period for the user to select "buildings" 5520. If the user responds by selecting "buildings" 5520, the LTS 5300 prompts the user to select buildings to display 5522. FIG. 58 describes the process to select buildings for display.

Figure 67:
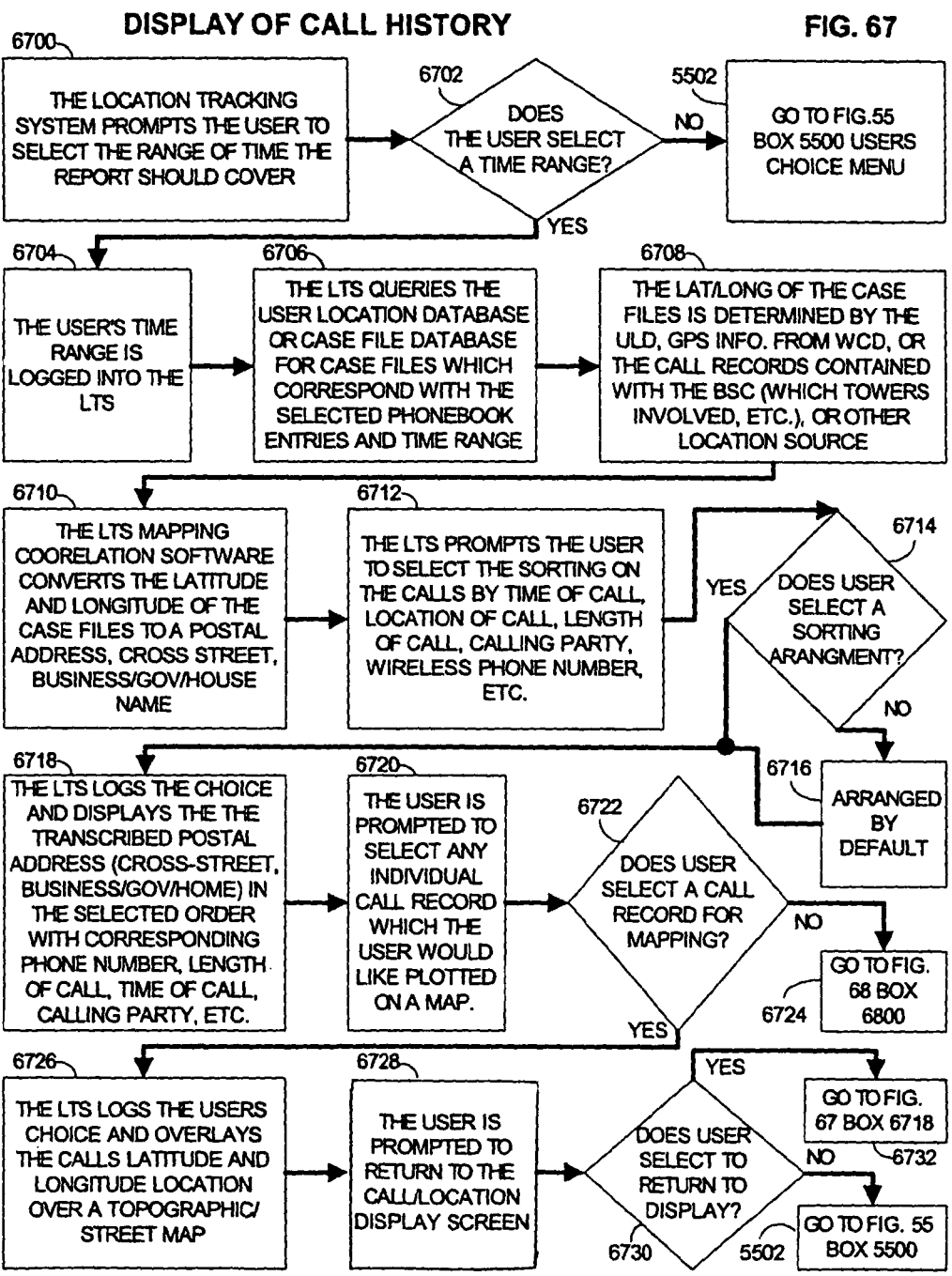

If the user does not respond within the specified period 5520, the LTS 5300 prompts the user to view a history of call/location/tracking history of phonebook entry(ies) to a wireless device(s) 104 that the user wants to locate/track by selection "view history" 5524. The LTS 5300 then waits a specified period for the user to select "view history" 5526. If the user responds by selecting "view history" 5526, the LTS 5300 forwards the user to the view history process 5528. FIG. 67 illustrates the view history process.

Figure 68:
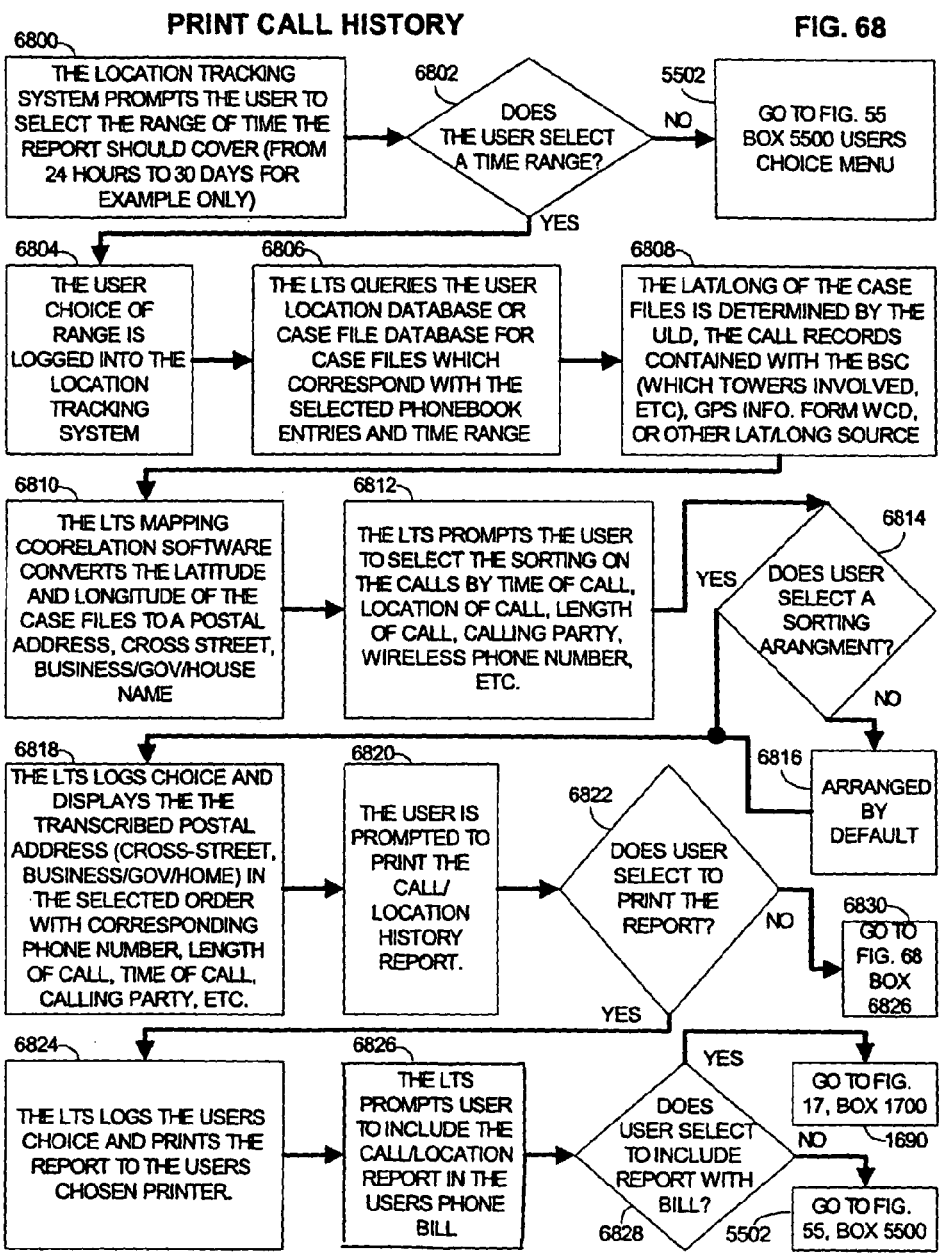

If the user does not respond within the specified period of time 5526, the LTS 5300 prompts the user to print a history of call/location history of phonebook entry(ies) to a wireless device(s) 104 by selecting "print history" 5530. The LTS 5300 then waits a specified period for the user to select "print history" 5532. If the user responds by selecting "print history" 5532, the LTS 5300 forwards the user to the print history process 5534. FIG. 68 illustrates the print history process.

Figure 69:
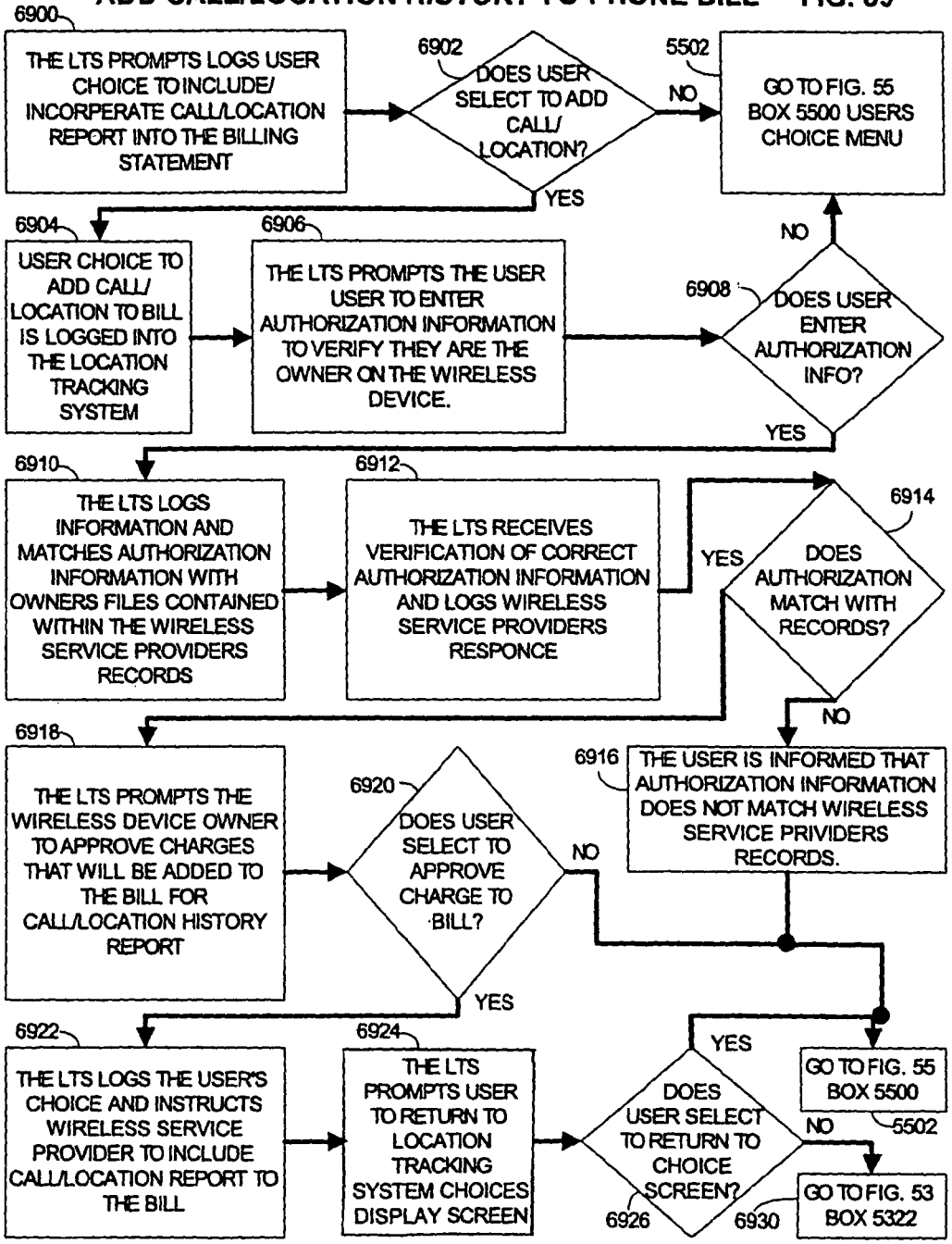

If the user does not respond within the specified period of time 5530, the LTS 5300 prompts the user to add a history of call/location/tracking history to the wireless service bill by selecting "add to bill" 5536. The LTS 5300 then waits a specified period for the user to select 'add to bill" 5538. If the user responds by selecting 'add to bill" 5539, the LTS 5300 executes the process to add the call/location report to the wireless service bill 5540. FIG. 69 illustrates the process to add the call/location report to the wireless service bill. If the user does not respond within the specified period 5538, the LTS 5300 logs the user off 5542.

FIG. 56

FIG. 56, illustrates the process of entering and selecting phonebook entries. When the user is transferred to the "phonebook" section, the LTS 5300 first queries the user records 5312 to determine if the user is currently locating/tracking the location of a wireless device 5600. If the LTS 5300 is currently locating/tracking a wireless device 5600, the LTS 5300 logs the current entry into the phonebook 5602. The LTS 5300 then displays the user's phonebook including the new entry 5604. Once the LTS 5300 displays the phonebook 5604, the LTS 5300 prompts the user to select phonebook entries that they would like to locate/track 5606. The LTS 5300 then waits a specified period for the user to respond 5608. If the user selects phonebook entries to be located/tracked 5608, the LTS 5300 logs the selected phonebook entries and retrieves the location of the wireless devices 104 requested by the user 5610. The LTS 5300 retrieves the lat/long locations of the wireless devices 104 by querying a ULD 900, a ULDC 908, by querying case files 2820 containing lat/long of wireless devices 104, by querying the wireless network's BSC 206 or by other location means. The LTS 5300 then plots the lat/long of the located wireless devices 104 and overlays the locations onto a street/topographic map 5612.

If the LTS 5300 is not able to locate a selected entry, the LTS 5300 notifies the user that the entry(ies) could not be located 5614. The LTS 5300 then prompts the user to select businesses, government buildings and/or private homes to be added to the display screen by selecting "buildings" 5518. The LTS 5300 then waits a specified period for the user to select "buildings" 5520. If the user selects "buildings" 5520, the LTS 5300 prompts the user to select buildings for display 5522. FIG. 58 illustrates the process. If the user does not select "buildings" 5520, the user is forwarded to the user choice menu 5502.

If the LTS 5300 is not currently locating/tracking a wireless device 104 when the user logs into the "phonebook" menu 5600, the LTS 5300 determines if the user has previously established a phonebook containing stored entries, within the user's record 5312. If the user does have a phonebook within the user's record 5312, the LTS 5300 displays the user's phonebook 5616, and the LTS 5300 permits the user to select and locate wireless devices 104 from their phonebook 5606. If the user does not have a phonebook as part of the user's records 5312, the user is informed that no phonebook records are contained in the user's record 5618, and the LTS 5300 forwards the user to the user's choice menu 5502.

FIG. 57

FIG. 57 illustrates the "add, delete, and editing phonebook entries menu". The diagram illustrates the process, which allows users to add, delete, and edit phonebook entries. The LTS 5300 prompts the user to add a new entry to the phonebook by selecting "add" 5700. The LTS 5300 then waits a specified period for the user to respond by selecting "add" 5702. If the user responds by selecting "add" 5702 a new entry, the LTS 5300 prompts the user to enter a telephone number or identification information 5704, described in FIG. 54.

If the user does not respond 5702, the LTS 5300 then prompts the user to delete an existing entry in the phonebook by selecting "delete" 5706. The LTS 5300 then waits a specified period for the user to respond selecting "delete" 5708. If the user responds by selecting "delete" 5708, the LTS 5300 allows the user to delete a selected phonebook entry and the LTS 5300 logs the change 5710 to the user's record 5312. The LTS 5300 then forwards the user to the user's choice menu 5502.

If the user does not respond within the specified period of time 5708, the LTS 5300 then prompts the user to edit an existing entry in the phonebook by selecting "edit" 5712. The LTS 5300 then waits a specified period for the user to respond selecting 'edit" 5712. If the user responds by selecting 'edit" 5714, the LTS 5300 allows the user to edit a selected phonebook entry and the LTS 5300 logs the change 5716 to the user's record 5312. The LTS 5300 forwards the user to the user's choice menu 5502. If the user does not respond within the specified period of time 5714, the LTS 5300 forwards the user to the user's choice menu 5502.

FIG. 58

Figure 59:
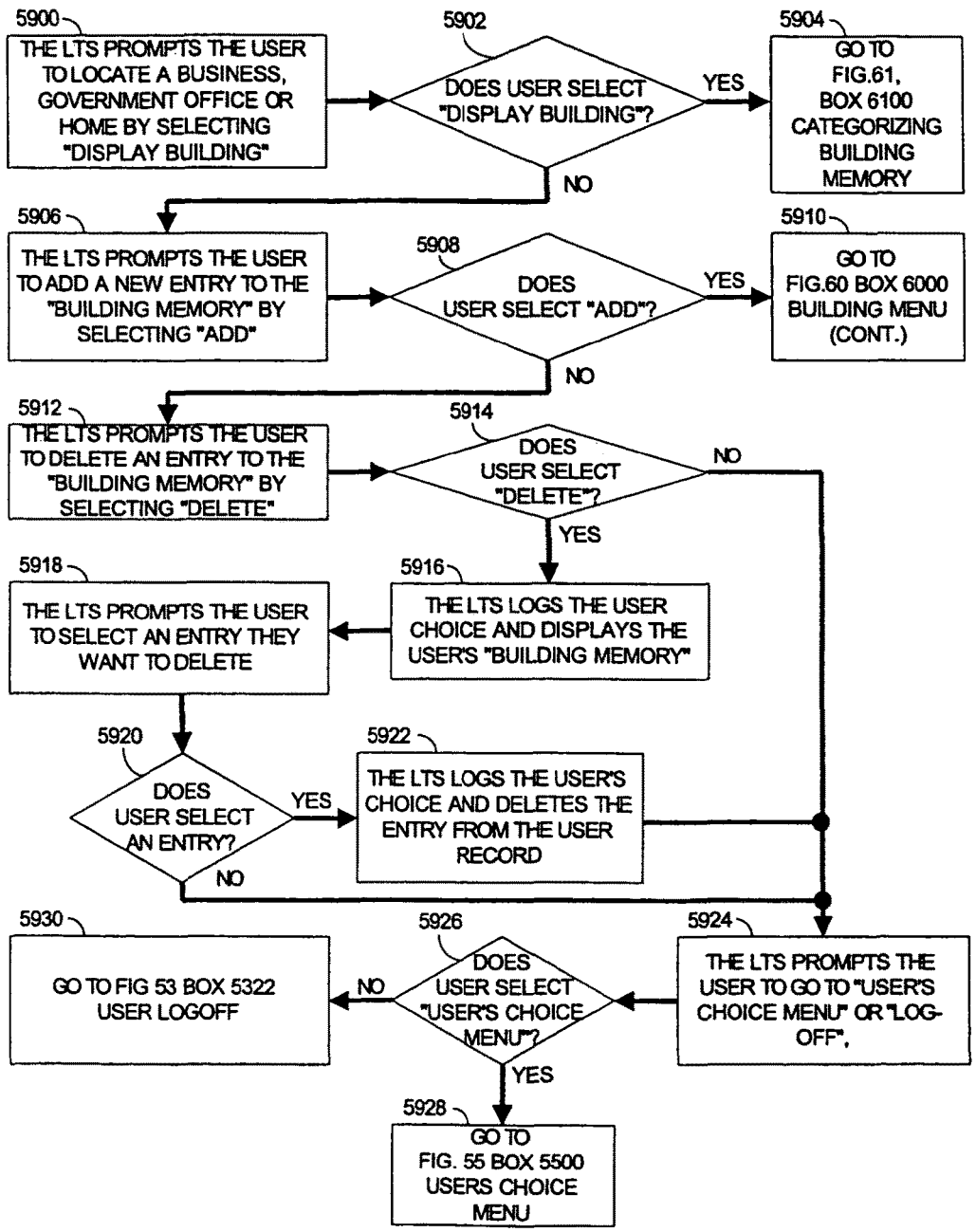

FIG. 58 illustrates the process of selection "buildings" that will be displayed on the display screen 2836. The LTS 5300 determines the user's current location 5800. The LTS 5300 prompts the user to enter or select a city by city name or zip code if the default city is not desired 5802. The LTS 5300 waits for the user to select a city 5804. If the user selects a different city 5804, the LTS 5300 logs the user's choice and makes it the default city 5806. After the user selects a city, the LTS 5300 checks if the user has entries in the building memory 5808. If the user does not have entries in the building memory 5808, the LTS 5300 sends the user to the building memory choice menu 5810, described in FIG. 59. If the user has entries in the building memory 5808, the LTS 5300 asks the user if he wants to select "building memory" 5812. The LTS 5300 waits for user response 5814. If the user does not select "building memory" 5814, the LTS 5300 sends the user to the building memory choice menu 5814 described in FIG. 59. If the user selects "building memory" 5814, the LTS 5300 displays the user's building memory and prompts the user to select entries 5816. The LTS 5300 waits for a user response 5818. If the user selects entries, the selected entries are display on the display screen 5820. Then the LTS 5300 sends the user to the building memory choice menu 5810 described in FIG. 59. If the user does not select any entries 5818, the LTS 5300 sends the user to the building memory choice menu 5810 described in FIG. 59.

FIG. 59

Figure 60:
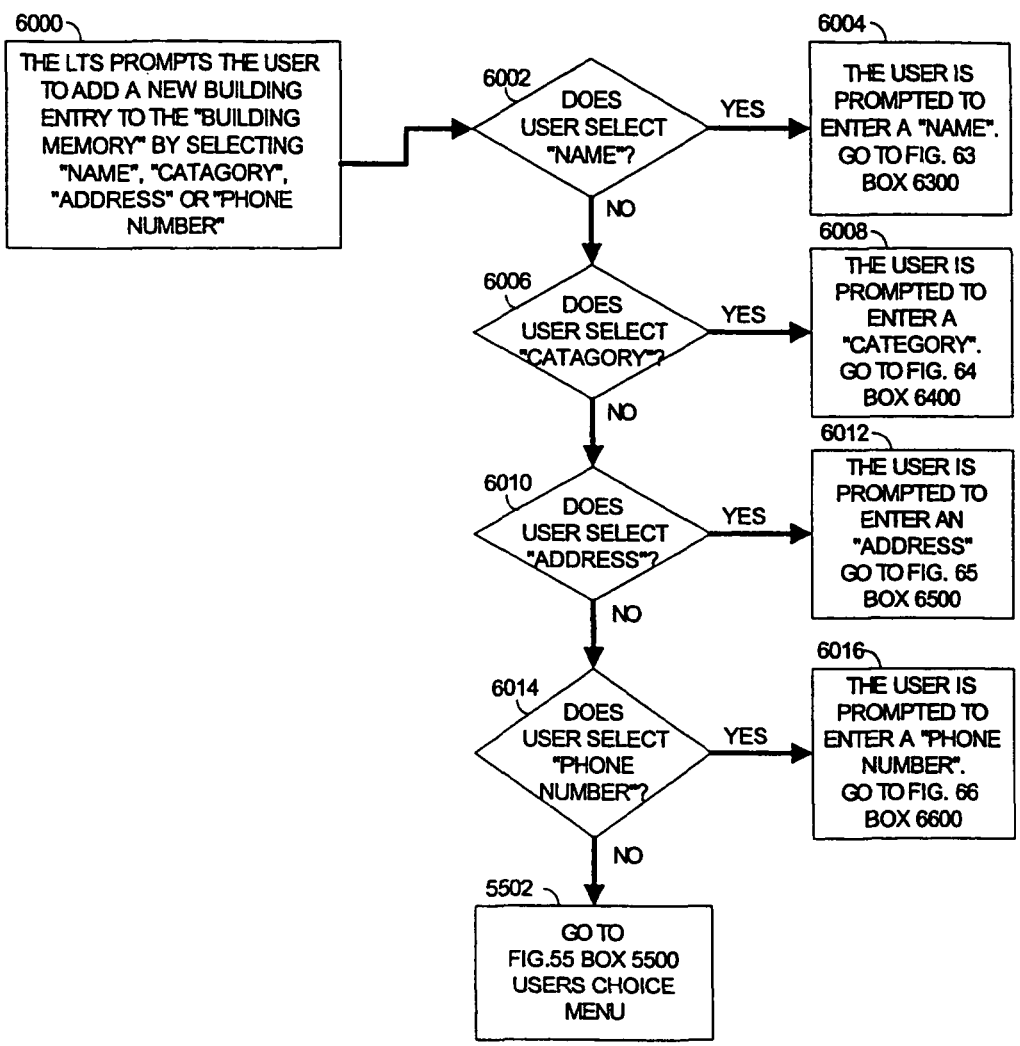

The building memory user's choice menu 5902 allows the user to add, select, and delete entries to their building memory. The LTS 5300 prompts the user to select a business, government office or home by selection "Display Building" 5900. If the user selects "display building" 5902, the LTS 5300 prompts the user to enter the listing they want to display 5904. If the user does not select "display building" 5902, the LTS 5300 prompts the user to add an entry to the building memory by selecting "add" 5906. If the user selects "add" 5908, the LTS 5300 forwards the user to the add building process 5910. FIG. 60 illustrates the add building process.

If the user does not select add 5914, the LTS 5300 prompts the user to delete an entry in the building memory by selecting "delete" 5912. If the user selects "delete" 5914, the LTS 5300 logs the user's choice and displays the user's building memory 5916. The LTS 5300 prompts the user to select the entry he wants to delete 5918. If the user selects an entry 5920, the LTS 5300 logs the user's choice and deletes the entry from the building memory 5922. The LTS 5300 then prompts the user to either go to the user's choice menu or log off 5924. If the user selects to go to the user's choice menu 5926, the LTS 5300 returns the user to the user's choice menu 5502. If the user chooses to logoff 5926, the LTS 5300 logs the user off the system 5930.

If the user does not select an entry to delete 5930, the LTS 5300 then prompts the user to either go to the user's choice menu or log off 5924. If the user selects to go to the user's choice menu 5926, the LTS 5300 returns the user to the user's choice menu 5502. If the user chooses to logoff 5926, the LTS 5300 logs the user off the system 5930.

If the user does not select the "delete" option 5912, the LTS 5300 then prompts the user to either go to the user's choice menu or log off 5924. If the user selects to go to the user's choice menu 5926, the LTS 5300 returns the user to the user's choice menu 5502. If the user chooses to logoff 5926, the LTS 5300 logs the user off the system 5930.

FIG. 60

Figure 63:
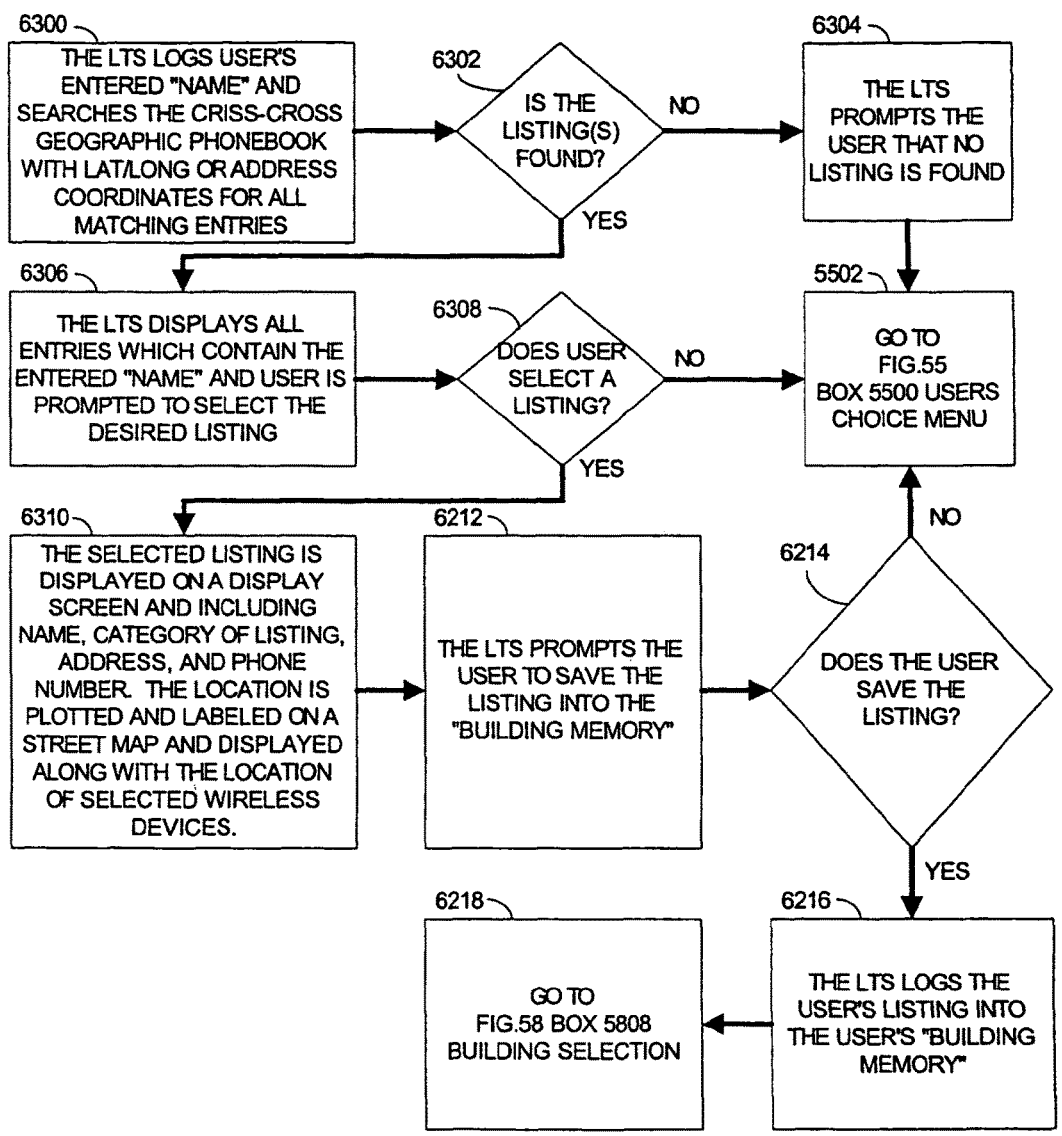
Figure 64:
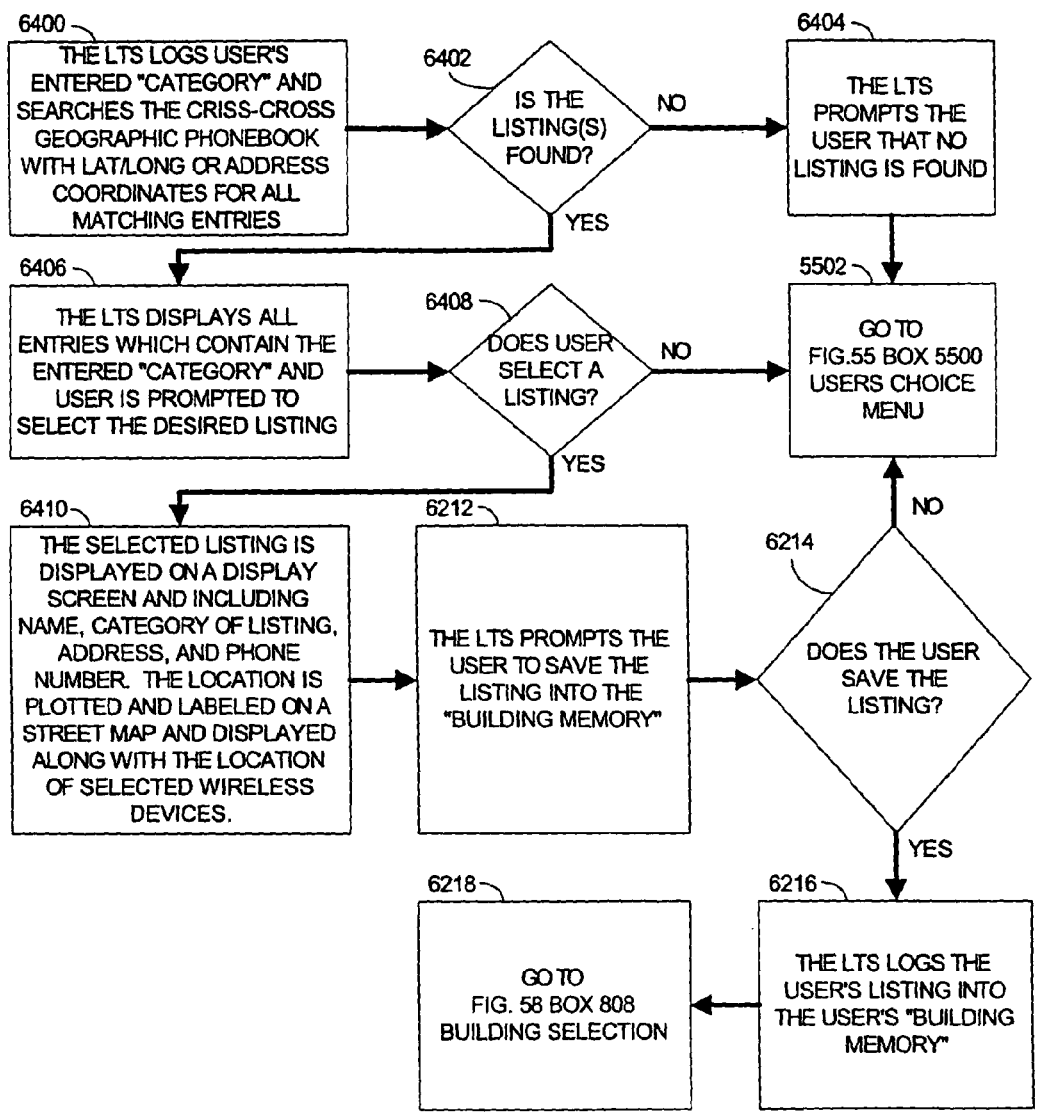
Figure 65:
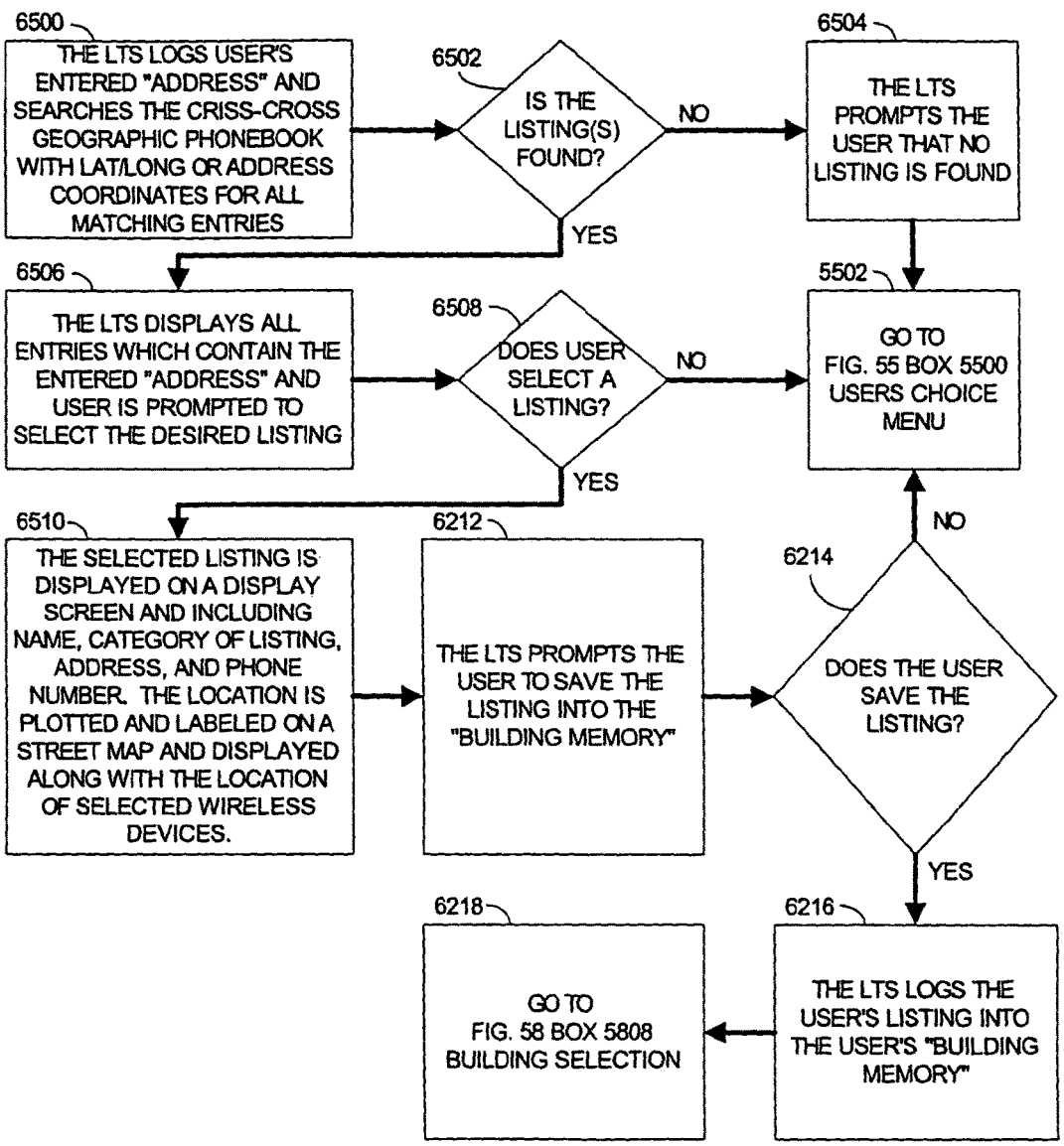

FIG. 60 continues the building memory process and illustrates the process to add an entry to the building memory. The LTS 5300 prompts the user to add a new building by selecting "name", "category", 'address", or "phone number" 6000. If the user selects "name" 6002, the LTS 5300 adds the entry by name 6004. FIG. 63 illustrates the process to add an entry by name. If the user selects "category" 6006, the LTS 5300 adds the entry by category 6008. FIG. 64 illustrates the process to add an entry by category. If the user selects "address" 6010, the LTS 5300 adds the entry by address 6012. FIG. 65 illustrates the process to add an entry by address. If the user selects "phone number" 6014, the LTS

Figure 66:
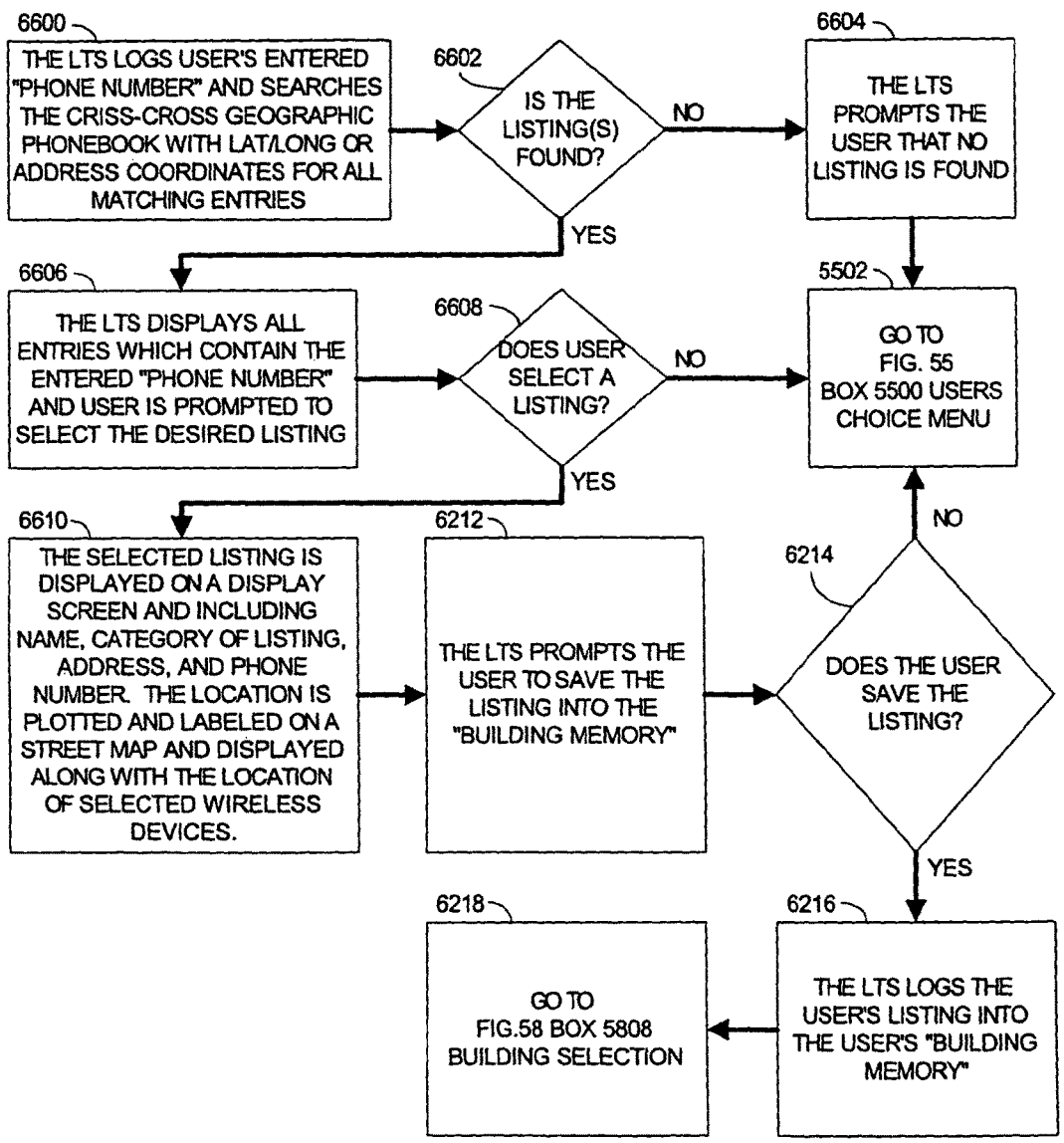

5300 adds the entry by phone number 6016. FIG. 66 illustrates the process to add an entry by phone number. If the user does not select any menu option 6014, the LTS 5300 returns the user to the user's choice menu 5502.

FIG. 61

Figure 61:
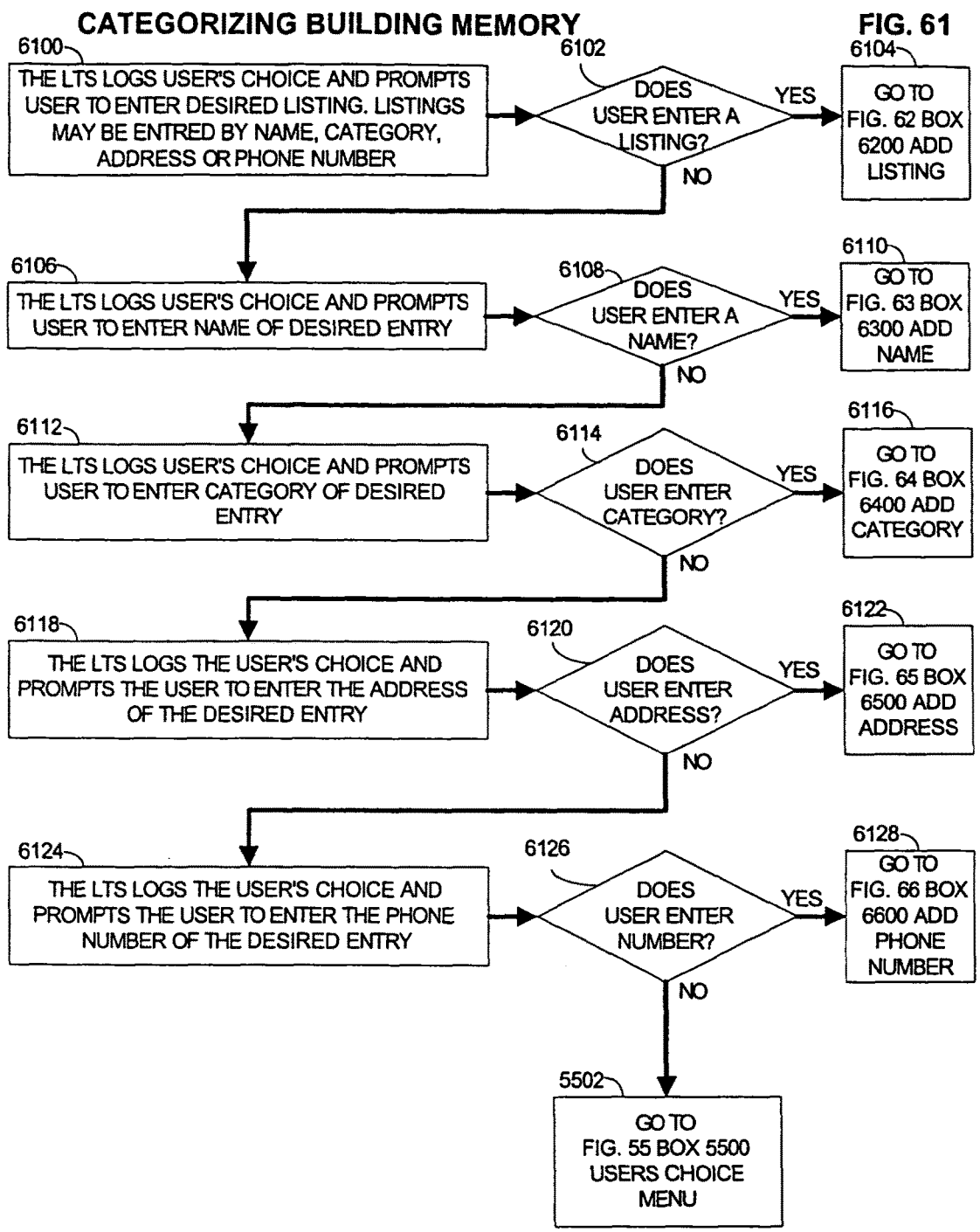
Figure 62:
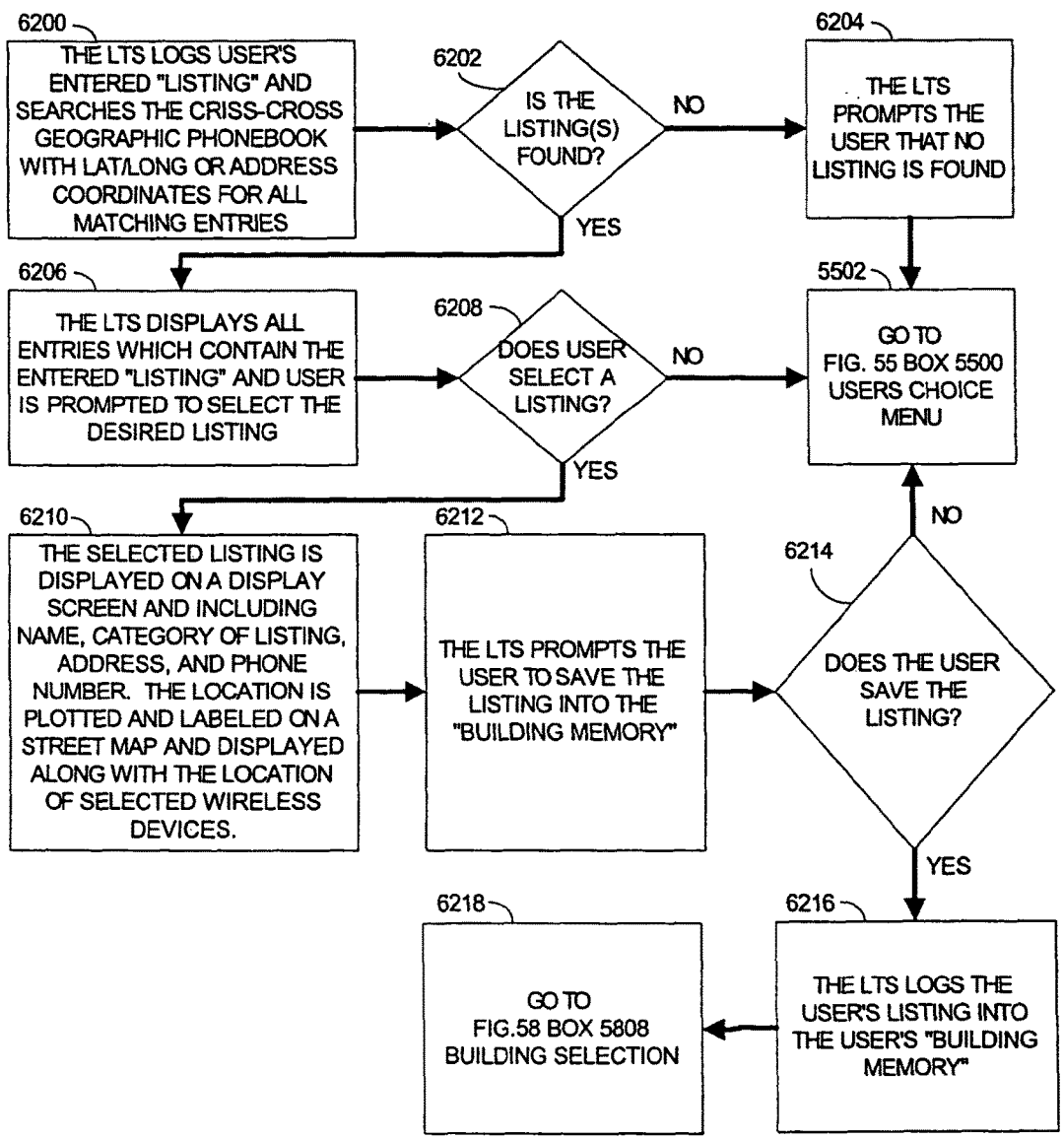

FIG. 61 illustrates the process for categorizing the building memory. The LTS 5300 logs the user's choice and prompts the user to enter the desired listing by name, category, address or phone number 6100. If the user enters a listing 6102, the LTS 5300 adds a "listing" 6104. FIG. 62 illustrates the add "listing" process.

If the user does not enter a "listing" 6102, the LTS 5300 prompts the user to enter the name of the desired entry 6106. If the user enters a name 6108, the LTS 5300 adds the entry by name 6110. FIG. 63 illustrates the process to add an entry by name. If the user does not enter name 6108, the LTS 5300 prompts the user to enter a category 6112. If the user enters a category 6114, the LTS 5300 adds the entry by category 6116. FIG. 64 illustrates the process to add an entry by category. If the user does not enter a category 6114, the LTS 5300 prompts the user to enter an address 6118. If the user enters an address 6120, the LTS 5300 adds the entry by address 6122. FIG. 65 illustrates the process to add an entry by address. If the user does not enter an address 6120, the LTS 5300 prompts the user to enter a phone number 6124. If the user enters a phone number 6126, the LTS 5300 adds the entry by phone number 6128. FIG. 66 illustrates the process to add an entry by address.

If the user does not enter a phone number 6126, the LTS 5300 returns the user to the user' choice menu 5502.

FIG. 62

FIG. 62 displays the process to enter a "listing" to the building memory. The LTS 5300 logs the user's entered listing and searches the criss-cross phonebook with the lat/long correlation 2810 or address coordinates for all matching entries 6200. If the listing is not found 1005, the LTS notifies the user the listing is not found 6202 and the user is sent to the user choices menu 5502. If the listing is found 6202, the LTS 5300 displays all the entries that contain the entered "listing" and the LTS 5300 prompts the user to select the desired entry 6206. If the user does not select a listing 6208, the user is sent to the user choices menu 5502. If the user selects an entry 6208, the LTS 5300 displays the selected listing on the display screen 2836 with the following information: name, category of listing, address, and phone number. The LTS 5300 plots and labels the listing location on a street map with the location of the wireless devices 6210. The LTS 5300 prompts the user if he wants to save the listing in the building memory 6212. If the user does not save the listing 6214, he is sent to the user choices menu 5502. If the user saves the listing, the LTS 5300 saves the listing in the building memory 6216, and the LTS 5300 returns the user to the building memory user's choice menu 6218.

FIG. 63

FIG. 63 displays the process to enter a "name" to the building memory. The LTS 5300 logs the user's entered name and searches the criss-cross phonebook with the lat/long correlation 2812 or address correlation's for all matching entries 6300. If the name is not found 6302, the LTS 5300 notifies the user the listing is not found 6304 and the user is sent to the user choices menu 5502. If the listing is found 6302, the LTS 5300 displays all the entries that contain the entered "name" and the LTS 5300 prompts the user to select the desired entry 6306. If the user does not select a listing 6308, the user is sent to the user choices menu 5502. If the user selects an entry 6308, the LTS 5300 displays the selected listing on the display screen 2836 with the following information: name, category of listing, address, and phone number. The LTS 5300 plots and labels the listing location on a street map with the location of the wireless devices 6310. The LTS 5300 prompts the user if he wants to save the listing in the building memory 6212. If the user does not save the listing 6214, he is sent to the user choices menu 5502. If the user saves the listing, the LTS 5300 saves the listing in the building memory 6316, and the LTS 5300 and the LTS 5300 returns the user to the building memory user's choice menu 6218.

FIG. 64

FIG. 64 displays the process to enter a "category" to the building memory. The LTS 5300 logs the user's entered listing and searches the criss-cross phonebook with the 1st/long correlations 2812 or address coordinates for all matching entries 6400. If the listing is not found 6402, the LTS 5300 notifies the user the listing is not found 6404 and the user is sent to the user choices menu 5502. If the listing is found 6204, the LTS 5300 displays all the entries that contain the entered "category" and the LTS 5300 prompts the user to select the desired entry 6406. If the user does not select a listing 6408, the user is sent to the user choices menu 5502. If the user selects an entry 6408, the LTS 5300 displays the selected listing on the display screen 2836 with the following information: name, category of listing, address, and phone number. The LTS 5300 plots and labels the listing location on a street map with the location of the wireless devices 6410. The LTS 5300 prompts the user if he wants to save the listing in the building memory 6212. If the user does not save the listing 6214, he is sent to the user choices menu 5502. If the user saves the listing, the LTS 5300 saves the listing in the building memory 6216, and the LTS 5300 and the LTS 5300 returns the user to the building memory user's choice menu 6218.

FIG. 65

FIG. 65 displays the process to enter a "address" to the building memory. The LTS 5300 logs the user's entered listing and searches the criss-cross phonebook with the latllong correlations 2812 or address coordinates for all matching entries 6500. If the listing is not found 6502, the LTS 5300 notifies the user the listing is not found 6504 and the user is sent to the user choices menu 5502. If the listing is found 6502, the LTS 5300 displays all the entries that contain the entered "address" and the LTS 5300 prompts the user to select the desired entry 6506. If the user does not select a listing 6508, the user is sent to the user choices menu 5502. If the user selects an entry 6508, the LTS 5300 displays the selected listing on the display screen 2836 with the following information: name, category of listing, address, and phone number. The LTS 5300 plots and labels the listing location on a street map with the location of the wireless devices 6510. The LTS 5300 prompts the user if he wants to save the listing in the building memory 6212. If the user does not save the listing 6214, he is sent to the user choices menu 5502. If the user saves the listing, the LTS 5300 saves the listing in the building memory 6216, and the LTS 5300 and the LTS 5300 returns the user to the building memory users choice menu 6218.

FIG. 66

FIG. 66 displays the process to enter a "phone number" to the building memory. The LTS 5300 logs the user's entered listing and searches the crisscross phonebook with the lat/long correlations 2812 or address coordinates for all matching entries 6600. If the listing is not found 6602, the LTS 5300 notifies the user the listing is not found 6604 and the user is sent to the user choices menu 5502. If the listing is found 6602, the LTS 5300 displays all the entries that contain the entered "phone number" and the LTS 5300 prompts the user to select the desired entry 6606. If the user does not select a listing 6608, the user is sent to the user choices menu 5502. If the user selects an entry 6608, the LTS 5300 displays the selected listing on the display screen 2836 with the following information: name, category of listing, address, and phone number. The LTS 5300 plots and labels the listing location on a street map with the location of the wireless devices 6610. The LTS 5300 prompts the user if he wants to save the listing in the building memory 6212. If the user does not save the listing 6214, he is sent to the user choices menu 5502. If the user saves the listing, the LTS 5300 saves the listing in the building memory 6216, and the LTS 5300 and the LTS 5300 returns the user to the building memory user's choice menu 6218.

FIG. 67

The user's history report may be generated by building and/or retrieving case files that are generated at the time that communications are sent/received by the wireless device 104, and which contain the location of the wireless device 104 at the time of the communication. This tracking method is best for tracking wireless devices 104, which are used, on a frequent basis during the day.

Alternatively, the user's history report may be generated by building and/or retrieving case files by periodically (every hour, twice a day etc.) querying a user location database 900, user location database coordinator 908, or querying the wireless networks base station controller 118-A or other network components, for the location of the wireless device 104.

This alternative method of generating a user's history report would be preferred for locating/tracking wireless devices 104 that are not used frequently. If a wireless device 104 only receives one or two communications a day, a periodic report (every hour, etc.) would give a more complete report of the location of the wireless device 104 through the day.

A third method of generating a user's history report is to combine the two methods mentioned above. This involves reporting case files with call/location generated when the wireless device 104 sends/receives a communication, combined with the periodic case file, which is generated periodically (every hour, etc., depending on the selected monitoring period set by the owner of the wireless device 104, the user of the LTS 5300, or the wireless service provider).

FIG. 67 shows the process to display call history report. The LTS 5300 prompts the user to select a range of time the report will cover 6700. If the user does not select a time range 6702, the LTS 5300 will send the user to the user choice menu 5502. If the user selects a time range 6702, the LTS 5300 logs the time range 6704 and the LTS 5300 queries the ULD 900 or case file database that correspond with the selected phonebook entries and time range 6706. The ULD 900, GPS, or the BSC 118-A determine the lat/long of the case files 6708. The LTS 5300 correlation software converts the latitude and longitude of the case files to a postal address, cross street, business, government, house name 6710. The LTS 5300 prompts the user to select how he wants to sort the call history 6712. The user can sort the call history by: time of call, location of call, calling party, or wireless phone number 6712. If the user does not select a sort type 6714, the default sort type is used 6716. Otherwise, the LTS 5300 logs the users choice and displays the transcribed postal address in the selected order with the corresponding phone number, length of call, time of call, and calling party 6718. The LTS 5300 then prompts the user to select an individual call record that the user desires to plot on a map 6720. If the user does not select a call record 6722, the LTS 5300 asks the user if he wants to print the call history 6724. If the user selects a call record 6722, the LTS 5300 logs the choice and overlays the calls latitude and longitude location on a topographic street map 6726. The LTS 5300 then prompts the user if he wants to return to the call/location display screen 6728. If the user selects to return to the call/location display screen 6730, the LTS 5300 prompts the user to select a time range for the call history report 6732. Otherwise, the LTS 5300 returns the user to the users choice menu 5502.

FIG. 68

FIG. 68 shows the process to print call history report. The LTS 5300 prompts the user to select a range of time the report will cover 6800. If the user does not select a time range 6802, the LTS 5300 will send the user to the user choice menu 5502. If the user selects a time range 6802, the LTS 5300 logs the time range 6804 and the LTS 5300 queries the ULD 900 or case file database that correspond with the selected phonebook entries and time range 6806. The ULD 900, GPS, or the BSC 206 determine the lat/long of the case files 6808. The LTS 5300 correlation software converts the latitude and longitude of the case files to a postal address, cross street, business, government, house name 6810. The LTS 5300 prompts the user to select how he wants to sort the call history 6812. The user can sort the call history by: time of call, location of call, calling party, or wireless phone number. If the user does not select a sort type 6814, the default sort type is used 6816. Otherwise, the LTS 5300 logs the user's choice and displays the transcribed postal address in the selected order with the corresponding phone number, length of call, time of call, and calling party 6818. The LTS 5300 then prompts the user if he wants to print the history report 6820. If the user does not print the history report 6822, the LTS 5300 prompts the user if he wants to include the call history report on the user's phone bill 6826. If the user prints the call history report 6822, the LTS 5300 sends the report to the desired printer 6824. The LTS 5300 then prompts the user if he wants to include the call history report on the user's phone bill 6826. If the user selects to include the report with the user's phone bill 6828, the LTS 5300 includes the call history report in the user's phone bill 6832. Otherwise, the LTS 5300 returns the user to the users choice menu 5502.

FIG. 69

FIG. 69 displays the process to include the call history report in the user's phone bill. The LTS asks the user if he wants the call history report included in the billing statement. If the user chooses not to add the call history report 6902, the LTS 5300 returns the user to the user's choice menu 5502. If the user chooses to add the call history 6902, the LTS 5300 logs the user's choice 6904, and prompts the user to enter authorization information to verify he is the owner of the wireless device 6906. If the user does not enter authorization information 6908, the LTS 5300 returns the user to the user's choice menu 5502. If the user enters authorization information 6908, the LTS 5300 logs the authorization information and matches the information with wireless providers records 6910. If the authorization information does not match the records 6914, the LTS 5300 notifies the user of the mismatch 6916, and returns the user to the user's choice menu 5502. If the information matches 6914, the LTS 5300 prompts the user to approve the charges added to the bill for the call history report 6918. If the user does not approve the charges 6920, the LTS 5300 returns the user to user's choice menu 5502. If the user approves the charges 6920, the LTS 5300 logs the user's choice and instructs the wireless service to include the call location history report to the bill 6922. The LTS 5300 prompts the user if he wants to return the user's choice menu 6924. If the user selects to returns to the user's choice menu 6926, the LTS 5300 returns the user to the user's choice menu 5502. Otherwise the user is logged off the LTS 6930.

Location Tracking System; Summary

The location tracking system 5300 is a method of determining the location and then tracking a single or plurality of wireless devices 104 on a given wireless device network(s) 100 based on a criterion provided by a user. Based on this criterion a log is created that record the location and network status of any wireless device 104 fitting the criterion. These logs are recorded to a database and then later transferred to a user database for storage on a local server database.

Accessing the database can be accomplished remotely or locally. Local access is from local service terminals on the network or mainframe. Remote access can be from a TCP/IP, IPX, Dial-up, remote server SQL Queries, and other listed methods. This allows for third party vendors to have access to the said primary embodiment 2800 features and use the technology to create product support and technological spin-offs. Examples of technological spin-offs would be; a cellular phone bill that gives the user's geographic location at the time of each logged call, an internet 3202 website that would allow business owners to track the location of employees or equipment comprising a wireless device 104, or a geographical advertising system (GAS) that would allow targeted advertising based on the location of the user of a wireless device 104. Many other technological spin-offs are also possible.

Tracking the wireless devices 104 can be done by utilizing a user location database (ULD) 900, GPS data from the phone, direct analysis of the network communication parameters, or by other third party methods. When a wireless device 104 is not located on a local server a user location database coordinator (ULDC) 908 or other system can be used to discover the location of a device to allow a log to be created.

Logs can be created and appended as a wireless device 104 roams a local wireless device network 100 or a remote wireless device 1900 network. Using TCP/IP and ATM connections, servers for discreet wireless device networks 100 can communicate together and allow seamless network interoperability. This allows the tracking logs to record the location of wireless devices 104 on a plurality of wireless device networks 100 having had a request generated from any network connected to the deemed wide-area network. Internet 3202 Protocol 6 and 7 should allow this to become even more practical.

Notification from the server to external programs, users, wireless devices 104 is a native capability of the said primary embodiment 2800. The messages can be sent alerting the said wireless device 104 of a system event. A user sets up this event when the log setup process begins by the user. The user can have the system send an alert based on a criterion such as the completion of a log. The advantage is that an alert can be sent to external programs triggering an external event. This allows third party software to use this to create a new technology and create a new product for their consumers.

An example is for a wireless device user 102 to be tracked and logged. A message could be sent via SMS (simple message system) to a prescribed wireless device 104 when that wireless device 104 being tracked leaves a certain geographic region. The system would for example allow a parent to be alerted when their child is going somewhere they shouldn't.

The primary embodiment 2800 also describes a method for allowing a large volume of users to access the logging and tracking database. The primary embodiment 2800 describes the method that allows a large volume of tracking to be done and logged simultaneously. By making separate database structures on separate hardware entities the load is divided into active database buffers were logs being created are stored, to a separate structure where inactive logs are saved for users.

A graphical interface and display protocol database 3004 is described that allows users to interact with the system and remotely retrieve meaningful representations of the data from the logs. Tracking logs simply contain data that describes network parameters as well as geographic and timing information. Alone this data is simply text. The said graphical display allows a useful extraction of the data to be represented. Multiple logs can be shown with data overlays including maps, topological information 4160, and other network parameters.

The physical structure for the wireless device network 100 is described in including the database hardware implementation, the networking implementation and the processing implementation. Examples of appropriate hardware and peripherals are given. Amounts of storage and hardware configurations are described. RAID architecture is listed and the preferred level of RAID deployment is also suggested for various deployments of the primary embodiment 2800 based on budget and performance.

A major user interaction of the primary embodiment 2800 is envisioned, but not excluded to, the ability to track and record wireless devices 104 that users have administrative control over. This would allow them to monitor, record, and review were and how their wireless devices 104 are used. Uses could be to monitor the location of workers, children, demographically defined users, and other types.

Monitoring wireless devices 104 by demographics has the unique ability to allow business to discover the location and moving habits of its customers. An example of this would be for a company to track all wireless devices 104 based on a set of demographic criterion that matches its target audience. The system would then track all wireless devices 104 matching those criterion and record the locations to a server database log, allowing the company to find a location to possibly build a new store that would maximize it exposure to its target customers.

Another us would be for a company to search for customers (based on a local mailing list of customers phone numbers) and when the customer enters a region (geographic distance) from the store location, a log would be created. A page or message could be sent to an external program indicating the event. A subsequent push' message technology such as SMS could be used to deliver content to the wireless device 104 in the form of an advertisement. This technology would allow the company to restrict its advertising to valid customers of interest and reduce the costs of advertising.

Description of Embodiments

Device Tracking and Logging

The wireless device 104 tracking and logging option of the location tracking system 5300 is used to monitor and record the location (latitude/longitude/altitude) of a wireless device 104 over a period of time. The feature requires the use of the device location software 2808, location database manager 904, as their associated components. For a wireless device 104 to be tracked it must be able to be recognized by the system. The device location software 2808 allows for a wireless device 104 (wireless device 104, 2 way pager, satellite phone, GPS enabled device, wireless LAN device, other) to be tracked as long as the system can access the control hardware/software for the appropriate wireless device network 100.

For GPS satellite network 114 enabled devices, certain considerations must be taken into account due to the nature of multi-path in cellular environments. Multi-path is the error caused by reflected signals entering the front end of the receiver and masking the real correlation peak. In this case, signal from the GPS satellite network 114 to the wireless device 104. The effects tend to be more pronounced in a static receiver near large reflecting surfaces, where 15 m in or more in ranging error can be found in extreme cases. In this case, a wireless device 104 slightly indoor or in a city between buildings would be relevant. Monitor or reference stations (in this case the BTS 118-A of the wireless device network 100) require special care in placing (the BTS's 118-A) to avoid unacceptable errors.

The first line of defense is to use the combination of antenna 2430 cut-off angle and antenna 2430 location that minimizes this problem. It however is not always possible in a wireless device network 100 and can cause undue or uneven accuracy in location ability over a wireless device network 100. A second approach is to use so-called "narrow correlator" receivers that tend to minimize the impact of multi-path on range tracking accuracy's. The approach does not apply to wireless device networks 100 and should not be used. Overall the effects of GPS satellite network 114 error still allow the most accurate location results. But consideration for its inaccuracies should be noted.

The wireless devices 104 that can be tracked are limited to the wireless device networks 100 the device location software 2808 is attached to. A noted exception is when a ULD 900 or ULDC network 1600 (or similar) is available for the system to query. In this case the wireless device 104 will be able to retrieve the location of any wireless device 104 that exists in the database regardless of the type of network it is operating on. The design would be preferred because it creates a type of universal standard that would allow a plurality of wireless devices 100 to be tracked over a variety of networks.

A further requirement for the wireless device 104 to be tracked is that the attached network or ULD 900/ULDC 908 to the location tracking system 5300 is capable of being polled (by software means) for locations of wireless devices 104 at regular intervals as short as less than one second or as long as many hours. The necessary hardware must exist on the wireless device network 100 to accommodate the required bandwidth and pipe-lining of multiple simultaneous requests for the location of a wireless device 104.

When no database such as an ULD 900 or ULDC network 1600 is available, the attached networks are required to provide the following elements from internal registers pertaining to an attached wireless device 104 on the wireless device network 100, as to allow the location tracking system 5300 software to calculate a location for the wireless device 104:

Base station(s) 118-A or antenna(s) 2430 location for all network equipment communicating with the wireless device 104 and; The round trip delay time for communications between the network antenna(s) 2430 and the wireless device 104 and/or;

The signal receive strength from the wireless device 104 to the network antenna(s) 2430 and/or;

Other location assisting information

When these design requirements on the network side are available then the location tracking system 5300 is capable of tracking a plurality of wireless devices 104 and recording user records 5312 to an internal/external database that includes the location referenced to time for the said wireless devices 104.

The location tracking system 5300 software first utilizes the display screen 2836 to display a menu to the user on their display screen 2836 of the wireless device 104 they are accessing the system from. The menu asks for the user to enter a single or list of wireless devices 104 to be logged. It also asks for a time frame to track these wireless devices 104 for. The time frame can be from the current system time to any given time. It can also begin at a future time and then end at any arbitrary time. Additionally, it can offer a log to be generated that includes only the location and basic other information (1 second duration or other short time). The location tracking system 5300 software would allow subsequent database queries to retrieve call location for all calls to a wireless device 104. Hence, an additional option that allows a log to be generated for all calls by a wireless device 104 for an indefinite time period is also required.

The user then can specify the log entry filenames for the database entries. When the user enters this information they are prompted with alerting options. These options include the user to be sent a message in the case of a set criterion is met. The user can then enter a list of criteria. These include:

Geographic boundary that wireless devices 104 cannot exceed/enter Distance wireless devices 104 may travel from any user defined location. If a wireless device 104 comes with in some distance of a user defines location When these criteria are entered the user enters their contact information. The location tracking system 5300 will alert the user if any criterion are met and include a message that indicates the wireless device 104 name and database entry that may be viewed to retrieve the results. The alerting options may take any of the following forms but are not limited to:

Email
SMS messaging
Web site posting
Online messaging
Page
Text messaging
Automated voice call (synthesized voice) to a voice line
Fax
Other messaging protocols that can send to wireless devices 104

Once the user selects this option the system can ask the user to review the choices. The user approves them, then the system sends the criteria to the location database manager 904. The users selected wireless devices 104 will be tracked for the remainder of the selected times. The user connects and they also review a list of active logs and cancel the logging or change the parameters and resubmit them to the location database manager 904. The system will overwrite the old tracking options for any modified wireless device 104.

The location database manager 904 now adds the wireless device 104 names (and corresponding wireless device identification 3724 information) into its location queue. The location queue contains the wireless device identifiers 3724 of all wireless devices 104 being logged. The location database manager 904 cycles through the list and determines the location of each wireless device 104 at the said time, and stores that information to a database record as named by the user in the setup.

When a new entry is added to the queue a database entry is established and necessary disk space is allotted for the duration specified by the user. The process assures that the system will not have to slow down to a lot more space later. The database disk space reserved is equal to the data storage rate times the file size per location query times the tracking time plus overhead for the database file entry.

The queue is automatically cycled though. Its size is dynamic because entries to it are constantly being made. Additionally, entries are always being removed from it. As the time(s) for entries to stop recording, as entered by a user, are met, and entry is removed from the queue. The database entry is then moved to a storage database on a different physical medium. The disk space on the primary databases physical drive is then free to be recorded to by a new record.

Users may now access any records on the second database. They may also access records for location tracking(s) in progress. When this occurs the location database manager 904 overwrites the end time to the current time. The location database manager 904 then creates a new entry that starts at the current time and ends at the original end time. The result is that on the next cycle through the queue the record would be stored (up to the current time) to the secondary database so that the user could access the tracking information up to the current time.

When a user retrieves the user record(s) 5312 the display software 2832 generates a map that covers the geographic boundaries of the users record(s) 5312 being opened. To display the user records 5312 the following information is needed:
  Geographic database 4160
  Metropolitan road database
  Building location database
  Topographic information 2810
  Other The information is then correlated to the user records 5312 based on the location in terms of latitude and longitude (and possible altitude). At this point the display software 2832 overlays this onto the user records 5312 and displays this information to the user. The user may zoom in and move the geographic boundaries. The resolution of the record will be limited to the time between updates and the distance traveled between those times by the wireless device 104. Mathematical extrapolations for missing data can be made by commonly known techniques to approximate the location between samples.

Location Database Logs

Logs created by the location tracking system 5300 software and database management software must have a consistent format that will allow universal parsing of the formatted data. The content listed in the logs must allow for a complete list of descriptive data to be saved and stored in an efficient manner.

When the data is stored to the logs key elements. are required to identify the logs owner and relevant network identifiers. The requirements to establish this are the following categories:
  User identifier
  Home network for user
  Current network log is being generated on
  User's permanent storage location The next elements listed in the database log are the elements that will be tracked. These elements will be listed under categories in the log to allow rapid parsing of the log by software after it has been created and stored to a user's local directory of sectionalized portion of a home database structure. The categories are:
  Device ID numbers 3724
  Network hardware ID numbers
  Event ID numbers The device ID numbers 3724 correspond to a unique identifier that is assigned to every wireless device 104 on a plurality of wireless device networks 100 that identifies itself and the wireless device network 100 it is on (ESN number, HEX ID code, wireless device 104 number, etc). The network hardware ID numbers are the identifiers of specific radio tower with BTS 110 or radio tower network 105 side equipment that communicates with users. Listed hardware elements here allow all wireless devices 104 communicating with these network components to be logged. Event ID numbers correspond to system events that would allow subsequent tracking of wireless devices 104. An example is when a wireless device network 100 fault occurs the system will monitor the wireless device 104 that the fault occurred on.

The log has a start and stop time stamp field additionally that allows the date and time of the logs creation and completion to be noted and parsed quickly. Additionally there are time stamps for all recorded data.

The next fields are data log fields. In this section there exists only wireless device ID numbers 3726 because only wireless devices 104 are ever tracked. The structure of this field is:
  Wireless device number 3726
  Tracking reference ID
  a plurality of data measurements (taken at sequential times)
    Location of device (GPS data or latitude/longitude)
    Time of measurement
    Date of measurement
    Other
      Network parameters
      Wireless device 104 statistics
      Etc There can be many wireless device numbers 3726 in the log as well as many data measurements for each wireless device 104. The structure allows a plurality of wireless devices 104 to be listed and for each wireless device 104 to have independent amounts of data written to it. The tracking reference ID number allows for a link to the initial reason the wireless device 104 was tracked. An external query can just look for wireless devices 104 with respect to initial tracking criteria. For example, if a criterion was to monitor all wireless devices 104 on 2 physical radio tower network 105, then a tracking reference ID would be associated with that and affixed to every wireless device 104 log that was created for that reason. The tracking elements each have pre assigned ID numbers that are given by the database manager software and the software then also puts the same ID on each relevant wireless device 104 tracked corresponding to the tracking requirement.

Cumulative Reports for Devices

The idea of a cumulative report would be to allow a user to retrieve information on a plurality of database log entries made on a specific or plurality of wireless devices 104. The reports could be extended to include details on all call activity on a wireless device 104 by allowing that wireless device 104 to have a log generated each time an active call is made. The location tracking system 5300 software is designed to allow this to happen. A short duration track occurs for every call that is made from a wireless device 104 and stored a personal storage space on the secondary database used for user long-term storage.

The qualifications placed on all tracking a wireless device 104 are that the wireless device 104 must verify a location and all call activity must be valid on the traffic channel. The qualification would exclude certain types of calls from being recorded. In general these calls would not show up as billable calls and would result in a user not being able to even initiate a voice channel on the phone.

Their duration are typically less than one second. Examples of situations that would not record data including location of a wireless device 104 are:

Network Access Failures
Drop Calls before call is established on Network
Poor Physical channel properties resulting in a call/network time out
Hard Block
Soft Block
Capacity Block All calls that are successfully initiated on the wireless device network 100 will have a location database log created by the location tracking system 5300 software, and subsequently user location database manager 904. All the logs are then stored into the user directory.

A possible use of this data is for it to be included in billing data. The user would receive a bill from the wireless device 104 carrier they use that could include call location information on where every call was initiated 6904. The caller ID features could allow the system to retrieve the number of the phone that was incoming or the outgoing phone dialed. This would also allow the location of that wireless device 104 to be noted.

The location of the user's wireless device 104 when the call was made would be accomplished by parsing the user's database 3216 by means of SQL techniques or by other database query tools commonly known. Each call logged would be referenced to other call information including time and date. They can then be referenced to calls listed on the billable statement sent to the user. The location would be recorded as a latitude and longitude location. If a user elects the system could convert this to a landmark location or address by referring to a criss-cross latitude longitude map/database. The nearest address could be listed. An additional option would be to list a general area as opposed to an address which could often be incorrect due to location accuracy.

The dialed number (for outgoing calls) or incoming caller's Id (for received calls) could also have a location listed. To accomplish this, the remote wireless device 1900 would be determined if it is a land line 142 device or a wireless device 104. If the device is a land locked device than an address for the phone number will be available through a database from the phone service provider of the number.

If, however, the device is a wireless device 104 unit then this will not work. The wireless device 104 will have to be queried remotely. In this case the system can use an ATM, I based, or other method to query the main service provider of the wireless device 104 for the user location database 900 entry for that user. If authentication is allowed, and a log was made for a call at that time then a location would be available. The location could then be added to a billing cycle.

If as in many cases, the remote wireless device 1900 had no call log made, then the wireless device 104 location can only be guessed upon. The system would have to resort to the users "home" NID and then supply that to the querying system. The NID could be resolved into a city, state, geographic region. The information would be included in the billing cycle as an approximation of the user's location. An appropriate consideration would be to inform on the billing cycle that is location is inaccurate and only an approximation and could be incorrect.

An additional use of a cumulative report would be for an external query to be made on a plurality of logs. The logging criteria could list any data field include wireless device identifiers 3724 (ex: phone #'s), logs from geographic regions, etc. The query could be remote or from an internal memory storage 2818 system. To make this possible, the external query would have to be IP base, ATM, or another universal standard that would allow a plurality of users access to the system and provide a secure data transmission.

The filter can then derive only the logs for a given user, or group of users, personal database folders. The results would then be returned and could be listed either textually or graphically to the user. A text representation would be for a list of database entries that met the specifications to be listed on the screen. A graphical representation could be to plot a map and indicate log locations on it. These options are described in the data log graphical display section.

Data Log Graphical Display

The user may parse a tracking log in their personal database. These logs will contain the location tracking system 5300 information for anything the user requested from the location tracking system 5300 software. The user can read this information after it is parsed in text form however a series of latitudes and longitudes will simply be repeated at the update intervals for each time a location was determined. The series of latitudes and longitudes is not very valuable to a user in general. An easy way for the user to gain valuable insight is to display this information on a graphical display unit. This could be a monitor or other display hardware attached to the querying device. It could also be a hard copy reproduced and printed on a printing device.

The log can be parsed and converted to a graphical display for the user by the following method. First, the database entry must be scanned and read all the correlated data for latitude and longitude information 2830 for the tracked wireless device 104. The most extreme dimensions in for example, east, west, north and south (using Cartesian coordinates) will be noted. In this case you could also use any other dimensionally system convenient (radial, spherical). The extreme locations will be the boundaries of the displayed map. The data points will be plotted on that map, correlating data for latitude and longitude information 2832 to the correlated pixel separation as correlated to the scale of the map. The minimum resolution is the pixel separation at the monitors screen resolution. The distance will be used to disregard location points at distances less than a given amount.

The plotting system can then plot the remaining points to the display screen 2836. The system will then have a map with the data points plotted to it. To increase accuracy the system may also be able to provide the described functionality that is not common knowledge. All roadways and transportation ways will be illustrated and correlating data for latitude and longitude information 2830 on the map. If a wireless device 104 is traveling in a direction for a given distance and follows a road way but is not on it exactly the software could assume the wireless device 104 is on the roadway and re-center the data points on the roadway to increase accuracy.

The plotting system would allow the system to more accurately display a tracked wireless device 104 to a user. When the location of this wireless device 104 is plotted it would not show the device passing though buildings or other objects and allow the location of the data point to be shifted to the adjacent roadway or habitable area. Definable parameters would be the distance traveled along a roadway and the distance away from the road way that the software could use as criteria to assume the wireless device 104 is on the road. The distance should be conservative as to prevent obscuring real locations. An appropriate distance could be from 5 meters to 100 meters depending on the tuning of a network engineer for a particular situation.

Displaying the wireless device 104 travel vector may also be useful. This Would allow the user to see the relative travel direction and speed of the wireless device 104. To accomplish this, the system would sample a defined parameter that represents how many data points to average. If the software averages 20 data points then the average direction and velocity would be represented by a vector on the display. The foot of the vector would be at the mean location of the sample range, and the vector length from foot to tip would be proportional to the average velocity over that sample time. The vectors would be plotted for every group of data points. The group size could be adjustable by the user and is accomplishable through any data interface.

Another display option would be for the user to have a real-time replay of the user's location. The display could be accomplished by plotting points to the screen at the minimum pixel separation over the time interval shown. The plotting is easily done and would give the user a perspective of where the user was at various points in time. A text information box can then additionally show the time during the call while points are being plotted.

The display software 2832 that gives the GUI and mapping ability can also show a plurality of log locations for a plurality of log database entries. The mapping can be accomplished by, as before, scanning logs for extreme distances. In this case though, all logs that are selected would have to be scanned for their maximum geographic dimensions. Once this is done, a map could be generated based on the dimensions. The overlay for the logs would be definable by programming, but a convenient method is to determine the initial starting location of each call and then to plot these points for each call on the map.

The user may select points and then the entire route can be plotted on the map. The user who wants more detail may zoom in. The new dimensionally of the map would require the minimum pixel separation to be re-computed and would then allow more detail or less depending on if the user zoomed in or out.

Alternate method that could be used if more detailed location information is available in future network configurations would be:
 Plotting altitude
 Inside building location
 Plotting call detail (logged speech)
Inter Network Communication To make the location tracking system 5300 available to other networks outside any single entity, a database sharing system must be established. A most likely case would be for a system such as an ATM routing center or an IP (connectionless) based system to be used.

The first system is beneficial in cases where a large number of database queries may be made. ATM switching allows for a dedicated path to be established between host and user sites and allow a rapid connection once the line is established. Basic benefits to consider when choosing ATM switching are:
 High performance via hardware switching
 Dynamic bandwidth for busy traffic
 Class-of-service support for various traffic type
 Scalability in speed and network size
 Common LAN/WAN architecture
 Opportunities for simplification via VC architecture
 International standards compliance The benefits of IP switching as opposed to direct ATM connections between wireless device networks 100 are that the complexity is reduced. You only route packets to the next routing point and can take advantage of preexisting hardware on other networks to get your data to the destination, in our case the other wireless device 104 network. The ability to handle security on a traditional router basis is very complex and the speed at which a router switches or routs a packet is very slow and cumbersome because every packet has to be looked at as it goes through the wireless device network 100. This can reduce security and is a consideration for any wireless provider when implementing IP switching. With an IF switch (MTX or other) 130-based network, what happens is the first packet is looked at and the supplementary packets do a quick forward look-up and then everything else goes through the network very, quickly, so it's less costly and it's easier to administer.

ATM systems require new and expensive hardware to be added but are often faster and more reliable. The system is also a far more secure method because all information is on a protected network at all times. IF based system here could use the internet 3202 to send requests between wireless device network 100 locations and allow for rapid development and low cost of implementation.

The inter-network structure would allow wireless device networks 100 to query each other for information. Security and fire-wall precautions aside, this allows one wireless device network 100 to retrieve the location of a wireless device 104 on any other wireless device network 100. The inter-network structure would allow the tracking of the two, or more, wireless devices 104 on a call or other communication. It would also allow tracking wireless devices 104 as they moved off of a network providers system and on to a remote system. IF version 6 provides for the internet 3202 solutions to inter-network wireless device 104 movement and would allow tracking to occur over multiple wireless device networks 100.

The data logs could then be generated at the remote wireless device network 100 and retrieved by the user's home wireless device network 100. This would allow tracking beyond the users own network boundaries.
Security The security of this wireless device network 100 can be viewed in two subsystems. First the network must secure access to the system at a user level access, or group access scheme. Second, the system must secure user system rights. In this regard, it must secure that any user may not gain access to sensitive information of another user it does not have rights to.

The access of a user to the system will be defined and can be implemented by various methods. Secure Socket Layer (SSL) can be used to guarantee that and external wireless device user 102 has a secure connection. Modern internet 3202 browsers use a SSL to encrypt the information that flows between the browser and the web server. A browser using SSL has established a secure encrypted connection with the server, meaning it is safe to send sensitive data. In the case of a local connection less line security is necessary. 128 bit or higher encryption of data across a wireless device network 100 will allow data to remain private in transit.

To allow for a secure connection various protocols can be used. FTP, and telnet offer some protection, but secure connections such as used by verging and other companies to establish "user identity" are recommended. The connection types should be connectionless service types. The secure connection ensures that packet never follow the same path across a network such as the internet 3202. The secure connection allows for less possibility of snooping and more security. On secure connections (point-to-point), connection oriented ATM links can suffice because the line is secure in a physical sense.

Wireless device users 102 will be placed in categories based on access rights. All three categories are defined by a administrator and are adjustable, but generally accepted standards are:

User
Super user
Administrator

A user level access will give the entity connecting to the system the ability to access only files created and stored in it user directory. The user may only request logs be created for wireless devices 104 that have been added to its authorized list by an administrative account.

A super user has access to all the user rights for itself, but may also have rights to the files and permissions of a group of wireless device users 102. This would allow the user to track wireless devices 104 listed on other wireless device users 102 accounts.

An administrator has all the access of the super user but also has the ability to create and delete accounts, as well as file management. This allows the administrator unrestricted access to all files on a server. It can also alter and change system parameters that affect any or all wireless device users 102.

Physical Hardware to Realize Embodiment

To implement the primary embodiment 2800 there must be a hardware platform for the software to function from. The term function refers to the normal operation of the software that includes the primary embodiment 2800 as well as any other secondary software packages that would run to assist the primary embodiment 2800. The secondary processes are commonly known and would not be covered by this patent. An example would be dynamic link libraries that are commonly known and used to linking various software elements.

The hardware required to implement the user location database manager 904 is inclusive of but not limited to, based on any unique hardware setup:

Data storage medium
Data storage controller (RAID, etc)
Computer 2910 (includes motherboard, CPU, RAM, etc)
Network interface card The data storage medium should consist of a hard disk or other nonvolatile storage medium that is can be accessed by a computer 2910. It can conform to either, IDE or SCSI standards. Extended standards could include ultra wide SCSI and EIDE as well as other derivations. The claimed scope is that a communications protocol database 3004 and physical layer would provide high bandwidth capacity and high efficiency. Examples of this hardware may be a western digital 10,000 RPM 80 GB deskstar hard disk drive.

The data storage controller consists of one of the following generic classes:

IDE/BIDE/etc
SCSI/U W-SCSI/etc
RAID type 1, 2, etc

The controllers are required for the computer 2910 to be allowed to access the hard disk drive. To allow for this to work the computer 2910 must be compatible with the controller. The RAID controller allows a unique benefit to the database and storage architecture. Having many configurations, very high bandwidth and redundancy of data is possible. The accurate usage of RAID architecture is critical for these databases as VERY high bandwidth is required on large wireless device networks 100. Explained as follows are the recommended RAID types and the considerations in choosing each.

In RAID 0, the controller will store the data across two or more disks, writing the data in blocks across the disks. For example, if you have two disks, block one will be written to disk one, block two to disk two, block three to disk one, and so on. The data will increase performance since the controller can read/write in parallel, but there is no redundancy, if one disk fails, the whole array fails, since the data is spread across the array. RAID 0 is the most efficient level in terms of cost/space/performance, as you will increase performance without sacrificing any disk space, though access times suffer slightly. RAID 0 is best used where cost/performance is critical, but data integrity is not. For this reason the type of RAID would be the least recommended for the primary embodiment 2800 and its databases.

A RAID 1 array consists of two or more disks and acts as one logical disk while mirrored data 1532 is passed between the disks. If you have an array consisting of two 36 GB disks, you will end up with a logical disk of 36 GB, with data being stored on both the physical disks. Hence one of the physical disks can fail, and the array will keep working, and if the disks are hot-swappable, which is the case with most SCSI RAID setups, the failed disk can be swapped for a new disk, and the controller will synch the data between the disks, restoring the array to full functionality, with no downtime. RAID 1 also increases the read performance since both disks can be read at once, while write performance will be more or less identical to that of one single disk. RAID 1 is a way to achieve good read performance, as well as redundancy. For this reason it is recommended over RAID 0 and will allow higher bandwidth and therefore more throughput from the database to the computer 2910

Striping with parity increases performance while maintaining a handle on redundancy. RAID 3 does this by implementing a RAID 0 and then creating a separate disk to write parity information. RAID 3 helps, if you lose a disk, that disk's information can be recreated. RAID 3 works on a binary system. (i.e. 11=0parity, 000 parity, 01=1 parity, 10=11 parity) You can take any two bits, and recreate the lost one. The benefits of this are performance and safety, although with RAID 3 you put a large strain on the odd disk that contains parity as everything has to be calculated and written to it. For ever bit written to any other disk, one gets written there, both bottlenecking performance, and creating more strain on this disk. 50 is considered to be a much better option. A required minimum of 3 disks, and an odd number of disks. RAID 3 is very expensive in terms of CPU power when implemented in software. For this reason this configuration is recommended over RAID 0 but less than RAID 1 for the primary embodiment 2800.

RAID 5 is a quite common type of RAID but it doesn't offer the performance of RAID 1+0, but is much cheaper.

Three or more disks a required for a RAID 5 array. RAID 5 stores parity information (unlike RAID 1 which stores data redundantly) across the disks in the array, this information can then be used to rebuild lost data in case of disk failure. Raid 5 is not recommended at all but is explained such that RAID 50 can next be fully understood.

Raid 50 is the combo of RAID 5 and RAID 0. The major benefit is speed. RAID 50s take the data to write, say 256 k, then split that among the RAID 0, so 128 k+128 k, then split that among the RAID 5s, so you could be writing 32 k+32 k+32 k+32 k+32 k+32 k+32 k+32 k all to separate disks at the same time. The same is true in reverse as well for reading. You could also lose I disk out of each array and the controller would keep running. You can stream high amounts of data to several machines at once over the network. To do it right it really should be done on two controllers, or one multi-channel controller to give the arrays as much bandwidth as possible. RAID 50 requires a minimum of 6 disks, and an even number of disks. The setup is recommended for the database controller. The system will be able to keep up with network connection bandwidth (T-1, T-3, OC-3, etc). The primary embodiment 2800 will operate at maximum efficiency using this setup.

The physical hardware should consist of a processor capable of computing the necessary work load. A dual processor system would reduce the load further. An intel XEON system (dual processor) at 1 GHz or above would suffice. Additional RAM in excess of 1 G would be beneficial and allow fast access to cached data. Similar systems to this are produced by AMD and other chip manufacturers.

The location tracking software 5300 may exist on any of the above said hardware but should have its own reserved storage medium. A low bandwidth connection to the computer 2910 is OK because the software will run from cache memory as it is a static program that is accessed frequently.

The display software 2832 does not require a specific set of hardware, more of a class of hardware. The display hardware 2832 required is a display driver or graphics hardware controller, commonly called a graphics card. Performance of the card need not be high but should allow for an adequate resolution display for the minimum programming of the display software 2832.

Display hardware 2832 that could be used as the physical display device can be CRT computer 2910 monitor displays, LCD displays of various sizes including palm-top sized displays. Example of this is a Viewsonic 19" CRT G790, this monitor would support up to 1 600×1 200 at 80 Hz refresh which would allow proper viewing of all visual data from the preferred embodiment 2800

The network interface cards required would be a 121100 base-T or higher connection. Hardware such as a 3COM Etherfast NIC would function properly. External connectivity to the internet 3202 or other high speed data access points is also required which often requires a ATM connection or other gateway routing wireless device 104.

Directional Assistance Network (DAN)
THE DAN COMPRISES:
  A COMPUTER SYSTEM HARDWARE/SOFTWARE
  AN OPERATING SYSTEM
  A DIRECTIONAL ASSISTANCE OPERATING PROGRAM
  AN AUTOMATED TELEPHONE HARDWARE/SOFTWARE
  A VOICE RECOGNITION HARDWARE/SOFTWARE
  TRAFFIC MONITORING AND ROUTE PLANNING HARDWARE/SOFTWARE AND MAPPING HARDWARE/SOFTWARE
  A WIRELESS DEVICE USER LOCATION DATABASE AND DATABASE LOGIC CENTER HARDWARE/SOFTWARE (OPTIONAL IF LOCATION DATA IS OBTAINED FROM AN OUTSIDE DATABASE, E-MOBILITY, ETC.)
  A PSTN USER LOCATION DATABASE AND DATABASE LOGIC CENTER HARDWARE/SOFTWARE (OPTIONAL IF LOCATION DATA IS OBTAINED FROM AN OUTSIDE DATABASE, E-MOBILITY, ETC.)
  LOCATION CONVERSION HARDWARE/SOFTWARE AND DATABASE TO CONVERT STREET ADDRESSES TO LONGITUDE AND LATITUDE DATA, AND TO CONVERT LONGITUDE AND LATITUDE DATA TO STREET ADDRESS DATA.
  A VOICE MAIL SYSTEM
  INTERNET ACCESSIBLE
  INTERNET ADDRESS AND WEB SITE.
  ABILITY TO MAKE AND SENT MAPS TO WCD, NAVIGATIONAL SYSTEMS, FAXES, E-MAILS, ETC . . . .
  A LIVE OPERATOR WHO CAN ACCESS, PROGRAM AND SERVICE ALL PARTS OF THE DAN.
  CONVERSION/STANDARDIZATION HARDWARE/SOFTWARE FOR INTERFACING WITH WIRELESS NETWORKS, WIRELESS DEVICES AND PUBLICLY SWITCHED TELEPHONE NETWORKS.
  CONVERSION/STANDARDIZATION HARDWARE/SOFTWARE FOR SENDING AND RECEIVING MAPS, F-MAILS AND FAXES.

Detailed Description of the Embodiments

Figure 70:
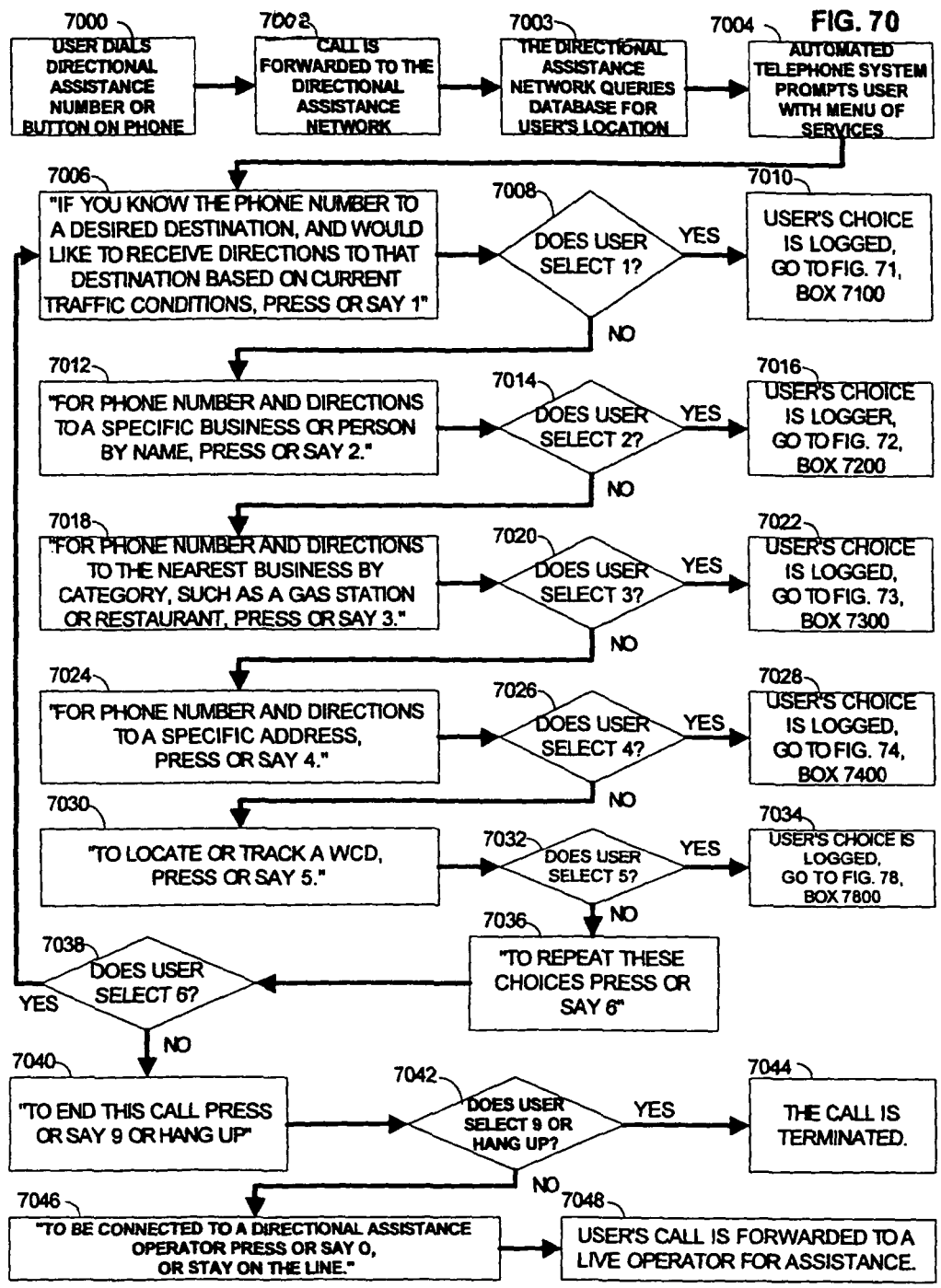

FIG. 70 is a flowchart of the Directional Assistance Network (DAN) query process. To begin the query process, a person seeking directional assistance or location information begins a query for directional assistance by dialing a specified phone number, such as, for example, 411, 511, an 800 number or a dedicated button on a wireless device, navigational system or a land-based communications device 7000. The user may also process a DAN query via the Internet. The user can enter his DAN query via a keypad or keyboard, through the use of voice recognition software, a live operator or by way of an interactive display screen, such as may be found on a wireless device or a navigational system. The process begins when the DAN 8100 receives the user's call 7002. The DAN 8100 then queries a user location database (ULD) to determine the user's location and logs to user's location within the DAN 8100, BOX 7003.

Still referring to FIG. 70, BOX 7003, if the DAN 8100 determines that the user is calling from a wireless communication device (WCD) 8205, such as, for example, a cellular phone, an Personal Digital Assistant (FDA), wireless navigational system, etc, then DAN 8100 queries a wireless network's ULD 900 in order to determine the user's location within the wireless network. The wireless network's ULD 900 can exist internally to the DAN 8100 and constructed by the DAN 8100 with information obtained from the wireless network through querying the wireless network's e-mobility services, switch and/or base station controller. The DAN 8100 could also find the user's location without a wireless network's ULD 900, by retrieving the user's location data from the wireless network on an as needed basis. The DAN 8100 can generate the location on an as needed basis by accessing pertinent location data, which can be obtained from the switch (MTX or other) 130, and the base station controller (BSC) 206. The pertinent information would include the round trip delay (RTD), signal strength and other factors needed for determining location of wireless device, which are disclosed in an attached document. The ability to determine the user's geographic location in the form of longitude and latitude data, when calling from a wireless device, is disclosed in an attached document entitled, 'A machine for providing a dynamic database of geographic location information for a plurality of wireless communications devices and process for making same". This document referenced above, is a U.S. Provisional Patent, U.S. Ser. No. 60/327,327, which was filed on Oct. 4, 2001, is hereby incorporated into this disclosure. Also, the wireless network's ULD 900 may be comprised of only a single service provider's network, or in may comprise a plurality of service provider's networks data regarding wireless device user location data. The DAN 8100 may use its conversion/standardization hardware/software 8160 to interface with wireless networks and wireless devices.

Still referring to FIG. 70, BOX 7003, if the user's call originates from a publicly switched telephone network (PSTN) 138, the user's location can be determined by querying a PSTN phone location database 8145 which consists of listings of the names of businesses and private residences, their respective street addresses, city, state and corresponding longitude and latitude coordinates, and their telephone numbers. The PSTN phone location database 8145 could be internal or external to the DAN 8100. The database could also be comprised of a street map location system instead of a longitude and latitude based system. The DAN 8100 could also find the user's location without a PSTN's phone location database 8145, by retrieving the user's location data from the PSTN 138 on an as needed basis. The location can be generated on an as needed basis within the DAN 8100 by accessing pertinent location data, which can be obtained from the switch (MTX or other) 130, and the base station controller (B S C) 206 of the PSTN 138. The DAN 8100 may use its conversion/standardization hardware/software 8160 to interface with the PSTN 138.

Regardless of whether the user is calling form a wireless device or a landline, once the user's geographic location has been determined and logged into the DAN's voice mapping software 8110, The DAN's automated telephone system prompts the user with a menu of services 7004. Still referring to FIG. 70, the DAN 8100 first asks the user "If you know the phone number of your desired destination, and would like to receive directions to that destination, please press or say 1" 7006. The automated telephone system waits for the user's response 7008. If the user selects "1", the user is forwarded to FIG. 71, BOX 7100, the portion of the query process that retrieves the geographic coordinates of the users destination, based on the destination's area code and telephone number 7010.

Again referring to FIG. 70, BOX 7008, if the user does not select "1" within a specified period of time, the automated telephone system continues to instruct the user "For the telephone number and directions to a specific business or person by name, press or say "2" 7012. The automated telephone system waits for the user's response 7014. If the user selects "2", the user is forwarded to FIG. 72, BOX 7200, the portion of the query process that retrieves the business or residential listing by the name of the listing 7016.

Still referring to FIG. 70, BOX 7014, if the user does not select "2" within a specified period of time, the automated telephone system continues to instruct the user, "For a phone number and directions to the nearest business by category, such as for example, a gas station or restaurant, press or say "3" 7018. If the user selects "3", the user is forwarded to FIG. 73, BOX 7300, the portion of the query process that retrieves the geographic coordinates of the users destination, based on the category of the business which the user wishes to find 7022.

Again referring to FIG. 70, BOX 7020, if the user does not select "3" within a specified period of time, the automated telephone system continues to instruct the user, "For a phone number and directions to as specific address, press or say "4" 7024. If the user selects "4", the user is forwarded to FIG. 74, BOX 7400, the portion of the query process that retrieves the geographic coordinates of the specific address the user is requesting directions and the phone number 7028. Still referring to FIG. 70, BOX 7026, if the user does not select "4" within a specified period of time, the automated telephone system continues to instruct the user, "To locate or track a wireless device, press or say "5" 7030. The DAN 8100 then waits a specified period of time for the user to respond by selecting "5" 7032. If the user selects "5", the user is forwarded to FIG. 78, BOX 7800 and the DAN 8100 continues it's query process 7034.

Again referring to FIG. 70, BOX 7032, if the user does not select '5" within a specified period of time, the automated telephone system continues to instruct the user, "To repeat these choices, press or say "6" 7036. The DAN 8100 then waits a specified period of time for the user to respond by selecting "6" 7038. If the user selects "6", the user is returned to FIG. 70, BOX 7006, the portion of the query process which has been described above is repeated 7032. If the user does not select "6" within a specified period of time, the automated telephone system continues to instruct the user, "To end this call, press or say "9", or hang up" 7040. The DAN 8100 then waits a specified period of time for the user to respond by selecting "9" 7042. If the user selects "9", the call is terminated 7044. If the user does not select '9" within a specified period of time, the automated telephone system continues to instruct the user, "To be connected to a DAN Operator, press or say "0", or say on the line" 7046. The automated telephone system then forwards the user's call, to a live operator for assistance 7048. The live operator has direct access to all components of the DAN 8100 and can assist the user's how are having trouble with the automated system.

Figure 71:
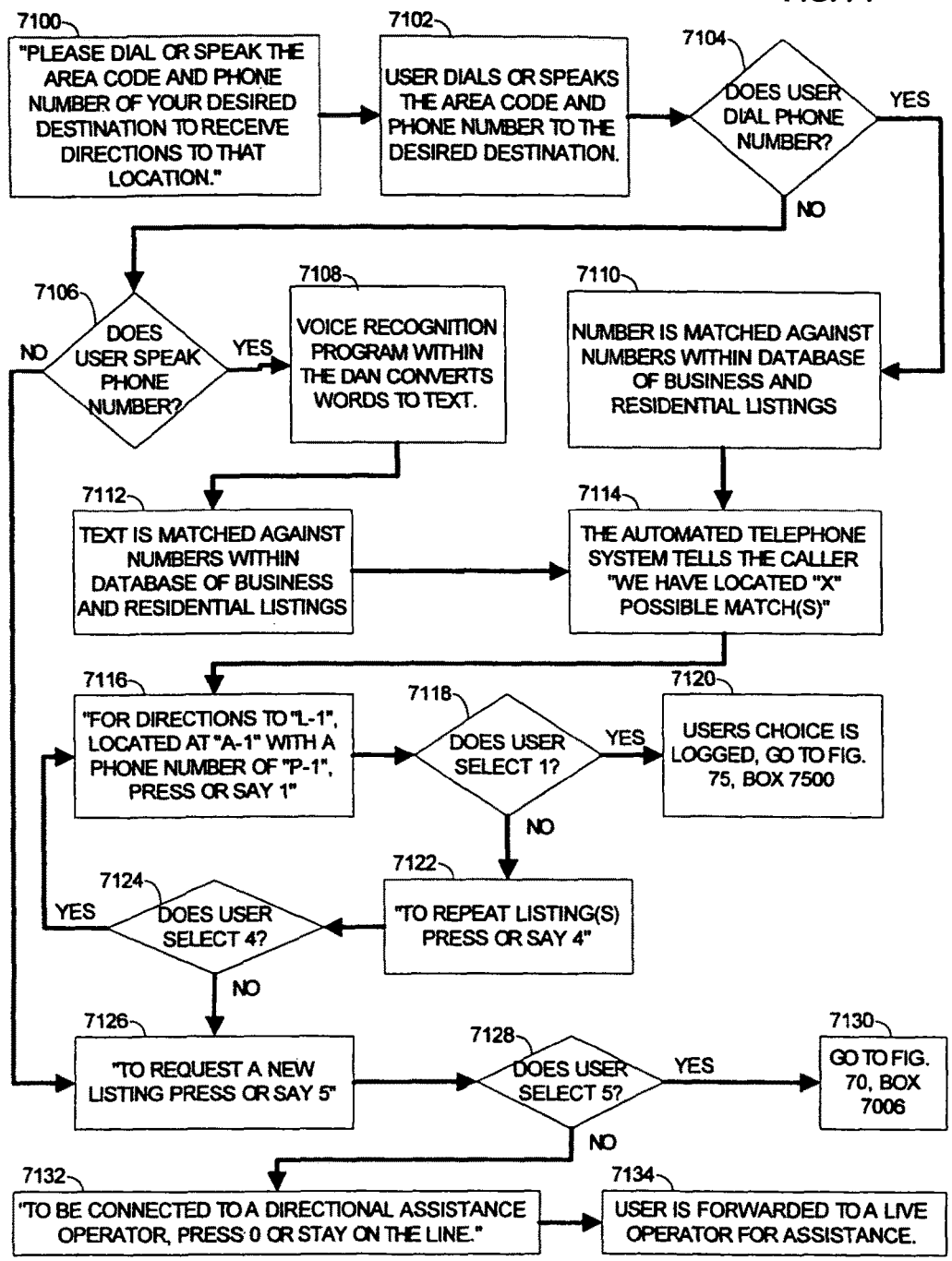

Now referring to FIG. 71, the automated telephone system instructs the user, "Please dial or speak the area code and phone number of your desired destination to receive directions to that location" 7100. The automated telephone system waits for the user to dial or speak the area code and telephone number to the desired destination 7102. The automated telephone system waits for the user to respond within a specified period of time by dialing the phone number 7104. If the user dials the phone number, the number is matched against numbers within the PSTN phone location database 7110 of business and residential listings, which may be internal or external to the DAN 8100. The automated telephone system then tells the user, "We have located "X" number possible match(s)" 7114.

Still referring to FIG. 71, if the user does not dial a phone number within the specified period of time, the automated telephone system waits for the user to respond by speaking the phone number 7106. If the user does not respond within a specified period of time, the user's query is forwarded to FIG. 71 BOX 7126, for further processing. If the user responds by speaking the phone number, a voice recognition program within the DAN 8100 converts the user's words into texts 7108. The DAN 8100 matches the text against telephone numbers contained within the database of business and residential listings 7112. The automated telephone system tells the user, "We have located "X" number possible match(s)" 7114.

Again referring to FIG. 71, the automated telephone system then instructs the user, "For directions to "listing 1" located at "address 1" with a phone number of "phone 1", press or say "1" 7116. The automated telephone system then waits a specified period of time for the user to press or say "1" 7118. If the user selects "1", the user's choice is logged within the DAN 8100, and the user's query is forwarded to FIG. 75, BOX 7500, for further processing 7120. If the user does not select "1", the automated telephone system instructs the user, "To repeat listing(s), press or say "4" 7122. The automated telephone system then waits a specified period of time for the user to respond by pressing or saying "4" 7124. If the user does select "4", the automated telephone system returns to FIG. 71, BOX 7116 and repeats the listing. If the user does not select "4" within the specified period of time, the automated telephone system instructs the user, "To request a new listing, press or say "5" 7126. If the user selects "5", the DAN 8100 returns the user to FIG. 70, BOX 7006, where the user can begin to search for a new listing 7130. If the user does not select "5", the automated telephone system instructs the user, "To be connected to a Directional Assistance Operator, press or say "0", or stay online" 7132. The automated telephone system then forwards the user, to a live directional assistance operator for assistance 7134.

Figure 72:
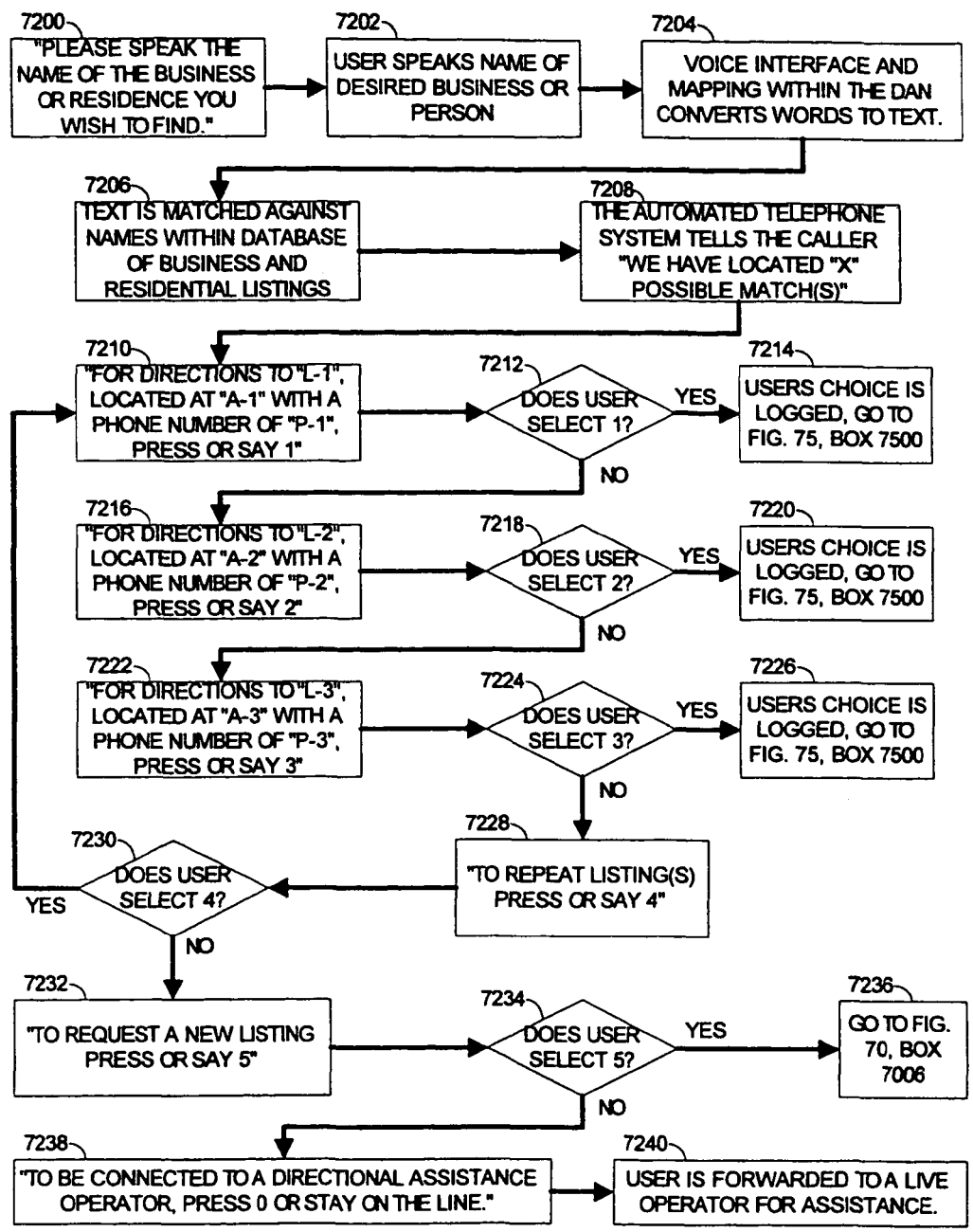

Now referring to FIG. 72, the automated telephone system instructs the user, "Please speak the name of the business or residents you wish to find" 7200. The automated telephone system waits for the user to speak the name of the desired business or person 7202. The voice interface software 8105 and voice mapping software 8110 within the DAN 8100 converts the user's spoken words into text 7204. The DAN 8100 matches the text against names within the PSTN phone location database 8145, which may be internal or external to the DAN 8100, BOX 7206. The automated telephone system then informs the user, "We have located "X" number of possible match(s)" 7208.

Still referring to FIG. 72, the automated telephone system then instructs that user, "For directions to "listing 1" located at "address 1", with a phone number of "phone number 1", press or say 1" 7210. The automated telephone system then waits a specified period of time for the user to respond by selecting "1" 7212. If the user selects "1", the user's choice is logged into the DAN 8100, and the DAN 8100 forwards the user to FIG. 75, BOX 7500, for further processing 7214. If the user does not respond by selecting "1", the automated telephone system instructs the user, "For directions to "listing 2" located at "address 2", with a phone number of "phone number 2", press or say "2" 7216. The automated telephone system then waits a specified period of time for the user to respond by selecting "2" 7218. If the user selects "2", the user's choice is logged into the DAN 8100, and the DAN 8100 forwards the user to FIG. 75, BOX 7500, for further processing 7220. If the user does not respond by selecting "2", the automated telephone system instructs the user, "For directions to "listing 3" located at "address 3", with a phone number of "phone number 3", press or say "3" 7222. The automated telephone system then waits a specified period of time for the user to respond by selecting "3" 7224. If the user selects "3", the user's choice is logged into the DAN 8100, and the DAN 8100 forwards the user to FIG. 75, BOX 7500, for further processing 7226.

Again referring to FIG. 72, if the user does not respond by selecting "3", the automated telephone system instructs the user, "To repeat the previous listing(s), press or say "4" 7228. The automated telephone system then waits a specified period of time for the user to respond by selecting "4" 7230. If the user selects "4", the DAN 8100 returns the user to FIG. 72, BOX 7210, were listings are repeated by the DAN's automated telephone system. If the user does not select the automated telephone system instructs the user, "To request a new listing, press or say "5" 7232. The automated telephone system then waits a specified period of time for the user to respond by selecting "5" 7234. If the user selects "5", the DAN 8100 returns the user's query to FIG. 70, BOX 7006, were a new query process can begin 7236. If the user does not select "5", the automated telephone system instructs the user, "To be connected to a Directional Assistance Operator, Press "0", or say on the line" 7238. The user's call is then forwarded to a live operator for assistance 7240.

Figure 73:
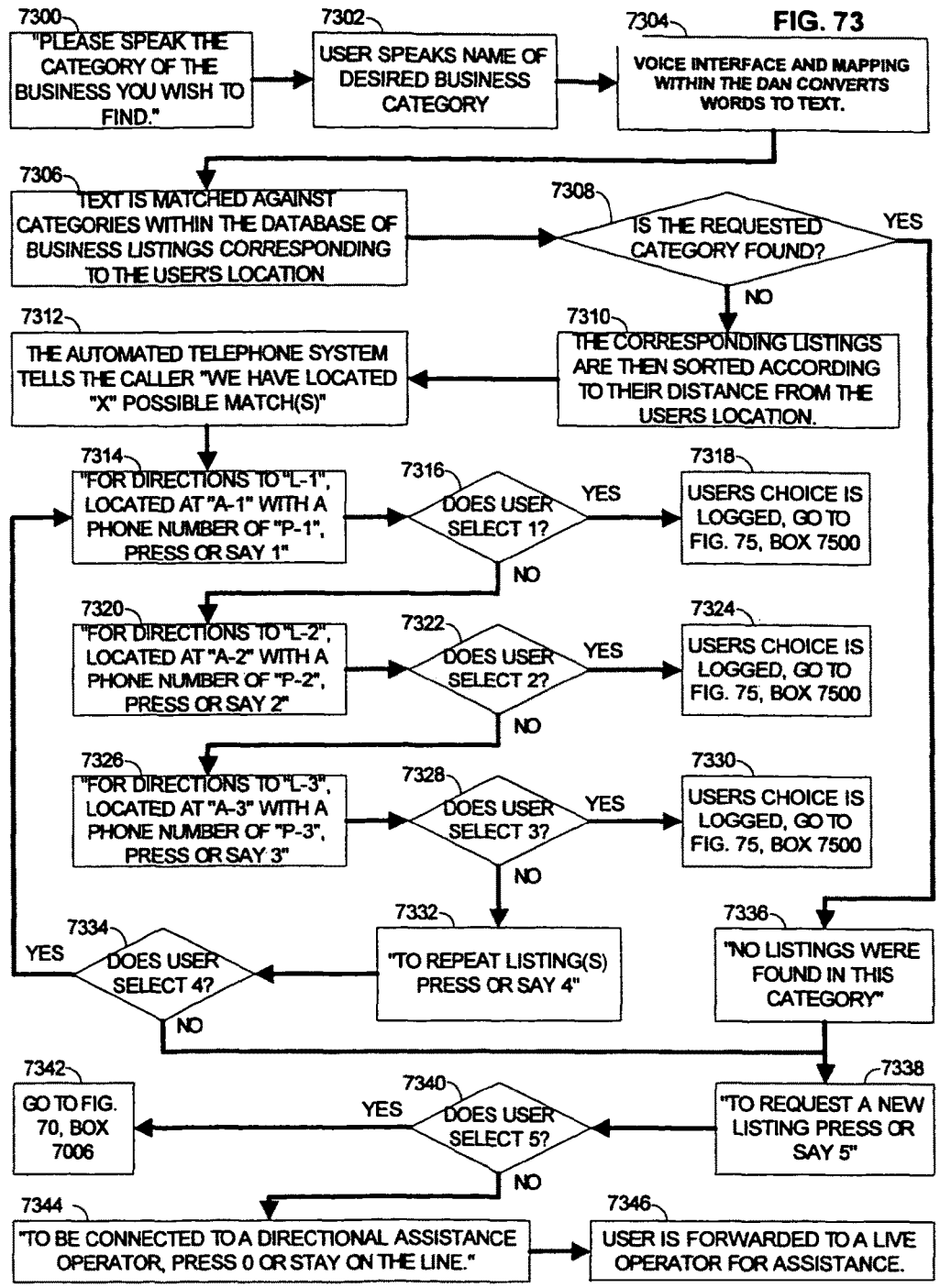

Now referring to FIG. 73, the automated telephone system instructs the user, "Please speak the category of business you wish to find" 7300. The automated telephone system waits for the user to speak the name of the desired business category 7302. The voice interface software 8105 and voice mapping software 8110 within the DAN 8100 converts the user's spoken words into text 7304. The DAN 8100 matches the text against categories within the PSTN phone location database 8145 that most closely correspond to the user's geographic location 7306. If the DAN 8100 does not find any listings within the user's selected category 7308, the automated telephone system informs the user, "No listings were found in this category" 7336. The automated telephone system then instructs the user, "To request a new listing, press or say 5" 7338. The DAN 8100 then waits a specified period of time for the user's response 7340. If the user selects "5", the user is returned to FIG. 70, BOX 7006, for an opportunity to select a new listing 7342. If the user does not select "5", the automated telephone system instructs the user, "To be connected to a Directional Assistance Operator, Press "0", or say on the line" 7344. The user's call is then forwarded to a live operator for assistance 7346.

Still referring to FIG. 73, if the DAN 8100 finds the requested category, the listings contained within that category are sorted according to distance from the user's geographic location 7310. The automated telephone system then informs the user, 'We have located "X" number of possible match(s)" 7312. The number "found" listings that are actually available to the user can be set within the DAN 8100 so as only to provide, for example, only the three closest listings within the selected category.

Still referring to FIG. 73, the automated telephone system then instructs that user, "For directions to "listing 1" located at "address 1", with a phone number of 'phone number 1", press or say "1" 7314. The automated telephone system then waits a specified period of time for the user to respond 7316. If the user selects "1", the user's choice is logged into the DAN 8100, and the DAN 8100 forwards the user to FIG. 75, BOX 7500, for further processing 7318. If the user does not respond, the automated telephone system instructs the user, "For directions to 'listing 2" located at "address 2", with a phone number of "phone number 2", press or say '2" 7320. The automated telephone system then waits a specified period of time for the user to respond 7322. If the user selects "2", the user's choice is logged into the DAN 8100, and the DAN 8100 forwards the user to FIG. 75, BOX 7500, for further processing 7324. If the user does not respond, the automated telephone system instructs the user, "For directions to "listing 3" located at "address 3", with a phone number of "phone number 3", press or say "3" 7326. The automated telephone system then waits a specified period of time for the user to respond 7328. If the user selects "3", the user's choice is logged into the DAN 8100, and the DAN 8100 forwards the user to FIG. 75, BOX 7500, for further processing 7330.

Again referring to FIG. 73, if the user does not respond, the automated telephone system instructs the user, "To repeat the previous listing(s), press or say "4" 7332. The automated telephone system then waits a specified period of time for the user to respond 7334. If the user selects "4", the user is returned to FIG. 73, BOX 7314, were listings are repeated through the DAN's automated telephone system. If the user does not select "4", the automated telephone system instructs the user, "To request a new listing, press or say "5" 7338. If the user selects "5", the user's query is returned to FIG. 70, BOX 7006, were a new query process can begin 7342. If the user does not select "5", the automated telephone system instructs the user, "To be connected to a Directional Assistance Operator, Press "0", or say on the line" 7344. The user's call is then forwarded to a live operator for assistance 7346.

Figure 74:
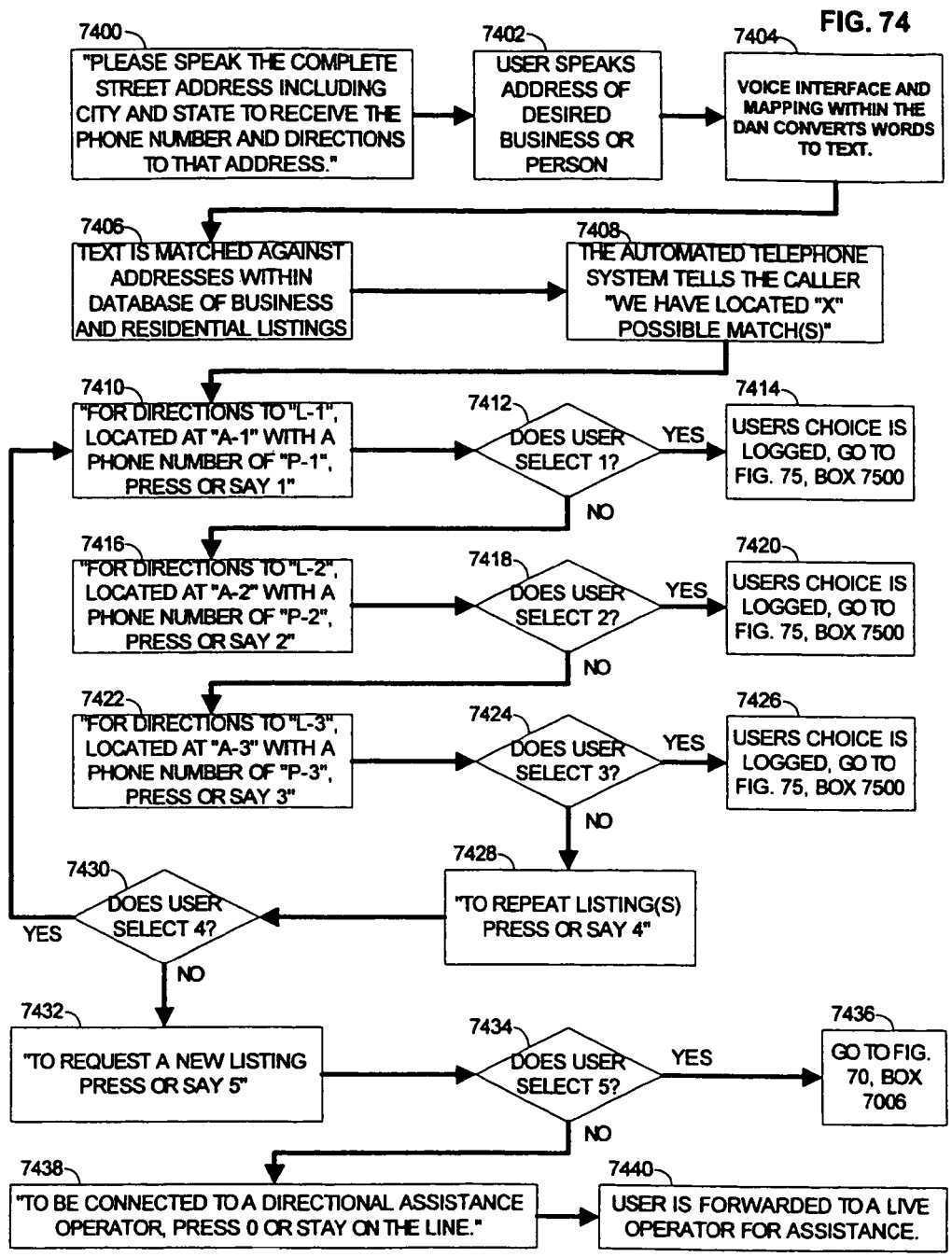

Now referring to FIG. 74, the automated telephone system instructs the user, "Please speak the complete Street address including city and state, to receive phone number and directions to that address" 7400. The automated telephone system waits for the user to speak the name of the desired business or person 7402. The voice interface software 8105 and voice mapping software 8110 within the DAN 8100 converts the user's spoken words into text 7404. The DAN 8100 matches the text against addresses within the PSTN phone location database 7406. The automated telephone system then informs the user, "We have located "X" number of possible match(s)" 7408.

Still referring to FIG. 74, the automated telephone system then instructs the user, "For directions to "listing 1" located at "address 1", with a phone number of "phone number 1", press or say 1" 7410. The automated telephone system then waits a specified period of time for the user to respond 7412. If the user selects 1", the user's choice is logged into the DAN 8100, and the DAN 8100 forwards the user to FIG. 75, BOX 7500, for further processing 7414. If the user does not respond, the automated telephone system instructs the user, "For directions to "listing 2" located at "address 2", with a phone number of "phone number 2", press or say "2" 7416. The automated telephone system then waits a specified period of time for the user to respond 7418. If the user selects '2" the user's choice is logged into the DAN 8100, and the DAN 8100 forwards the user to FIG. 75, BOX 7500, for further processing 7420. If the user does not respond, the automated telephone system instructs the user, "For directions to "listing 3" located at "address 3", with a phone number of "phone number 3", press or say "3" 7422. The automated telephone system then waits a specified period of time for the user to respond 7424. If the user selects "3", the user's choice is logged into the DAN 8100, and the DAN 8100 forwards the user to FIG. 75, BOX 7500, for further processing 7426.

Again referring to FIG. 74, if the user does not respond, the automated telephone system instructs the user, "To repeat the previous listing(s), press or say "4" 7428. The automated telephone system then waits a specified period of time for the user to respond 7430. If the user selects '4", the DAN 8100 returns the user to FIG. 74, BOX 7410, where listings are repeated. If the user does not select "4", the automated telephone system instructs the user, "To request a new listing, press or say "5" 7432. If the user selects "5", the user's query is returned to FIG. 70, BOX 7006, were a new query process can begin 7436. If the user does not select "5", the automated telephone system instructs the user, "To be connected to a Directional Assistance Operator, Press "0", or say on the time" 7438. The user's call is then forwarded to a live operator for assistance 7440.

Figure 75:
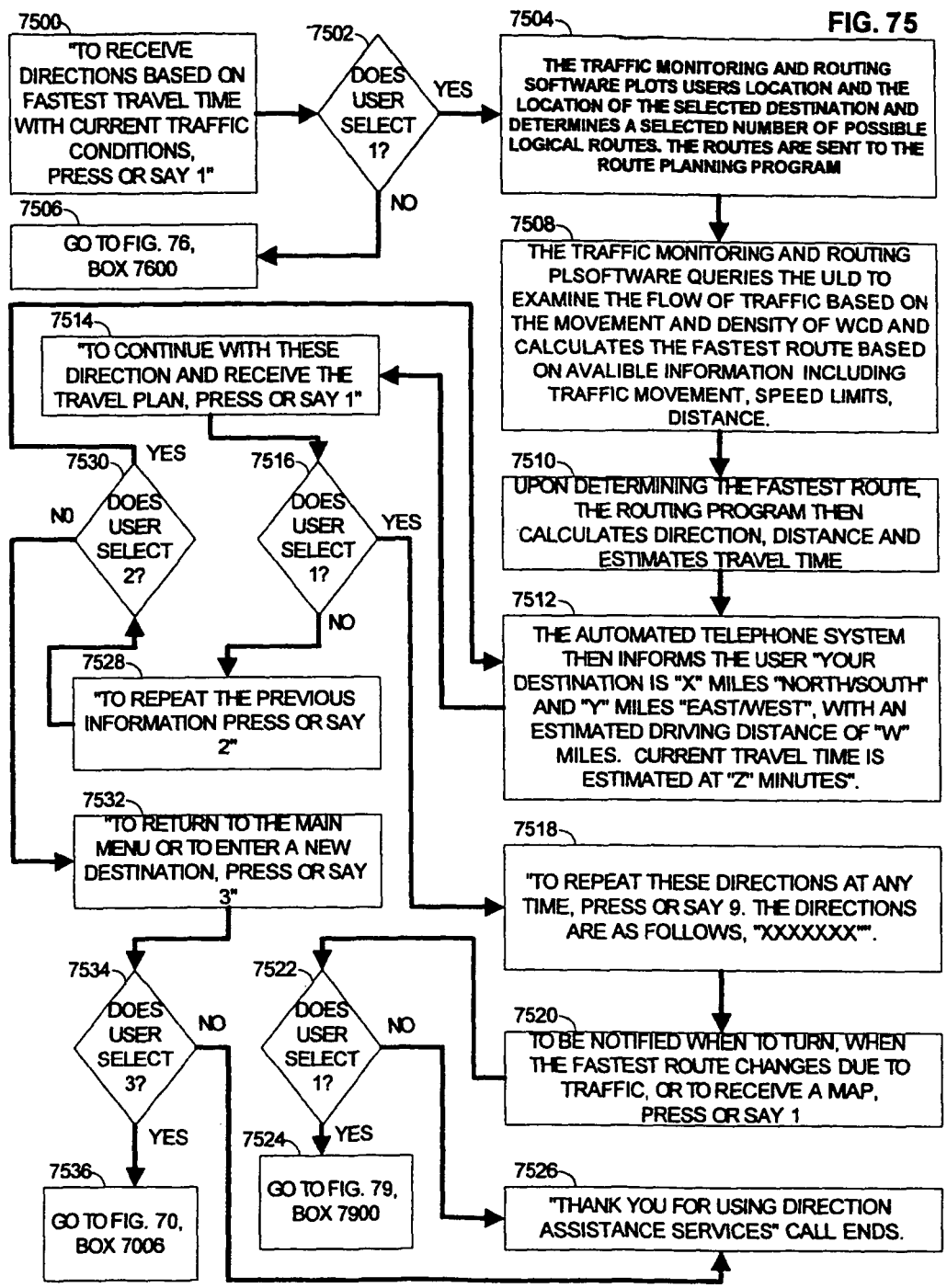

Now referring to FIG. 75, the automated telephone system instructs the user, "To receive directions based on fastest travel time with current traffic conditions, press or say 1" 7500. The automated telephone system waits a specified period of time for the user to respond 7502. If the user does not respond with a specified period of time, the query process is forwarded to FIG. 76, BOX 7600, for further processing 7506. If the user does select "1", the traffic monitoring software 8125 and routing software 8120, within the DAN 8100, plots the user's location and location of the selected destination, and determines a selected number of possible logical routes. The routes are sent to the DAN's traffic monitoring software and routing software 7504. The traffic monitoring software 8125 and routing software 8120 queries the wireless network's ULD 900 to examine the flow of traffic based on the movement and density of wireless devices, and calculates the fastest route based on available information including traffic movement, speed limits (if available) and distance 7508.

Still referring to FIG. 75, upon determining the fastest route, the traffic monitoring software 8125 and routing software 8120 then calculates direction, distance, and estimated travel time 7510. The automated telephone system then informs the user, "Your destination is "X' miles "North/South" and "Y" miles "East/West", with an estimated driving distance of "W" miles. Current travel time is estimated at '1' minutes" 7512. The automated telephone system then instructs the user, "To continue with these directions and receive the travel plans, press or say "1" 7514. The automated telephone system then waits a specified period of time for the user to select 1" 7516. If that user does not respond with within a specified period of time, the automated telephone system then instruments the user, "To repeat the previous information, press or say "2" 7528. The automated telephone system then waits a specified period of time for the user to select '2" 7530. If the user responds by selecting '2", the DAN 8100 returns the user to FIG. 75, BOX 7512. If the user does not select "2" within a specified period of time, the automated telephone system then instruments the user, To return to the main menu, or to enter a new destination, press or say "3" 7532. The automated telephone system then waits a specified period of time for the user to select "3" 7534. If the user responds by selecting "3", the user is returned to FIG. 70, BOX 7006 to began a new query 7536. If the user does not select "3" within a specified period of time, the automated telephone system then informs the user, "Thanking you for using the Direction Assistance Service", and the call is terminated 7526.

Again referring to FIG. 75, BOX 7516, if the user selects "1", the automated telephone system then instructs the user, "To repeat these directions at anytime, press or say "9". The directions are as follows, "XXXXXX" 7518. The automated telephone system then instructs the user, "To be instructed when to turn, to receive a notice when the fastest route to changes due to traffic conditions, or to receive a map of the travel plan, press or say 1" 7520. The automated telephone system then waits a specified period of time for the user to select "1" 7522. If the user responds by selecting "1", the user is forwarded to FIG. 79, BOX 7900 for further processing 7524. If the user does not select "1" within a specified period of time, the automated telephone system then informs the user, "Thanking you for using the Direction Assistance Services", and the call is terminated 7526.

Figure 76:
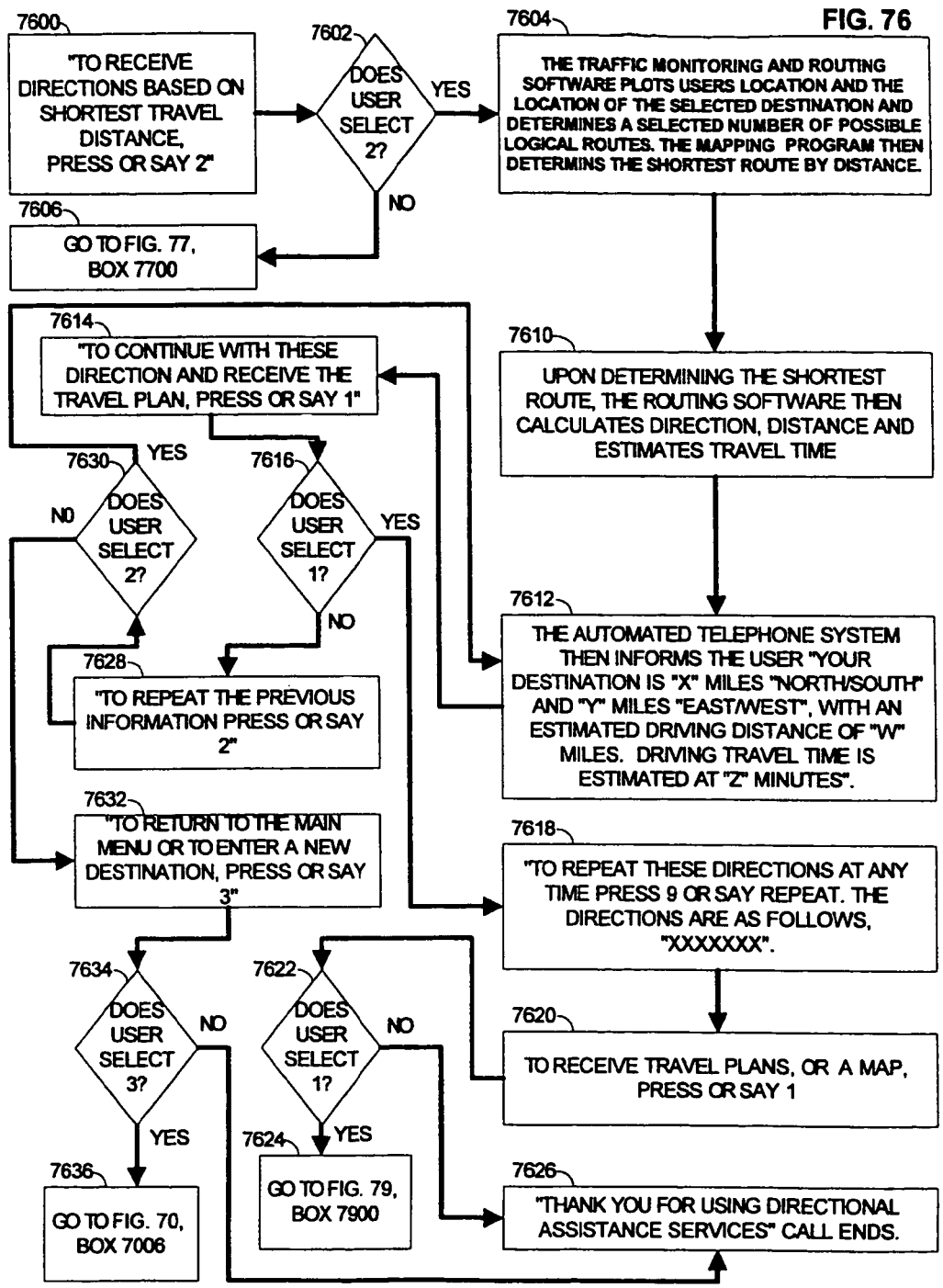

Now referring to FIG. 76, the automated telephone system instructs the user, "To receive directions based shortest travel distance, press or say "2" 7600. The automated telephone system waits a specified period of time for the user to respond 7602. If the user does not respond with a specified period of time, the DAN 8100 forwards the query process to FIG. 77, BOX 7700, for further processing 7606. If the user does select "2", the traffic monitoring software 8125 and routing software 8120 comprised within the DAN 8100, plots the user's location, and location of the selected destination, and determines the shortest possible logical route 7604. The traffic monitoring software 8125 and routing software 8120 then determines the direction, distance, and estimated travel time 7610. The automated telephone system then informs the user, "Your destination is "X" miles "North/South" and "Y" miles "East/West", with an estimated driving distance of "W" miles. Driving time is estimated at "Z" minutes" 7612. The automated telephone system then instructs the user, "To continue with these directions and receive the travel plans, press or say "1" 7614. The automated telephone system then waits a specified period of time for the user to select "1" 7616. If that user does not respond with within a specified period of time, the automated telephone system then instructs the user, "To repeat the previous information, press or say "2" 7628. The automated telephone system then waits a specified period of time for the user to select "2" 7630. If the user responds by selecting "2", the user is returned to FIG. 76, BOX 7612. If the user does not select "2" within a specified period of time, the automated telephone system then instructs the user, "To return to the main menu, or to enter a new destination, press or say "3" 7632. The automated telephone system then waits a specified period of time for the user to-select "3" 7634. If the user responds by selecting "3", the DAN 8100 returns the user to FIG. 70, BOX 7006 to began a new query 7636. If the user does not select "3" within a specified period of time, the automated telephone system then informs the user, "Thanking you for using the Directional Assistance Services", and the call is terminated 7626.

Again referring to FIG. 76, BOX 7616, if the user selects "1", the automated telephone system then instructs the user, "To repeat these directions at anytime, press or say "9". The directions are as follows, "XXXXXX" 7618. The automated telephone system then instructs the user, "To be instructed when to turn, or to receive a map of the travel plan, press or say "1" 7620. The automated telephone system then waits a specified period of time for the user to select "1" 7622. If the user responds by selecting "1", the DAN 8100 forwards the user to FIG. 79, BOX 7900 for further processing 7624. If the user does not select "1" within a specified period of time, the automated telephone system then informs the user, "Thanking you for using the Directional Assistance Services", and the call is terminated 7626.

Figure 77:
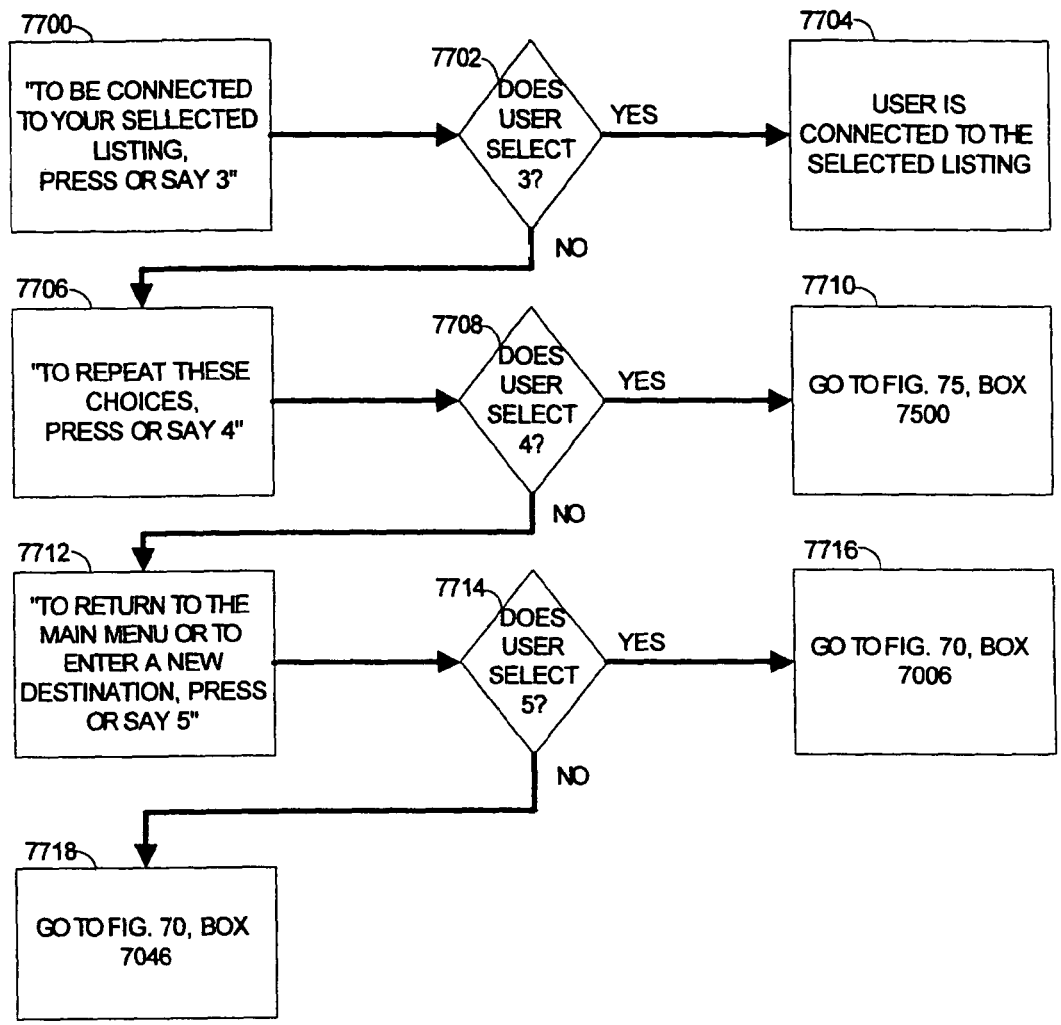

Now referring to FIG. 77, the automated telephone system instructs the user, "To be connected to your selective listing, press or say "3" 7700. The automated telephone system waits a specified period of time for the user to respond 7702. If the user does select "3", the automated telephone system connects the user to their selected listing 7704. If the user does not respond by selecting "3" within a specified period of time, the automated telephone system instructs to user, "To repeat these choices, press or say "4" 7706. If the user does select '4", the automated telephone system returns the user to FIG. 75, BOX 7500, and the query process continues 7710. If the user does not respond by selecting "4" within a specified period of time, the automated telephone system instructs to user, "To return to the main menu or to enter a new destination, press or say "5" 7712. If the user does select "5", the automated telephone system returns the user to FIG. 70, BOX 7006, and the query process starts over 7716. If the user does not respond by selecting "5" within a specified period of time, the automated telephone system returns the user to FIG. 70, BOX 7046 and the user is connected to a live Directional Assistance Operator 7718.

Figure 78:
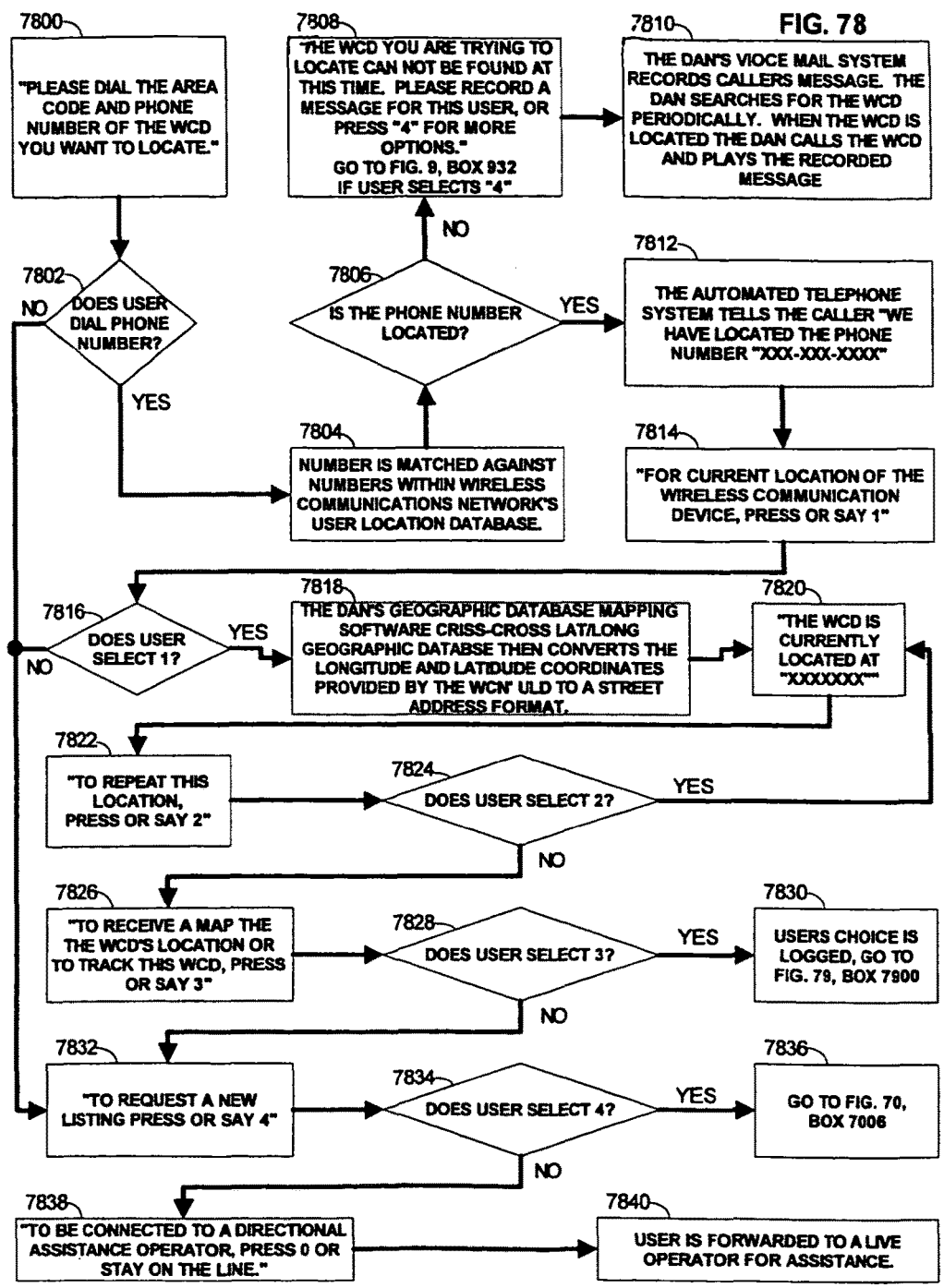

Now referring to FIG. 78, the automated telephone system instructs the user, "Please dial the area code and phone number of the wireless communications device you want to locate 7800. The automated telephone system then waits a specified period for time for the user to respond by dialing the wireless communications device's phone number the user wishes to find 7802. If the user does not respond within the specified period of time, the automated telephone system instructs the user, "To request a new listing, press or say 4" 7832. If the user does respond within the specified period of time, the telephone phone number is logged into the DAN 8100 and the telephone number is matched against telephone numbers within the wireless communication network's ULD 900, BOX 7804. The DAN 8100 then determines if the requested telephone number is located 7806.

Still referring to FIG. 78, BOX 7806, if the phone number is not found, the automated telephone system instructs the user, "The wireless communications device (WCD) you are trying to locate cannot be found at this time. Please record and message for the wireless communications device's user, or press "4" for more options." If the user selects "4", the query is forwarded to FIG. 78, BOX 7832, to begin a new query 7808. If the user does not selected "4", the DAN's voice mail system records the caller's message. The DAN 8100 searches for the wireless communications device periodically. When the wireless communications device is located, the DAN 8100 calls the wireless communications device and plays the recorded message 7810.

Again referring to FIG. 78, BOX 7806, if the phone number is found, the automated telephone system tells the user, "We have located the phone number "XXX-XXX-XXXX" 7812. The automated telephone system then tells the user, "For current location of the wireless communications device, press or say "1" 7814. The automated telephone system then waits a specified period of time, for the user to respond by pressing 1" 7816. If the user does not select "1", the automated telephone system forwards the user to FIG. 78, BOX 7832, to request a new listing. If the user does select "1", the DAN's geographic database mapping software 8155 criss-cross lat/long geographic database 8150 and then converts the longitude and latitude coordinates provided by the wireless communication network's ULD 900 to a street address format 7818. The automated telephone system then informs the user of the Street address by saying, "The wireless device is currently located at "XXXXXXXX" 7820. The automated telephone system then instructs the user, "To repeat this location, press or say "2" 7822. The automated telephone system then waits for the user to respond by selecting "2" 7824. If the user does select "2" within a specified period of time, the users query is returned to FIG. 78, BOX 7820, in order to repeat the location information.

Still referring to FIG. 78, BOX 7824, if the user does not select "2" within the specified period of time, the automated telephone system then instructs the user, "To receive a map of the wireless device's location, or to track the wireless device, press or say "3" 7826. The automated telephone system then waits for the user to respond within a selected period of time by selecting "3" 7828. If that user does select "3" within the specified period of time, the DAN 8100 logs the user's choice and forwards the user's query to FIG. 79, BOX 7900, for further processing 7830. Again referring to FIG. 78, BOX 7828, if the user does not select "3" within the specified period of time, the automated telephone system instructs the user, "To request a new listing, press or say "4" 7832. The automated telephone system then waits for the user to respond by selecting "4" 7834. If the user selects "4" within the specified period of time, the user's query is forwarded to FIG. 70 BOX 7006 to begin a new query 7836. If that user does not select "4" with them the specified period of time, the automated telephone system instructs the user, "To be connected to the Directional Assistance Operator, press "0" or stay on the line" 7838. The user is then forwarded to a live Operator for assistance 7840.

Figure 79:
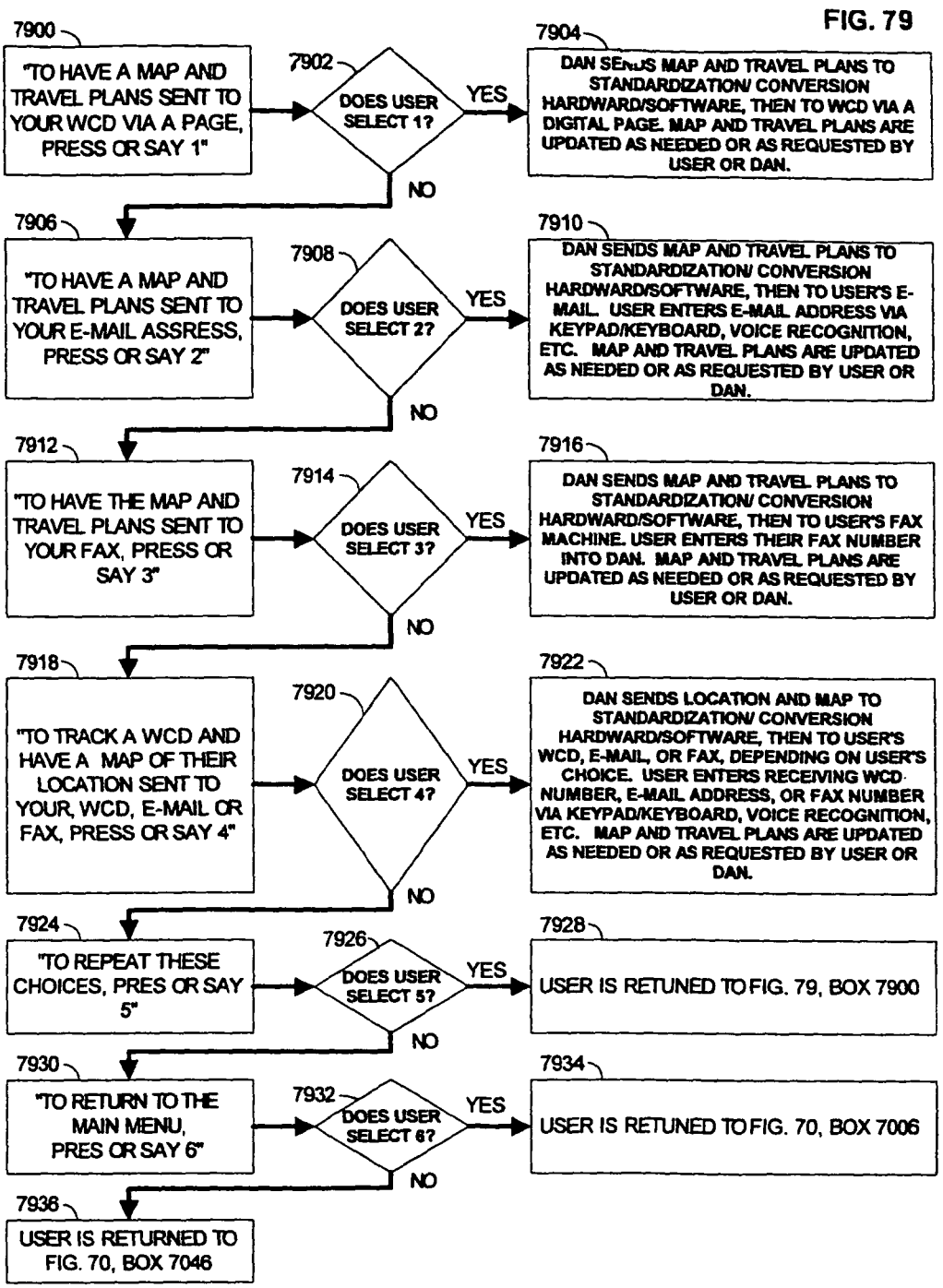

Now referring to FIG. 79, the automated telephone system instructs the user, "To have a map and travel plans sent to your wireless device via a page, press or say "1" 7900. The automated telephone system then waits for the user to respond by selecting "1" 7902. If the user selects "1", the DAN 8100 sends a map and travel plans to the standardization/conversion hardware/software 8160 to convert the map and travel plan to a format which will interface with the protocol of the user's wireless device. The map and travel plans are sent to the user's wireless device via a page and are updated if the user requests an update as traffic conditions change to as to offer a faster route. The user can also be notified when to turn if the DAN 8100 monitors the user's location and pages the user when the user is approaching a turn 7904.

Again referring to FIG. 79, BOX 7902, if the user does not select 1', the automated telephone system instructs the user, "To have a map and travel plans sent to your e-mail address, press or say '2" 7906. The automated telephone system then waits for the user to respond by selecting "2" 7908. If the user selects "2", the DAN 8100 instructs the user to enter their e-mail address via keypad/keyboard, voice recognition, interactive display screen or other. The DAN 8100 then sends a map and travel plans to the standardization/conversion hardware/software 8160 to convert the map and travel plan to a format which will interface with the protocol of the user's e-mail service and navigational program. The map and travel plans are sent to the user's e-mail address and are updated if the user requests an update as traffic conditions change to as to offer a faster route. The user can also be notified when to turn if the DAN 8100 monitors the user's location and e-mails the user when the user is approaching a turn 7910.

Again referring to FIG. 79, BOX 7908, if the user does not select "2", the automated telephone system instructs the user, "To have a map and travel plans sent to your fax machine, press or say '3" 7912. The automated telephone system then waits for the user to respond by selecting "3" 7914. If the user selects "3", the DAN 8100 instructs the user to enter the area code and telephone number were the faxes are to be sent. The DAN 8100 then sends a map and travel plans to the standardization/conversion hardware/software 8160 to convert the map and travel plan to a format, which will interface with the protocol of the user's Fax machine/program. The map and travel plans are sent to the user's fax machine and are updated if the user requests an update as traffic conditions change to as to offer a faster route. The user can also be notified when to turn if the DAN 8100 monitors the user's location and fax the user when the user is approaching a turn 7816.

Again referring to FIG. 79, BOX 7914, if the user does not select "3", the automated telephone system instructs the user, 'To track a wireless device and have a map of their location sent to your wireless device, e-mail or fax, press or say "4" 7918. The automated telephone system then waits for the user to respond by selecting "4" 7920. If the user selects "4", the DAN 8100 instructs the user to enter whether the tracking and map information should be sent to their wireless communication device, e-mail, website, navigational system, computer or fax. The users choice can be entered via a keyboard/keypad, voice recognition, interactive display screen or other. The DAN 8100 then instructs the user to input the wireless device area code and phone number, e-mail address, website address, navigational system address, computer address and/or area code and telephone number were the map and location information is to be sent regarding the wireless device being monitored. The DAN 8100 then sends a map and travel plans to the standardization/conversion hardware/software to convert the map and travel plan to a format, which will interface with the protocol of the user's wireless device, e-mail, website, navigational system, computer system or Fax machine/program. The map and location information are sent to the user's wireless device, e-mail, website, navigational system, computer system or fax machine and are updated if the user requests an update, as monitored wireless device travels from one location to another, or from time to time 7922.

Again referring to FIG. 79, BOX 7920, if the user does not select "4", the automated telephone system instructs the user, "To repeat these choices, press or say "5" 7924. The automated telephone system then waits for the user to respond by selecting "5" 7926. If the user selects "5", the users query is returned to FIG. 79, BOX 7900, to repeat the choices 7928.

Again referring to FIG. 79, BOX 7926, if the user does not select "5", the automated telephone system instructs the user, "To return to the main menu, press or say "6" 7930. The automated telephone system then waits for the user to respond by selecting '6" 7932. if the user selects "6", the users query is returned to FIG. 70, BOX 7006, to restart the query process 7934. If the user does not select "6", the automated telephone system returns the user to FIG. 70, BOX 7046, to be connected with a Directional Assistance Operator 7936.

Figure 80:
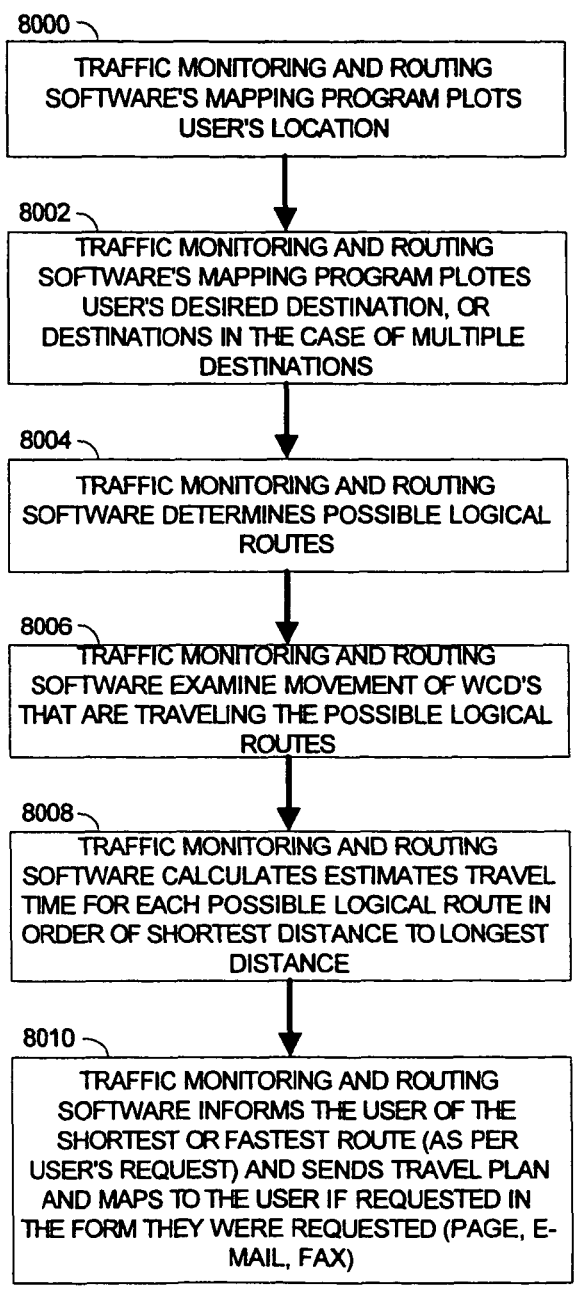

FIG. 80 is a flowchart describing the operation of the DAN's traffic monitoring software 8125 and routing software 8120. To begin the query process, the traffic monitoring software 8125 and routing software 8120 plots the user's location. If the user is calling from a wireless device, the DAN 8100 queries the wireless network's ULD 900 to retrieve the user's longitude and latitude coordinates. The DAN 8100 then converts the longitude and latitude coordinates to a street address or location. This location is plotted into the traffic monitoring software 8125 and routing software 8120. If the user is calling from a landline within a PSTN 8138, the DAN 8100 retrieves the users location from the PSTN phone location database 8145. Then the DAN 8100 plots the street address provided by the PSTN phone location database into the traffic monitoring software 8125 and routing software 8120 BOX 8000.

Still referring to FIG. 80, the DAN 8100 then plots the user's desired destination by cross-referencing and retrieving the destination information from the PSTN phone location database 8145. If the user has entered more than one destination, the DAN 8100 can plot multiple destinations for route planning purposes 8002. The traffic monitoring software 8125 and routing software 8120 them determines a selected number of possible logical driving routes and the distance in miles or meters for each possible route 8004. The traffic monitoring software 8125 and routing software 8120 then examines the movement of wireless devices that are traveling the possible logical routes to determine average speed or number of wireless devices on the possible logical routes 8006. The traffic monitoring software 8125 and routing software 8120 then calculates the estimated travel time for each route in order to determine the shortest possible travel time. Routes are considered in order of miles/meters from shortest to longest. The basic formula to obtain the travel time for a possible route is as follows:

$$\text{Distance(miles/meters)} \times \text{Average Speed(Miles/Meters Per Hour)} = \text{Route Travel Time}$$

This is the basic formula, but other formulas may be entered into the traffic monitoring software 8125 and routing software 8120 to include such things as number of wireless devices on a route, weather conditions, posted speed limits, train schedules, road work, road closures, historical average speeds based on time of day/year, etc. 8008. The traffic monitoring software 8125 and routing software 8120 informs the user of the shortest or fastest route (as per their request) and sends the travel plan and map to the user if requested, in the form the user requested (Page to wireless device, e-mail, fax, etc.). If the user has requested to receive updates, the traffic monitoring software 8125 and routing software 8120 monitors the users location and informs them of faster routes, when to turn, and other requested items 8010.

Detailed Description of the Preferred Embodiment

The directional assistance network (DAN) 8100 is a machine and process that provides a dynamic location routing system and directional assistance to an entity though a variety of remote methods. One objective of the DAN 8100 is to provide a means for an entity to request mapping, voice, or other methods of directions that would give the said entity directions from entity's current geographic location to entity's target location. The routing system allows a. plurality of devices to connect to the DAN 8100 and request directional assistance to a plurality of target locations.

The claimed entities could exist as a:
Wireless device user
Land line phone user
Internet (world-wide-web) user
Intranet user
Non-human element such a software package
Voice-over IP network user
Dial-up user
Other user selected entities The geographic location based technology would allow the said users to be routed along a path that would take the most direct or most timely route to the user's selected destination. For example, a user of a wireless device could query the DAN 8100 for a display of the user's current location on a street map, and the fastest driving route to the user's place of employment, based on current traffic conditions, distance, and other user defined attributes from available sources. The routing software 8120 within the DAN 8100 facilitates this process. The routing software 8120 allows a discrete computational analysis of traffic conditions based on recorded data from a plurality of sources. Current day realizable sources of this information are: data sampling from a wireless network, live national traffic alert databases, local traffic database entries, traffic cams, traffic radar gun" database, direct user input, or other available sources.

The DAN 8100 also comprises traffic monitoring software 8125 that monitors traffic conditions in real time by, for example, tracking the movement of a plurality of wireless devices to determine the location of slow moving traffic. The routing software 8120 uses the traffic monitoring software 8125 to determine routing information, in order to provide directional assistance. This directional assistance is deliverable to the above listed entities.

The user can select routing information based on the following:
Time to destination
Distance to destination
Alternate routes based on 'way points' set by user
Scenic routes (pre-programmed scenic information comprised within a criss-cross lat/long geographic database 8150)
Routes bases on probability of reaching a destination within time constraints
Routes to alternate locations of similar interest (Hospitals, etc)
Routes based on user preferences established in a local preferences database.

The first step of the routing software's 8120 is to retrieve the current geographic location of the requesting entity. The DAN 8100 retrieves the users current geographic location using the device location software 8115. The device location software 8115 allows the location of a wireless device, (and fixed, Internet, or other user defined entity to be obtained. The device location software 8115 has the ability to query external sources for information. In the case of a wireless network, the device location software 8115 would analyze wireless network parameters and data at the base station controller (BSC) 206 or the MTX 130 for call information to determine the location of a wireless device.

An additional technology that would allow rapid access to this data would be a dynamic database or system designed to store and hold information including latitude and longitude of the said wireless devices.

The supporting databases required for the above claimed software to function include a criss-cross lat/long geographic database 8150. The crisscross at/long geographic database 8150 contains latitude and longitude information correlating to actual street locators, such as a directory of listings of business and residential address locations and contact information. Scenic locations, hospitals, and other 'categorized' locations could be extrapolated from this database.

The geographic database mapping software 8155 controls the criss-cross lat/long geographic database 8150. The geographic mapping software 8155 allows multiple simultaneous requests, and is responsible for both resolving addressing information to latitude/longitude coordinates and resolving latitude/longitude coordinates to addressing information. To effective processing, the external connections to the criss-cross lat/long geographic database 8150, and primary logic software 8101, can utilize an ATM type packet routing. The ATM type pocket routing will allow very fast switching times and transfer speeds.

To allow the entities to access the claimed primary embodiment, the DAN 8100 contains two similar software packages. The first software package is the voice interface software 8105. The voice interface software 8105 allows the user to access the functionality of the DAN 8100 via the human voice, To interpret the voice signal of the user, the voice interface software 8105 works with the voice mapping software 8110. The voice mapping software 8110 interprets voice signals from the user (spoken words) and converts the voice signals into data inputs for the voice interface software 8105.

The voice mapping software 8110 allows the user to walk through a series of menus and input information. Menus such as "press 1 to spell or say the name of your destination" will be synthesized and presented to the human user. The user can then respond using their voice, "Hospital". The voice mapping software 8110 would then resolve the spoken work "Hospital" into a data representation of the term. In addition, the voice mapping software 8110 allows target location information to be resolved into a data-formatted address that can be used along with the routing software to route directions, The next software component utilized by the DAN 8100 is the data interface software 8130. The data interface software 8130 receives input data in a usable format. The data interface software 8130 simply parses the supplied data and passes it to the DAN's 8100 primary logic software 8101.

The external DAN query interface software 8135 allows external connectivity to the DAN 8100. The external DAN query interface software 8135 adapts and standardizes the many different physical interfaces and protocols that connects with the DAN 8100. The package is very important because it needs to be able to support many sophisticated entities that connects to the DAN 8100. The entities supply data in many different ways. These external connections to query devices 8140 can be:

Physical
    Data connections (Ti, DCI, etc)
    Telephony connections
    Wireless network connection
    Direct Dial-up connection
Data Formats
    SQL database entries
    Scripting
    Unformatted raw ascii text
    Formatted text
    WAP text entries
Data Interface Protocols
    ftp
    http
    telnet
    dial-up
    direct-connect
    SMS The external DAN query interface software 8135 takes these external sources and formats the data stream that both the data interface software 8130 and the voice mapping software 8110 use to retrieve information from external sources.

The DAN 8100 also includes the standardization/conversion hardware/software 8160. The standardization/conversion hardware/software 8160 is listed under the previously referenced provisional patent. The standardization/conversion hardware/software 8160 functions under a singleinput/single-output (SISO) type control structure, where a single input results in a single output. The standardization/conversion hardware/software 8160 receives a command from one protocol, and outputs the correct protocol to the receiving machine.

The standardization/conversion hardware/software 8160 receives a command from an external network connection 8165 or from the primary logic software 8101. The standardization/conversion hardware/software 8160 first checks the received protocol against a pre-configured protocol, and then checks known types of protocols by querying an internal protocol database. If there is a matching protocol found within the internal protocol database, then the standardization/conversion hardware/software 8160 the appropriate protocol by checking the receive protocol list. The standardization/conversion hardware/software 8160 then determines if a conversion can be made. If the standardization/conversion hardware/software 8160 can convert the protocol command, then the command is sent to the connected device. The standardization/conversion hardware/software 8160 waits for another command. If any of the decision boxes are "no" than an error is recorded and send back to the sending source.

The standardization/conversion hardware/software 8160 differs from the external DAN query interface software 8135 in that the DAN 8100 utilizes the standardization/conversion hardware/software 8160 to connect to networks or other devices and retrieve information used by various subroutines. The general example would be for the DAN 8100 to query a wireless network's MTX 130 and then BSC 206 to retrieve user information.

Controlling all the software and hardware of the DAN 8101 is the primary logic software 8101. The primary logic software 8101 generates and processes the usage and pure control commands. Data storage is also part of the primary logic software 8101. The primary logic software 8101 must be able to process a large volume of external requests and processes created by entities requesting geographic routing information.

The recommended physical architecture that the DAN 8100 would reside in a hardware that could supply enough bandwidth, memory, physical storage and processing ability to respond to an entities geographic routing request in a reasonable amount of time determined by a customer.

The location that the DAN 8100 could exist can be any of the following:

At a wireless switching office
At telephony switching center/PSTN
Located on the internet (with some static/dynamic range of IF addresses)

In alternate embodiments where the DAN 8100 is located at locations other than a wireless network, additional equipment will need to be located at a wireless switch. The DAN linking software 8300 allows remote queries of the wireless switch. The DAN linking software 8300 connects to the e-mobility services 144 that links to the MTX 130. The DAN linking software 8300 includes the interim linking software 8515. The interim linking software 8515 negotiates and retrieves data from the MTX 130 or the BSC 206 components of a wireless switch. In addition, the DAN linking software 8300 includes packet routing software/hardware 8520 that allows packets to be passed from wireless devices (the WAP/e-mobility connections) to the DAN 8100 that is remotely located. The DAN linking software 8300 also includes the DAN data query software 8525 to manage the methods used to query the local wireless networks hardware/software.

Routing Methodology to Obtain Directions for Requesting Entity

When an entity connected to the DAN 8100 requests directions to an address or location, the DAN 8100 must have access to data sources that gives the location of the wireless device and the target location.

The following are examples of data sources for obtaining this information:

User location database (ULD)—containing mobile device location information 900

User location database coordinator (ULDC)—Containing ability to query multiple ULD's 908

Direct query of MTX 130 or BSC 206 for location of wireless devices Location information calculated by GPS at/in the wireless device Public addressing database containing addressing for location queried by wireless device.

PSTN Database with a correlated latllong information for a fixed device, 8145

Location information sent from the querying device to the DAN 8100

When a wireless device requests directions to a location the following steps to carry out this process:

The DAN determines the wireless devices current location in terms of latitude/longitude and converting to postal addressing relative to roadways.

The DAN then determines the location of the target

The DAN then calculates the route to the target through current streets and roads The DAN 8100 determines the wireless devices' location with the use of the criss-cross lat/long geographic database 8150, latitude/longitude coordinates obtained by GPS systems on the wireless device, a location retrieved though a ULD 900 or ULDC 908, or similar device that calculates the current location.

The criss-cross lat/long geographic database 8150 can convert either an address to a latitude/longitude coordinate or a latitude/longitude coordinate into an address. After obtaining the location of the device in latitude/longitude coordinate form the information is processed and converted to standard addressing.

Next, the DAN 8100 determines the target's location. The target location address could be resolved by querying a public addressing database for known locations. If the target location is another wireless device, the location would be retrieved though a ULD 900, or ULDC 908, or by querying the MTX 130 and/or the BSC 206 controlling the target wireless device, then converted to a standard address by the criss-cross lat/long geographic database 8150.

Next, the DAN 8100 determines the most efficient route to the target address. While current commonly known software can accomplish this task, it is limited to resolving routes based on:

Shortest distance (miles/Kilometers) traveled

Time to arrive at destination

User sensitive settings such as scenic routes

What the commonly used software lacks is the ability to compensate for current road conditions (traffic jams, weather, etc). The DAN 8100 has the ability to resolve routes using information obtained from a wireless network or from other traffic databases, to determine the fastest route in units of time or distance. The routing software 8125 initially determines the route using commonly known methods, but then uses a unique and new method to check the level of traffic congestion along the route.

The level of traffic congestion can be determined from either gathering information from traffic databases or from obtaining the location of devices on a wireless network. To gather the location of devices on any given segment of a road or route, data can be gathered from a MTX 130, in combination with a ULD 900 or ULDC 908, or direct query of the MTX 130 or the BSC 206.

The information obtained from the ULD/ULDC/Direct Query includes the following:

Number of wireless devices on the route calculated to target location

Location of wireless devices on the route calculated to target location

Current state (active/standby) of wireless devices along calculated route

The routing software 8120 uses the route wireless device information to determine the congestion of the route. The congestion is measured by the following calculations. First, the location of the wireless devices is correlated to locations on the route. Next, the velocities of the wireless devices are calculated. The velocity is calculated by sampling the location of a device at fixed time intervals. The routing software 8120 then compares the velocities of the devices to the posted speed limits along the different segments of the route. The comparison measures the traffic flow and validates the devices that are in the traffic route and not on a sidewalk or other close area.

In addition, the routing software 8120 calculates the wireless device geographic density along the route. Average and normal density would be calibrated depending on the size and attributes of the road. For example, a larger road would have a different average density than a smaller road. A multilane highway would have a different average density than a two-lane highway. The average values for wireless device density on roads would have to be adjusted for various road attributes. The routing software 8120 evaluates the current levels and compares them to the average value.

After the routing software 8120 calculates the traffic density measurement, the routing software 8120 evaluates the traffic conditions along any given route. The routing software 8120 compares the calculated traffic density to a predetermined normal level.

The comparison is described by the following:

$D_r = D_c/D_n$, where $D_r$=density ratio,$D_c$=current density, and $D_n$=normal density.

Using this formula, the density ratio for any traffic condition is calculated. For example, if a current traffic density of a geographic region is 100 units/distance, and the normal density is 50 units/distance, then the density ratio would be 2. The density ratio corresponds to 2 times or 200% more traffic than the normal traffic density for that area.

The equation that determines the time it would take to cross a geographic segment is defined by the following formula: Time=$\alpha \times e^{D_r * \beta}$ where $\alpha$ is an experimentally determined scaling factor that a network engineer can tune, and $\beta$ is the normal time to cross the geographic segment. From this formula it is apparent that when is adjusted the time can be linearly scaled by the traffic engineer. It is also apparent that when the value of D changes that the Time changes exponentially. This should make since b/c as traffic increases, the time does not increases linearly For example, when Dr is 2 (2 times more or 200% the normal traffic) the time to reach the destination is not double the time, but less than that amount of time. Using the formula you can see the affects of the values of Dr and in FIGS. 86 and 87 respectively.

After the time calculation is computed an adjusted travel time for the segment is sent to the routing software. Alternate routes based on normal traffic travel times are then send and run through this algorithm. When the route with least time based on actual traffic conditions is found, the DAN 8100 locks the route as the best traffic route. Each segment of the route is completed in this method. The result is a complete route from the origin of the device to the destination that allows for the quickest travel based on time.

The DAN 8100 then sends the resulting route to the wireless device and the wireless device displays the route to the user. The user can then travel to the location. If the user desires, the software can continually monitor the route and alert the user to changing road conditions and report route corrections to the previous calculated directions. The user can then take additional detours to further speed the time or distance to the route.

If the user requests directions to a wireless device on the wireless network, the calculated route would obviously not be a static route. The DAN 8100 would continuously update the route as required. The route could be calculated based on the route taken by the wireless device being tracked, or by simply using the method above to determining the fastest route to the target. The current state of the tracked wireless device would be taken into account. If the tracked wireless device were in an active state, then the route would update continuously. However, if the tracked wireless device is not active or if current location information is not available, then the route would not update, and the DAN 8100 can calculate the route using the last known location of the wireless device. The DAN 8100 would relay the tracked wireless device state to the requesting wireless device.

Alternate Embodiment to the Directional Assistance Network

The primary embodiment refers to a system that users on a plurality of devices (wireless/fixed location) may obtain directional mapping from their current locations. The DAN 8100 can also be implemented by an alternate method. The alternate method would include directional mapping databases and software integrated into its system. The method would not take into consideration traffic density and other variables that would affect directional routing.

For the alternative method to work the wireless device would need to contain a map and a latitude/longitude referenced database of target locations. The databases could be cities, metropolitan areas, states, countries, or other variable sized geographic areas. The map would need to contain information on the current location of the wireless device. The wireless device could obtain the current location information from the device itself using GPS or from the wireless network.

The database would need a large storage medium that could be created on a plurality of mediums including but not limited to:
  Hard Disk
  Micro Drive
  Optical Storage Medium (CD/DVD/etc)
  Flash Memory Device
  Memory Card
  EPROM
  EEPROM
  Removable Storage Medium The alternate embodiment requires the wireless device to have the ability to locate a destination based on address, company name, landmark, etc. If the wireless device cannot find the destination in the internal database, the wireless device queries the wireless network for the destination information. The wireless network server resolves the request. When the network server finds the destination information, it sends back the latitude and longitude of the destination to the requesting wireless device. The wireless device stores and appends the destination information with the latitude/longitude in the local database for subsequent path resolution. If the wireless network server does not find the destination, then the wireless device alerts the user that the device could not find the destination.

Advantages of the alternative embodiment are the user will be able to:
  Obtain faster routing information
  Not inquire a connection cost
  Not require an active connection to the network To allow faster routing, the wireless device can query the wireless network server for traffic congestion information. To allow faster routing of the wireless device in regards to time to the destination or for multiple waypoints and then a destination, a query to the server could be requested if a network connection is available. This would allow the network to access traffic databases that contain information on traffic congestion along a route to be analyzed. Each segment of a route could be analyzed and assigned a numerical figure representing the expected amount of time to travel through the segment. The routing at the server could then send corrections to the device and make alterations to the routing information to improve the results given to the user.

The connection to the network by a device would require any, but not limited to, the following connections that could be resolved and eventually routed to TCP/IP or other I routing protocols:
  TCP/IP Network Connection
  IPX/ULD
  PPP/SLIP
  Wireless Networks
    2G
    3G
    2.5G
    GSM
    TDMA
    CDMA
    CDMA2000
  Direct Connection To make the computations the wireless network the following are required: a database of a plurality of geographic locations with addressing correlated to latitude and longitudes; software to determine the time to travel on a given route; logistic software to determine a faster route; interface with the requesting software.

The logistics software works by accessing traffic condition databases not claimed by this patent. The basic requirement of the databases is to return information that corresponds to the traffic density of a roadway or other geographic location. When the logistics software acquires this information, the software compares the current traffic density to a predetermined normal level.

The resulting route can then (after being calculated) be sent to the wireless device or may already exist there and will not need to be updated in this case. The route will then be graphically reproduced or printed as text and displayed to the user. The user can then travel to the location.

Description of Figures

FIG. 81

Figure 81:
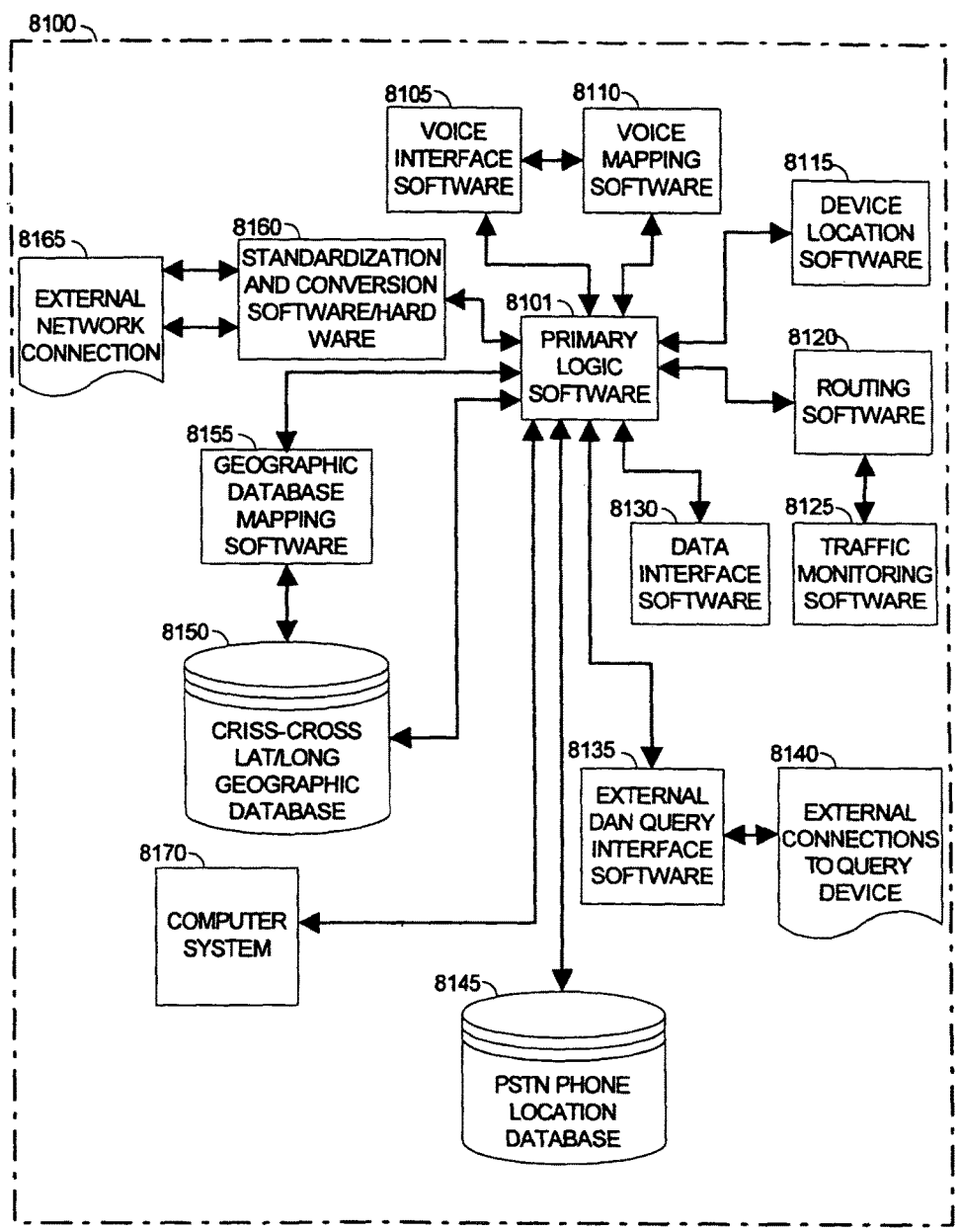

FIG. 81 describes the structure of the DAN 8100. The figure shows the DAN 8100 with all the components logically connected. In addition, the figure illustrates the connectivity of the DAN 8100 to external sources. The figure also illustrates other devices internal to the DAN 8100.

The DAN 8100 contains two external connectivity points. The standardization/conversion hardware/software 8160 connects to an external network connection 8165 and connects the DAN 8100 to friendly networks used to obtain additional data. The external directional assistance network query interface software 8135 connects to external connections to query devices 8140. The connection point connects to devices/entities that can remotely query the DAN 8100. Both the standardization/conversion hardware/software 8160 and the external DAN network query interface software 8140 interface with the primary logic software 8101.

The primary logic software 8101 handles the primary control and processing for the DAN 8100. The primary logic software 8101 controls the interaction between the different internal components and external interfaces, and processes all requests by the different components.

The data interface software 8130 and voice interface software 8105 allow interactivity to external entities accessing the DAN 8100. Both components interface with the primary logic software 8101. The voice interface software 8105 utilizes the voice mapping software 8110. The voice mapping software also interfaces with the primary logic center 8101.

The routing software 8120 component interfaces directly with the primary logic software 8101. The routing software 8120 utilizes the traffic monitoring software 8125. The routing software 8120 utilizes the device location software 8115 indirectly. The device location software 8115 interfaces with the primary logic software 8101. Any access of the device location software 8115 must be done through the primary logic software 8101.

The database attached to the DAN 8100 is the criss-cross latllong geographic database 8150. The geographic database mapping software 8155 controls and interfaces with the criss-cross at/long geographic database 8150. Both of these components interface with the primary logic software 8101. The primary logic software 8101 also interfaces with the PSTN phone location database 8145.

FIG. 82

Figure 82:
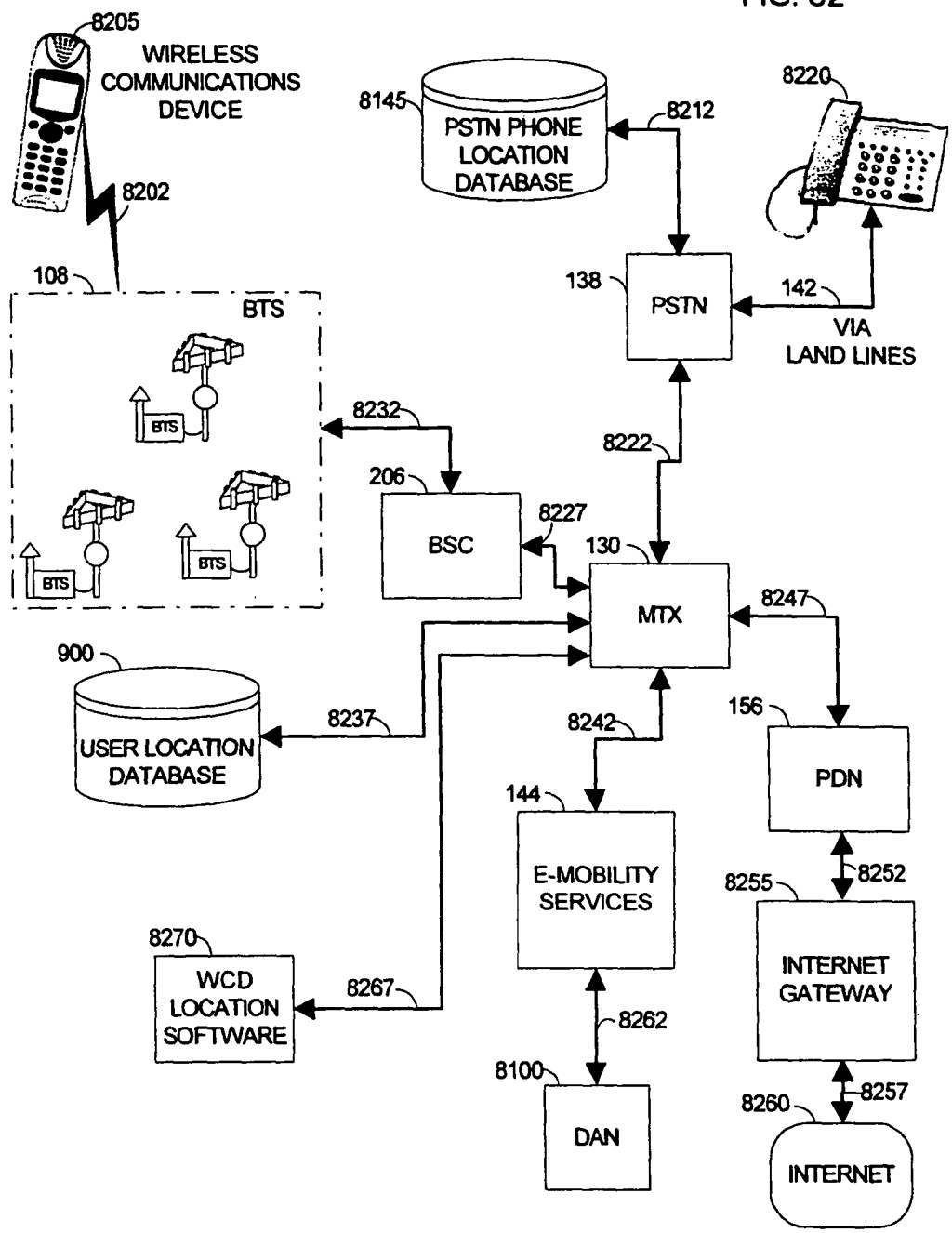

FIG. 82 illustrates the primary embodiment of the invention; the DAN 8100 co-located at a wireless network. FIG. 82 displays devices that interact with the DAN 8100. Wireless communication device 8205 connects to cellular towers 8235, Via Ti/other connection links 8232 from the BTS 108, the wireless communication device 8205 connects with the cellular base station controller (BSC) 206. The BSC 206 links 8227 to the MTX 130. The MTX 130 links to the e-mobility services 144. The e-mobility services 144 links to the DAN 8100. The user location database (ULD) 900 and the wireless communications device location software 8270 also connect to the MTX 130.

The MTX 130 links to the packet data network (PDN) 156, and to an internet gateway, 8255 and finally to the Internet 8260. The MTX 130 also links to a publicly switched telephony network (PSTN) 138. The PSTN 138 contains the PSTN phone location database 8145. The PSTN 138 connects to fixed location phones 8220 via land lines 142.

FIG. 83

Figure 83:
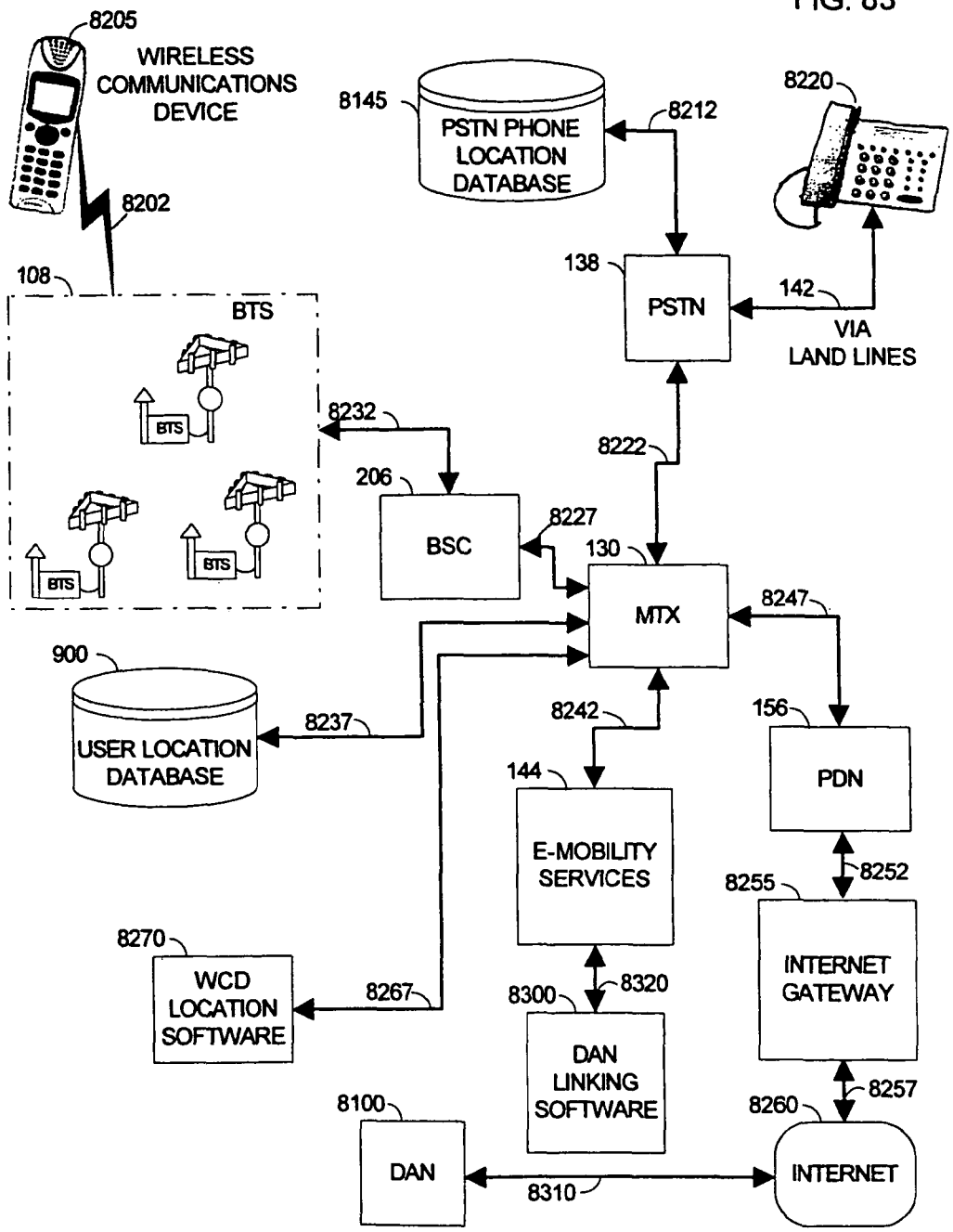

FIG. 83 illustrates the primary embodiment's alternate location; the DAN 8100 located remotely via the Internet 8260 at a remote server. FIG. 83 displays devices that ultimately interact with the DAN 8100. Wireless communication devices 8205 connect to cellular towers (BTS) 108. Via Ti/other connection link 8232 from the BTS 108, the wireless communication devices connect with the base station controller (BSC) 206. The BSC 206 links 8227 to the MTX 130. The MTX 130 links to the packet data network (PDN) 156 that links to the internet gateway 8255. The internet gateway 8225 links to the Internet 8260. The DAN 8100 interfaces 8310 the wireless network through the Internet 8200. The ULD 900 and the wireless communications device location software 8270 also connects to the MTX 130.

The MTX 130 links to the e-mobility services 144. The e-mobility services 144 links to the DAN linking software, 8300. The MTX 130 also links to a publicly switched telephony network (PSTN) 138. The PSTN 138 contains the PSTN phone location database 8145. The PSTN connects to fixed location phones 8220 via land lines 142.

FIG. 84

Figure 84:
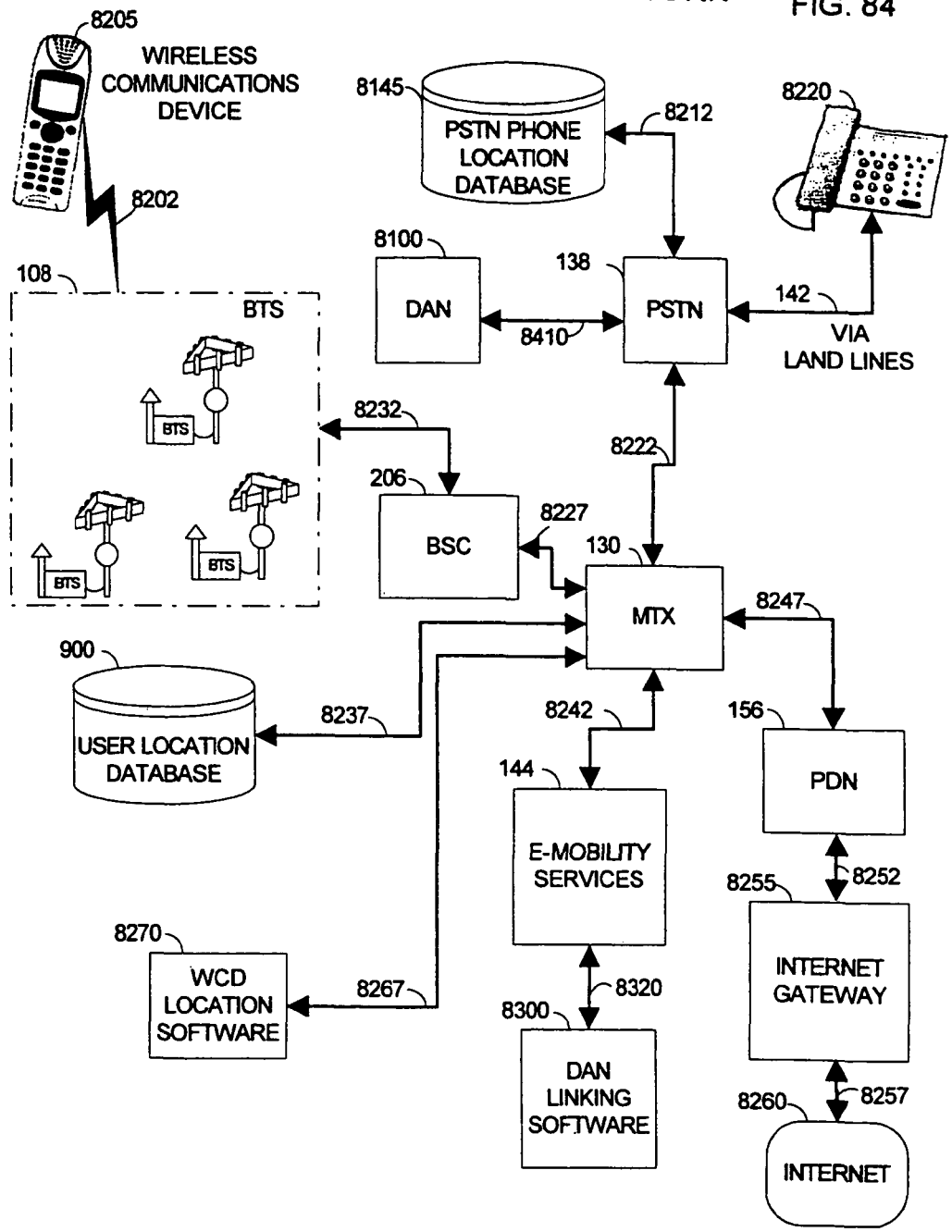

FIG. 84 illustrates the DAN 8100 remotely located at the PSTN 215. FIG. 84 displays devices that ultimately interact with the DAN 8100. Wireless communication devices 8205 connect to cellular towers (BTS) 108. Via Ti/other connection link 8232 from the BTS 108, the wireless communication devices 8205 connect with the wireless base station controller (BSC) 206. The BSC 206 links 8227 to the MIX 130. The MTX 130 connects to the PSTN 138 and then to the DAN 8100. The PSTN connects to other remote PSTN switching centers also. The PSTN 138 contains the PSTN Phone Location Database 8145. The PSTN 138 connects to fixed location phones 8220 via land lines 142.

The MIX 130 links to the e-mobility services 144. The e-mobility services 144 links to the DAN linking software 8300. The user location database (ULD) 900 and the wireless communications device location software 8270 also connect to the MIX 130.

FIG. 85

Figure 85:
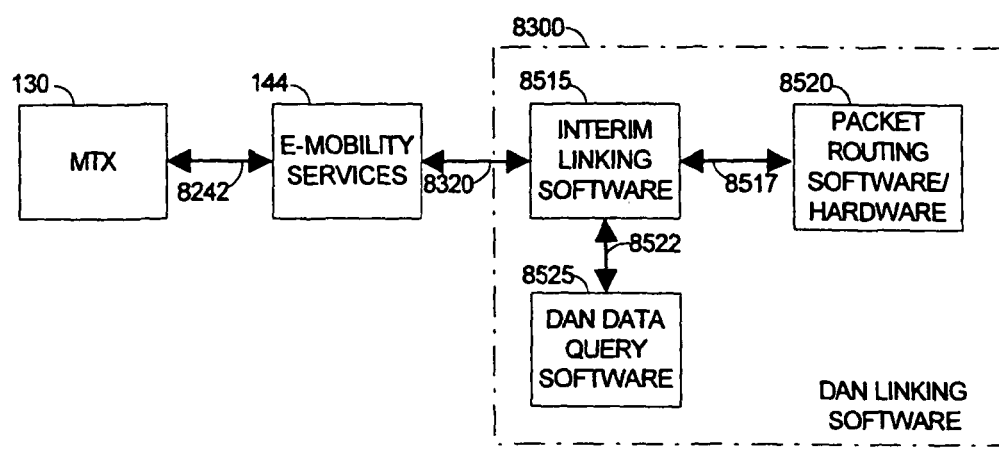

FIG. 85 illustrates the DAN linking software 8300 used by the DAN 8100. The DAN linking software, 8300, allows the DAN 8100 to interface with wireless networks, when it is remotely located. Wireless communications devices 8205 send requests to the DAN 8100 signals via e-mobility services, 144. The interim linking software 8515 receives the signals and routes them to the packet rerouting software/hardware 8520. Packets are then routed to the remotely located DAN 8100. The DAN data query software 8525 connects to the interim linking software 8515. The DAN data query software 8525 allows the DAN 8100 to remotely pass queries to the MTX, 130, which via the e-mobility services 144.

FIG. 86

Figure 86:
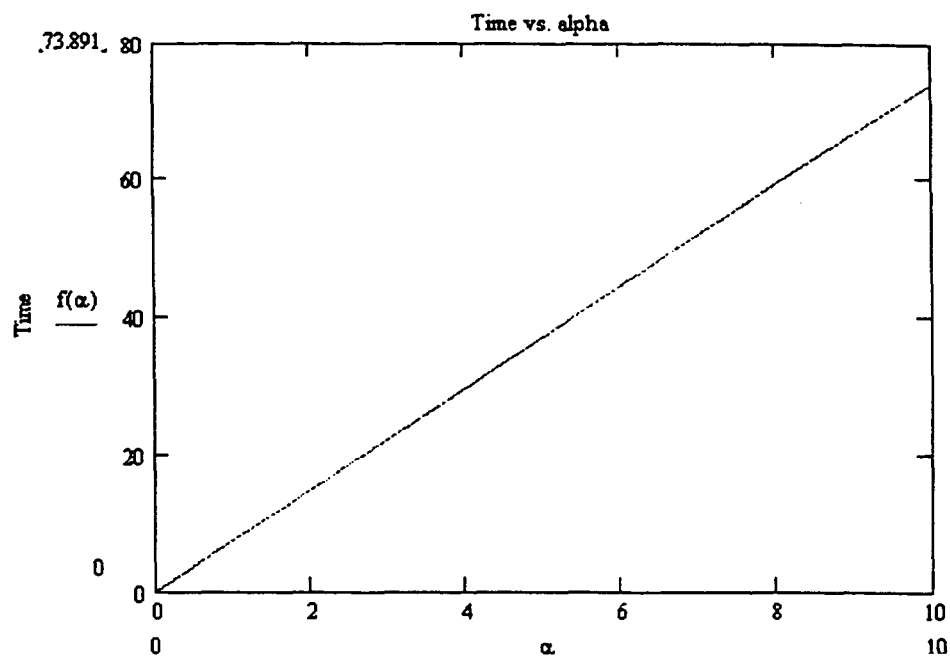

FIG. 86 shows the Traffic Time Calculation Performance Based on user or network-defined variables. The figure shows the alpha, an experimentally obtained scaling factor, on the traffic density-time algorithm. The network engineer determines the value of the variables. As shown, the effects of alpha are linearly proportional to the output of the algorithm. So an increase in one variable proportionally affects the output of the equation.

FIG. 87

FIG. 87 shows the traffic time calculation performance based on a variable traffic density ratio. The effects of Dr, the density ratio is shown to produce an exponential result for the expected time to travel on any given route. When the traffic density compared to the normal density level increases, as expected the time to travel along that route increases exponentially as well.

Pro-Active Traffic Routing System

Overview

The traffic control system allows network traffic engineers to optimize traffic flow in real-time based on feedback from systems such as the DAN and the LTS. Both of these system poll on data from other resources such as the ULD/ULDC and GPS data from mobile devices. The location tracking system allows network software located (physically or virtually) at the MTX to access information on the movement of mobile devices on a cellular network.

These moving devices, tracked by the LTS, can be filtered to include only devices on roadways, which is of interest and is used by programs such as the DAN to route users from one location to the next allowing them to avoid traffic congestion. This congestion is based on mobile unit density on the roadways.

Of interest to the traffic control software is the density of traffic along roadway section that have various traffic control devices that can be altered remotely. Altering their parameters would allow traffic flow to be altered and ease congestion. Automating this process, the traffic control software would, in real time, allow traffic congestion reduction over many roadways that otherwise would take much longer to implement. These changes are based on various methodologies described in the following text. Additionally, basic software architecture for such a system is recommended, but does not limit the spirit of this invention.

Traffic Control Devices

To discuss the ability to monitor or control traffic flow, the devices that control this factor should be discussed. Not all devices that control traffic flow can be remotely controlled, and thus cannot be used by the traffic control software. The devices that can work in this system will be listed and discussed in broad terms, as to allow them to apply to many design n a generic sense. Particular devices may be extruded from these descriptions and easily adapted to any specific setup.

The following generic devices are usable for the traffic control system:

Intersection Traffic Control Lights
Highway Inlet Traffic Control Lights
Variable Speed Limit Roadway Signs Intersection traffic control lights are defined as those lighting systems that include roadway intersection of two or more roadways at a single point, with a lighting system that directs what road way should cross at any given time. Variables that are affected here are the length any roadway may go cross the intersection, and the length of a turn lane being able to direct traffic from one lane to the next during that cycle.

Highway inlet traffic control lights are a simple way to moderate and control the inlet of traffic onto major roadways. These roadways are typically one directional and the inlet is also one directional. The lighting system is usually an on/off system. A red light moderates traffic by allowing one car though at a time, and then stopping the next car for a time limit, then allowing it to pass and enter the highway. The control variable is the hold time between letting cars though.

Variable speed limit roadways signs are signs that can alter posted speed limits based on a remote signal. The speed limit can be controlled remotely thus allowing the posted limit to change and thus control the flow of traffic. The variable here is the posted speed limit.

Detecting Traffic Congestion

Traffic congestion that can be alleviated by a controllable traffic control device must exist at the geographic site of the device. In other words, a device cannot alter congestion for which its function plays no role. The congestion must be co-located at the devices location, or in its field of control. Many devices have a range of control. The specific devices must have their characteristics programmed into the software. These characteristics include range and in what direction, that the device affects flow control. Also, the flow control depends on the type of device.

To detect the traffic congestion the traffic control software must know the location of each device. The system must then know the range and direction to monitor for congestion. These characteristics, as described above, will allow a profile to be sent to the LTS for each device. The LTS can return the traffic density and average velocity of the mobiles in this region. This information will show the levels of congestion. There should be limits at which the system will modify default values. It should not be necessary to modify the defaults if there is little congestion, as it would result in little or no change to the roadway traffic.

More specifically, for a generic system, the traffic can be monitored in all indicated directions for the defined distance for each. Some default traffic density value should be defined for all directions. Some speed value for traffic can also be assigned. Four possible methods of congestion can be used. The first is to use the system in the DAN. The second is to look at the average velocity of the devices on a roadway. The third is to look at the density of the mobile devices against some default value. The fourth is to look at both the density and the velocity of the devices. Using the forth method, a formula such as multiplying the average speed and density together to result in a number could allow a basis for more accurate congestion detection. Again a default value could be defined as to indicate when it is exceed that traffic congestion is bad. An additional value that indicates the severity of congestion could be the percent that the roadway is congested over its default value.

These methods should be chosen based on need and function on any particular design. Further in this description, it will be implied that this method results in two categories, pass and fail. Pass is that the threshold is not met and normal traffic exists. Fail indicates that the limit has been exceeded and the traffic is above tolerable limits.

Described as follows are methods to control and alleviate congestion based on device type.

Methodology for Alleviating Congestion

Various methods are needed based on the type of traffic control device. Described for each classification of device, are the methodologies to reduce congestion.

Intersection Traffic Control Lights

The congestion of traffic control lights should be monitored in the direction of the lighting system along the intersecting roadways for a reasonable distance. This distance can be defined and included in software programming, but a typical value may be 50% of the distance to the next intersection controlled by a traffic control light. This value could vary from one traffic lighting system to the next.

The system should start by analyzing traffic congestion along all roadways at the intersection. The roadways should then either be classified as pass or fail. All fail roadways should have a percentage calculated that indicates the amount over the default value that they are congested. To alleviate the traffic, the roadways that are above the limit should be placed in order of descending percent over-congestion. The most congested roadways should have the timing adjusted such that they are allowed additional time on the crossing direction of the intersection. This would represent a longer green light. This would also scale the turn signal direction. The time increase could be proportional to the percent over-congestion. The second, and descending congestion roadways could function in a similar manner, but give less than the same increase. The roadways with no congestion would have the time crossing decreased.

One additional factor is the time to cycle between all roadways (green light offered for every roadway in intersection). This should increase by some defined amount based on the number of congested roads. There should be a limit though programmed into the software. All timings for individual directions should sum up to this time. To accomplish this, it would be necessary to decrease the total time allowed for crossing on the non congested directions, when and increase occurs in the congested directions. Note, that if no directions are congested, then no changing in timing occurs.

Highway Inlet Traffic Control Lights

This system is relatively simple and is based on the ability of the traffic control system to use the LTS to determine only the traffic density of the roadway that the inlet lets into. The density should examine the average density along the roadway, again using some distance defined for the inlet control device.

The period that the device allows cars to pass is inversely proportional to the density of the traffic along this distance. A set of criteria should be established that would adjust the timing for various densities. Lesser densities mean more cars per unit time can safely enter the highway. The converse is similarly true. These exact timings depend on particular roadways and should be unique to every device and configured initially based on field experiments. Below is an example that demonstrates these criteria for a generic system, using generic values:

| Traffic Density | Inlet Entrance Rate |
|---|---|
| 10 cars/100 m | 20 cars/minute |
| 20 cars/100 m | 15 cars/minute |
| 30 cars/100 m | 10 cars/minute |
| 40 cars/100 m | 5 cars/minute |

Variable Speed Limit Roadway Signs

This is a method very similar to above, but is mainly a safety feature that can reduce the possibility of an accident, and thus the primary case for traffic delays, roadside accidents. The system is inversely proportional to traffic density as above. The system should poll the LTS for device density for a distance defined for the specific device. The speed then should be adjusted to levels that are safe for various traffic densities. As cars are closer together, the safe speed limit decreases. Various brackets of speed to indicate for various ranges of traffic density could be defined and integrated into the software. The traffic control software than can automatically adjust the speed values based on traffic density.

Basic Software Requirements

The software architecture of this system is designed so it can be collocated at the MTX or virtually hosted elsewhere but assessable to the MTX. The software should have access to the LTS and have subroutines written to allow it to submit tracking queries to the LTS to determine traffic density and other necessary factors.

The system should be designed to have an administrator's option to enable and disable the system and any particular devices. The system should allow a device to be added and all its parameters added as well. As each device is added, a device ID can be associated. This device ID would allow each device to be distinguished among each other. The system could then send electronic signals to the devices though direct or indirect routes to modify parameters on each device. These routes can be custom design or pass over public or private networks that connect the two points. The devices and their modification methodology are not the focus of this patent, however these devices are commonly known technology and software can easily be integrated into this that allows remote control to occur.

Call Routing System

Overview

The call routing system allows a user to have calls that are intended for the users mobile device, routed to alternate location, based on the current location or the device and its proximity to the said alternate locations. The user has the option to supply the phone numbers of devices that the user would like it devices to auto-route incoming calls to when the user is near those locations, and when the feature is activated. The user also submits a geographic distance from the device that when the user's device enters into, will activate the routing feature and allow the user the option of having its calls routed to the new device (user is asked if the new location, is acceptable for routing by SMS or similar 2-way message from server). When the user exits the region near the device (as listed in his preferences) the system again asks if the user wants call to be routed back to the users mobile device. If the user has no devices near them, a feature also allows nearby public devices to be offered to the user as alternate locations for routing.

The call routing system also allows for outing call routing which allows a user, service provider or manufacturer to route outgoing calls to selected phone numbers based on the location of the wireless device. For example, if a user dials "911" for emergency services, the call will be routed to the closest "911" call center, based on the location of the wireless device. An other example of the outgoing call routing system would be a user accessing the internet. When the user dials to connect to the internet, her call may be routed to a local internet access number based on the location of the wireless device. This outgoing call routing system will enable a user of a wireless device to optimize the use of his wireless device by receiving better service at a lower cost.

System Design and Function

For the routing system to function, the system must deploy its software at the MTX of a cellular provider. An alternate location on a intranet or internet is possible, but would require the MTX to link to that service and transport method. The software would rely on a service such as the LTS to allow monitoring and tracking of mobile devices. It also requires a database of user preferences that include: routing numbers and distance from routing numbers to activate routing. Authentication and other system level information for users should also exist. A plurality of users may activate the system, and the system will function for all active users. The LTS acts as an cooperative program that helps the current embodiment in many ways, as listed below. This software requires the flowing methods and function as listed below to be carried out to function properly.

Determining Location of User

To allow the system to operate the user of a mobile device must have his or her devices location monitored by the network. To do this, various methods exist such as the directional assistance network (DAN). The DAN allows a device to be monitored for location and additionally allows system events to be triggered based on the location of the device. The main requirement is that the location of the device be stored in a database or other location such that an external program can queue this information. A possible way to implement this is to use a User Location Database or a User Location Database Network. Other methods would be direct querying of the MTX or BSC to determine the location of a said mobile device, or a mobile device equipped with location information such as GPS or triangulation.

Determining Phones Near to User

To determine the fixed phones near a mobile device the system must first obtain the location of the said mobile device. When the system, using any of the above methods as further explained in accompanying documentation (on LTS, ULD, ULDC), has acquired the devices location, it stores it to a temporary register (software variable). The system must then check the user preferences, as stored in a local or remote configuration file, to determine the routing protocols. In this case, it must check the configuration to see if the user has indicated a phone number to route calls to. If no number exists then the system can attempt to route the call to any public telephone device in the vicinity. Routing to a private phone system would also be possible, but security and privacy concerns would hamper this. But for completeness, the methodology here applies to all cases.

If the system checks the configuration and no devices are listed, or no devices near the mobile device (near implies a distance parameter that is in the configuration file) exist, then the mobile devices can be sent a message alerting the user that private devices were found. If this is the case, then the user can reply with three options:
  Route to nearest public device
  Route to new private device (user must enter new device ID)
  Turn off Routing Determining Public Phones Near to User The user has the option to have the call routed to the nearest public device. If the user chooses this option than the system would query the PSTN and retrieve all public phones within the following parameters. The system currently would have the geographic location of the mobile device. Using the PSTN's public phone network database it would query for a list of devices within the mobile devices telecommunication sub-region. These sub-regions are determined by the telecommunications company, and having indicated a particular region, the system can then retrieve all public device phone numbers.

Having done this, the phone numbers can then be submitted again to the PSTN to resolve their addresses. Using commonly known techniques the system can then calculate the distance form the user (user's device) to the public phone(s) retrieved from the PSTN. The nearest device would then be chosen. This device and its address would then be sent to the user via the messaging capability of the phone, possible using wireless internet or other e-mobility techniques. The user may accept or reject the location. If the user accepts the location then the user would have calls that were routed to his mobile devices, rerouted to the public device. If the user rejects the location, subsequent locations based on distance can be presented (closest to furthest). The user may again either at any time, add a private number, accept the public location, or turn off routing.

Determining Fixed (Private) Phones Near to User

If the user has entered a list of private numbers in the configuration file, or adds a private number when no device in its proximity is found, the system can apply a simpler technique than above. The system can use the features of the LTS to its advantage by setting alert modes. These alert modes will be to create a custom tracking criteria for the device. The tracking criteria would be to create circular regions with a radius found in the configuration file, and instruct the LTS to alert the program when a user enters/ exists these regions. Thus two options can exist when a user activates tracking: a user turns on tracking while in a region, a user turns on tracking while not in a region. If the user is not in a region then the system will not receive a message from the LTS, it can then as above, ask the user if they wish to search for a public device.

A second option should be to allow the user to disable public device searching. Thus, a user may not be near a routable location (based on locations in a configuration file) but when a user does enter a region, the system will be alerted by the LTS. When the system is alerted of a user entering a specific region near a listed private phone, then the system will route calls to this device. Conversely, when the user exists this region, the LTS will again notify the system and the users calls will not be routed. As before with the public system, the user (user's device) will be sent a message to ask if routing preferences should be changed. The user can chose to accept new routing or decline it. If routing is declined, then the system will ignore the LTS alert when the user exists the region of the private line. It should however then receive the alert when a user enters another private device region and again prompt the user.

Determining Mobile Phone Near to User

When in the above case a user places in his configuration, or when prompted to add a private device (via a message sent to the mobile device), a routing destination that is itself a mobile device the system must add another subroutine to handle this. The procedure above for a private fixed land phone is the same until the location for the device at the PSTN is queried. At this point, the PSTN would return a result that indicates that the device is a mobile phone. The PSTN would also indicate the service provider for the device.

With this information there are 3 different ways to obtain the location of the device. The first approach is to use the ULDC network to retrieve the devices location. A second, is to query the service provider (possibly the same service provider as the active user) through a cooperative data sharing agreement and retrieve the mobile location on a ULD. The third option is to directly query a BSCIMTX for information to resolve the mobiles location.

When the tracking system is activated, all number indicated to be mobile numbers will require the system to periodically refresh the location of the devices. This time between refreshing can be configured by a system configuration parameter. When the device is refreshed, a new tracking criteria will be submitted to the LTS and the old criteria deleted. Besides these alteration, the system works just as it did for the land fixed device routing.

System Routing Change

When the mobile device has a new forwarding location the system then forwards this new phone number to the routing ability function of the cellular network. This allows external requests from outside the MTX (incoming calls) to be forwarded to a new number supplied from the current embodiment.

Methods to Alert User of Device of Routing Information

Many methods in current software and hardware designs of cellular networks exists to allow 2 direction communication from a software program on a MTX/Intranet to communicative with a mobile device. Methods which exist now that can accomplish the necessary tasks are:
  SMS
  Wireless Internet
  WML
  Proprietary Software These methods would require the user to respond in some cases. The system would then receive a response from the user, which would contain the users phone ID thus allowing the system to route the response to the particular mobiles preferences and routing queues.

Geographic Advertising System

Summary

The geographic advertising system (GAS) is a geographically based advertising system which enables the delivery of targeted advertising to and from wireless device users based on their geographic location. GAS monitors the movement of wireless users via monitoring hardware and software connected to a wireless network or user location database, and when a wireless device meets a certain criteria, the wireless device user may by targeted for an advertising solicitation. For example, a user of a wireless device who has traveled outside his home calling area, may receive a text message on his wireless device telling him of a discount on a hotel room in the area.

A business initiated solicitation to a wireless device may be triggered by:
  Distance between wireless device and soliciting business
  Location of the wireless device's home calling area
  Demographic information (age, sex, race, etc.)
  Historic travel patterns
  If wireless device is currently geographically located at a particular location (For example, shopping at the competition's store)
  Other defined criteria
  The solicitation may be delivered by;
  A text message to the wireless device
  A phone call to a wireless device
  A message deposited in the users voice mail
  An e-mail
  Postal mail
  A user of a wireless device may also initiate a solicitation by, for example, requesting the prices of hotel rooms within a given geographic radius.
  For a user initiated solicitation, the user may sort by:
  Type of goods and services
  Name of business providing goods and services
  Price of goods and services
  Distance to goods and services
  Other defined criteria
  This GAS can work in conjunction with the DAN or other mapping software to provide driving directions, for example, to the hotel which is soliciting the user.

ACRONYMS

BSC . . . BASE STATION CONTROLLER
BSS . . . MANAGER BASE STATION SUBSYSTEM MANAGER
BTS . . . BASE STATION TRANSCEIVER SUBSYSTEM
GPS . . . GLOBAL POSITIONING SYSTEM
HLR . . . HOME LOCATION REGISTER
MTX . . . METROPOLITAN TELEPHONY EXCHANGE
PSTN . . . PUBLIC SWITCH TELEPHONY NETWORK
RF . . . RADIO FREQUENCY
RSSI . . . RECEIVE STRENGTH SIGNAL
TDOA . . . TIME DIFFERENCE OF ARRIVAL
ULD . . . USER LOCATION DATABASE
ULDC . . . USER LOCATION DATABASE COORDINATOR
ULDCN . . . USER LOCATION DATABASE COORDINATOR NETWORK
. . . ULDM USER LOCATION DATABASE MANAGER

What is claimed is:

1. A system including:
  one or more radio-frequency transceivers and an associated one or more antennas to which the radio-frequency transceiver is coupled, wherein the one or more radio-frequency transceivers configured for radio-frequency communication with at least one mobile wireless communications device; and
  a computer coupled to the one or more radio-frequency transceivers programmed to locate the one or more mobile wireless communications devices and generate an indication of a location of the one or more mobile wireless communications devices, wherein the computer further receives and stores performance data of connections between the one or more mobile wireless communications devices and the radio-frequency transceiver along with the indication of location, wherein the computer references the performance data to expected performance data, wherein the computer determines at least one suggested corrective action in conformity with differences between the performance data and expected performance data in conjunction with the indication of location, wherein the computer further receives an error code from the radio-frequency transceiver, determines whether the error code indicates a performance issue with respect to the connection between the one or more mobile wireless communications devices and the radio-frequency transceiver, and wherein the computer determines the at least one suggested corrective action in response to the error code.

2. The system of claim 1, wherein the computer further determines the at least one suggested corrective action in conformity with a value of the error code.

3. The system of claim 1, wherein the one or more mobile wireless communication devices comprises two or more mobile wireless communication devices, each of the two or more mobile wireless communication devices communicating via radio frequency electromagnetic signals, wherein the computer is computer programmed to routinely, identify performance data and a corresponding location for each of the two or more wireless communication devices, and store in a memory the performance data and the corresponding locations for each of the two or more mobile wireless communication devices, and wherein the one or more radio-frequency transceivers and one or more associated antennas comprise a radio tower in communication with said computer and with the two or more mobile wireless communication devices, the radio tower adapted to generate an error code based upon operation of the radio tower and wherein the computer is further programmed to selectively suggest the at least one corrective action as a corrective adjustment of said radio frequency electromagnetic signal emitted by the radio tower so as to restrict processing radio frequency electromagnetic signals from one of the two or more mobile wireless communication devices based upon the error code.

4. The system of claim 1, wherein the two or more mobile wireless communication devices transmit performance data; and wherein the computer is further programmed to receive the performance data and to accordingly identify the location of each of two or more mobile wireless communication devices.

5. The system of claim 1, wherein the computer routinely stores updated performance data and an updated indication of location of the one or more mobile wireless communications devices while the mobile wireless communications device is communicating with the one or more radio-frequency transceivers.

6. A method of managing a wireless radio-frequency (RF) network, the method comprising:
   coupling in communication, one or more radio-frequency transceivers and an associated one or more antennas to which the radio-frequency transceiver is coupled to one or more mobile wireless communications devices;
   locating the one or more mobile wireless communications devices according to the radio-frequency communications and generating an indication of a location of the one or more mobile wireless communications devices;
   receiving and storing performance data of connections between the one or more mobile wireless communications devices and the radio-frequency transceiver along with the indication of location;
   referencing the performance data to expected performance data;
   determining at least one suggested corrective action in conformity with differences between the performance data and expected performance data in conjunction with the indication of location;
   receiving an error code from the radio-frequency transceiver;
   determining whether the error code indicates a performance issue with respect to the connection between the one or more mobile wireless communications devices and the radio-frequency transceiver; and
   determining the at least one suggested corrective action in response to the error code.

7. The method of claim 6, further comprising the computer determines the at least one suggested corrective action in conformity with a value of the error code.

8. The method of claim 6, wherein the one or more mobile wireless communications devices comprises two or more wireless communication devices, wherein the coupling couples each of the wireless communication devices in radio frequency communication with the radio-frequency transceiver, and wherein the method further comprises:
   routinely identifying the performance data and the corresponding location for each of the two or more wireless communication devices;
   storing the performance data and the corresponding locations for each of the two or more wireless communication devices in a memory of a computer;
   generating an error code based upon operation of the radio-frequency transceiver and the two or more wireless communication devices; and
   selectively suggesting the corrective action as a corrective adjustment of said radio frequency electromagnetic signal emitted by the radio tower so as to restrict processing radio frequency electromagnetic signals from at least one of the two or more wireless communication devices based upon the error code.

9. The method of claim 8, further comprising:
   transmitting performance data from at least one of the two or more wireless communication devices; and
   the computer receiving the performance data and accordingly identify the location of each of the two or more wireless communication devices.

10. The method of claim 6, further comprising routinely storing updated performance data and an updated indication of location of the one or more mobile wireless communications devices while the mobile wireless communications device is communicating with the one or more radio-frequency transceivers.

11. A system including:
   multiple radio-frequency transceivers and associated multiple antennas to which the associated radio-frequency transceivers are coupled, wherein the multiple radio-frequency transceivers are configured for radio-frequency communication with one or more mobile wireless communications devices; and
   a computer coupled to the multiple radio-frequency transceivers that receives and stores an indication of a location of the one or more mobile wireless communications devices, wherein the computer receives an indication that indicates that communication between a particular one of the radio-frequency transceivers and the one or more mobile wireless communications devices is faulty, wherein the computer takes corrective action on the particular radio-frequency transceiver to attempt to remedy the fault, wherein the one or more mobile wireless communications devices transmit an indication of performance of communication with the particular one of the multiple radio-frequency transmitters, and wherein the computer is further programmed to receive the indication of performance from one of the multiple radio-frequency transceivers as the indication that the communication between the particular one of the radio-frequency transceivers and the one or more mobile wireless communications devices is faulty, wherein the computer further receives and stores performance data of connections between the one or more mobile wireless communications devices and the multiple radio-frequency transceivers along with the indication of location, wherein the computer references the performance data to expected performance data, and wherein the computer determines at least one suggested corrective action in conformity with differences between the performance data and expected performance data in conjunction with the indication of location.

12. The system of claim 11, wherein the computer routinely stores updated performance data and an updated indication of location of the one or more mobile wireless communications devices while the mobile wireless communications device is communicating with the one or more radio-frequency transceivers.

13. The system of claim 11, wherein the computer takes action by setting a state of the particular radio-frequency transceiver to prevent communication between the one or more radio-frequency transceivers and the one or more mobile wireless communications devices.

14. The system of claim 11, wherein the computer takes action by automatically adjusting at least one operating parameter of the particular radio-frequency transceiver to improve communication between the at least on radio-frequency transceiver and the one or more mobile wireless communications devices.

15. The system of claim 14, wherein the computer further receives an error code from the particular radio-frequency transceiver, determines whether the error code indicates a performance issue with respect to the communications between the one or more mobile wireless communications devices and the particular radio-frequency transceiver, and wherein the computer determines at least one corrective action taken by the automatically adjusting in response to the error code.

16. The system of claim 15, wherein the computer further determines the at least one corrective action in conformity with a value of the error code.

17. A method of managing a wireless radio-frequency (RF) network, the method comprising:
- coupling in communication, multiple radio-frequency transceivers and associated multiple antennas to which the radio-frequency transceivers are coupled, wherein the multiple radio-frequency transceivers are configured for radio-frequency communication one or more mobile wireless communications devices;
- locating the one or more mobile wireless communications devices according to the radio-frequency communication and generating an indication of a location of the one or more mobile wireless communications devices;
- receiving and storing the indication of location by a computer system;
- the computer system receiving and storing performance data of connections between the one or more mobile wireless communications devices and the multiple radio-frequency transceivers along with the indication of location;
- the computer system receiving an indication of performance from a first one of the multiple radio-frequency transceivers that indicates that communication between the first one of the radio-frequency transceivers and the one or more mobile wireless communications devices is faulty;
- responsive to receiving the indication that the communication is faulty, the computer taking corrective action on the particular radio-frequency transceiver to attempt to remedy the fault;
- the computer referencing the performance data to expected performance data; and
- the computer determining at least one suggested corrective action in conformity with differences between the performance data and expected performance data in conjunction with the indication of location.

18. The method of claim 17, wherein the receiving and storing routinely stores updated performance data and an updated indication of location of the one or more mobile wireless communications devices while the mobile wireless communications device is communicating with the one or more radio-frequency transceivers.

19. The method of claim 17, wherein the computer takes action by setting a state of the particular radio-frequency transceiver to prevent communication between the at least on radio-frequency transceiver and the one or more mobile wireless communications devices.

20. The method of claim 17, wherein the computer takes action by automatically adjusting at least one operating parameter of the particular radio-frequency transceiver to improve communication between the at least on radio-frequency transceiver and the one or more mobile wireless communications devices.

21. The method of claim 20, further comprising:
- the computer further receiving an error code from the particular radio-frequency transceiver;
- the computer determining whether the error code indicates a performance issue with respect to the communications between the one or more mobile wireless communications devices and the particular radio-frequency transceiver; and
- the computer determining at least one corrective action taken by the automatically adjusting in response to the error code.

22. The method of claim 21, further comprising the computer the computer determining the at least one corrective action in conformity with a value of the error code.

* * * * *